(12) United States Patent
Katsumoto et al.

(10) Patent No.: US 12,544,372 B2
(45) Date of Patent: Feb. 10, 2026

(54) METHODS OF TREATING RHEUMATOID ARTHRITIS, CHRONIC SPONTANEOUS URTICARIA, AND SYSTEMIC LUPUS ERYTHEMATOSIS USING AN INHIBITOR OF BRUTON'S TYROSINE KINASE

(71) Applicant: Genentech, Inc., South San Francisco, CA (US)

(72) Inventors: Tamiko Katsumoto, Millbrae, CA (US); Leslie Chinn, South San Francisco, CA (US); Alyssa Mariko Morimoto, San Mateo, CA (US); David James Haddon, Millbrae, CA (US)

(73) Assignee: Genentech, Inc., South San Francisco, CA (US)

( * ) Notice: Subject to any disclaimer, the term of this patent is extended or adjusted under 35 U.S.C. 154(b) by 1110 days.

(21) Appl. No.: 17/381,592

(22) Filed: Jul. 21, 2021

(65) Prior Publication Data

US 2022/0047588 A1 Feb. 17, 2022

Related U.S. Application Data

(63) Continuation of application No. PCT/US2020/014346, filed on Jan. 21, 2020.

(60) Provisional application No. 62/913,270, filed on Oct. 10, 2019, provisional application No. 62/795,477, filed on Jan. 22, 2019.

(51) Int. Cl.
| | | |
|---|---|---|
| *A61K 31/4985* | (2006.01) | |
| *A61K 45/06* | (2006.01) | |
| *A61P 19/02* | (2006.01) | |
| *A61P 37/06* | (2006.01) | |

(52) U.S. Cl.
CPC .......... *A61K 31/4985* (2013.01); *A61K 45/06* (2013.01); *A61P 19/02* (2018.01); *A61P 37/06* (2018.01)

(58) Field of Classification Search
CPC ................................................ A61K 31/4985
See application file for complete search history.

(56) References Cited

U.S. PATENT DOCUMENTS

| | | |
|---|---|---|
| 8,716,274 B2 | 5/2014 | Crawford et al. |
| 8,921,353 B2 | 12/2014 | Crawford et al. |
| 9,238,655 B2 | 1/2016 | Crawford et al. |
| 9,782,405 B2 | 10/2017 | Crawford et al. |
| 10,045,983 B2 | 8/2018 | Crawford et al. |
| RE48,239 E | 10/2020 | Crawford et al. |
| 2019/0194203 A1 | 6/2019 | Crawford et al. |
| 2020/0062769 A1 | 2/2020 | Crawford et al. |
| 2021/0079002 A1 | 3/2021 | Crawford et al. |

FOREIGN PATENT DOCUMENTS

| | | |
|---|---|---|
| CN | 103189074 A | 3/2013 |
| WO | 2017/148837 A1 | 9/2017 |
| WO | 2018/175863 A1 | 9/2018 |

OTHER PUBLICATIONS

Genentech: Study: NCT02833350; Jul. 14, 2016 XP055685865, Retrieved from the Internet:URL:https://clinicaltrials.gov/ct2/history/NCT02833350?V_21 (retrieved on Nov. 23, 2024). (Year: 2016).*
Finckh et. al (Arthritis Research & Therapy 2009, 11(Suppl 1):S1 This article is online at http://arthritis-research.com/supplements/11/S1 (doi:10.1186/ar2666)) (Year: 2009).*
Katsumoto et. al (Clinical Pharmacology & Therapeutics vol. 103 No. 6 , Jun. 2018, p. 1020-1028. (Year: 2018).*
Ruderman, "Overview of safety of non-biologic and biologic DMARDs" Rheumatology 51:vi37-vi43 (2012).
Steiman et al., "Non-biologic disease-modifying antirheumatic drugs (DMARDs) improve pain in inflammatory arthritis (IA): a systematic literature review of randomized controlled trials" Rheumatology International 33(5):1105-1120 ( 2013).
Altrichter, S., et al., "IgE mediated autoallergy against thyroid peroxidase—a novel pathomechanism of chronic spontaneous urticaria?" PLOS One 6(4):e14794 (1-6) (Apr. 12, 2011).
Bruton, O., et al., "Agammaglobulinemia" Pediatrics 9(6):722-728 (Jun. 1, 1952).
Burness, C.B., et al., "Belimumab: in systemic lupus erythematosus" Drugs 71(18):2435-2444 (Dec. 1, 2011).
Chan, P. et al., "Population Pharmacokinetics, Efficacy Exposure-response Analysis, and Model-based Meta-analysis of Fenebrutinib in Subjects with Rheumatoid Arthritis" Pharma Res 37(2):25(1-13) (Jan. 6, 2020).
Cohen, S., et al., "Efficacy and Safety of Fenebrutinib, a BTK Inhibitor, Compared to Placebo in Rheumatoid Arthritis Patients with Active Disease Despite TNF Inhibitor Treatment: Randomized, Double Blind, Phase 2 Study" Abstract (929) 83rd Annual ACR/ARP Annual Meeting—2019, Atlanta, Georgia US, pp. 1-4 ( Nov. 10, 2019).
Cohen, S., et al., "Fenebrutinib Compared to Placebo and Adalimumab in Patients with Inadequate Response to Either Methotrexate Therapy or Prior TNF Therapy: Phase 2 Study" Abstract (OP0025; Annual of Rheumatic Diseases, vol. 78:Issue Suppl. 2) Annual European Congress of Rheumatology, EULAR 2019, Madrid, Spain, pp. A80 (1-2) (Jun. 12-15, 2019).
Cohen, S., et al., "Fenebrutinib versus Placebo or Adalimumab in Rheumatoid Arthritis: A Randomized, Double-Blind, Phase II Trial (ANDES Study)" Arthritis Rheumatol 72(9):1435-1445 (Sep. 91, 2020).
Conley, M.E., et al., "Genetic analysis of patients with defects in early B-cell development" Immuno Rev 203(1):216-234 (Feb. 1, 2005).

(Continued)

*Primary Examiner* — John S Kenyon
*Assistant Examiner* — Rehana Ismail
(74) *Attorney, Agent, or Firm* — Armstrong Teasdale LLP

(57) ABSTRACT

The present disclosure relates to methods of treating rheumatoid arthritis, chronic spontaneous urticaria, and systemic lupus erythematosus using fenebrutinib, an inhibitor of Bruton's tyrosine kinase, or a pharmaceutically acceptable salt thereof.

9 Claims, 54 Drawing Sheets

(56) References Cited

OTHER PUBLICATIONS

Crawford, J. et al., "Discovery of GDC-0853: A Potent, Selective, and Noncovalent Bruton's Tyrosine Kinase Inhibitor in Early Clinical Development" J Med Chem 61(6):2227-2245 (Mar. 22, 2018).
Fors-Nieves, C., et al., "Mortality in Systemic Lupus Erythematosus: an Updated Review" Curr Rheumatol Rep 18(4):21 (1-7) (Apr. 1, 2016).
Goronzy J., et al., "Developments in the scientific understanding of rheumatoid arthritis" Arthritis Res Ther 11(5):249 (1-14) (Oct. 14, 2009).
Greaves, M.,, "Chronic urticaria" J Allergy Clin Immunol 105(4):664-672 (Apr. 1, 2000).
Greaves, M.W., et al., "Chronic idiopathic urticaria" Curr Opin Allergy Clin Immunol 3(5):363-368 (Oct. 1, 2003).
Herman, A., et al., "Safety, Pharmacokinetics, and Pharmacodynamics in Healthy Volunteers Treated With GDC-0853, a Selective Reversible Bruton's Tyrosine Kinase Inhibitor" Clin Pharmacol Ther 103(6):1020-1028 (Jun. 1, 2018).
"International Preliminary Report on Patentability—PCT/US2020/014346" (Report Issuance Date: Jul. 27, 2021; Chapter I),:1-11 (Aug. 5, 2021).
"International Search Report—PCT/US2020/014346" (w/Written Opinion),:pp. 1-15 (May 6, 2020).
Isenberg, D., et al., "Efficacy, Safety, and Pharmacodynamic Effects of the Bruton's Tyrosine Kinase Inhibitor Fenebrutinib (GDC-0853) in Systemic Lupus Erythematosus: Results of a Phase II, Randomized, Double-Blind, Placebo-Controlled Trial" Arthritis Rheumatol 73(10):1835-1846 (Oct. 1, 2021).
Isenberg, D., et al., "Efficacy, Safety, and Pharmacodynamic Effects of the Bruton's Tyrosine Kinase Inhibitor, Fenebrutinib (GDC-0853), in Moderate to Severe Systemic Lupus Erythematosus in a Phase 2 Controlled Study" Abstract (OP0233 (2020); Ann Rheum Dis, vol. 79, supplement 1, year 2020, p. 148) Annual European Congress of Rheumatology, EULAR 2020, Virtual Conference, pp. 1-2 (Jun. 3-6, 2020).
Isenberg, D., et al., "Efficacy, Safety, and Pharmacodynamic Effects of the Bruton's Tyrosine Kinase Inhibitor, Fenebrutinib (GDC-0853), in Moderate to Severe Systemic Lupus Erythematosus: Results of a Phase 2 Randomized Controlled Trial" Abstract (L15,) 83rd Annual ACR/ARP Annual Meeting—2019, Atlanta, Georgia US, pp. 1-5 (Nov. 12, 2019).
Iyer, A.S., et al., "Absence of Tec family kinases interleukin-2 inducible T cell kinase (Itk) and Bruton's tyrosine kinase (Btk) severely impairs Fc epsilonRI-dependent mast cell responses" J Biol Chem 286(11):9503-9513 (Mar. 18, 2011).
Kaplan, A., et al., "Clinical Practice: Chronic Urticaria and Angioedema" New Engl J Med 346(3):175-179 (Jan. 17, 2002).
Kay, A.B., et al., "Elevations in vascular markers and eosinophils in chronic spontaneous urticarial weals with low-level persistence in uninvolved skin" Br J Dermatol 171(3):505-511 (Sep. 1, 2014).
Kozel, M., et al., "Chronic urticaria: aetiology, management and current and future treatment options" Drugs 64(22):2515-2536 (Nov. 1, 2004).
Lindsay, L., et al., "Baseline Factors Associated with Lupus Flares: A Post-hoc Analysis of Patients with Moderate to Severe Active Systemic Lupus Erythematosus Enrolled in a 48-week Phase II Randomized Clinical Trial" Poster (POS0792; Ann Rheum Dis, vol. 80, Suppl. 1, Year 2021, p. 648) Annual European Congress of Rheumatology, EULAR 2021, Virtual—France, p. 1 (Jun. 2-5, 2021) http://scientific.sparx-ip.net/archiveeular/?c=a&view=1&searchfor-fenebrutinib&item=2021POS0792.
Looney, R.J., "B cell-targeted therapy for rheumatoid arthritis: an update on the evidence" Drugs 66(5):625-639 (Apr. 1, 2006).
Martin, F., et al., "Pathogenic Roles of B Cells in Human Autoimmunity: Insights from the Clinic" Immunity 20(5):517-527 (May 1, 2004).
Maurer, M., et al., "Unmet clinical needs in chronic spontaneous urticaria. A GA²LEN task force report" Allergy 66(3):317-330 (Mar. 1, 2011).

McGirt, L., et al., "Successful treatment of recalcitrant chronic idiopathic urticaria with sulfasalazine" Arch Dermatol 142(10):1337-1342 (Oct. 1, 2006).
Morimoto, A., et al., "The BTK Inhibitor, Fenebrutinib, Effectively Modulates B and Myeloid Cell Biology in Rheumatoid Arthritis Patients" Abstract (FRI0129 (2019); Ann Rheum Dis, vol. 78, supplement 2, year 2019, p. A733) Annual European Congress of Rheumatology, EULAR 2019, Madrid, Spain, pp. A733 (1-2) ( Jun. 12-15, 2019).
Niiro, H., et al., "Regulation of B-cell fate by antigen-receptor signals" Nat Rev Immunol 2(12):945-956 (Dec. 1, 2002).
Powell, R.J., et al., "BSACI guideline for the management of chronic urticaria and angioedema" Clin Exp Allergy 45(3):547-565 (Mar. 1, 2015).
Reth, M., et al. advances in Immunology "Chapter Four—Signaling Circuits in Early B-Cell Development" Austen, F., et al., eds., First Edition, San Diego, CA—USA: Academic Press, vol. 122:129-175 (2014).
Ruiz-Irastorza, G., et al., "Predictors of major infections in systemic lupus erythematosus" Arthritis Res Ther 11(4):R109 (1-8) (Jul. 15, 2009).
Saini, S.S., et al., "Chronic spontaneous urticaria: etiology and pathogenesis" Immunol Allergy Clin North Am 34(1):33-52 (Feb. 1, 2014).
Satterthwaite, A.B., et al., "The role of Bruton's tyrosine kinase in B-cell development and function: a genetic perspective" Immunol Rev 175(1):120-127 (Jun. 1, 2000).
Shlomchik, M.J., "Sites and Stages of Autoreactive B Cell Activation and Regulation" Immunity 28(1):18-28 (Jan. 18, 2008).
Sochorová, K., et al., "Impaired Toll-like receptor 8-mediated IL-6 and TNF-alpha production in antigen-presenting cells from patients with X-linked agammaglobulinemia" Blood 109(6):2553-2556 (Mar. 15, 2007).
US ClinicalTrails.gov, "A Study to Evaluate the Long-term Safety and Efficacy of Fenebrutinib in Participants Previously Enrolled in a Fenebrutinib Chronic Spontaneous Urticaria (CSU) Study" (History of Changes; ClinicalTrials.gov Identifier: NCT03693625; Other Study IDs: GS40868, 2018-002296-17(EudraCT Number); Submitted Date: Dec. 17, 2018(v3); First Posted: Oct. 3, 2018; Results First Posted: Sep. 25, 2020; Last Update Posted: Sep. 25, 2020; Retrieved: Oct. 19, 2021),:1-10.
US ClinicalTrials.gov, "A Study of GDC-0853 in Participants With Refractory Chronic Spontaneous Urticaria (CSU)" (History of Changes; ClinicalTrials.gov Identifier: NCT03137069; Other Study IDs: GS39684, 2016-004624-35 (EudraCT Number); First Posted: May 2, 2017; Results First Posted: Sep. 29, 2020; Last Updated Posted: Sep. 29, 2020; Retrieved: Oct. 15, 2021),:1-16 (Nov. 28, 2018).
US ClinicalTrials.gov, "A Study of the Safety and Efficacy of GDC-0853 in Participants With Moderate to Severe Active Systemic Lupus Erythematosus" (History of Changes; ClinicalTrials.gov Identifier: NCT02908100; Other Study IDs: GA30044, 2016-001039-11 (EudraCT Number); First Posted: Sep. 20, 2016; Results First Posted: Jul. 7, 2020; Last Update Posted: Jul. 7, 2020; Retrieved: Oct. 15, 2021),:1-19 (Dec. 17, 2018).
US ClinicalTrials.gov, "A Study to Evaluate the Long-Term Safety and Efficacy of GDC-0853 in Participants With Moderate to Severe Rheumatoid Arthritis Enrolled in Study GA29350 (NCT02833350)" (History of Changes; ClinicalTrials.gov Identifier: NCT02983227; Other Study IDs: GA30067, 2016-000498-19(EudraCT Number); Submitted Date: Dec. 17, 2018(v21); First Posted: Dec. 6, 2016; Results First Posted: Aug. 3, 2020; Last Update Posted: Aug. 3, 2020; Retrieved: Oct. 19, 2021),:1-19.
US ClinicalTrials.gov, "A Study to Evaluate the Long-term Safety and Efficacy of Fenebrutinib in Participants Previously Enrolled in a Fenebrutinib Chronic Spontaneous Urticaria (CSU) Study" (History of Changes; ClinicalTrials.gov Identifier: NCT03693625; Other Study IDs: GS40868, 2018-002296-17 (EudraCT Number); First Posted: Oct. 3, 2018; Results First Posted: Sep. 25, 2020; Last Update Posted: Sep. 25, 2020),:1-10 (Dec 17, 2018).
US ClinicalTrials.gov, "A Two-Cohort Randomized Phase II, Double-Blind, Parallel Group Study in Patients With Active Rheumatoid Arthritis Evaluating the Efficacy and Safety of GDC-0853 Compared With Placebo and Adalimumab in Patients With an Inadequate

(56) References Cited

OTHER PUBLICATIONS

Response to Previous Methotrexate Therapy (Cohort 1) . . . " (Sponsor: Genentech, Inc.—NCT02833350; Test Product—GDC-0853 (RO7010939)),:1-46 (Mar. 10, 2017) https://clinicaltrials.gov/ProvidedDocs/50/NCT02833350/Prot_SAP_001.pdf.

US ClinicalTrials.gov, "An Extension Study of GDC-0853 in Participants With Moderate to Severe Active Systemic Lupus Erythematosus" (History of Changes; ClinicalTrials.gov Identifier: NCT03407482; Other Study IDs: GA30066, 2017-001764-37(EudraCT Number); Submitted Date: Dec. 19, 2018 (v11); First Posted: Jan. 23, 2018; Results First Posted: Dec. 19, 2020; Last Update Posted: Dec. 19, 2020; Retrieved: Oct. 19, 2021),:1-17 https://clinicaltrials.gov/ct2/history/NCT03407482?V_11=View#StudyPageTop.

US ClinicalTrials.gov, "Efficacy and Safety of GDC-0853 in Participants With Refractory Chronic Spontaneous Urticaria (CSU)" (History of Changes; ClinicalTrials.gov Identifier: NCT03137069; Other Study IDs: GS39684, 2016-004624-35(EudraCT Number); Submitted Date: Nov. 28, 2018 (v17); First Posted: May 2, 2017; Results First Posted: Sep. 29, 2020; Last Update Posted: Sep. 29, 2020; Retrieved: Oct. 19, 2021),:1-16 https://clinicaltrials.gov/ct2/history/NCT03137069?V_17=View#StudyPageTop.

US ClinicalTrials.gov, "Safety and Efficacy Study of GDC-0853 Compared With Placebo and Adalimumab in Participants With Rheumatoid Arthritis (RA)" (History of Changes; ClinicalTrials.gov Identifier: NCT02833350; Other Study IDs: GA29350, 2016-000335-40(EudraCT Number); Submitted Date: Oct. 18, 2018(v21); First Posted: Jul. 14, 2016; Results First Posted: Sep. 10, 2019; Last Update Posted: Jun. 12, 2020; Retrieved: Oct. 19, 2021),:1-28.

US ClinicalTrials.gov, "Safety and Efficacy Study of GDC-0853 Compared With Pacebo and Adalimumab in Participants With Rheumatoid Arthritis (RA)" (History of Changes; ClinicalTrials.gov Identifier: NCT02833350; Other Study IDs: GA29350, 2016-000335-40 ( EudraCT Number); First Posted: Jul. 14, 2016; Last Updated Posted: Oct. 19, 2018; Printed: May 24, 2021),:1-27 (May 24, 2021) https://clinicaltrials.gov/ct2/history/NCT02833350.

US ClinicalTrials.gov, "Study of the Safety and Efficacy of GDC-0853 in Participants With Moderate to Severe Active Systemic Lupus Erythematosus" (History of Changes; ClinicalTrials.gov Identifier: NCT02908100; Other Study IDs: GA30044, 2016-001039-11(EudraCT Number); Submitted Date: Dec. 17, 2018 (v21): First Posted: Sep. 20, 2016; Results First Posted: Jul. 7, 2020; Last Update Posted: Jul. 7, 2020; Retrieved: Oct. 19, 2021),:1-19.

Ying, S., et al., "TH1/TH2 cytokines and inflammatory cells in skin biopsy specimens from patients with chronic idiopathic urticaria: Comparison with the allergen-induced late-phase cutaneous reaction" J Allergy Clin Immunol 109(4):694-700 (Apr. 1, 2002).

Zweiman, B., et al., "Modulation of serum histamine releasing activity in chronic idiopathic urticaria" Immunopharmacology 39(3):225-234 (Jun. 1, 1998).

\* cited by examiner

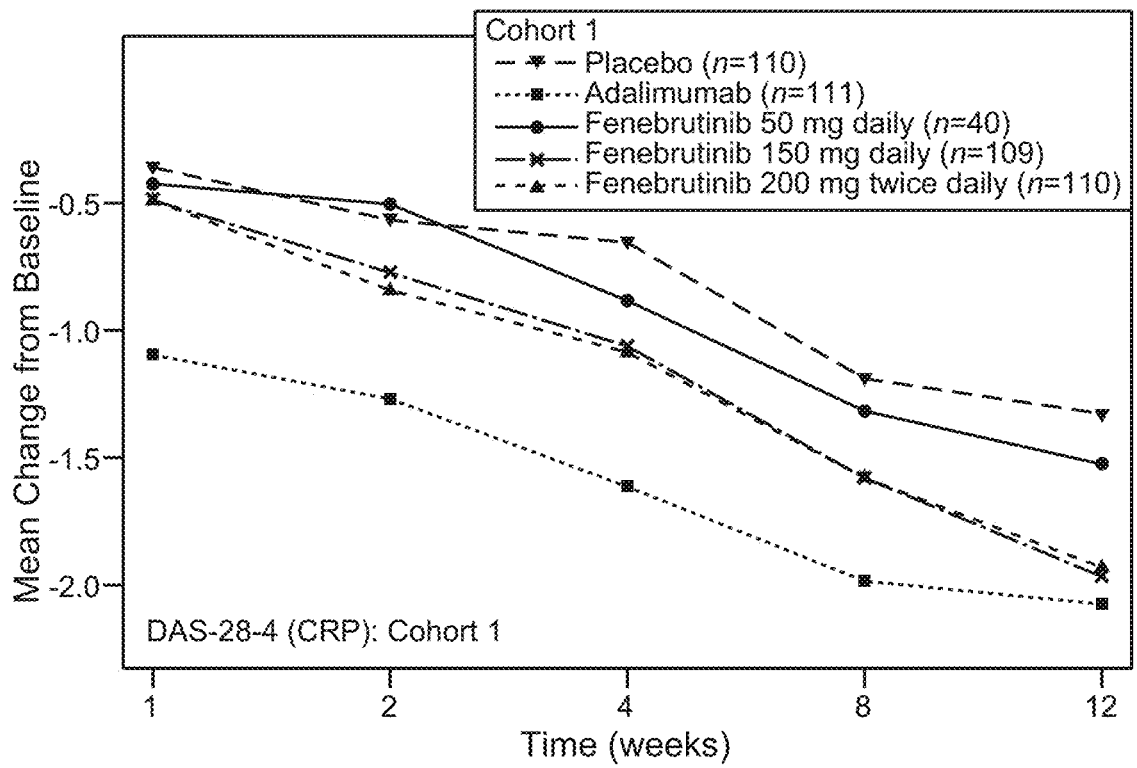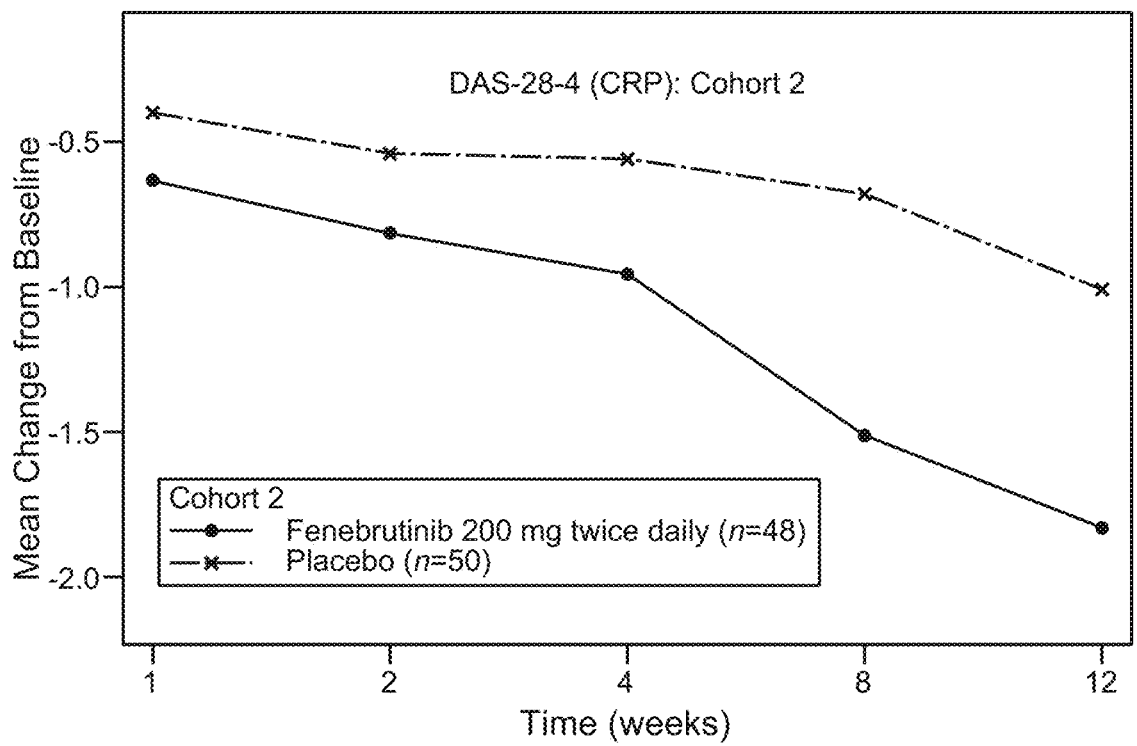
FIG. 21B

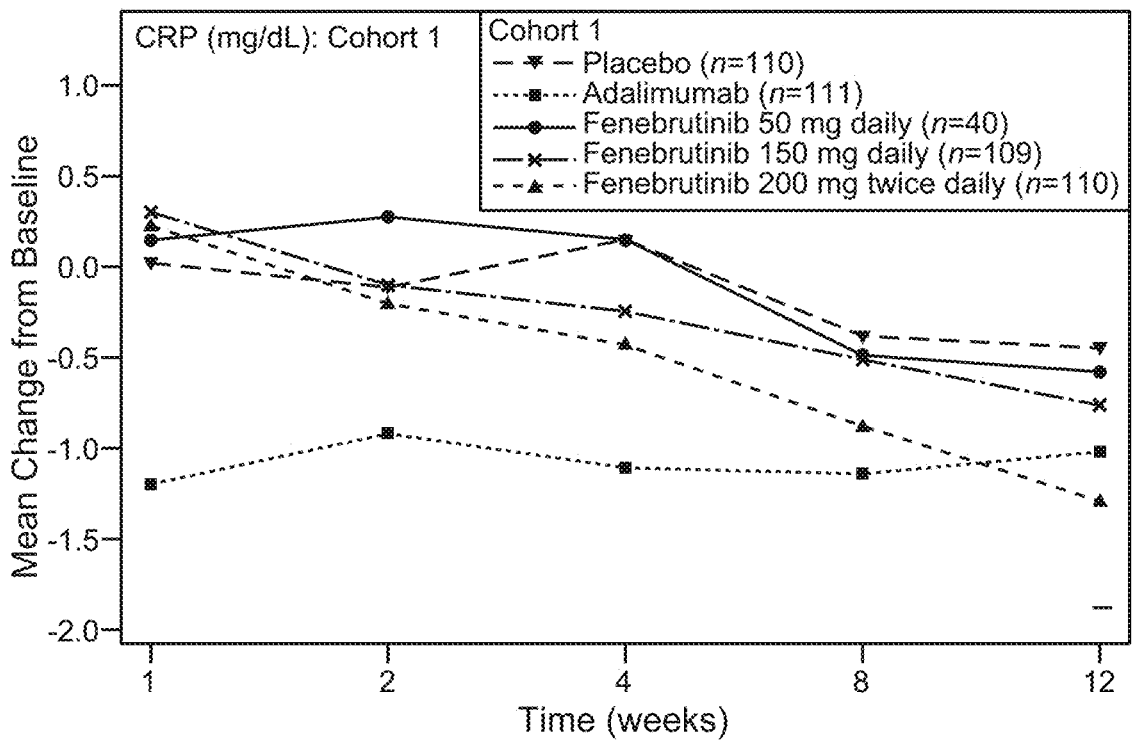
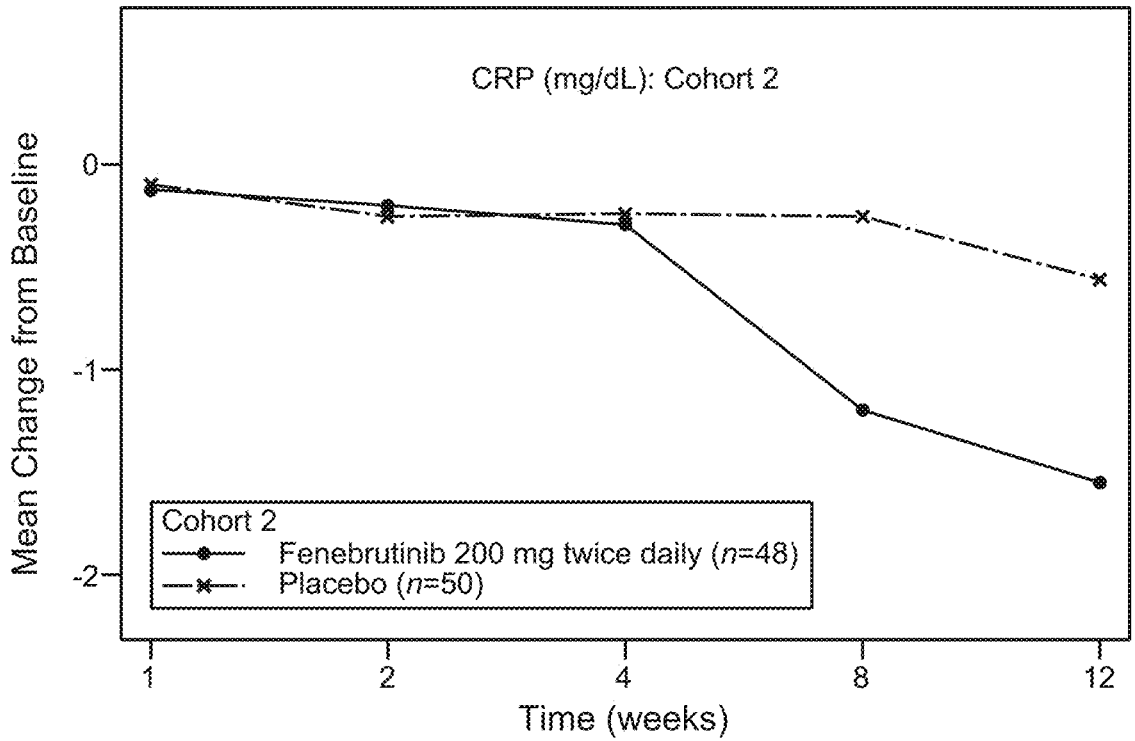
FIG. 25D

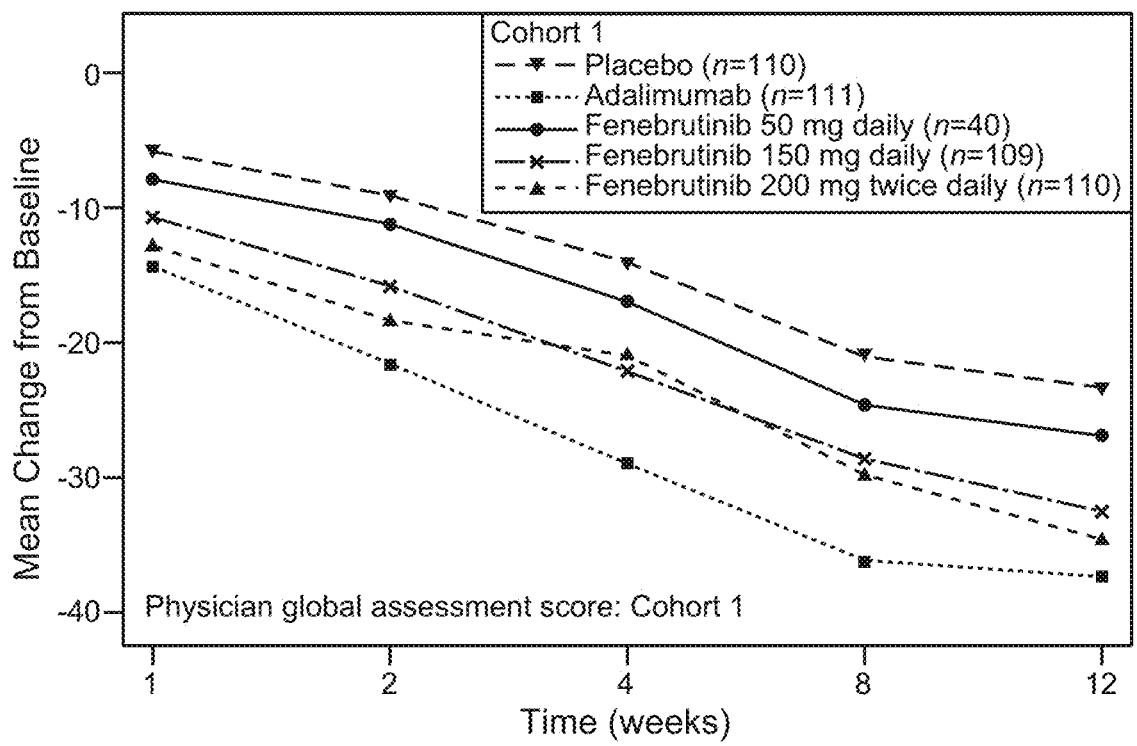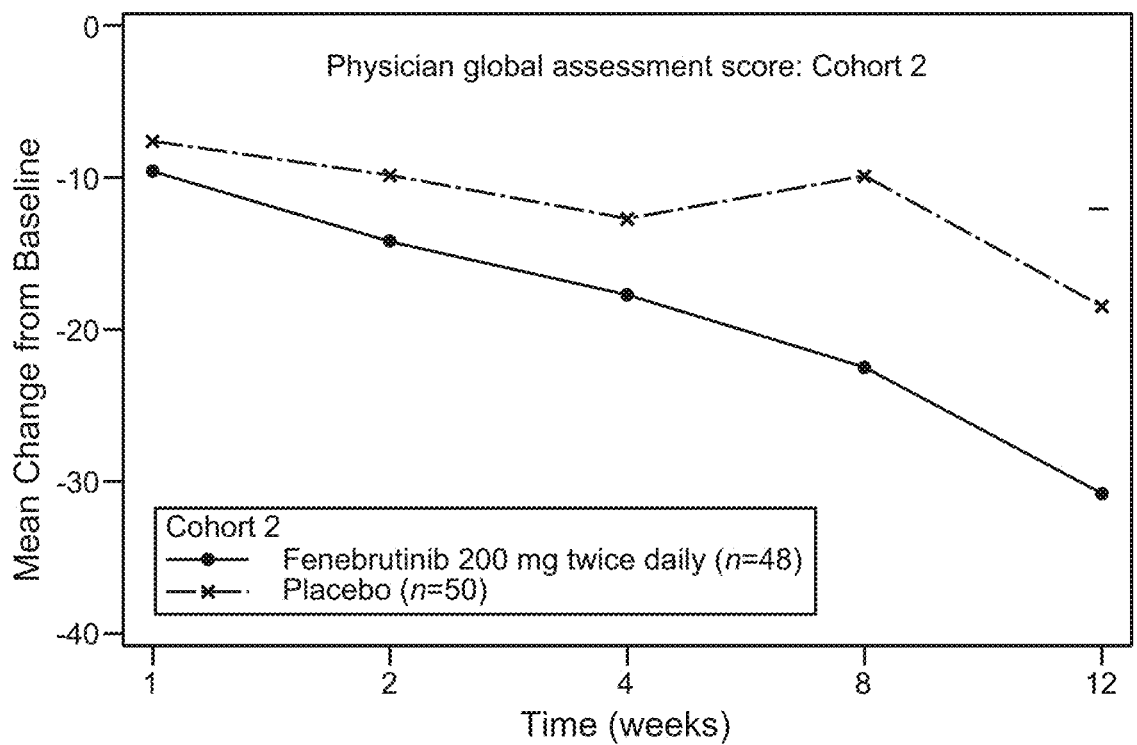
FIG. 26A

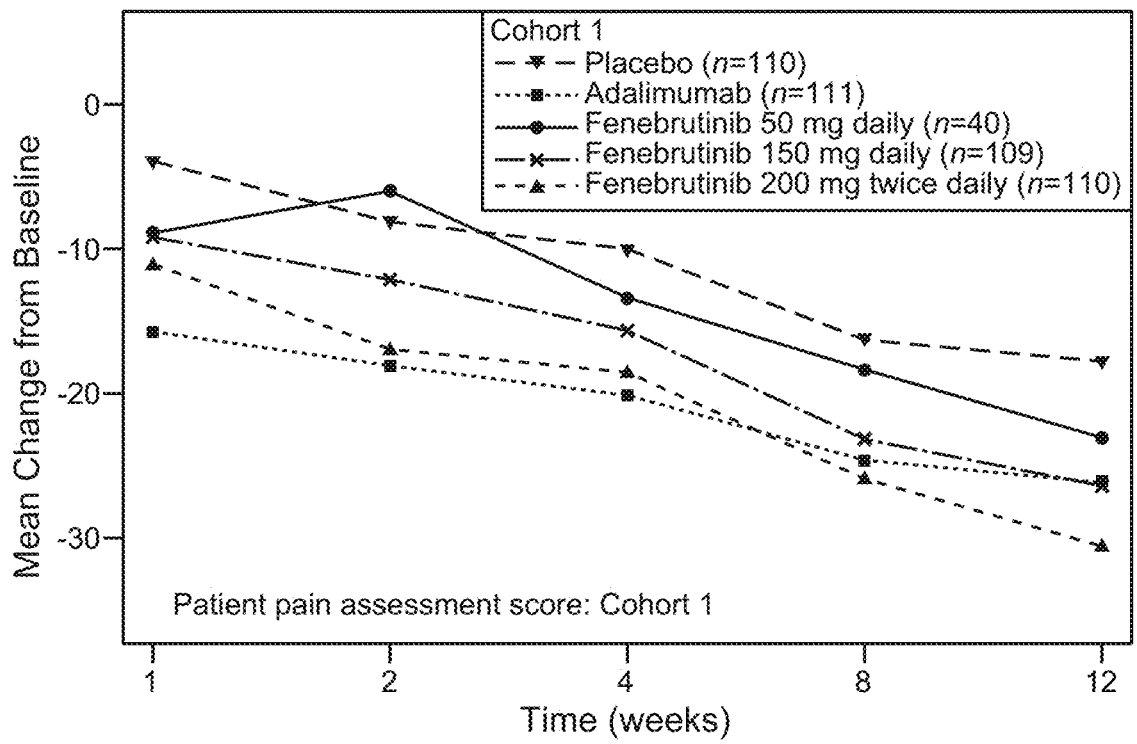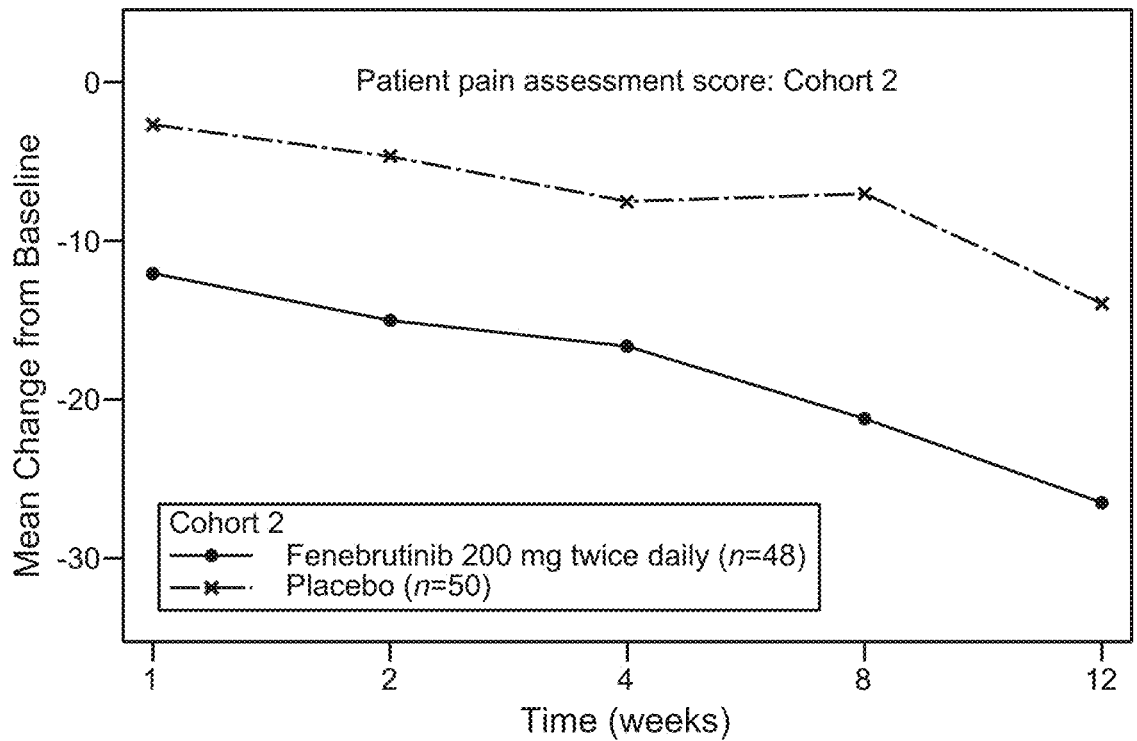
FIG. 26C

Demographics and baseline characteristics of patients in both cohorts of fenebrutinib RA study

| | Cohort 1 (MTX-IR) | | | | | Cohort 2 (TNF-IR) | |
|---|---|---|---|---|---|---|---|
| | Placebo (n=110) | Fen, 50 mg once daily (n=40) | Fen, 150 mg once daily (n=109) | Fen, 200 mg twice daily (n=110) | Ada, 40 mg every other week (n=111) | Placebo (n=50)* | Fen, 200 mg twice daily (n=48)* |
| Age,* years mean (SD) | 50 (12) | 52 (12) | 50 (11) | 50 (12) | 50 (12) | 55 (12) | 51 (13) |
| Sex,* female n (%) | 90 (82) | 35 (88) | 92 (84) | 85 (77) | 87 (78) | 37 (76) | 37 (76) |
| Race,* white n (%) | 95 (86) | 36 (90) | 96 (88) | 96 (87) | 99 (89) | 42 (86) | 42 (86) |
| BMI* (kg/m²) mean (SD) | 28 (6) | 27 (6) | 27 (5) | 28 (6) | 27 (5) | 27 (5) | 26 (5) |
| RA duration,* years median (range) | 5 (0.3-25) | 8 (0.3-32) | 5 (0.3-31) | 5 (0.3-38) | 5 (0.3-30) | 9 (1.2-29) | 7 (2.0-36) |
| Antibody, positive n (%) ACPA / RF | 102 (93) / 98 (89) | 39 (98) / 38 (95) | 100 (91) / 108 (98) | 105 (95) / 103 (94) | 103 (92) / 104 (93) | 42 (84) / 49 (98) | 46 (96) / 46 (96) |
| Swollen-joint count of 66 examined, mean (SD) | 16 (10) | 13 (8) | 14 (8) | 14 (8) | 14 (8) | 15 (8) | 15 (8) |
| Tender-joint count of 68 examined, mean (SD) | 24 (13) | 24 (13) | 24 (13) | 22 (12) | 24 (13) | 27 (16) | 24 (12) |
| HAQ-DI mean (SD) | 1.6 (0.6) | 1.8 (0.5) | 1.7 (0.5) | 1.7 (0.6) | 1.8 (0.7) | 1.8 (0.5) | 1.5 (0.6) |
| DAS-28-4-CRP mean (SD) | 5.9 (0.8) | 5.7 (0.9) | 5.9 (0.8) | 5.8 (1.0) | 5.8 (0.9) | 6.0 (1.0) | 5.9 (0.9) |
| CRP (mg/dL) mean (SD) | 2.0 (1.9) | 1.6 (1.4) | 2.0 (2.0) | 2.5 (3.1) | 2.1 (2.6) | 3.1 (4.1) | 2.5 (2.8) |
| ESR (mm/h) mean (SD) | 45 (21) | 45 (20) | 43 (21) | 45 (23) | 41 (22) | 61 (32) | 52 (29) |
| IgM (mg/dL) mean (SD) | 1580 (81) | 1430 (52) | 1640 (102) | 1380 (60) | 1450 (60) | 1720 (84) | 1560 (72) |
| IgG (mg/dL) mean (SD) | 1291 (300) | 1250 (299) | 1245 (368) | 1317 (471) | 1271 (355) | 1323 (381) | 1333 (495) |

*Cohort 2 groups are n=50 for placebo and n=48 for fenebrutinib in the intent-to-treat population; for age, sex, race, BMI, and RA duration, n=49 for both groups. Fen = fenebrutinib; Ada = adalimumab.

| FIG. 30B-1 |
|---|
| FIG. 30B-2 |

FIG. 30B-1

Additional baseline characteristics and disease activity measures of patients in both cohorts of fenebrutinib RA study

| | Cohort 1 (MTX-IR) | | | | | Cohort 2 (TNF-IR) | |
|---|---|---|---|---|---|---|---|
| | Placebo (n=110) | Fen, 50 mg once daily (n=40) | Fen, 150 mg once daily (n=109) | Fen, 200 mg twice daily (n=110) | Fen, 40 mg every other week (n=111) | Placebo (n=50) | Fen, 200 mg twice daily (n=48) |
| Region, *n* (%) | | | | | | | |
| EEU/Asia | 66 (60) | 33 (83) | 65 (60) | 66 (60) | 65 (59) | 30 (60) | 30 (63) |
| LATAM | 40 (36) | 5 (13) | 40 (37) | 40 (36) | 41 (37) | 15 (30) | 15 (31) |
| USA | 4 (4) | 2 (5) | 4 (4) | 4 (4) | 5 (5) | 5 (10) | 3 (6) |
| Previous biologic DMARDs | | | | | | | |
| 1 TNF inhibitor, *n* (%) | N/A | N/A | N/A | N/A | N/A | 41 (82) | 42 (88) |
| 2 TNF inhibitors, *n* (%) | N/A | N/A | N/A | N/A | N/A | 5 (10) | 5 (10) |
| Previous biologic non-TNF Patients, *n* (%) | N/A | N/A | N/A | N/A | N/A | 6 (12) | 8 (16) |
| Phys. global assessment | | | | | | | |
| n | 110 | 40 | 109 | 110 | 111 | 50 | 48 |
| Mean (SD) | 62.4 (16.6) | 64.2 (14.0) | 63.8 (14.8) | 65.1 (16.3) | 66.0 (18.8) | 70.2 (20.5) | 64.6 (14.9) |
| Pts. global assessment | | | | | | | |
| n | 107 | 40 | 108 | 108 | 110 | 49 | 48 |
| Mean (SD) | 60.9 (21.2) | 66.1 (15.6) | 67.3 (17.9) | 65.0 (18.3) | 65.6 (22.7) | 70.7 (19.6) | 65.4 (20.6) |
| Pts. assessment of pain | | | | | | | |
| n | 107 | 40 | 108 | 108 | 110 | 49 | 48 |
| Mean (SD) | 63.5 (22.8) | 65.3 (14.4) | 66.6 (18.2) | 65.5 (20.4) | 64.0 (23.0) | 67.5 (22.5) | 66.4 (21.0) |

| | | | | | | | |
|---|---|---|---|---|---|---|---|
| Methotrexate at baseline | | | | | | | |
| Patients, n | 110 | 40 | 109 | 110 | 111 | 49* | 49* |
| Dose (mg/week), mean (SD) | 16.1 (3.4) | 16.3 (3.2) | 16.2 (3.3) | 16.2 (3.8) | 15.7 (3.2) | 16.6 (3.2) | 15.7 (3.7) |
| Corticosteroids at baseline | | | | | | | |
| Patients, n | 67 | 14 | 63 | 67 | 62 | 16* | 19* |
| Dose (mg/day), mean (SD) | 7.4 (3.1) | 7.8 (3.0) | 7.6 (2.7) | 7.9 (2.5) | 7.8 (2.4) | 8.3 (2.4) | 7.5 (2.8) |
| SF-36 at baseline | | | | | | | |
| Patients, n | 105 | 39 | 102 | 107 | 109 | 48 | 45 |
| Physical component score, mean (SD) | 31.0 (6.1) | 29.3 (6.2) | 31.0 (5.7) | 30.1 (6.6) | 29.5 (6.2) | 30.6 (6.0) | 31.3 (6.0) |
| Patients, n | 105 | 39 | 102 | 106 | 109 | 48 | 45 |
| Mental component score, mean (SD) | 46.0 (12.4) | 44.3 (13.0) | 43.9 (11.9) | 44.9 (14.4) | 45.0 (12.3) | 41.1 (11.8) | 46.9 (11.4) |
| FACIT-fatigue at baseline | | | | | | | |
| Patients, n | 108 | 40 | 106 | 107 | 110 | 50 | 48 |
| Score, mean (SD) | 26.6 (9.8) | 24.0 (12.2) | 26.2 (9.6) | 27.5 (10.5) | 25.7 (11.4) | 23.6 (10.0) | 27.0 (8.3) |

EEU: Bolivia, Russia, Serbia, and Ukraine; LATAM: Argentina, Brazil, Colombia, and Mexico; Asia: Korea: Phys: Physician; Pts: Patients. *Cohort 2 groups are n=50 for placebo and n=48 for fenebrutinib in the intent-to-treat population; one placebo patient received fenebrutinib in error. Thus the safety population has 49 patients in each arm. Methotrexate and corticosteroid are summarized based on the safety population

Summary of primary and secondary efficacy endpoints for both cohorts of fenebrutinib RA study.

| Week 12 Response | Cohort 1 (MTX-IR) | | | | | Cohort 2 (TNF-IR) | |
|---|---|---|---|---|---|---|---|
| | Placebo (n=110) | Fen, 50 mg once daily (n=40) | Fen, 150 mg once daily (n=109) | Fen, 200 mg twice daily (n=110) | Ada, 40 mg every other week (n=111) | Placebo (n=50) | Fen, 200 mg twice daily (n=48) |
| ACR50* | | | | | | | |
| Responders, n (%) | 16 (15) | 7 (18) | 30 (28) | 38 (35) | 40 (36) | 6 (12) | 12 (25) |
| 95% CI (%) | (8, 21) | (6, 29) | (19, 36) | (26, 43) | (27, 45) | (3, 21) | (13, 37) |
| P value vs. PBO | - | 0.2503 | 0.0164 | 0.0003 | 0.0001 | - | 0.0717 |
| ACR20* | | | | | | | |
| Responders, n (%) | 40 (36) | 24 (60) | 61 (56) | 65 (59) | 80 (72) | 12 (24) | 28 (58) |
| 95% CI (%) | (27, 45) | (45, 75) | (47, 65) | (50, 68) | (64, 80) | (12, 36) | (44, 72) |
| P value vs. PBO | - | 0.0003 | 0.0020 | 0.0003 | <0.0001 | - | 0.0001 |
| ACR70* | | | | | | | |
| Responders, n (%) | 8 (7) | 2 (5) | 10 (9) | 14 (13) | 20 (18) | 2 (4) | 7 (15) |
| 95% CI (%) | (2, 12) | (0, 12) | (4, 15) | (7, 19) | (11, 25) | (0, 9) | (5, 25) |
| P value vs. PBO | - | 1.0000 | 0.6200 | 0.1901 | 0.0155 | - | 0.0983 |
| DAS28-4-CRP** | | | | | | | |
| Patients, n | 99 | 36 | 95 | 95 | 104 | 43 | 47 |
| Change from baseline, mean | -1.34 | -1.74 | -1.96 | -1.96 | -2.11 | -1.43 | -2.26 |
| Difference | - | -0.41 | -0.63 | -0.62 | -0.78 | - | -0.83 |
| P value vs. PBO | - | 0.1696 | 0.0002 | 0.0003 | <0.0001 | - | 0.0001 |

| | | | | | | |
|---|---|---|---|---|---|---|
| CRP (mg/dL)** | | | | | | |
| Patients, n | 102 | 37 | 97 | 97 | 106 | 44 |
| Adjusted mean | 1.63 | 1.28 | 1.28 | 1.20 | 1.12 | 1.62 |
| Difference | - | -0.35 | -0.35 | -0.43 | -0.51 | - |
| P value vs. PBO | - | 0.4860 | 0.2205 | 0.0850 | 0.0254 | - |
| ESR (mm/h)** | | | | | | |
| Patients, n | 102 | 37 | 98 | 97 | 108 | 45 |
| Adjusted mean | 36.50 | 31.83 | 33.84 | 31.00 | 31.24 | 45.48 |
| Difference | - | -4.67 | -2.66 | -5.50 | -5.26 | - |
| P value vs. PBO | - | 0.3739 | 0.6006 | 0.0528 | 0.0600 | - |
| HAQ-DI score** | | | | | | |
| Patients, n | 101 | 36 | 102 | 103 | 108 | 45 |
| Adjusted mean | 1.30 | 1.19 | 1.13 | 1.03 | 1.08 | 1.22 |
| Difference | - | -0.11 | -0.16 | -0.26 | -0.22 | - |
| P value vs. PBO | - | 0.7339 | 0.1245 | 0.0030 | 0.0198 | - |

| | |
|---|---|
| 47 | |
| 0.59 | |
| -1.02 | |
| 0.0003 | |
| 47 | |
| 32.55 | |
| -12.9 | |
| 0.0018 | |
| 47 | |
| 0.88 | |
| -0.34 | |
| 0.0084 | |

*Both cohorts adjusted for region and cohort 2 also adjusted for region, treatment, and baseline value, and cohort 2 also adjusted for non-TNF biologic status; **Both cohorts adjusted for non-TNF biologic status.

| FIG. 31B-1 |
| FIG. 31B-2 |

FIG. 31B-1

| Week 12 Response | Cohort 1 (MTX-IR) | | | | | Cohort 2 (TNF-IR) | |
|---|---|---|---|---|---|---|---|
| | Placebo (n=110) | Fen, 50 mg once daily (n=40) | Fen, 150 mg once daily (n=109) | Fen, 200 mg twice daily (n=110) | Ada, 40 mg every other week (n=111) | Placebo (n=50)* | Fen, 200 mg twice daily (n=48)* |
| DAS28-4 ESR | | | | | | | |
| Patients, n | 99 | 36 | 94 | 95 | 106 | 44 | 47 |
| Change from baseline, mean (SD) | -1.5 (1.3) | -1.8 (1.0) | -2.1 (1.4) | -2.1 (1.1) | -2.1 (1.1) | -1.1 (1.2) | -1.9 (1.2) |
| DAS remission* | | | | | | | |
| Patients, n | 110 | 40 | 109 | 110 | 111 | 50 | 48 |
| Responders, n (%) | 4 (4) | 1 (3) | 8 (7) | 9 (8) | 10 (9) | 2 (4) | 2 (4) |
| 95% CI (%) | (0-7) | (0-7) | (2-12) | (3-13) | (4-14) | (0-9) | (0-10) |
| P value vs. PBO | - | 0.7134 | 0.2635 | 0.1749 | 0.1213 | - | 0.7848 |
| DAS low disease activity* | | | | | | | |
| Patients, n | 110 | 40 | 109 | 110 | 111 | 50 | 48 |
| Responders, n (%) | 4 (4) | 3 (8) | 21 (19) | 16 (15) | 19 (17) | 2 (4) | 7 (15) |
| 95% CI (%) | (0-7) | (0-16) | (12-27) | (8-21) | (10-24) | (0-9) | (5-25) |
| P value vs. PBO | - | 0.5490 | 0.0003 | 0.0044 | 0.0010 | - | 0.0584 |

Summary of additional secondary endpoints for both cohorts of fenebrutinib RA study.
* indicates non-responder imputation used for analysis.

| | | | | | | |
|---|---|---|---|---|---|---|
| CDAI | | | | | | |
| Patients, n | 99 | 36 | 95 | 94 | 105 | 44 | 47 |
| Change from baseline, mean (SD) | -17.0 (16.2) | -17.0 (11.2) | -22.1 (12.2) | -22.1 (11.8) | -22.2 (11.8) | -12.2 (12.1) | -20.4 (13.2) |
| SDAI | | | | | | | |
| Patients, n | 99 | 36 | 94 | 94 | 103 | 43 | 47 |
| Change from baseline, mean (SD) | -17.5 (16.7) | -17.5 (11.4) | -22.9 (12.5) | -23.2 (12.5) | -23.3 (12.0) | -12.9 (12.6) | -22.0 (13.8) |
| Boolean remission | | | | | | | |
| Patients, n | 102 | 37 | 98 | 97 | 108 | 45 | 47 |
| Responders, n (%) | 1 (1) | 0 (0) | 2 (2) | 4 (4) | 7 (7) | 1 (2) | 4 (9) |
| 95% CI (%) | (0-3) | (0-0) | (0-5) | (0-8) | (2-11) | (0-7) | (1-16) |
| P value vs. PBO | - | 0.8787 | 0.7101 | 0.2425 | 0.0559 | - | 0.2457 |
| SF-36 | | | | | | | |
| Patients, n | 99 | 35 | 98 | 100 | 106 | 44 | 45 |
| Physical score, change from baseline, mean (SD) | 3.5 (6.8) | 5.6 (6.0) | 5.7 (6.9) | 6.6 (7.5) | 6.4 (6.4) | 1.8 (6.4) | 5.4 (7.5) |
| Patients, n | 99 | 36 | 98 | 101 | 106 | 43 | 45 |
| Mental score, change from baseline, mean (SD) | 4.3 (10.5) | 7.0 (9.3) | 4.9 (10.6) | 6.9 (12.1) | 6.5 (10.8) | 5.1 (10.1) | 5.8 (10.2) |
| FACIT-fatigue | | | | | | | |
| Patients, n | 99 | 36 | 94 | 94 | 107 | 45 | 47 |
| Change from baseline, mean (SD) | 7.1 (10.9) | 9.0 (10.6) | 8.2 (10.2) | 9.0 (10.0) | 9.6 (9.0) | 5.7 (9.2) | 8.9 (9.6) |

FIG. 31B-2

| Cohort | Arm | All comers | CU index < 10 | n | CU index >= 10 | n |
|---|---|---|---|---|---|---|
| II | 50 mg QD | -3.9(-10.5 to +2.7) | +1.7(-6.9 to +10.3) | 9 | -11.4(-22.3 to -0.4) | 5 |
| II | 150 mg QD | -8.5(-14.8 to -2.1) | -5.1(-13.6 to +3.5) | 10 | -11.0(-21.3 to -0.7) | 8 |
| II | 200 mg BID | -10.9(-17.5 to -4.3) | -8.9(-17.7 to -0.2) | 8 | -12.6(-22.9 to -2.4) | 7 |
| I | 200 mg BID | -4.3(-11.3 to +2.7) | +1.5(-8.8 to +11.9) | 10 | -10.9(-20.3 to -1.4) | 9 |

Week 8 UAS7

METHODS OF TREATING RHEUMATOID ARTHRITIS, CHRONIC SPONTANEOUS URTICARIA, AND SYSTEMIC LUPUS ERYTHEMATOSIS USING AN INHIBITOR OF BRUTON'S TYROSINE KINASE

CROSS-REFERENCE TO RELATED APPLICATIONS

This application is a continuation of International Application No. PCT/US2020/014346, filed Jan. 21, 2020, which claims the benefit of U.S. Provisional Application No. 62/795,477, filed Jan. 22, 2019; and U.S. Provisional Application No. 62/913,270, filed Oct. 10, 2019; the disclosures of which are incorporated herein by reference in their entireties.

FIELD

The present disclosure relates to methods of treating rheumatoid arthritis, chronic spontaneous urticaria, and systemic lupus erythematosus using an inhibitor of Bruton's tyrosine kinase (BTK).

BACKGROUND

Bruton's Tyrosine Kinase (BTK): Discovery of the genetic basis for primary immunodeficiencies has been the source of new therapeutic targets in immunomodulatory therapies. In humans, mutations in the gene for Bruton's tyrosine kinase (BTK), which is located on the X chromosome, can result in the development of an immunodeficiency state characterized by a significant absence of circulating B cells (Bruton O C. Pediatrics 1952, 9:722-8; Conley M E, et al, Immunol Rev 2005, 203:216-34), and very low immunoglobulin levels due to a defect in B-cell differentiation at the pro-to pre-B cell stage that precludes assembly of the B-cell receptor (BCR) complex and immunoglobulin gene expression (Reth M, Nielsen P., Adv Immunol 2014, 122: 129-75. doi: 10.1016/B978-0-12-800267-4.00004-3). Affected male patients have a primary immune deficiency, X-linked agammaglobulinemia (XLA), and are susceptible to recurrent infections starting shortly after birth. Patients with XLA can live relatively normal lives on a standard therapy of intravenous (IV) immunoglobulin, which suggests that BTK can be safely inhibited, especially in people with established immune systems. IV immunoglobulin replacement therapy lowers the rate of infection, reduces hospitalization rates for patients with XLA, and has greatly improved the long-term prognosis of these patients.

BTK is essential for the differentiation and activity of B cells during immune system ontogeny and normal adaptive immune responses. BTK is activated by phosphatidylinositol 3-kinase-dependent plasma membrane recruitment and phosphorylation on tyrosine Y551 by the Sre-family kinase Lyn. Autophosphorylation and activation also occurs on tyrosine Y223 in a BTK-specific manner. Once activated, BTK induces PLCγ2- and $Ca^{2+}$-dependent signaling, which leads to the activation of NF-κB- and NFAT-dependent pathways leading to cellular activation and differentiation (Niiro H, Clark E A., Nat Rev Immunol 2002, 2:945-56). In addition, BTK is important in FcεRI signaling in both basophils and mast cells, the key cell types in the pathogenesis of CSU. BTK null mice have impaired FcεRI signaling resulting in decreased histamine and inflammatory cytokine release (Iyer A S, et al., J Bio Chem 2011, 286: 9503-13. doi: 10.1074/jbc.M110.1656131).

Rheumatoid Arthritis (RA): RA is an autoimmune disorder characterized by progressive synovitis, systemic inflammation, and the production of characteristic autoantibodies that can lead to progressive damage to the joints, arthropathy, and impaired joint-dependent movement leading to significant reduction in quality of life, unemployment, and premature death. Hypotheses on the pathogenesis of RA have focused on autoantibody production, immune complex formation in the synovium, pro-inflammatory cytokine production, particularly interleukin-6 (IL-6) and tumor necrosis factor-alpha (TNF-α), and the role of B cells and myeloid cells in inflamed synovium (see, e.g., Martin F, Chan A C. Immunity 2004, 20:517-27; Looney R J. Drugs 2006, 66:625-39; Shlomchik M J. Immunity 2008, 28:18-28; Goronzy J, Weyand C., Arthritis Res. Ther. 2009, 11:249). Although there are many medications available for the treatment of RA, there remains an unmet need for safer therapy with improved efficacy, especially in the signs and symptoms of disease leading to full remission.

Targeted B-cell treatments have become a focus of development as immunomodulators in autoimmune disorders. BTK is a key kinase in signaling cascades following B cell-antigen receptor activation in B cells, in Fc receptor binding of immune complexes in myeloid cells, and in some toll-like receptor signaling events in B cells, myeloid cells, and dendritic cells (Satterthwaite A B, Witte O N, Immunol. Rev. 2000, 175:120-7; Sochorová et al., Blood 2007, 109; 2553-6.). Autoimmune disorders marked by prominent B-cell and immune complex-mediated activities, such as RA and systemic lupus erythematous, may benefit from targeted antagonism of BTK signaling.

Chronic spontaneous urticaria (CSU): CSU, also referred to as chronic idiopathic urticaria (CIU), is defined by the presence of wheals (hives), angioedema, or both for at least 6 weeks without an obvious cause (Greaves M., Curr Opin Allergy Clin Immunol 2003, 3:363-8). Previous estimates of the prevalence of CSU were approximately 0.1%, which persists in 20% of CSU patients 2 decades after diagnosis (Greaves M. Chronic urticaria. J Allergy Clin Immunol 2000, 105:664-72; Saini S S. Chronic spontaneuos urticaria: etiology and pathogensis. Immunol Allergy Clin North. Am 2014, 34:33-52. doi: 10.1016/j.iac.2013.09.012). More recent evidence indicates that the point prevalence of the disease is approximately 1% (Maurer M, et al., Arch Dermatol 2006, 142:1337-42). Affected patients experience frequent pruritic hives with associated erythema and/or episodes of angioedema. CSU is reported to be associated with angioedema in approximately 50% of cases (McGirt L Y, et al., Allergy 2011, 66:317-30). The classic urticaria description is a wheal and flare with a pale elevated lesion and surrounding erythema, ranging in size from a few millimeters to a few centimeters across, usually occurring in groups and often coalescing to form large confluent lesions.

The etiology of CSU is not clear. There are several theories including one proposing an infectious origin and another related to an autoimmune origin (Kaplan A P. Chronic urticaria and angioedema. N Engl J Med 2002, 346:175-9). Some studies have found that approximately 30%-60% of patients with CSU have an autoimmune component as evidenced by the presence of a positive autologous serum skin test (Zweiman B, et al., Immunopharmacology 1998, 39:225-34). Another hypothesis regarding the etiology of CSU is that of a specific IgE antibody targeted to an endogenous antigen. In a study of more than 450 patients with CSU indicate that greater than 50% of CSU patients had IgE antibodies directed against thyroperoxidase (Altrichter S, et al., PLOS ONE 2011, 6:e14794).

Another common pathway in CSU is the abnormal activation of mast cells and basophils in the skin. In patients with CSU, increased numbers of mast cells can be found in both affected and unaffected skin (Kay A B, et al., Br J Dermatol 2014, 171:505-11. doi: 10.1111/bjd. 12991). Mast cells from CSU patients are more sensitive, have lower thresholds for activation, and respond more robustly by releasing more histamine and other inflammatory mediators. Similarly, increased numbers of basophils have been seen in the lesional and non-lesional skin of patients with CSU (Ying S, et al., J Allergy Clin Immunol 2002, 109:694-700).

Roughly half of patients with CSU achieve symptomatic control with H1 antihistamine therapy at approved doses. In some cases, the dose of antihistamine is increased (up to 4 times the approved dose per local treatment guidelines) and additional therapies, such as leukotriene receptor antagonists (LTRAs), are used although increased doses of antihistamines and LTRAs are not approved for the treatment of CSU. These agents have variable success and may be associated with severe adverse effects. Patients may remain symptomatic despite ongoing H1 antihistamine treatment (up to 4 times the approved dose per local treatment guidelines, Powell R J, et al. Clin Exp Allergy 2015, 45:547-65. doi: 10.1111/cea.12494), and for this group of patients, therapies such as immunosuppressants (e.g., cyclosporine, corticosteroids, intravenous immunoglobulin G, and methotrexate) and plasmapheresis have been used (Kozel M A, Sabroe R A., Chronic urticaria, aetiology, management and current and future treatment options. Drugs 2004, 64:2515-36). These agents have variable success and may be associated with severe adverse effects. More recently, omalizumab was approved for treatment of refractory CSU/CIU. CSU can be a debilitating condition because of a lack of clinical response as well as the unpredictable course of the disease, both of which can have a profound negative influence on the patient's quality of life.

Systemic Lupus Erythematosus (SLE): SLE is an autoimmune rheumatic disease that occurs primarily in women of childbearing age. It is characterized by multisystem involvement and immunological abnormalities, and much of the tissue damage is thought to occur through autoantibody formation and immune complex deposition. The disease is heterogeneous in its clinical presentation, course, and prognosis. However, most patients present with joint involvement, skin rashes, mouth ulcers, Raynaud's phenomenon, and/or severe fatigue. Inflammation of pericardial and pleural tissues may also be present. The most serious manifestations include central nervous system and renal involvement, which correlate with poor outcomes that include temporary or permanent disability or death. Typically, the disease follows a relapsing-remitting course with intermittent periods of disease activity (flare) interspersed with periods of relative quiescence.

Medications for the successful treatment of SLE as measured by long-term remission are limited, and only one new medication for SLE treatment has been approved in more than 50 years (Burness C B, McCormack P. L., Drugs 2011, 71:2435-44). Analgesics and nonsteroidal anti-inflammatory drugs (NSAIDs) provide partial symptomatic relief. Antimalarial drugs are generally well tolerated by patients with SLE and appear to have a beneficial effect on the prevention of lupus flares, increasing long-term survival and possibly ameliorating certain types of organ damage (Ruiz-Irastorza G, Olivares N, Ruiz-Arruza I, et al., Arthritis Res. Ther. 2009, 11: R109). However, these agents are generally regarded as having insufficient efficacy for moderate to severe manifestations of SLE.

As a measure of unmet need, the risk of mortality remains elevated for patients with lupus. In the modern era, on the basis of a multisite international cohort of 9500 patients with lupus, the standardized mortality ratio was 2.4, with particularly high mortality seen with renal disease (Fors Nieves C E, Izmirly P M., Curr. Rheumatol. Rep. 2016, 18:21). The development of new treatments for SLE patients with increased efficacy and decreased toxicity remains an important and a necessary area of investigation.

All references cited herein, including patent applications and patent publications, are herein incorporated by reference in their entirety, as if each individual reference were specifically and individually indicated to be incorporated by reference.

SUMMARY OF THE DISCLOSURE

Provided herein are methods and uses of a BTK inhibitor, fenebrutinib, or a pharmaceutically acceptable salt thereof, for treating rheumatoid arthritis, chronic spontaneous urticaria, and systemic lupus erythematosus. In particular, the methods and uses provided herein include the administration of fenebrutinib to patients having (i) moderate to severely active RA with inadequate response to prior treatment; (ii) symptomatic CSU despite prior H1 antihistamine treatment; or (iii) moderate to severely active SLE with inadequate response to prior treatment.

Fenebrutinib is a compound of the formula:

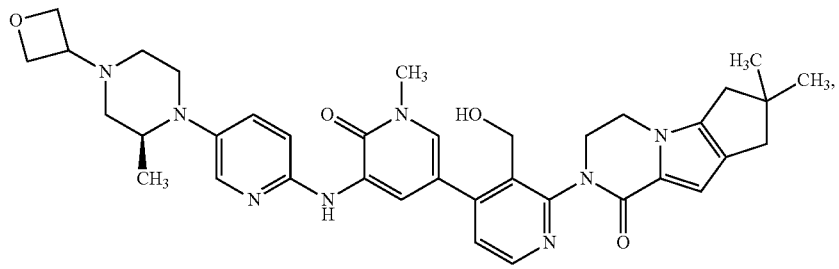 [SMILES: C[C@H]1CN(C2COC2)CCN1c1ccc(Nc2cc(-c3ccnc(N4CCn5c(cc6c5CC(C)(C)C6)C4=O)c3CO)cn(C)c2=O)nc1]

and is also known by the following names:
GDC-0853;
($6^2$S)-$2^3$-(hydroxymethyl)-$1^7$,$1^7$,$3^1$,$6^2$-tetramethyl-$1^3$,$1^4$, $1^7$,$1^8$-tetrahydro-4-aza-1(2)-cyclopenta[4,5]pyrrolo[1, 2-a]pyrazina-6(1,4)-piperazina-2(2,4),3(3,5),5(2,5)-tripyridina-7(3)-oxetanaheptaphane-$1^1$($1^6$H),$3^6$($3^1$H)-dione; and
(S)-2-(3'-(hydroxymethyl)-1-methyl-5-((5-(2-methyl-4-(oxetan-3-yl)piperazin-1-yl)pyridin-2-yl)amino)-6-oxo-1,6-dihydro-[3,4'-bipyridin]-2'-yl)-7,7-dimethyl-2, 3,4,6,7,8-hexahydro-1H-cyclopenta[4,5]pyrrolo[1,2-a]

pyrazin-1-one. The R enantiomer of the compound is: (R)-2-(3'-(hydroxymethyl)-1-methyl-5-((5-(2-methyl-4-(oxetan-3-yl)piperazin-1-yl)pyridin-2-yl)amino)-6-oxo-1,6-dihydro-[3,4'-bipyridin]-2'-yl)-7,7-dimethyl-2,3,4,6,7,8-hexahydro-1H-cyclopenta[4,5]pyrrolo[1,2-a]pyrazin-1-one.

Fenebrutinib is a highly selective, orally administered, reversible inhibitor of BTK. U.S. Pat. No. 8,716,274, which is hereby incorporated by reference in its entirety, discloses classes of heteroaryl pyridine and aza-pyridone compounds useful for inhibiting Btk, including fenebrutinib. WO 2017/148837, which is hereby incorporated by reference in its entirety, discloses solid forms and formulations of fenebrutinib and pharmaceutically acceptable salts thereof.

In a first embodiment (Embodiment 1, "E1"), provided herein is a method of treating a human patient having moderately to severely active rheumatoid arthritis, wherein the patient has demonstrated inadequate response to prior treatment with one or more conventional non-biologic DMARDs, the method comprising the administration of fenebrutinib, or a pharmaceutically acceptable salt thereof, at a dose of about 150 mg to about 400 mg daily.

E2: The method of E1, wherein the dose of fenebrutinib is about 200 mg administered twice daily.

E2a: The method of E1, wherein the daily dose of fenebrutinib is about 400 mg, administered as about 200 mg twice daily.

E3: The method of E1, wherein the dose of fenebrutinib is about 200 mg administered once daily.

E4: The method of E1, wherein the dose of fenebrutinib is about 100 mg administered twice daily.

E4a: The method of E1, wherein the daily dose of fenebrutinib is about 200 mg, administered as about 100 mg twice daily.

E5: The method of E1, wherein the dose of fenebrutinib is about 150 mg administered once daily.

E6: The method of E1, wherein the dose of fenebrutinib is about 150 mg to about 300 mg daily.

E7: The method of E1, wherein the dose of fenebrutinib is about 200 mg to about 300 mg daily.

E9: The method of E1, wherein the dose of fenebrutinib is about 200 mg to about 400 mg daily.

E10: The method of E1, wherein the dose of fenebrutinib is about 150 mg to about 200 mg daily.

E11: The method of any one of E1 and E6-E10, wherein the daily dose is administered once or twice daily.

E12: The method of E11, wherein if administered twice daily, each dose contains the same amount of fenebrutinib.

E13: The method of any one of E1-E12, wherein the conventional non-biologic DMARD in the prior treatment is methotrexate.

E14: The method of any one of E1-E13, wherein the fenebrutinib, or a pharmaceutically acceptable salt thereof, is administered in combination with one or more additional therapeutic agents.

E15: The method of E14, wherein the additional therapeutic agent is methotrexate.

E16: The method of E14, wherein the additional therapeutic agent is a Janus kinase inhibitor.

E17: The method of E16, wherein the Janus kinase inhibitor is selected from the group consisting of tofacitinib, baricitinib, filgotinib, peficitinib, and upadacitinib, and pharmaceutically acceptable salts thereof.

E18: The method of E16, wherein the Janus kinase inhibitor is tofacitinib, or a pharmaceutically acceptable salt thereof.

E19: The method of any one of E16-E18, wherein both therapeutic agents are orally administered in a single tablet or capsule.

E20: The method of any one of E16-E19, wherein methotrexate is also administered.

E21: The method of any one of E1-E20, wherein the patient having an inadequate response to prior treatment with one or more conventional non-biologic DMARDs is identified by RA disease activity by joint counts and laboratory markers of inflammation: ≥6 tender/painful joints on motion (68 joint count) and ≥6 swollen joints (66 joint count).

E22: The method of any one of E1-E20, wherein the patient having an inadequate response to prior treatment with one or more conventional non-biologic DMARDs is identified by hsCRP greater than or equal to 0.400 mg/dL.

E23: The method of any one of E1-E20, wherein the patient having an inadequate response to prior treatment with one or more conventional non-biologic DMARDs is identified as testing positive by anti-cyclic citrullinated protein/peptide antibody (anti-CCP or ACPA), rheumatoid factor, or both.

E24: The method of any one of E1-E20, wherein the patient having an inadequate response to prior treatment with one or more conventional non-biologic DMARDs is identified by the following:

Have a diagnosis of adult-onset RA as defined by the 2010 ACR/European League Against Rheumatism Classification Criteria for RA;

RA disease activity by joint counts and laboratory markers of inflammation: ≥6 tender/painful joints on motion (68 joint count) and ≥6 swollen joints (66 joint count);

hsCRP greater than or equal to 0.400 mg/dL;

Positive for anti-cyclic citrullinated protein/peptide antibody (anti-CCP or ACPA), rheumatoid factor, or both; and Has received one or more conventional non-biologic DMARDs for at least 12 weeks at a stable dose prior to treatment with fenebrutinib.

E25: The method of any one of E21-E24, wherein the conventional non-biologic DMARDs is methotrexate.

E26: A method of treating a human patient having moderately to severely active rheumatoid arthritis, wherein the patient has demonstrated an inadequate response or intolerance to prior treatment with one or more biologic rheumatoid arthritis drugs, the method comprising the administration of fenebrutinib, or a pharmaceutically acceptable salt thereof, at a dose of about 150 to about 400 mg daily.

E27: The method of E26, wherein the dose of fenebrutinib is about 200 mg administered twice daily.

E27a: The method of E26, wherein the daily dose of fenebrutinib is about 400 mg, administered as about 200 mg twice daily.

E28: The method of E26, wherein the dose of fenebrutinib is about 300 mg administered once daily.

E29: The method of E26, wherein the dose of fenebrutinib is about 100 mg administered twice daily.

E29a: The method of E26, wherein the daily dose of fenebrutinib is about 200 mg, administered as about 100 mg twice daily.

E30: The method of E26, wherein the dose of fenebrutinib is about 200 mg administered once daily.

E31: The method of E26, wherein the dose of fenebrutinib is about 150 mg administered twice daily.

E31a: The method of E26, wherein the daily dose of fenebrutinib is about 300 mg, administered as about 150 mg twice daily.

E32: The method of E26, wherein the dose of fenebrutinib is about 150 mg administered once daily.

E33: The method of any one of E26-E32, wherein the biologic rheumatoid arthritis drug is selected from the group consisting of a TNF-alpha inhibitor, abatacept, tocilizumab, sarilumab, sirukumab, anakinra, and any biosimilar equivalents thereof.

E34: The method of E33, wherein the biologic rheumatoid arthritis drug is a TNF-alpha inhibitor.

E35: The method of E34, wherein the TNF-alpha inhibitor is selected from the group consisting of adalimumab, infliximab, etanercept, golimumab, certolizumab, or a biosimilar equivalent thereof.

E36: The method of E35, wherein the TNF-alpha inhibitor is adalimumab.

E37: The method of any one of E26-E36, wherein the fenebrutinib, or a pharmaceutically acceptable salt thereof, is administered in combination with one or more additional therapeutic agents.

E38: The method of E37, wherein the additional therapeutic agent is methotrexate.

E39: The method of E37, wherein the additional therapeutic agent is a Janus kinase inhibitor.

E40: The method of E39, wherein the Janus kinase inhibitor is selected from the group consisting of tofacitinib, baricitinib, filgotinib, peficitinib, and upadacitinib, and pharmaceutically acceptable salts thereof.

E41: The method of E40, wherein the Janus kinase inhibitor is tofacitinib, or a pharmaceutically acceptable salt thereof.

E42: The method of any one of E39-E41, wherein both therapeutic agents are orally administered in a single tablet or capsule.

E43: The method of any one of E39-E42, wherein methotrexate is also administered.

E44: The method of any one of E26-E43, wherein the patient having an inadequate response to prior treatment with one or more biologic rheumatoid arthritis drugs is identified by insufficient efficacy or loss of efficacy at a dose and duration that, in accordance with local clinical practice, is considered acceptable to adequately assess clinical response, to previous treatment with at least one and no more than two biologic rheumatoid arthritis drugs.

E45: The method of any one of E26-E43, wherein the patient having an inadequate response to prior treatment with one or more biologic rheumatoid arthritis drugs is identified by the following:
Positive for anti-cyclic citrullinated protein/peptide antibody (anti-CCP or ACPA), rheumatoid factor, or both; and
Experienced intolerance to, or insufficient efficacy or loss of efficacy at a dose and duration that, in accordance with local clinical practice, is considered acceptable to adequately assess clinical response, to previous treatment with at least one and no more than two biologic rheumatoid arthritis drugs.

E46: The method of any one of E26-E43, wherein the patient having an inadequate response to prior treatment with one or more biologic rheumatoid arthritis drugs is identified by the following:
hsCRP greater than or equal to 0.650 mg/dL;
Positive for anti-cyclic citrullinated protein/peptide antibody (anti-CCP or ACPA), rheumatoid factor, or both; and
Experienced intolerance to, or insufficient efficacy or loss of efficacy at a dose and duration that, in accordance with local clinical practice, is considered acceptable to adequately assess clinical response, to previous treatment with at least one and no more than two biologic rheumatoid arthritis drugs.

E47: The method of any one of E26-E43, wherein the patient having an inadequate response to prior treatment with one or more biologic rheumatoid arthritis drugs is identified by the following:
RA disease activity by joint counts and laboratory markers of inflammation: ≥6 tender/painful joints on motion (68 joint count) and ≥6 swollen joints (66 joint count);
hsCRP greater than or equal to 0.650 mg/dL;
Positive for anti-cyclic citrullinated protein/peptide antibody (anti-CCP or ACPA), rheumatoid factor, or both; and
Experienced intolerance to, or insufficient efficacy or loss of efficacy at a dose and duration that, in accordance with local clinical practice, is considered acceptable to adequately assess clinical response, to previous treatment with at least one and no more than two biologic rheumatoid arthritis drugs.

E48: The method of any one of E26-E43, wherein the patient having an inadequate response to prior treatment with one or more biologic rheumatoid arthritis drugs is identified by the following:
Has a diagnosis of adult-onset RA as defined by the 2010 ACR/European League Against Rheumatism Classification Criteria for RA;
RA disease activity by joint counts and laboratory markers of inflammation: ≥6 tender/painful joints on motion (68 joint count) and ≥6 swollen joints (66 joint count);
hsCRP greater than or equal to 0.650 mg/dL;
Positive for anti-cyclic citrullinated protein/peptide antibody (anti-CCP or ACPA), rheumatoid factor, or both; and
Experienced intolerance to, or insufficient efficacy or loss of efficacy at a dose and duration that, in accordance with local clinical practice, is considered acceptable to adequately assess clinical response, to previous treatment with at least one and no more than two biologic rheumatoid arthritis drugs.

E49: The method of any one of E1-E48, wherein the patient has a reduction in one or more symptoms of rheumatoid arthritis after treatment with fenebrutinib, or a pharmaceutically acceptable salt thereof.

E50: The method of E49, wherein the reduction in symptoms of the patient is measured by at least a 50% reduction in the patient's American College of Rheumatology score (ACR50).

E51: The method of E49, wherein the reduction in symptoms of the patient is measured by a 70% reduction in the patient's American College of Rheumatology score (ACR70).

E52: The method of E49, wherein the reduction in symptoms of the patient is measured by a 20% reduction in the patient's American College of Rheumatology score (ACR20).

E53: The method of E49, wherein the reduction in symptoms of the patient is a reduction in the patient's HAQ-DI score.
E54: The method of E49, wherein the reduction in symptoms of the patient is a reduction in the patient's DAS28 score.
E55: The method of E49, wherein the reduction in symptoms of the patient is a reduction in the patient's DAS28-3-CRP score.
E56: The method of E49, wherein the reduction in symptoms of the patient is a reduction in the patient's CRP versus baseline.
E57: The method of E49, wherein the reduction in symptoms of the patient is a reduction in the patient's ESR versus baseline.
E58: The method of E49, wherein the reduction in symptoms of the patient is a reduction in the patient's SF-36 score.
E59: The method of E49, wherein the reduction in symptoms of the patient is a reduction in the patient's FACIT-Fatigue score.
E60: The method of E49, wherein the reduction in symptoms of the patient is a reduction in two or more of the measures described in E50-E59.
E61: The method of any one of E50-E52, wherein the reduction in symptoms of the patient is also measured by a reduction in one or more of the measures described in E54-E59.
E62: The method of any one of E49-E61, wherein the reduction in one or more symptoms of rheumatoid arthritis occurs within or at 2 weeks of treatment.
E63: The method of any one of E49-E61, wherein the reduction in one or more symptoms of rheumatoid arthritis occurs within or at 4 weeks of treatment.
E64: The method of any one of E49-E61, wherein the reduction in one or more symptoms of rheumatoid arthritis occurs within or at 8 weeks of treatment.
E65: The method of any one of E49-E61, wherein the reduction in one or more symptoms of rheumatoid arthritis occurs within or at 12 weeks of treatment.
E66: The method of any one of E1-E65, wherein the method further comprises the step of measuring one or more clinical or laboratory endpoints for the patient in order to evaluate the efficacy of the treatment with fenebrutinib or a pharmaceutically acceptable salt thereof.
E67: The method of E66, wherein the one or more clinical or laboratory endpoints are selected from the group consisting of the patient's: ACR50 score, ACR 70 score, HAQ-DI score, DAS28 score, DAS28-3-CRP score, SF-36 score, FACIT-fatigue score, CRP versus baseline, and ESR versus baseline.
E67a: The method of E56 or E67, wherein the CRP baseline is the level of CRP in a sample from the patient prior to beginning administration of fenebrutinib, or a pharmaceutically acceptable salt thereof.
E67b: The method of E57, E67, or E67a, wherein the ESR baseline is the level of ESR in a sample from the patient prior to beginning administration of fenebrutinib, or a pharmaceutically acceptable salt thereof.
E68: The method of E66 or E67 wherein the clinical or laboratory endpoint is measured after 2 weeks of treatment.
E69: The method of E66 or E67 wherein the clinical or laboratory endpoint is measured after 4 weeks of treatment.
E70: The method of E66 or E67 wherein the clinical or laboratory endpoint is measured after 8 weeks of treatment.
E71: The method of E66 or E67 wherein the clinical or laboratory endpoint is measured after 12 weeks of treatment.
E72: The method of any one of E1-E71, wherein the patient to be treated is positive for autoantibodies.
E73: The method of any one of E1-E71, wherein the method comprises a first step of identifying in a sample of blood of the patient: (i) the presence of autoantibodies, and (ii) elevated levels of ESR relative to baseline, prior to administering fenebrutinib, or a pharmaceutically acceptable salt thereof, to the patient testing positive for said autoantibodies and elevated ESR.
E74: The method of any one of E1-E71, wherein the method comprises a first step of identifying in a sample of blood of the patient: (i) the presence of autoantibodies, and (ii) elevated levels of CRP relative to baseline, in a sample of blood of the patient prior to administering fenebrutinib, or a pharmaceutically acceptable salt thereof, to the patient testing positive for said autoantibodies and elevated CRP.
E75: The method of any one of E1-E71, wherein the method comprises a first step of identifying in a sample of blood of the patient: (i) the presence of autoantibodies, (ii) elevated levels of CRP relative to baseline, and (iii) elevated levels of ESR relative to baseline, prior to administering fenebrutinib, or a pharmaceutically acceptable salt thereof, to the patient testing positive for said autoantibodies and elevated CRP.
E75a: The method of any one of E74-E75, wherein the CRP baseline is the level of CRP in a blood sample from a healthy subject without rheumatoid arthritis.
E75b: The method of any one of E73, E75, or E75a, wherein the ESR baseline is the level of ESR in a blood sample from a healthy subject without rheumatoid arthritis.
E76: The method of any one of E72-E75, wherein the autoantibodies are selected from the group consisting of rheumatoid factor and anticitrullinated peptide antibodies (ACPA).
E77: The method of any one of E72-E76, wherein the autoantibodies include IgM antibodies.
E78: The method of any one of E1-E71, wherein the method first comprises the step of confirming that the patient is seropositive prior to treatment with fenebrutinib, or a pharmaceutically acceptable salt thereof.
E79: A method of administering fenebrutinib, or a pharmaceutically acceptable salt thereof, to treat a human patient with moderately to severely active rheumatoid arthritis, wherein the patient exhibits an abnormality in one or more biomarkers of liver function after fenebrutinib administration, the method comprising (a) administering to said patient fenebrutinib, or a pharmaceutically acceptable salt thereof, at a dose lower than about 150 to about 400 mg per day for a time period, followed by (b) administering to said patient fenebrutinib, or a pharmaceutically acceptable salt thereof, at a dose of about 150 to about 400 mg per day.
E80: The method of E79, wherein the dose in step (a) is equal to or lower than about 200 mg per day.
E81: The method of E79, wherein the dose in step (a) is equal to or lower than about 150 mg per day.
E82: The method of any one of E79-E81, wherein the dose in step (b) is the same dose in step (a).

E83: The method of any one of E79-E81, wherein the dose in step (b) is a lower dose than the dose in step (a).

E84: The method of any one of E79-E83, wherein the abnormality in one or more biomarkers of liver function is a grade 2 abnormality.

E85: The method of any one of E79-E83, wherein the abnormality in one or more biomarkers of liver function is a grade 3 abnormality.

E86: The method of any one of E79-E85, wherein the one or more biomarkers of liver function is selected from the group consisting of alanine transaminase, aspartate transaminase, bilirubin, and alkaline phosphatase.

E87: The method of any one of E79-E85, wherein the one or more biomarkers of liver function is selected from the group consisting of alanine transaminase and aspartate transaminase.

E88: The method of any one of E79-E87, wherein prior to step (a), the administration of fenebrutinib, or a pharmaceutically acceptable salt thereof, is discontinued until biomarkers of liver function are within normal limits.

E89: The method of any one of E79-E87, wherein the time period of step (a) continues until biomarkers of liver function are within normal limits.

E90: The method of any one of E79-E89, further comprising the step of measuring one or more biomarkers of liver function prior to or during step (a).

E91: The method of any one of E1-E90, wherein prior to said treatment, a sample from the patient has been found to have elevated levels of one or more biomarkers selected from the group consisting of rheumatoid factor IgM, total IgM, total IgG, CXCL13, and CCL4.

E92: A method of identifying a human patient having moderately to severely active rheumatoid arthritis, wherein the patient is more likely to exhibit benefit from treatment comprising fenebrutinib or a pharmaceutically acceptable salt thereof, the method comprising determining levels of one or more biomarkers selected from the group consisting of rheumatoid factor IgM, total IgM, total IgG, CXCL13, and CCL4 in a sample from the patient, wherein elevated levels of the one or more biomarkers in the sample indicates that the patient is more likely to exhibit benefit from the fenebrutinib treatment.

E93: The method of E92, wherein the patient has demonstrated inadequate response to prior treatment with one or more conventional non-biologic DMARDs.

E94: The method of E92, wherein the patient has demonstrated an inadequate response or intolerance to prior treatment with one or more biologic rheumatoid arthritis drugs.

E95: The method of any one of E91-E94, wherein the sample has been found to have elevated levels of two of the biomarkers.

E96: The method of any one of E91-E94, wherein the sample has been found to have elevated levels of three of the biomarkers.

E97: The method of any one of E91-E94, wherein the sample has been found to have elevated levels of four of the biomarkers.

E98: The method of any one of E91-E94, wherein the sample has been found to have elevated levels of each of the biomarkers rheumatoid factor IgM, total IgM, total IgG, CXCL13, and CCL4.

E98a: The method of any one of E91-E98, wherein at least one of the one or more biomarkers is rheumatoid factor IgM.

E98b: The method of E91 or E98a, wherein an elevated level of rheumatoid factor IgM is greater than 20 units/ml of RF, or greater than or equal to 15 IU/ml of RF IgM, or a both, in a sample of blood from the patient.

E99: The method of any one of E1-E98, wherein fenebrutinib, or a pharmaceutically acceptable salt thereof, is orally administered.

E100: The method of any one of E1-E98, wherein fenebrutinib, or a pharmaceutically acceptable salt thereof, is orally administered in the form of one or more tablets or capsules.

E101: The method of any one of E1-E98, wherein fenebrutinib, or a pharmaceutically acceptable salt thereof, is orally administered in the form of one or more tablets.

E102: The method of any one of E1-E101, wherein the free base of fenebrutinib is administered.

E103: A compound for use in a method of treating moderately to severely active rheumatoid arthritis in a human patient, wherein the patient has demonstrated inadequate response to prior treatment with one or more conventional non-biologic DMARDs, wherein the compound is fenebrutinib or a pharmaceutically acceptable salt thereof, and wherein the treatment is at a dose of fenebrutinib of about 150 mg to about 400 mg daily.

E104: The compound for use in the method of E103, wherein the dose of fenebrutinib is about 200 mg administered twice daily.

E104a: The compound for use in the method of E103, wherein the daily dose of fenebrutinib is about 400 mg, administered as about 200 mg twice daily.

E105: The compound for use in the method of E103, wherein the dose of fenebrutinib is about 200 mg administered once daily.

E106: The compound for use in the method of E103, wherein the dose of fenebrutinib is about 100 mg administered twice daily.

E106a: The compound for use in the method of E103, wherein the daily dose of fenebrutinib is about 200 mg, administered as about 100 mg twice daily.

E107: The compound for use in the method of E103, wherein the dose of fenebrutinib is about 150 mg administered once daily.

E108: The compound for use in the method of E103, wherein the dose of fenebrutinib is about 150 mg to about 300 mg daily.

E109: The compound for use in the method of E103, wherein the dose of fenebrutinib is about 200 mg to about 300 mg daily.

E110: The compound for use in the method of E103, wherein the dose of fenebrutinib is about 200 mg to about 400 mg daily.

E111: The compound for use in the method of E103, wherein the dose of fenebrutinib is about 150 mg to about 200 mg daily.

E112: The compound for use in the method of any one of E103 and E108-E111, wherein the daily dose is administered once or twice daily.

E113: The compound for use in the method of E112, wherein if administered twice daily, each dose contains the same amount of fenebrutinib.

E114: The compound for use in the method of any one of E103-E113, wherein the conventional non-biologic DMARD in the prior treatment is methotrexate.

E115: The compound for use in the method of any one of E103-E113, wherein the fenebrutinib, or a pharmaceutically acceptable salt thereof, is administered in combination with one or more additional therapeutic agents.

E116: The compound for use in the method of E115, wherein the additional therapeutic agent is methotrexate.

E117: The compound for use in the method of E115, wherein the additional therapeutic agent is a Janus kinase inhibitor.

E118: The compound for use in the method of E117, wherein the Janus kinase inhibitor is selected from the group consisting of tofacitinib, baricitinib, filgotinib, peficitinib, and upadacitinib, and pharmaceutically acceptable salts thereof.

E119: The compound for use in the method of E117, wherein the Janus kinase inhibitor is tofacitinib, or a pharmaceutically acceptable salt thereof E120: The compound for use in the method of any one of E115-E120, wherein both therapeutic agents are orally administered in a single tablet or capsule.

E121: The compound for use in the method of E115-E121, wherein methotrexate is also administered.

E122: The compound for use in the method of any one of E103-E121, wherein the patient having an inadequate response to prior treatment with one or more conventional non-biologic DMARDs is identified by RA disease activity by laboratory markers of inflammation and joint counts wherein inadequate response by joint counts refers to ≥6 tender/painful joints on motion (68 joint count) and ≥6 swollen joints (66 joint count).

E123: The compound for use in the method of any one of E103-E121, wherein the patient having an inadequate response to prior treatment with one or more conventional non-biologic DMARDs is identified by hsCRP greater than or equal to 0.400 mg/dL.

E124: The compound for use in the method of any one of E103-E121, wherein the patient having an inadequate response to prior treatment with one or more conventional non-biologic DMARDs is identified as testing positive for anti-cyclic citrullinated protein/peptide antibody (anti-CCP or ACPA), rheumatoid factor, or both.

E125: The compound for use in the method of any one of E103-E121, wherein the patient having an inadequate response to prior treatment with one or more conventional non-biologic DMARDs is identified by the following:

Have a diagnosis of adult-onset RA as defined by the 2010 ACR/European League Against Rheumatism Classification Criteria for RA;

RA disease activity by joint counts and laboratory markers of inflammation: ≥6 tender/painful joints on motion (68 joint count) and ≥6 swollen joints (66 joint count);

hsCRP greater than or equal to 0.400 mg/dL;

Positive for anti-cyclic citrullinated protein/peptide antibody (anti-CCP or ACPA), rheumatoid factor, or both; and Has received one or more conventional non-biologic DMARDs for at least 12 weeks at a stable dose prior to treatment with fenebrutinib.

E126: The compound for use in the method of any one of E122-E125, wherein the conventional non-biologic DMARDs is methotrexate.

E127: A compound for use in a method of treating moderately to severely active rheumatoid arthritis in a human patient, wherein the patient has demonstrated an inadequate response or intolerance to prior treatment with one or more biologic rheumatoid arthritis drugs, wherein the compound is fenebrutinib or a pharmaceutically acceptable salt thereof, and wherein the treatment is at a dose of fenebrutinib of about 150 to about 400 mg daily.

E128: The compound for use in the method of E127, wherein the dose of fenebrutinib is about 200 mg administered twice daily.

E128a: The compound for use in the method of E127, wherein the daily dose of fenebrutinib is about 400 mg, administered as about 200 mg twice daily.

E129: The compound for use in the method of E127, wherein the dose of fenebrutinib is about 300 mg administered once daily.

E130: The compound for use in the method of E127, wherein the dose of fenebrutinib is about 100 mg administered twice daily.

E130a: The compound for use in the method of E127, wherein the daily dose of fenebrutinib is about 200 mg, administered as about 100 mg twice daily.

E131: The compound for use in the method of E127, wherein the dose of fenebrutinib is about 200 mg administered once daily.

E132: The compound for use in the method of E127, wherein the dose of fenebrutinib is about 150 mg administered twice daily.

E132a: The compound for use in the method of E127, wherein the daily dose of fenebrutinib is about 300 mg, administered as about 150 mg twice daily.

E133: The compound for use in the method of E127, wherein the dose of fenebrutinib is about 150 mg administered once daily.

E134: The compound for use in the method of any one of E127-E133, wherein the biologic rheumatoid arthritis drug is selected from the group consisting of a TNF-alpha inhibitor, abatacept, tocilizumab, sarilumab, sirukumab, anakinra, and any biosimilar equivalents thereof.

E135: The compound for use in the method of E134, wherein the biologic rheumatoid arthritis drug is a TNF-alpha inhibitor.

E136: The compound for use in the method of E135, wherein the TNF-alpha inhibitor is selected from the group consisting of adalimumab, infliximab, etanercept, golimumab, certolizumab, or a biosimilar equivalent thereof.

E137: The compound for use in the method of E136, wherein the TNF-alpha inhibitor is adalimumab.

E138: The compound for use in the method of any one of E127-E137, wherein the fenebrutinib, or a pharmaceutically acceptable salt thereof, is administered in combination with one or more additional therapeutic agents.

E139: The compound for use in the method of E138, wherein the additional therapeutic agent is methotrexate.

E140: The compound for use in the method of E138, wherein the additional therapeutic agent is a Janus kinase inhibitor.

E141: The compound for use in the method of E140, wherein the Janus kinase inhibitor is selected from the group consisting of tofacitinib, baricitinib, filgotinib, peficitinib, and upadacitinib, and pharmaceutically acceptable salts thereof.

E142: The compound for use in the method of E141, wherein the Janus kinase inhibitor is tofacitinib, or a pharmaceutically acceptable salt thereof.

E143: The compound for use in the method of any one of E140-E142, wherein both therapeutic agents are orally administered in a single tablet or capsule.

E144: The compound for use in the method of any one of E140-E143, wherein methotrexate is also administered.

E145: The compound for use in the method of any one of E127-E144, wherein the patient having an inadequate response to prior treatment with one or more biologic rheumatoid arthritis drugs is identified by insufficient efficacy or loss of efficacy at a dose and duration that, in accordance with local clinical practice, is considered acceptable to adequately assess clinical response, to previous treatment with at least one and no more than two biologic rheumatoid arthritis drugs.

E146: The compound for use in the method of any one of E127-E144, wherein the patient having an inadequate response to prior treatment with one or more biologic rheumatoid arthritis drugs is identified by the following:

Positive for anti-cyclic citrullinated protein/peptide antibody (anti-CCP or ACPA), rheumatoid factor, or both; and Experienced intolerance to, or insufficient efficacy or loss of efficacy at a dose and duration that, in accordance with local clinical practice, is considered acceptable to adequately assess clinical response, to previous treatment with at least one and no more than two biologic rheumatoid arthritis drugs.

E147: The compound for use in the method of any one of E127-E144, wherein the patient having an inadequate response to prior treatment with one or more biologic rheumatoid arthritis drugs is identified by the following:

hsCRP greater than or equal to 0.650 mg/dL;

Positive for anti-cyclic citrullinated protein/peptide antibody (anti-CCP or ACPA), rheumatoid factor, or both; and Experienced intolerance to, or insufficient efficacy or loss of efficacy at a dose and duration that, in accordance with local clinical practice, is considered acceptable to adequately assess clinical response, to previous treatment with at least one and no more than two biologic rheumatoid arthritis drugs.

E148: The compound for use in the method of any one of E127-E144, wherein the patient having an inadequate response to prior treatment with one or more biologic rheumatoid arthritis drugs is identified by the following:

RA disease activity by joint counts and laboratory markers of inflammation: ≥6 tender/painful joints on motion (68 joint count) and ≥6 swollen joints (66 joint count);

hsCRP greater than or equal to 0.650 mg/dL;

Positive for anti-cyclic citrullinated protein/peptide antibody (anti-CCP or ACPA), rheumatoid factor, or both; and Experienced intolerance to, or insufficient efficacy or loss of efficacy at a dose and duration that, in accordance with local clinical practice, is considered acceptable to adequately assess clinical response, to previous treatment with at least one and no more than two biologic rheumatoid arthritis drugs.

E149: The compound for use in the method of any one of E127-E144, wherein the patient having an inadequate response to prior treatment with one or more biologic rheumatoid arthritis drugs is identified by the following:

Has a diagnosis of adult-onset RA as defined by the 2010 ACR/European League Against Rheumatism Classification Criteria for RA;

RA disease activity by joint counts and laboratory markers of inflammation: ≥6 tender/painful joints on motion (68 joint count) and ≥6 swollen joints (66 joint count);

hsCRP greater than or equal to 0.650 mg/dL;

Positive for anti-cyclic citrullinated protein/peptide antibody (anti-CCP or ACPA), rheumatoid factor, or both; and Experienced intolerance to, or insufficient efficacy or loss of efficacy at a dose and duration that, in accordance with local clinical practice, is considered acceptable to adequately assess clinical response, to previous treatment with at least one and no more than two biologic rheumatoid arthritis drugs.

E150: The compound for use in the method of any one of E127-E149, wherein the patient has a reduction in one or more symptoms of rheumatoid arthritis after treatment with fenebrutinib, or a pharmaceutically acceptable salt thereof.

E151: The compound for use in the method of E150, wherein the reduction in symptoms of the patient is measured by at least a 50% reduction in the patient's American College of Rheumatology score (ACR50).

E152: The compound for use in the method of E150, wherein the reduction in symptoms of the patient is measured by a 70% reduction in the patient's American College of Rheumatology score (ACR70).

E153: The compound for use in the method of E150, wherein the reduction in symptoms of the patient is measured by a 20% reduction in the patient's American College of Rheumatology score (ACR20).

E154: The compound for use in the method of E150, wherein the reduction in symptoms of the patient is a reduction in the patient's HAQ-DI score.

E155: The compound for use in the method of E150, wherein the reduction in symptoms of the patient is a reduction in the patient's DAS28 score.

E156: The compound for use in the method of E150, wherein the reduction in symptoms of the patient is a reduction in the patient's DAS28-3-CRP score.

E157: The compound for use in the method of E150, wherein the reduction in symptoms of the patient is a reduction in the patient's CRP versus baseline.

E158: The compound for use in the method of E150, wherein the reduction in symptoms of the patient is a reduction in the patient's ESR versus baseline.

E159: The compound for use in the method of E150, wherein the reduction in symptoms of the patient is a reduction in the patient's SF-36 score.

E160: The compound for use in the method of E150, wherein the reduction in symptoms of the patient is a reduction in the patient's FACIT-Fatigue score.

E161: The compound for use in the method of E150, wherein the reduction in symptoms of the patient is a reduction in two or more of the measures described in E151-E160.

E162: The compound for use in the method of any one of E151-E153, wherein the reduction in symptoms of the patient is also measured by a reduction in one or more of the measures described in E155-E160.

E163: The compound for use in the method of any one of E150-E162, wherein the reduction in one or more symptoms of rheumatoid arthritis occurs within or at 2 weeks of treatment.

E164: The compound for use in the method of any one of E150-E162, wherein the reduction in one or more symptoms of rheumatoid arthritis occurs within or at 4 weeks of treatment.

E165: The compound for use in the method of any one of E150-E162, wherein the reduction in one or more symptoms of rheumatoid arthritis occurs within or at 8 weeks of treatment.

E166: The compound for use in the method of any one of E150-E162, wherein the reduction in one or more symptoms of rheumatoid arthritis occurs within or at 12 weeks of treatment.

E167: The compound for use in the method of any one of E103-E166, wherein the method further comprises the step of measuring one or more clinical or laboratory endpoints for the patient in order to evaluate the efficacy of the treatment with fenebrutinib or a pharmaceutically acceptable salt thereof.

E168: The compound for use in the method of E167, wherein the one or more clinical or laboratory endpoints are selected from the group consisting of the patient's: ACR50 score, ACR 70 score, HAQ-DI score, DAS28 score, DAS28-3-CRP score, SF-36 score, FACIT-fatigue score, CRP versus baseline, and ESR versus to baseline.

E168a: The compound for use in the method of E157 or E168, wherein the CRP baseline is the level of CRP in a sample from the patient prior to beginning administration of fenebrutinib or a pharmaceutically acceptable salt thereof.

E168b: The compound for use in the method of E158, E168, or E168a, wherein the ESR baseline is the level of ESR in a sample from the patient prior to beginning administration of fenebrutinib or a pharmaceutically acceptable salt thereof.

E169: The compound for use in the method of E167 or E168 wherein the clinical or laboratory endpoint is measured after 2 weeks of treatment.

E170: The compound for use in the method of E167 or E168 wherein the clinical or laboratory endpoint is measured after 4 weeks of treatment.

E171: The compound for use in the method of E167 or E168 wherein the clinical or laboratory endpoint is measured after 8 weeks of treatment.

E172: The compound for use in the method of E167 or E168 wherein the clinical or laboratory endpoint is measured after 12 weeks of treatment.

E173: The compound for use in the method of any one of E103-E172, wherein the patient to be treated is positive for autoantibodies.

E174: The compound for use in the method of any one of E103-E172, wherein the method comprises a first step of identifying in a sample of blood of the patient: (i) the presence of autoantibodies, and (ii) elevated levels of ESR relative to baseline, prior to administering fenebrutinib, or a pharmaceutically acceptable salt thereof, to the patient testing positive for said autoantibodies and elevated ESR.

E175: The compound for use in the method of any one of E103-E172, wherein the method comprises a first step of identifying in a sample of blood of the patient: (i) the presence of autoantibodies, and (ii) elevated levels of CRP relative to baseline, in a sample of blood of the patient prior to administering fenebrutinib, or a pharmaceutically acceptable salt thereof, to the patient testing positive for said autoantibodies and elevated CRP.

E176: The compound for use in the method of any one of E103-E172, wherein the method comprises a first step of identifying in a sample of blood of the patient: (i) the presence of autoantibodies, (ii) elevated levels of CRP relative to baseline, and (iii) elevated levels of ESR relative to baseline, prior to administering fenebrutinib, or a pharmaceutically acceptable salt thereof, to the patient testing positive for said autoantibodies and elevated CRP.

E176a: The compound for use in the method of E174 or E176, wherein baseline ESR is the level of ESR in a sample of blood from a healthy subject without rheumatoid arthritis.

E176b: The compound for use in the method of E175, E176, or E176a, wherein baseline CRP is the level of CRP in a sample of blood from a healthy subject without rheumatoid arthritis.

E177: The compound for use in the method of any one of E173-E176, wherein the autoantibodies are selected from the group consisting of rheumatoid factor and anticitrullinated peptide antibodies (ACPA).

E178: The compound for use in the method of any one of E173-E176, wherein the autoantibodies include IgM antibodies.

E179: The compound for use in the method of any one of E103-E172, wherein the method first comprises the step of confirming that the patient is seropositive prior to treatment with fenebrutinib, or a pharmaceutically acceptable salt thereof.

E180: The compound for use in the method of any one of E103-E179, wherein fenebrutinib, or a pharmaceutically acceptable salt thereof, is orally administered.

E181: The compound for use in the method of any one of E103-E180, wherein fenebrutinib, or a pharmaceutically acceptable salt thereof, is orally administered in the form of one or more tablets or capsules.

E182: The compound for use in the method of any one of E103-E180, wherein fenebrutinib, or a pharmaceutically acceptable salt thereof, is orally administered in the form of one or more tablets.

E183: The compound for use in the method of any one of E103-E182, wherein the compound is the free base of fenebrutinib.

E184: A method of treating a human patient having chronic spontaneous urticaria, wherein the patient is disease symptomatic despite prior H1 antihistamine treatment, the method comprising the administration of fenebrutinib, or a pharmaceutically acceptable salt thereof, at a dose of about 50 mg to about 400 mg daily.

E185: The method of E184, wherein the dose of fenebrutinib is about 200 mg administered twice daily.

E185a: The method of E184, wherein the daily dose of fenebrutinib is about 400 mg, administered as about 200 mg twice daily.

E186: The method of E184, wherein the dose of fenebrutinib is about 200 mg administered once daily.

E187: The method of E184, wherein the dose of fenebrutinib is about 150 mg administered once daily.

E188: The method of E184, wherein the dose of fenebrutinib is about 100 mg administered once daily.

E189: The method of E184, wherein the dose of fenebrutinib is about 100 mg administered twice daily.

E189a: The method of E184, wherein the daily dose of fenebrutinib is about 200 mg, administered as about 100 mg twice daily.

E190: The method of E184, wherein the dose of fenebrutinib is about 50 mg administered once daily.

E191: The method of E184, wherein the dose of fenebrutinib is about 50 mg administered twice daily.

E191a: The method of E184, wherein the daily dose of fenebrutinib is about 100 mg, administered as about 50 mg twice daily.

E192: The method of any one of E184-E191, wherein the patient has a mean reduction in a weekly itch severity score from baseline after treatment.

E193: The method of E192, wherein the mean reduction is at least a 3 point mean reduction in change from baseline.

E194: The method of E192, wherein the mean reduction is at least a 5 point mean reduction in change from baseline.

E195: The method of any one of E184-E194, wherein the patient has a reduction in Urticaria Activity Score (UAS7) from baseline after treatment.

E196: The method of E195, wherein the patient's UAS7 is less than or equal to 6 after treatment.

E197: The method of E195, wherein the patient's UAS7 is less than or equal to 4 after treatment.

E198: The method of E195, wherein the patient has a reduction in UAS7 of at least 11 points after treatment.

E199: The method of any one of E184-E198, wherein the patient has a reduction in weekly hive count from baseline after treatment.

E200: The method of E199, wherein the reduction of weekly hive count is at least a 6 point reduction from baseline.

E201: The method of any one of E192-E200, wherein the reduction from baseline occurs within or at 4 weeks of treatment.

E202: The method of any one of E192-E200, wherein the reduction from baseline occurs within or at 8 weeks of treatment.

E203: The method of any one of E192-E200, wherein the reduction from baseline occurs within or at 12 weeks of treatment.

E203a: The method of any one of E192-E203, wherein baseline is the value evaluated in the patient prior to beginning administration of fenebrutinib or a pharmaceutically acceptable salt thereof.

E204: The method of any one of E184-E203, wherein the patient is concurrently administered a H1 antihistamine.

E205: The method of E204, wherein the H1 antihistamine is selected from the group consisting of cetirizine, levocetirizine, fexofenadine, loratadine, desloratadine, diphenhydramine, hydroxyzine, chlorpheniramine, and cyproheptadine.

E206: The method of E204, wherein the H1 antihistamine is selected from the group consisting of cetirizine, fexofenadine, loratadine and desloratadine.

E207: The method of any one of E184-E206, wherein the method first comprises the step of identifying the presence of autoantibodies in sample of blood of the patient prior to administering fenebrutinib, or a pharmaceutically acceptable salt thereof, to the patient having said autoantibodies.

E208: The method of E207, wherein the autoantibodies are capable of activating mast cells and/or basophils.

E209: The method of E207, wherein the autoantibodies identified in the sample are selected from the group consisting of IgE antibodies that bind to TPO, IgE antibodies that bind to IL24, IgG antibodies that bind to IgE, and IgG antibodies that bind to FcERI.

E210: The method of any one of E207-E209, wherein the presence of autoantibodies is measured by the CU Index method.

E210-i: The method of any one of E207-E210, wherein the autoantibodies identified comprise IgG antibodies that bind to FcERI.

E210-i: The method of E210-i, wherein the level of IgG antibodies that bind to FcERI in the sample is elevated relative to the level in a healthy subject without chronic spontaneous urticaria.

E211: A method for treating a human patient with chronic spontaneous urticaria, wherein the patient is disease symptomatic despite prior H1 antihistamine treatment, the method comprising:

(i) determining that a sample from the patient comprises elevated levels of one or more biomarkers selected from the group consisting of IgE antibodies that bind to TPO, IgE antibodies that bind to IL24, IgG antibodies that bind to IgE, and IgG antibodies that bind to FcERI; and (ii) administering to the patient about 50 mg to about 400 mg daily of fenebrutinib, or a pharmaceutically acceptable salt thereof.

E212: A method of identifying a human patient having chronic spontaneous urticaria, wherein the patient is disease symptomatic despite prior H1 antihistamine treatment, wherein the patient is more likely to exhibit benefit from treatment comprising fenebrutinib, or a pharmaceutically acceptable salt thereof, by determining levels of one or more biomarkers selected from the group consisting of IgE antibodies that bind to TPO, IgE antibodies that bind to IL24, IgG antibodies that bind to IgE, and IgG antibodies that bind to FcERI; in a sample from the patient, wherein elevated levels of the one or more biomarkers in the sample indicates that the patient is more likely to exhibit benefit from the fenebrutinib treatment.

E212-i: The method of any one of E211-E212, wherein the a sample from the patient has elevated levels of IgG antibodies that bind to FcERI.

E212-ii: The method of any one of E211 to E212-i, wherein the elevated levels of one or more biomarkers are elevated relative to a healthy subject without chronic spontaneous urticaria.

E213: A method of administering fenebrutinib, or a pharmaceutically acceptable salt thereof, to treat a human patient with chronic spontaneous urticaria, wherein the patient is disease symptomatic despite prior H1 antihistamine treatment, and wherein the patient exhibits an abnormality in one or more biomarkers of liver function after fenebrutinib administration, the method comprising (a) administering to said patient fenebrutinib, or a pharmaceutically acceptable salt thereof, at a dose lower than about 150 to about 400 mg per day for a time period, followed by (b) administering to said patient fenebrutinib, or a pharmaceutically acceptable salt thereof, at a dose of about 150 mg to about 400 mg per day.

E214: The method of E213, wherein the dose in step (a) is equal to or lower than about 200 mg per day.

E215: The method of E213, wherein the dose in step (a) is equal to or lower than about 150 mg per day.

E216: The method of any one of E213-E215, wherein the dose in step (b) is the same dose in step (a).

E217: The method of any one of E213-E215, wherein the dose in step (b) is a lower dose than the dose in step (a).

E218: The method of any one of E213-E217, wherein the abnormality in one or more biomarkers of liver function is a grade 2 abnormality.

E219: The method of any one of E213-E217, wherein the abnormality in one or more biomarkers of liver function is a grade 3 abnormality.

E220: The method of any one of E213-E219, wherein the one or more biomarkers of liver function is selected from the group consisting of alanine transaminase, aspartate transaminase, bilirubin, and alkaline phosphatase.

E221: The method of any one of E213-E219, wherein the one or more biomarkers of liver function is selected from the group consisting of alanine transaminase and aspartate transaminase.

E222: The method of any one of E213-E221, wherein prior to step (a), the administration of fenebrutinib, or a pharmaceutically acceptable salt thereof, is discontinued until biomarkers of liver function are within normal limits.

E223: The method of any one of E213-E222, wherein the time period of step (a) continues until biomarkers of liver function are within normal limits.

E224: The method of any one of E213-E223, further comprising the step of measuring one or more biomarkers of liver function prior to or during step (a).

E225: The method of any one of E184-E224, wherein fenebrutinib, or a pharmaceutically acceptable salt thereof, is orally administered.

E226: The method of any one of E184-E225, wherein fenebrutinib, or a pharmaceutically acceptable salt thereof, is orally administered in the form of one or more tablets or capsules.

E227: The method of any one of E184-E226, wherein fenebrutinib, or a pharmaceutically acceptable salt thereof, is orally administered in the form of one or more tablets.

E228: The method of any one of E184-E227, wherein the compound is the free base of fenebrutinib.

E229: A compound for use in a method of treating a human patient having chronic spontaneous urticaria, wherein the patient is disease symptomatic despite prior H1 antihistamine treatment, wherein the compound is fenebrutinib or a pharmaceutically acceptable salt thereof, and wherein the treatment is at a dose of fenebrutinib of about 50 mg to about 400 mg daily.

E230: The compound for use in the method of E229, wherein the dose of fenebrutinib is about 200 mg administered twice daily.

E230a: The compound for use in the method of E229, wherein the daily dose of fenebrutinib is about 400 mg, administered as about 200 mg twice daily.

E231: The compound for use in the method of E229, wherein the dose of fenebrutinib is about 200 mg administered once daily.

E232: The compound for use in the method of E229, wherein the dose of fenebrutinib is about 150 mg administered once daily.

E233: The compound for use in the method of E229, wherein the dose of fenebrutinib is about 100 mg administered once daily.

E234: The compound for use in the method of E229, wherein the dose of fenebrutinib is about 100 mg administered twice daily.

E234a: The compound for use in the method of E229, wherein the daily dose of fenebrutinib is about 200 mg administered as about 100 mg twice daily.

E235: The compound for use in the method of E229, wherein the dose of fenebrutinib is about 50 mg administered once daily.

E236: The compound for use in the method of E229, wherein the dose of fenebrutinib is about 50 mg administered twice daily.

E236a: The compound for use in the method of E229, wherein the daily dose of fenebrutinib is about 100 mg, administered as 50 mg twice daily.

E237: The compound for use in the method of any one of E229-E236, wherein the patient has a mean reduction in a weekly itch severity score from baseline after treatment.

E238: The compound for use in the method of E237, wherein the mean reduction is at least a 3 point mean reduction in change from baseline.

E239: The compound for use in the method of E237, wherein the mean reduction is at least a 5 point mean reduction in change from baseline.

E240: The compound for use in the method of any one of E229-E239, wherein the patient has a reduction in Urticaria Activity Score (UAS7) from baseline after treatment.

E241: The compound for use in the method of E240, wherein the patient's UAS7 is less than or equal to 6 after treatment.

E242: The compound for use in the method of E240, wherein the patient's UAS7 is less than or equal to 4 after treatment.

E243: The compound for use in the method of E240, wherein the patient has a reduction in UAS7 of at least 11 points after treatment.

E244: The compound for use in the method of any one of E229-E243, wherein the patient has a reduction in weekly hive count from baseline after treatment.

E245: The compound for use in the method of E244, wherein the reduction of weekly hive count is at least a 6 point reduction from baseline.

E246: The compound for use in the method of any one of E237-E245, wherein the reduction from baseline occurs within or at 4 weeks of treatment.

E247: The compound for use in the method of any one of E237-E245, wherein the reduction from baseline occurs within or at 8 weeks of treatment.

E248: The compound for use in the method of any one of E237-E245, wherein the reduction from baseline occurs within or at 12 weeks of treatment.

E248a: The compound for use in the method of any one of E237-E248, wherein the baseline is the value determined in the patient prior to beginning administration of fenebrutinib or a pharmaceutically acceptable salt thereof.

E249: The compound for use in the method of any one of E229-E248, wherein the patient is concurrently administered a H1 antihistamine.

E250: The compound for use in the method of E249, wherein the Hl antihistamine is selected from the group consisting of cetirizine, levocetirizine, fexofenadine, loratadine, desloratadine, diphenhydramine, hydroxyzine, chlorpheniramine, and cyproheptadine.

E251: The compound for use in the method of E249, wherein the H1 antihistamine is selected from the group consisting of cetirizine, fexofenadine, loratadine and desloratadine.

E252: The compound for use in the method of any one of E229-E251, wherein the method first comprises the step of identifying the presence of autoantibodies in sample of blood of the patient prior to administering fenebrutinib, or a pharmaceutically acceptable salt thereof, to the patient having said autoantibodies.

E253: The compound for use in the method of E252, wherein the autoantibodies are capable of activating mast cells and/or basophils.

E254: The compound for use in the method of E252, wherein the autoantibodies identified in the sample are selected from the group consisting of IgE antibodies that bind to TPO, IgE antibodies that bind to IL24, IgG antibodies that bind to IgE, and IgG antibodies that bind to FcERI.

E254-i: The compound for use in the method of E252-E254, wherein the autoantibodies identified in the sample comprise IgG antibodies that bind to FcERI.

E255: The compound for use in the method of any one of E252-E254, wherein the presence of autoantibodies is measured by the CU Index method.

E256: The compound for use in the method of any one of E229-E255, wherein fenebrutinib, or a pharmaceutically acceptable salt thereof, is orally administered.

E257: The compound for use in the method of any one of E229-E256, wherein fenebrutinib, or a pharmaceutically acceptable salt thereof, is orally administered in the form of one or more tablets or capsules.

E258: The compound for use in the method of any one of E229-E257, wherein fenebrutinib, or a pharmaceutically acceptable salt thereof, is orally administered in the form of one or more tablets.

E259: The compound for use in the method of any one of E229-E258, wherein the compound is the free base of fenebrutinib.

E260: A method of treating a human patient having moderately to severely active systemic lupus erythematosus, wherein the patient is disease symptomatic despite prior standard oral SLE treatment, the method comprising the administration of fenebrutinib, or a pharmaceutically acceptable salt thereof, at a dose of about 150 mg to about 400 mg daily.

E261: The method of E260, wherein the dose of fenebrutinib is about 200 mg administered twice daily.

E261a: The method of E260, wherein the daily dose of fenebrutinib is about 400 mg, administered as about 200 mg twice daily.

E262: The method of E260, wherein the dose of fenebrutinib is about 200 mg administered once daily.

E263: The method of E260, wherein the dose of fenebrutinib is about 100 mg administered twice daily.

E263a: The method of E260, wherein the daily dose of fenebrutinib is about 200 mg, administered as about 100 mg twice daily.

E264: The method of E260, wherein the dose of fenebrutinib is about 150 mg administered once daily.

E265: The method of E260, wherein the dose of fenebrutinib is about 150 mg to about 300 mg daily.

E266: The method of E260, wherein the dose of fenebrutinib is about 200 mg to about 300 mg daily.

E267: The method of E260, wherein the dose of fenebrutinib is about 200 mg to about 400 mg daily.

E268: The method of E260, wherein the dose of fenebrutinib is about 150 mg to about 200 mg daily.

E269: The method of any one of E260-E268, wherein if administered twice daily, each dose contains the same amount of fenebrutinib.

E270: The method of any one of E260-E269, wherein the standard oral SLE treatment is selected from the group consisting of an oral corticosteroid, an anti-malarial, and an immunosuppressant.

E271: The method of any one of E260-E269, wherein the standard oral SLE treatment is selected from the group consisting of an oral corticosteroid, azathioprine, methotrexate, mycophenolate mofetil, mycophenolic sodium, hydroxychloroquine, chloroquine, and quinacrine.

E272: The method of any one of E260-E271, wherein the administration is in combination with an oral corticosteroid.

E273: The method of any one of E260-E272, wherein the patient has a reduction in one or more clinical symptoms of SLE after treatment.

E274: The method of E273, wherein the reduction in clinical symptoms of the patient is measured by the patient's SLE Responder Index (SRI-4) score.

E275: The method of E273 or E274, wherein the reduction in clinical symptoms of the patient is measured by the patient's British Isles Lupus Activity Group-based Composite Lupus Assessment (BICLA) score.

E276: The method of any one of E273-E275, wherein the reduction in one or more clinical symptoms of SLE occurs within or at 24 weeks of treatment.

E277: The method of any one of E273-E275, wherein the reduction in one or more clinical symptoms of SLE occurs within or at 48 weeks of treatment.

E278: The method of any one of E260-E277, further comprising the step of measuring one or more clinical endpoints for the patient in order to evaluate the efficacy of the treatment with fenebrutinib or a pharmaceutically acceptable salt thereof.

E279: The method of E278, wherein the clinical endpoint is the patient's SRI-4 score.

E280: The method of E278 or E279, wherein the clinical endpoint is the patient's BICLA score.

E281: The method of any one of E278-E280, wherein the clinical endpoint is measured after 24 weeks of treatment.

E282: The method of any one of E278-E280, wherein the clinical endpoint is measured after 48 weeks of treatment.

E283: The method of any one of E260-E282, wherein the method first comprises the step of identifying the presence of one or more biomarkers in sample of blood of the patient prior to treatment with fenebrutinib, or a pharmaceutically acceptable salt thereof, wherein the one or more biomarkers are selected from the group consisting of CCL3, CCL4, CCL20, CXCL13 and autoantibodies.

E284: The method of any one of E260-E282, wherein the method first comprises the step of identifying the presence of one or more biomarkers in sample of blood of the patient prior to treatment with fenebrutinib, or a pharmaceutically acceptable salt thereof, wherein the biomarkers comprise IgJ, MZB1, and TXNDC5.

E284a: The method of any one of E260-E282, wherein the method first comprises the step of identifying the presence of one or more biomarkers selected from the group consisting of IgJ, MZB1, and TXNDC5 in sample of blood of the patient prior to treatment with fenebrutinib, or a pharmaceutically acceptable salt thereof.

E285: A method for treating a human patient with moderately to severely active systemic lupus erythematosus, wherein the patient is disease symptomatic despite prior standard oral SLE treatment, comprising administering about 150 mg to about 400 mg daily of fenebrutinib, or a pharmaceutically acceptable salt thereof, to the patient wherein a sample from the patient has been found to have elevated levels of one or more biomarkers selected from the group consisting of CCL3, CCL4, CCL20, CXCL13 and autoantibodies.

E286: A method for treating a human patient with moderately to severely active systemic lupus erythematosus, wherein the patient is disease symptomatic despite prior standard oral SLE treatment, the method comprising:
(i) determining that a sample from the patient comprises elevated levels of one or more biomarkers selected from the group consisting of CCL3, CCL4, CCL20, CXCL13 and autoantibodies; and
(ii) administering to the patient about 150 to about 400 mg daily of fenebrutinib, or a pharmaceutically acceptable salt thereof.

E287: A method of identifying an SLE patient who is more likely to exhibit benefit from treatment comprising fenebrutinib, or a pharmaceutically acceptable salt thereof, by determining levels of one or more biomarkers selected from the group consisting of CCL3, CCL4, CCL20, CXCL13 and autoantibodies in a sample from the patient, wherein elevated levels of the one or more biomarkers in the sample indicates that the patient is more likely to exhibit benefit from the fenebrutinib treatment.

E288: A compound for use in a method of treating a human patient having moderately to severely active systemic lupus erythematosus, wherein the patient is disease symptomatic despite prior standard oral SLE treatment, wherein the compound is fenebrutinib, or a pharmaceutically acceptable salt thereof, and wherein the fenebrutinib is administered to the patient at a dose of about 150 mg to about 400 mg daily.

E289: The compound for use in the method of E288, wherein the dose of fenebrutinib is about 200 mg administered twice daily.

E289a: The compound for use in the method of E288, wherein the daily dose of fenebrutinib is about 400 mg, administered as about 200 mg twice daily.

E290: The compound for use in the method of E288, wherein the dose of fenebrutinib is about 200 mg administered once daily.

E291: The compound for use in the method of E288, wherein the dose of fenebrutinib is about 100 mg administered twice daily.

E291a: The compound for use in the method of E288, wherein the daily dose of fenebrutinib is about 200 mg, administered as about 100 mg twice daily.

E292: The compound for use in the method of E288, wherein the dose of fenebrutinib is about 150 mg administered once daily.

E293: The compound for use in the method of E288, wherein the dose of fenebrutinib is about 150 mg to about 300 mg daily.

E294: The compound for use in the method of E288, wherein the dose of fenebrutinib is about 200 mg to about 300 mg daily.

E295: The compound for use in the method of E288, wherein the dose of fenebrutinib is about 200 mg to about 400 mg daily.

E296: The compound for use in the method of E288, wherein the dose of fenebrutinib is about 150 mg to about 200 mg daily.

E297: The compound for use in the method of any one of E288-E296, wherein if administered twice daily, each dose contains the same amount of fenebrutinib.

E298: The compound for use in the method of any one of E288-E297, wherein the standard oral SLE treatment is selected from the group consisting of an oral corticosteroid, an anti-malarial, and an immunosuppressant.

E299: The compound for use in the method of any one of E288-E297, wherein the standard oral SLE treatment is selected from the group consisting of an oral corticosteroid, azathioprine, methotrexate, mycophenolate mofetil, mycophenolic sodium, hydroxychloroquine, chloroquine, and quinacrine.

E300: The compound for use in the method of any one of E288-E299, wherein the administration is in combination with an oral corticosteroid.

E301: The compound for use in the method of any one of E288-E300, wherein the patient has a reduction in one or more clinical symptoms of SLE after treatment.

E302: The compound for use in the method of E301, wherein the reduction in clinical symptoms of the patient is measured by the patient's SLE Responder Index (SRI-4) score.

E303: The compound for use in the method of E302 or E303, wherein the reduction in clinical symptoms of the patient is measured by the patient's British Isles Lupus Activity Group-based Composite Lupus Assessment (BICLA) score.

E304: The compound for use in the method of any one of E301-E303, wherein the reduction in one or more clinical symptoms of SLE occurs within or at 24 weeks of treatment.

E305: The compound for use in the method of any one of E301-E303, wherein the reduction in one or more clinical symptoms of SLE occurs within or at 48 weeks of treatment.

E306: The compound for use in the method of any one of E288-E305, further comprising the step of measuring one or more clinical endpoints for the patient in order to evaluate the efficacy of the treatment with fenebrutinib or a pharmaceutically acceptable salt thereof.

E307: The compound for use in the method of E306, wherein the clinical endpoint is the patient's SRI-4 score.

E308: The compound for use in the method of E306 or E307, wherein the clinical endpoint is the patient's BICLA score.

E309: The compound for use in the method of any one of E305-E308, wherein the clinical endpoint is measured after 24 weeks of treatment.

E310: The compound for use in the method of any one of E305-E308, wherein the clinical endpoint is measured after 48 weeks of treatment.

E311: The compound for use in the method of any one of E288-E310, wherein the method first comprises the step of identifying the presence of one or more biomarkers in sample of blood of the patient prior to treatment with fenebrutinib, or a pharmaceutically acceptable salt thereof, to the patient having said autoantibodies, wherein the one or more biomarkers are selected from the group consisting of CCL3, CCL4, CCL20, CXCL13 and autoantibodies.

E312: The compound for use in the method of any one of E288-E310, wherein the method first comprises the step of identifying the presence of one or more biomarkers in sample of blood of the patient prior to treatment with fenebrutinib, or a pharmaceutically acceptable salt thereof, wherein the biomarkers comprise IgJ, MZB1 and TXNDC5.

E313: Fenebrutinib, or a pharmaceutically acceptable salt thereof, for use in treating a human patient with moderately to severely active rheumatoid arthritis, wherein the patient has exhibited an abnormality in one or more biomarkers of liver function after fenebrutinib administration, the method comprising (a) administering to said patient fenebrutinib, or a pharmaceutically acceptable salt thereof, at a dose lower than about 150 mg to about 400 mg per day for a time period, followed by (b) administering to said patient fenebrutinib, or a pharmaceutically acceptable salt thereof, at a dose of about 150 mg to about 400 mg per day.

E314: Fenebrutinib, or a pharmaceutically acceptable salt thereof, for use in treating a human patient with chronic spontaneous urticaria, wherein the patient is disease symptomatic despite prior H1 antihistamine treatment, wherein the patient has exhibited an abnormality in one or more biomarkers of liver function after fenebrutinib administration, and wherein the patient is administered fenebrutinib, or a pharmaceutically acceptable salt thereof, at a dose lower than about 50 mg to about 400 mg per day for a time period, followed by (b) administering to said patient fenebrutinib, or a pharmaceutically acceptable salt thereof, at a dose of about 50 mg to about 400 mg per day.

E315: Fenebrutinib, or a pharmaceutically acceptable salt thereof, for use in treating a human patient with moderately to severely active systemic lupus erythematosis, wherein the patient has exhibited an abnormality in one or more biomarkers of liver function after fenebrutinib administration, the method comprising (a) administering to said patient fenebrutinib, or a pharmaceutically acceptable salt thereof, at a dose lower than about 150 mg to about 400 mg per day for a time period, followed by (b) administering to said patient fenebrutinib, or a pharmaceutically acceptable salt thereof, at a dose of about 150 mg to about 400 mg per day.

E316: Fenebrutinib, or a pharmaceutically acceptable salt thereof, for the use as described in any one of E313-E315, wherein the dose in step (a) is equal to or lower than about 200 mg per day.

E317: Fenebrutinib, or a pharmaceutically acceptable salt thereof, for the use as described in any one of E313-E315, wherein the dose in step (a) is equal to or lower than about 150 mg per day.

E318: Fenebrutinib, or a pharmaceutically acceptable salt thereof, for the use as described in any one of E313-E317, wherein the dose in step (b) is the same dose in step (a).

E319: Fenebrutinib, or a pharmaceutically acceptable salt thereof, for the use as described in any one of E313-E317, wherein the dose in step (b) is a lower dose than the dose in step (a).

E320: Fenebrutinib, or a pharmaceutically acceptable salt thereof, for the use as described in any one of E313-E319, wherein the abnormality in one or more biomarkers of liver function is a grade 2 abnormality.

E321: Fenebrutinib, or a pharmaceutically acceptable salt thereof, for the use as described in any one of E313-E319, wherein the abnormality in one or more biomarkers of liver function is a grade 3 abnormality.

E322: Fenebrutinib, or a pharmaceutically acceptable salt thereof, for the use as described in any one of E313-E321, wherein the one or more biomarkers of liver function is selected from the group consisting of alanine transaminase, aspartate transaminase, bilirubin, and alkaline phosphatase.

E323: Fenebrutinib, or a pharmaceutically acceptable salt thereof, for the use as described in any one of E313-E321, wherein the one or more biomarkers of liver function is selected from the group consisting of alanine transaminase and aspartate transaminase.

Also provided herein is a compound for use in the manufacture of a medicament for any one of the treatment methods described in the embodiments above, wherein the compound is fenebrutinib or a pharmaceutically acceptable salt thereof.

In addition to the specific embodiments described above, any one of the embodiments of this invention may be combined.

It is to be understood that one, some, or all of the properties of the various embodiments described herein may be combined to form other embodiments of the present invention. These and other aspects of the invention will become apparent to one of skill in the art. These and other embodiments of the invention are further described by the detailed description that follows.

BRIEF DESCRIPTION OF THE DRAWINGS

FIGS. 21A-21C show the ACR50 response (FIG. 21A), mean change in baseline of DAS28-4-CRP (FIG. 21B), and mean change in baseline of HAQ-DI (FIG. 21C) by visit for Cohorts 1 and 2 of the fenebrutinib RA study of Example 1. The legend for all graphs is shown in FIG. 21C.

FIGS. 25A-25D show the change in the ACR components of SJC (FIG. 25A), TJC (FIG. 25B), ESR (FIG. 25C), and CRP (FIG. 25D) from baseline to week 12 in Cohorts 1 and 2 of the fenebrutinib RA study of Example 1.

FIGS. 26A-26C show the change in the ACR components of physician global assessment score (FIG. 26A), patient global assessment score (FIG. 26B), and patient pain assessment score (FIG. 26C) from baseline to week 12 in Cohorts 1 and 2 of the fenebrutinib RA study of Example 1.

FIGS. 30A and 30B (30B-1 and 30B-2) are tables summarizing the demographics and baseline characteristics of the patients in the fenebrutinib RA study of Example 1.

FIGS. 31A (31A-1 and 31A-2) and 31B (31B-1 and 31B-2) are tables summarizing the primary and secondary efficacy endpoints at week 12 of the fenebrutinib RA study of Example 1.

DETAILED DESCRIPTION

I. Definitions

Figure 1:
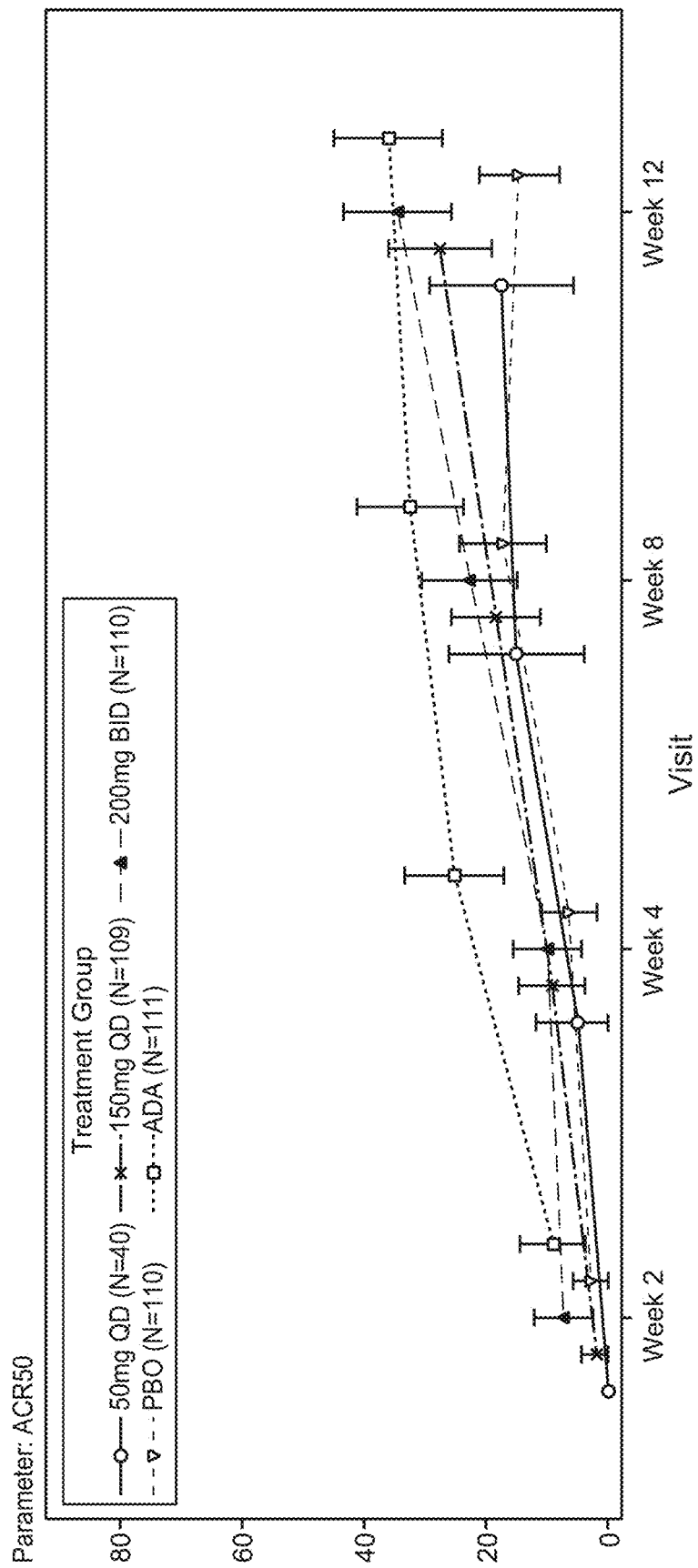
FIG. 1 shows ACR50 scores over time for Cohort 1 of the fenebrutinib RA study of Example 1.

Before describing the invention in detail, it is to be understood that this invention is not limited to particular compositions or biological systems, which can, of course, vary. It is also to be understood that the terminology used herein is for the purpose of describing particular embodiments only, and is not intended to be limiting.

As used in this specification and the appended claims, the singular forms "a", "an" and "the" include plural referents unless the content clearly dictates otherwise. Thus, for example, reference to "a molecule" optionally includes a combination of two or more such molecules, and the like.

The term "about" as used herein refers to the usual error range for the respective value readily known to the skilled person in this technical field. Reference to "about" a value or parameter herein includes (and describes) embodiments that are directed to that value or parameter per se. In some embodiments, the term "about" refers to a range of plus or minus 10% for the respective value. In some embodiments, the term "about" refers to a range of plus or minus 5% for the respective value. In some embodiments, the term "about" refers to a range of plus or minus 2% for the respective value. In some embodiments, the term "about" refers to a range of plus or minus 1% for the respective value.

It is understood that aspects and embodiments of the invention described herein include "comprising," "consisting," and "consisting essentially of" aspects and embodiments.

The term "pharmaceutical formulation" refers to a preparation which is in such form as to permit the biological activity of the active ingredient to be effective, and which contains no additional components which are unacceptably toxic to a subject to which the formulation would be administered. In some embodiments, such formulations are sterile. "Pharmaceutically acceptable" excipients (vehicles, additives) are those which can reasonably be administered to a subject mammal to provide an effective dose of the active ingredient employed.

As used herein, the term "treatment" refers to clinical intervention designed to alter the natural course of the individual or cell being treated during the course of clinical pathology. Desirable effects of treatment include decreasing the rate of disease progression, ameliorating or palliating the disease state, and remission or improved prognosis. In some embodiments, two or more of such effects are achieved. In some embodiments, an individual is successfully "treated" if one or more symptoms associated with their disease or disorder is diminished; the disease is made more tolerable to the patient; the rate of degeneration or decline, or rate of disease or disorder development is slowed or stopped; the progression of the disease or disorder is slowed or stopped; or the final point of degeneration is less debilitating. For example, an individual is successfully "treated" if one or more symptoms associated with cancer are mitigated or eliminated, including, but are not limited to, reducing the proliferation of (or destroying) cancerous cells, decreasing symptoms resulting from the disease, increasing the quality of life of those suffering from the disease, decreasing the dose of other medications required to treat the disease, and/or prolonging survival of individuals. Treatment of certain diseases or disorders may in some embodiments include, but is not limited to, specific clinical or other endpoints such as those described in the Examples provided herein.

An "effective amount" is at least the minimum amount required to effect a measurable improvement or prevention of a particular disorder. An effective amount herein may vary according to factors such as the disease state, age, sex, and weight of the patient, and the ability of the antibody to elicit a desired response in the individual. An effective amount is also one in which any toxic or detrimental effects of the treatment are outweighed by the therapeutically beneficial effects. For prophylactic use, beneficial or desired results include results such as eliminating or reducing the risk, lessening the severity, or delaying the onset of the disease, including biochemical, histological and/or behavioral symptoms of the disease, its complications and intermediate pathological phenotypes presenting during development of the disease. For therapeutic use, beneficial or desired results include clinical results such as decreasing one or more symptoms resulting from the disease, increasing the quality of life of those suffering from the disease, decreasing the dose of other medications required to treat the disease, enhancing effect of another medication such as via targeting, delaying the progression of the disease, and/or prolonging survival. An effective amount can be administered in one or more administrations. For purposes of this invention, an effective amount of drug, compound, or pharmaceutical composition is an amount sufficient to accomplish prophylactic or therapeutic treatment either directly or indirectly. As is understood in the clinical context, an effective amount of a drug, compound, or pharmaceutical composition may or may not be achieved in conjunction with another drug, compound, or pharmaceutical composition. Thus, an "effective amount" may be considered in the context of administering one or more therapeutic agents, and a single agent may be considered to be given in an effective amount if, in conjunction with one or more other agents, a desirable result may be or is achieved.

The dosage ranges provided herein refer to the free form of fenebrutinib. It would be clear to one of skill in the art how to calculate a corresponding amount of a pharmaceutical salt form of fenebrutinib, taking into account the difference in molecular weight between the free form of fenebrutinib and a salt form. For example, in some embodiments provided herein, a patient is administered about 200 mg daily of fenebrutinib, or a pharmaceutically acceptable salt thereof. If a pharmaceutically acceptable salt form is administered in such embodiments, due to the salt form having a higher molecular weight than the free form of fenebrutinib, the total weight of the pharmaceutically acceptable salt of fenebrutinib administered is greater than 200 mg, but corresponds to about 200 mg of the free form of fenebrutinib.

As used herein, "inadequate response" refers to a lack of sufficient response to treatment of a disease as measured by clinical, laboratory or other measures of disease activity, including symptoms thereof. Inadequate response may be defined by specific clinical or other endpoints such as those described in the Examples provided herein. An insufficient response as provided herein includes outcomes where no discernable response to treatment is observed, and outcomes where a response to treatment is observed but considered insufficient to meaningfully alleviate symptoms or treat the disease.

As used herein, "intolerance" to treatment refers to a lack of a patient's ability to continue to receive a drug or therapy due to one or more sensitivity or adverse reactions to the drug or therapy. Intolerance may require cessation of therapy for a period of time, or indefinitely. Intolerance may, for example, be caused by a side effect of a drug treatment in a particular patient or group of patients.

As used herein, "disease symptomatic" refers to the presentation of symptoms, signs or signs of a disease in a patient. Such symptoms or signs of disease may be observable by a physician or other care provider, or by the patient themselves, or by one or more laboratory tests. A patient is disease symptomatic when they display such signs. In some embodiments, a patient is considered disease symptomatic according the specific patient inclusion criteria set out in the Examples provided herein.

As used herein, "in conjunction with" or "in combination with" refers to administration of one treatment modality (e.g., a drug therapy) in addition to another treatment modality. As such, these terms refer to administration of one treatment modality before, during, or after administration of the other treatment modality to a patient.

A "disorder" is any condition that would benefit from treatment including, but not limited to, chronic and acute disorders or diseases including those pathological conditions which predispose a mammal to the disorder in question.

As used herein, "moderately to severely active rheumatoid arthritis", which may be used synonymously with "moderate to severe rheumatoid arthritis", refers to active RA as measured by standards accepted in the field of rheumatology (e.g., DAS28, ACR50, SDAI, joint counts). In some embodiments, a patient having 6 or greater tender joints and 6 or greater swollen joints has moderately to severely active RA. In other embodiments, a patient having (i) 6 or greater tender joints and 6 or greater swollen joints, and (ii) an elevated level of a laboratory measure of inflammation, has moderately to severely active RA. Such lab measures of inflammation may be CRP, ESR, autoantibodies (e.g., RF and ACPA) or a combination of these measures.

As used herein, "moderately to severely active systemic lupus erythematosis" which may be used synonymously with "moderate to severe systemic lupus erythematosis", refers to active SLE as measured by standards accepted in the field (e.g., SLEDAI-2K score and/or Physician's Global Assessment). In some embodiments, a patient having a SLEDAI-2K score ≥8 (at screening only) with clinical SLEDAI-2K score ≥4.0 (at both screening and Day 1) and a Physician's Global Assessment ≥1.0 (out of 3) is considered to have moderately to severely active SLE. In some embodiments, the patient having moderately to severely active SLE has the above symptoms and is currently receiving at least one standard oral treatment (e.g., corticosteroids, anti-malarials, and/or immunosuppressants) for SLE.

As used herein, term "DMARD" refers to a disease-modifying anti-rheumatic drug. As used herein, DMARDs include conventional non-biologic DMARDs (e.g., methotrexate, azathioprine, cyclophosphamide, cyclosporine, leflunomide, mycophenolate mofetil, sulfasalazine, hydroxychloroquine, and minocycline) and targeted non-biologic DMARDs such as Janus kinase inhibitors (JAK inhibitors), SYK inhibitors, IRAK1 inhibitors, IRAK4 inhibitors, RIP1K inhibitors, and apremilast. Exemplary conventional non-biologic DMARDs include, but are not limited to, methotrexate, azathioprine, cyclophosphamide, cyclosporine, leflunomide, mycophenolate mofetil, sulfasalazine, hydroxychloroquine and minocycline. Exemplary targeted non-biologic DMARDS include apremilast, tofacitinib, baricitinib, filgotinib, peficitinib, and upadacitinib, including pharmaceutically acceptable salts thereof. In some embodiments, hydroxychloroquine is in a sulfate salt form (i.e., hydroxychloroquine sulfate). Exemplary Janus kinase inhibitors include, but are not limited to, tofacitinib, baricitinib, filgotinib, peficitinib, and upadacitinib, and pharmaceutically acceptable salts thereof.

As used herein, a "biologic rheumatoid arthritis drug" refers to a biological molecule, such as a protein, that interferes with or modulates the activity of a cellular receptor associated with an inflammatory and/or autoimmune response associated with rheumatoid arthritis, particularly TNF-alpha, B-cell receptors, T-cell receptors, cytokines (e.g., IL-1, IL-6 and IL-17), and granulocyte-macrophage colony-stimulating factor (GM-CSF). Biologic rheumatoid arthritis drugs include, but are not limited to, TNF-alpha inhibitors, B-cell antagonists, T-cell antagonists, IL-1 receptor antagonists, IL-6 receptor antagonists, IL-17 receptor antagonists, and GM-CSF receptor antagonists. Exemplary biologic rheumatoid arthritis drugs include, but are not limited to, abatacept, rituximab, tocilizumab, adalimumab, etanercept, anakinra, infliximab, sarilumab, golimumab, certolizumab, certolizumab pegol, and any biosimilar equivalents thereof. In some embodiments, the biologic rheumatoid arthritis drug is adalimumab, tocilizumab or sarilumab.

In some embodiments, the "biologic rheumatoid arthritis drug" is a "non-TNFα inhibitor biologic", e.g., abatacept, tocilizumab, sarilumab, sirukumab, anakinra, or any biologics or biosimilar equivalents with the same mode of action to the listed agents, including investigational biosimilar agents.

As used herein, a "biologic TNF-alpha inhibitor" refers to a biologic agent (i.e., an antibody) that inhibits, to some extent, a biological function of tumor necrosis factor alpha (TNF-alpha), for example by biding to TNF-alpha and neutralizing or reducing its activity. Examples of biologic TNF-alpha inhibitors includes but are not limited to adalimumab, etanercept, infliximab, golimumab, certolizumab, certolizumab pegol, and any biosimilar equivalents thereof.

As used herein, a "B-cell antagonist" is a molecule that, upon binding to a B-cell surface marker, destroys or depletes B cells in a mammal and/or interferes with one or more B-cell functions. Exemplary B-cell antagonists include but are not limited to CD20 antibodies, CD22 antibodies, BR3 antibodies and BR3-Fc immunoadhesin. Exemplary CD20 antibodies include rituximab, ocrelizumab, ofatumumab, tositumomab, obinutuzumab, ibritumomab, and any biosimilar equivalents thereof.

As used herein, a "T-cell antagonist" is a molecule that, upon binding to a T-cell surface marker, interferes with one or more T-cell functions such as activation, cell signaling and/or differentiation. In some embodiments, the T-cell antagonist is abatacept or a biosimilar equivalent thereof.

As used herein, a "IL-6 receptor antagonist" refers to an agent that inhibits, to some extent, a biological function of interleukin-6 (IL-6), for example by biding to the IL-6 receptor and neutralizing or reducing its activity. In some embodiments, the IL-6 receptor antagonist is tocilizumab, sarilumab, and any biosimilar equivalents thereof.

As used herein, a "IL-1 receptor antagonist" refers to an agent that inhibits, to some extent, a biological function of interleukin-6 (IL-1), for example by biding to the IL-1 receptor and neutralizing or reducing its activity. In some embodiments, the IL-1 receptor antagonist is anakinra.

As used herein, "ACR" and "ACR score" refers to the American College of Rheumatology standard score for the measurement of rheumatoid arthritis activity in a patient. ACR20 refers to a 20% improvement on a scale of 28 intervals. ACR50 refers to a 50% improvement. ACR70 refers to a 70% improvement. See Rocha, K. www.rheumatoidarthritis.org/treatment/acr-score (last visited Aug. 7, 2018); Aletaha, D. et al. Ann. Rheum. Dis. 2010, 69(9): 1580-8.

As used herein "HAQ-DI" refers to the HAQ Disability subscale, which consists of patient questions as a measure of rheumatoid arthritis functional disability and overall severity. See B. Bruce, J. F. Fries, Health and Quality of Life Outcomes 2003, 1:20; Bardwell et al., Rheumatology 2002, 41(1): 38-45.

As used herein, "DAS28" refers to the Disease Activity Score as measured in part by reference to 28 joints of a patient having rheumatoid arthritis. See National Rheumatoid Arthritis Society (www.nras.org.uk/the-das28-score, last visited Aug. 7, 2018); J. Fransen, P. L. C. M. van Riel., Clin Exp Rheumatol 2005; 23 (Suppl.39): S93-S99. As used herein, "DAS28-3-CRP" refers to a DAS28 score as measured by three variables: tender joint count, swollen joint count, and C-reactive protein ("CRP").

As used herein, "SF-36" refers to the widely-used medical outcomes health survey "Short Form-36", which is used as a tool for monitoring the results of medical care in patients. See Tarlov A. R., et al., JAMA 1989, 262 (7): 925-30; Linde, L., et al., J Rheumatol, 35 (2008), pp. 1528-1537.

As used herein, "FACIT-Fatigue" or the "FACIT-Fatigue Scale" refers to the Functional Assessment of Chronic Illness Therapy Fatigue (FACIT-Fatigue) Scale, which is a standard measure of patient fatigue by patient survey, in for example, rheumatoid arthritis patients. See Cella, D., et al., J Rheumatol. 2005, 32(5):811-9.

As used herein, "CRP" refers to C-reactive protein, or the blood test for inflammation in the body which measures C-reactive protein in the blood. CRP, a protein produced in the liver, will increase in concentration in the blood in response to inflammation. CRP may be measured by a "hsCRP" test, which measures high sensitivity CRP. In some embodiments, a positive result for elevated CRP is as measured by hsCRP ≥0.400 mg/dL hsCRP test. In other embodiments, a positive result for elevated CRP is as measured by a hsCRP ≥0.650 mg/dL hsCRP test. CRP tests are widely available from a variety of vendors (LabCorp, Quest Diagnostics, Life Line Screening, etc.).

As used herein, "ESR" refers to "Erythrocyte Sedimentation Rate", which is a test that indirectly measures the degree of inflammation in the body by measuring how quickly red blood cells settle at the bottom of a test tube containing a sample of a patient's blood. See www.healthline.com/health/esr (last visited Aug. 7, 2018). A positive ESR may be determined using the Westergren method according to specifications by the International Council for Standardization in Haematology, or by automated methods (e.g., TEST1 from Alifax). See https://icsh(dot)org/guidelines; Lou, J. M. et al., *Int. Jnl. Lab. Hem.* 2011, 33:125-132.

As used herein, "ACPA" refers to anticitrullinated peptide antibody or anticitrullinated protein antibody, also known as anti-cyclic citrullinated protein/peptide antibody (i.e., anti-CCP or ACPA).

As used herein, "autoantibody positive" or "positive for autoantibodies" refers to a patient having elevated levels of autoantibodies. Such patients will test positive for one or both of these autoantibodies. In some embodiments, autoantibody positive includes seropositive patients. Test kits or assays for measuring autoantibodies in a patient sample are commercially available (e.g., Anti-CCP Cobas e601 from Covance, Diastat from Axis-Shield, Immunoscan-CCP Plus from Eurodiagnostica, ELIA-CCP from Phadia, and Quanta Lite from Inova).

As used herein, "seropositive" refers to a patient having elevated levels of the autoantibodies rheumatoid factor (RF), ACPA or both. Such patients will test positive for one or both of RF and ACPA. In some embodiments, a positive RF diagnosis means that a sample of the patient's blood shows greater than 20 units/ml of RF, and a positive ACPA diagnosis means that a sample of the patient's blood shows greater than 5 units/ml of ACPA. See Isaacs, J. D., et al. Ann. Rheum. Dis. 2013, 72:329-336; Aggarwal, R. et al. Arthritis Rheum. 2009, 61 (11): 1472-83. In other embodiments, a positive RF diagnosis means that a sample of the patient's blood shows greater than or equal to 15 IU/ml of RF IgM, and a positive ACPA diagnosis means that a sample of the patient's blood shows greater than or equal to 17 U/ml of ACPA IgG. Test kits or assays are commercially available (Anti-CCP Cobas e601, Diastat, Immunoscan-CCP Plus, ELIA-CCP, and Quanta Lite).

As used herein, "seronegative" refers to a patient who does not show elevated levels of both RF and ACPA (i.e., the patent tests negative by both measures).

As used herein, "UAS7" refers to the Urticaria Activity Score summed over 7 days, which among other things, assesses hive count and itch severity in CSU patients. UAS7 is further described in the clinical study of Example 2.

As used herein, "H1 antihistamine" refers to drugs which are antagonists of H1-histamine receptors, and are commonly prescribed for allergies, urticaria and other allergic or hypersensitivity reactions or conditions. H1 antihistamines provided herein include alkylamine antihistamines, ethanolamine antihistamines, tricyclic antihistamines, and second-generation antihistamines. Exemplary alkylamine antihistamines include, but are not limited to, pheniramine, chlorpheniramine, dexchlorpheniramine, brompheniramine, dexbrompheniramine, triprolidine, dimetindene, acetaminophen/chlorpheniramine, acetaminophen/chlorpheniramine/phenylephrine, and chlorpheniramine/phenylephrine/dextromethorphan. Exemplary ethanolamine antihistamines include, but are not limited to, clemastine, diphenhydramine and doxylamine. Exemplary tricyclic antihistamines include loratadine and desloratadine. Other H1 antihistamines include second generation antihistamines such as cetirizine, levocetirizine and fexofenadine. In some embodiments, H1 antihistamines provided herein include cetirizine, levocetirizine, fexofenadine, loratadine, desloratadine, diphenhydramine, hydroxyzine, chlorpheniramine, and cyproheptadine.

As used herein, "CU Index" or "Chronic Urticaria Index" refers to commercially-available in vitro basophil histamine release assay in which patient serum is mixed with donor basophils and the released histamine levels are measured through a quantitative enzyme immunoassay. A CU Index value greater than or equal to 10 indicates that the patient has either an autoimmune basis for their urticaria (e.g., antibodies for either IgE, FcɛRI, or anti-FcɛRII) or an alternate histamine releasing factor. See Biagtan, M. J., et al., J Allergy Clin Immunol. 2011, 127 (6): 1626-27. A commercially available CU Index test is CU Index® by Viracor (www.viracor-eurofins.com/2103-cu-index, last visited Aug. 23, 2018).

As used herein, "standard oral SLE treatment" refers to oral drugs commonly prescribed to SLE patients. In some embodiments, a standard oral SLE treatment is selected from corticosteroids, anti-malarials, and immunosuppressants. In some embodiments, the standard oral SLE treatments are selected from: an oral corticosteroid, azathioprine, methotrexate, mycophenolate mofetil, mycophenolic sodium, hydroxychloroquine, chloroquine, and quinacrine.

As used herein, "SRI-4" refers to the SLE Responder Index response. The SRI-4 response criterion is commonly used in SLE studies, is accepted by health authorities to measure reduction in SLE disease activity, and it is a composite measure that includes the SLE Disease Activity Index (SLEDAI-2K), British Isles Lupus Activity Group (BILAG) 2004, and Physician Global Assessment. See Luijten K. M., Autoimmun. Rev. 2012, 11(5): 326-9.

As used herein, "BICLA" refers to the BILAG-based Composite Lupus Assessment. The BILCA response is a common secondary metric to SRI-4 as a meaningful measure of SLE disease activity. See Luijten K. M., Autoimmun. Rev. 2012, 11 (5): 326-9.

An "oral corticosteroid" or "OCS" as defined herein, refers to glucocorticoids, steroids and/or cortisole-like drugs suitable for oral administration for the treatment of the diseases provided herein, and includes but is not limited to prednisone, cortisone, cortisone acetate, hydrocortisone, dexamethasone, prednisolone, and methylprednisolone.

A "patient" for purposes of treatment refers to any animal classified as a mammal, including humans, domestic and farm animals, and zoo, sports, or pet animals, such as dogs, horses, cats, cows, etc. Preferably, the patient is human.

The term "antibody" herein is used in the broadest sense and specifically covers monoclonal antibodies (including full length monoclonal antibodies), polyclonal antibodies, multispecific antibodies (e.g., bispecific antibodies), and antibody fragments so long as they exhibit the desired biological activity.

The term "biomarker" as used herein refers to an indicator, e.g., predictive, diagnostic, and/or prognostic, which can be detected in a sample. The biomarker may serve as an indicator of a particular subtype of a disease or disorder (e.g., cancer) characterized by certain, molecular, pathological, histological, and/or clinical features. In some embodiments, a biomarker is a gene. Biomarkers include, but are not limited to, polynucleotides (e.g., DNA, and/or RNA), polypeptides, polypeptide and polynucleotide modifications (e.g. posttranslational modifications), carbohydrates, and/or glycolipid-based molecular markers. The "amount" or "level" of a biomarker associated with an increased clinical benefit to an individual is a detectable level in a biological sample. These can be measured by methods known to one skilled in the art and also disclosed herein. The expression level or amount of biomarker assessed can, in some embodiments, be used to determine the response to the treatment. In certain embodiments, the expression level or amount of one or more biomarkers is associated with a certain response to treatment.

The term "sample," as used herein, refers to a composition that is obtained or derived from a subject and/or individual of interest that contains a cellular and/or other molecular entity that is to be characterized and/or identified, for example based on physical, biochemical, chemical and/or physiological characteristics. For example, the phrase "disease sample" and variations thereof refers to any sample obtained from a subject of interest that would be expected or is known to contain the cellular and/or molecular entity that is to be characterized. Samples include, but are not limited to, primary or cultured cells or cell lines, cell supernatants, cell lysates, platelets, serum, plasma, vitreous fluid, lymph fluid, synovial fluid, follicular fluid, seminal fluid, amniotic fluid, milk, whole blood, blood-derived cells, urine, cerebrospinal fluid, saliva, sputum, tears, perspiration, mucus, tumor lysates, and tissue culture medium, tissue extracts such as homogenized tissue, tumor tissue, cellular extracts, and combinations thereof.

By "tissue sample" or "cell sample" is meant a collection of similar cells obtained from a tissue of a subject or individual. The source of the tissue or cell sample may be solid tissue as from a fresh, frozen and/or preserved organ, biopsy, and/or aspirate; blood or any blood constituents such as plasma; bodily fluids such as cerebral spinal fluid, amniotic fluid, peritoneal fluid, or interstitial fluid; cells from any time in gestation or development of the subject. The tissue or cell sample may also be primary or cultured cells or cell lines. Optionally, the tissue or cell sample is obtained from a disease tissue/organ. The tissue or cell sample may contain compounds which are not naturally intermixed with the tissue in nature such as preservatives, anticoagulants, buffers, fixatives, nutrients, antibiotics, or the like.

A "reference sample", "reference cell", "reference tissue", "control sample", "control cell", or "control tissue", as used herein, refers to a sample, cell, tissue, standard, or level that is used for comparison purposes. In one embodiment, a reference sample, reference cell, reference tissue, control sample, control cell, or control tissue is obtained from a healthy and/or non-diseased part of the body (e.g., tissue or cells) of the same subject or individual. For example, healthy and/or non-diseased cells or tissue adjacent to the diseased cells or tissue. In another embodiment, a reference sample is obtained from an untreated tissue and/or cell of the body of the same subject or individual. In yet another embodiment, a reference sample, reference cell, reference tissue, control sample, control cell, or control tissue is obtained from a healthy and/or non-diseased part of the body (e.g., tissues or cells) of an individual who is not the subject or individual. In even another embodiment, a reference sample, reference cell, reference tissue, control sample, control cell, or control tissue is obtained from an untreated tissue and/or cell of the body of an individual who is not the subject or individual.

The term "diagnosis" is used herein to refer to the identification or classification of a molecular or pathological state, disease or condition. For example, "diagnosis" may refer to identification of a particular type of disease. "Diagnosis" may also refer to the classification of a particular subtype of disease, e.g., by histopathological criteria, or by molecular features (e.g., a subtype characterized by expression of one or a combination of biomarkers (e.g., particular genes or proteins encoded by said genes)).

An "effective response" of a patient or a patient's "responsiveness" to treatment with a medicament and similar wording refers to the clinical or therapeutic benefit imparted to a patient at risk for, or suffering from, a disease or disorder, such as cancer. In one embodiment, such benefit includes any one or more of: extending survival (including overall survival and progression free survival); resulting in an objective response (including a complete response or a partial response); or improving signs or symptoms of cancer. In some embodiments, the disease or disorder is rheumatoid arthritis, CSU, or SLE. In certain embodiments, an "effective response" or a patient's "responsiveness" to treatment for a particular disorder or disease may be evaluated, for example, using one or more standardized assessments, such as the standardized assessments described herein.

A patient who "does not have an effective response" to treatment refers to a patient who does not have any one of extending survival (including overall survival and progression free survival); resulting in an objective response (including a complete response or a partial response); or improving signs or symptoms of cancer. In some embodiments, a patient who "does not have an effective response" to treatment refers to a patient who does not have improvement in one or more signs or symptoms of a disorder or disease, such as SLE, CSU, or RA.

II. Pharmaceutical Compositions and Formulations

Also provided herein are pharmaceutical compositions and formulations comprising fenebrutinib, or a pharmaceutically acceptable salt thereof, for use in the methods of treatment described herein (e.g., RA, CSU and/or SLE). In some embodiments, the pharmaceutical compositions and formulations further comprise one or more pharmaceutically acceptable carriers. WO 2017/148837, which is hereby incorporated by reference in its entirety, discloses formulations and dosage forms comprising fenebrutinib and pharmaceutically acceptable salts thereof. In some embodiments, a formulation described in WO 2017/148837 is used to deliver fenebrutinib to a patient according to one or more of the methods provided herein.

Fenebrutinib, or a pharmaceutically acceptable salt thereof can be administered by any suitable means, including oral, parenteral, intrapulmonary, and intranasal, and, if desired for local treatment, intralesional administration. In preferred embodiments, oral administration is preferred.

Pharmaceutically acceptable salts of fenebrutinib may be used in the methods herein. As used herein, the term "pharmaceutically acceptable salt" is meant to include salts of the active compounds which are prepared with relatively nontoxic acids or bases, depending on the particular substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of salts derived from pharmaceutically-acceptable inorganic bases include aluminum, ammonium, calcium, copper, ferric, ferrous, lithium, magnesium, manganic, manganous, potassium, sodium, zinc and the like. Salts derived from pharmaceutically-acceptable organic bases include salts of primary, secondary and tertiary amines, including substituted amines, cyclic amines, naturally-occurring amines and the like, such as arginine, betaine, caffeine, choline, N,N'-dibenzylethylenediamine, diethylamine, 2-diethylaminoethanol, 2-dimethylaminoethanol, ethanolamine, ethylenediamine, N-ethylmorpholine, N-ethylpiperidine, glucamine, glucosamine, histidine, hydrabamine, isopropylamine, lysine, methylglucamine, morpholine, piperazine, piperidine, polyamine resins, procaine, purines, theobromine, triethylamine, trimethylamine, tripropylamine, tromethamine and the like. When compounds of the present invention contain relatively basic functionalities, acid addition salts can be obtained by contacting the neutral form of such compounds with a sufficient amount of the desired acid, either neat or in a suitable inert solvent. Examples of pharmaceutically acceptable acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids and the like, as well as the salts derived from relatively nontoxic organic acids like acetic, propionic, isobutyric, malonic, benzoic, succinic, suberic, fumaric, mandelic, phthalic, benzenesulfonic, p-tolylsulfonic, citric, tartaric, methanesulfonic, and the like. Also included are salts of amino acids such as arginate and the like, and salts of organic acids like glucuronic or galactunoric acids and the like (see, for example, Berge, S. M., et al., "Pharmaceutical Salts", Journal of Pharmaceutical Science, 1977, 66, 1-19). Certain specific compounds of the present invention contain both basic and acidic functionalities that allow the compounds to be converted into either base or acid addition salts.

In some of the embodiments provided herein, oral doses of fenebrutinib, or a pharmaceutically acceptable salt thereof, preferably in the form of tablets or capsules, contain about 5 mg, 10 mg, 20 mg, 25 mg, 30 mg, 40, mg, 50 mg, 100 mg, 150 mg, or 200 mg of the active ingredient. In some embodiments wherein the dosage form comprising a pharmaceutically acceptable salt of fenebrutinib, the oral dosage form comprises the pharmaceutically acceptable salt form in an amount equivalent to about 5 mg, 10 mg, 20 mg, 25 mg, 30 mg, 40, mg, 50 mg, 100 mg, 150 mg, or 200 mg of the free form of fenebrutinib.

In some embodiments, daily doses of fenebrutinib, or a pharmaceutically acceptable salt thereof, include about 50-400 mg daily; about 150-400 mg daily; about 200-400 mg daily; about 250-400 mg daily; about 300-400 mg daily; about 50-300 mg daily; about 100-300 mg daily; about 150-300 mg daily; about 250-300 mg daily; about 50-200 mg daily; about 100-200 mg daily; about 150-200 mg daily; and about 200-300 mg daily. In some embodiments, the oral dose is 50 mg QD, 100 mg QD, 150 mg QD, 200 mg QD, 250 mg QD, 300 mg QD, 100 mg BID, 150 mg BID, or 200 mg BID. In some embodiments wherein a pharmaceutically acceptable salt form of fenebrutinib is administered, the daily dose is an amount equivalent to a dosage or dosage range of the free form of fenebrutinib as described herein (e.g., equivalent to about 50-400 mg daily; about 150-400 mg daily; about 200-400 mg daily; etc. of the free form of fenebrutinib).

In some embodiments, a composition and formulation herein may also contain more than one active ingredients as necessary for the particular indication being treated (e.g., RA, CSU and/or SLE), preferably those with complementary activities that do not adversely affect each other. Such active ingredients are suitably present in combination in amounts that are effective for the purpose intended. In some such embodiments, the formulation is an oral tablet or capsule containing fenebrutinib, or a pharmaceutically acceptable salt thereof, and a Janus Kinase inhibitor, preferably selected from the group consisting of tofacitinib, baricitinib, filgotinib, peficitinib, and upadacitinib. In some embodiments, the tablet or capsule contains fenebrutinib, or a pharmaceutically acceptable salt thereof, and tofacitinib.

III. Methods of Treatment

Provided herein are methods for treating RA, CSU or SLE in specific patient populations described herein by administering fenebrutinib or a pharmaceutically acceptable salt thereof. In one aspect, provided herein are methods of treating a patient having moderately to severely active RA, wherein the patient has demonstrated inadequate response to prior treatment with one or more conventional non-biologic DMARDs. In another aspect, the patient has demonstrated an inadequate response or intolerance to prior treatment with one or more biologic rheumatoid arthritis drugs. More specific aspects of these methods of treatment are described in the Summary of the Disclosure (i.e., E1, E2, etc.). It was discovered in the clinical trial results provided herein, that fenebrutinib is safe and effective in the treatment of RA in the above described patient populations.

In another aspect, provided herein are methods of treating CSU patients who remain disease symptomatic despite prior treatment with H1 anthistamines. It was discovered in the clinical trial results provided herein, that fenebrutinib is safe and effective in the treatment of CSU in this patient population. More specific aspects of these methods of treatment are described in the Summary of the Disclosure.

In another aspect, provided herein are methods of treating patients having moderate to severe active SLE, wherein the patient is disease symptomatic despite prior standard oral SLE treatment. It was discovered in the clinical trial results provided herein, that fenebrutinib is safe and effective in the treatment of SLE in this patient population. More specific aspects of these methods of treatment are described in the Summary of the Disclosure.

Also provided herein are methods of treating RA, CSU or SLE in the specific patient populations described herein by administering fenebrutinib or a pharmaceutically acceptable salt thereof, wherein the patient is monitored after treatment for elevated liver enzymes associated with hepatotoxicity. It was discovered that, at certain doses of fenebrutinib, some patients experience elevated liver enzymes associated with hepatotoxicity and therefore it would be desirable to monitor for such occurrences during treatment, and in some cases halt treatment for some time or reduce the dose of fenebrutinib should it be warranted. In some embodiments, if the patient shows signs of elevated liver enzymes associated with hepatotoxicity, the administration of fenebrutinib is discontinued, halted for a period of time and restarted, or continued at a lower dose. More specific aspects of these methods of treatment are described in the Summary of the Disclosure.

Fenebrutinib, or a pharmaceutically acceptable salt thereof, can be used either alone or in combination with other agents in a method of treatment described herein. For instance, the additional therapeutic may be an anti-inflammatory agent, an immunomodulatory agent, chemotherapeutic agent, an apoptosis-enhancer, a neurotropic factor, an agent for treating cardiovascular disease, an agent for treating liver disease, an anti-viral agent, an agent for treating blood disorders, an agent for treating diabetes, and an agent for treating immunodeficiency disorders. The second therapeutic agent may be an NSAID anti-inflammatory agent. The second compound of the pharmaceutical combination formulation or dosing regimen preferably has complementary activities to fenebrutinib or a pharmaceutically acceptable salt thereof such that they do not adversely affect each other. More specific aspects of these methods of treatment using combinations of therapy are described in the Summary of the Disclosure.

In some embodiments, the additional therapeutic is selected from the group consisting of: corticosteroids (e.g., prednisone, prednisolone, methylprednisolone, and hydrocortisone); disease-modifying antihrheumatic drugs ("DMARDs", e.g., immunosuppressive or anti-inflammatory agents); anti-malarial agents (e.g. hydroxychloroquine and chloroquine); immunosuppressive agents (e.g., cyclophosphamide, azathioprine, mycophenolate mofetil, methotrexate); anti-inflammatory agents (e.g., aspirin, NSAIDs (e.g., ibuprofen, naproxen, indomethacin, nabumetone, celecoxib)); anti-hypertensive agents (e.g., calcium channel blockers (e.g., amlodipine, nifedipine) and diuretics (e.g., furosemide)); statins (e.g., atorvastatin, fluvastatin, lovastatin, pitavastatin, pravastatin, rosuvastatin and simvastatin); anti-B-cell agents (e.g., anti-CD20 (e.g., rituximab), anti-CD22); anti-B-lymphocyte stimulator agents ("anti-BLyS", e.g., belimumab, blisibimod); type-1 interferon receptor antagonist (e.g., anifrolumab); T-cell modulators (e.g., rigerimod); abatacept; anticoagulants (e.g., heparin, warfarin); and vitamin D supplements.

In other aspects, the patient to be treated in the methods provided herein has a disease that expresses (has been shown to express e.g., in a diagnostic test) one or more biomarkers. In some embodiments, the patient's disease expresses lower level of the biomarker. In some embodiments, the patient's disease expresses higher level of the biomarker. Specific biomarkers are described both in the Summary of the Disclosure and in the Examples below. In some embodiments of any of the methods, assays and/or kits provided herein, the one or more biomarkers is present in the sample when it comprises more than 0% of the sample. In some embodiments, the biomarker is present in at least 1% of the sample. In some embodiments, the biomarker is present in at least 5% of the sample. In some embodiments, the biomarker is present in at least 10% of the sample. In certain embodiments, for example in certain embodiments wherein the disorder is SLE, the one or more biomarkers are selected from the group consisting of IgJ, MZB1, and TXNDC5. In other embodiments, for example in certain embodiments wherein the disorder is SLE, the one or more biomarkers are selected from the group consisting of CCL3, CCL4, CCL20, CXCL13, and autoantibodies. In still further embodiments, for example in certain embodiments wherein the disorder is CSU, the one or more biomarkers are selected from the group consisting of IgE antibodies that bind to TPO, IgE antibodies that bind to IL24, IgG antibodies that bind to IgE, and IgG antibodies that bind to FcERI. In yet further embodiments wherein the disorder is CSU, the one or more biomarkers includes IgG antibodies that bind to FcERI (e.g., includes at least IgG antibodies that bind to FcERI but may further comprise one or more other biomarkers, or no other biomarkers). In yet further embodiments, for example in certain embodiments wherein the disorder is CSU, the one or more biomarkers are one or more autoantibodies evaluated using the CU index method. In some embodiments, a CU index value greater than or equal to 10 indicates an elevated level of one or more biomarkers (e.g., autoantibodies). In certain embodiments, an elevated level of one or more of these biomarkers (such as one or more biomarkers in a patient with SLE, or one or more biomarkers in a patient with CSU) indicates the patient is more likely to benefit from treatment with fenebrutinib, or a pharmaceutically acceptable salt thereof, than a subject that does not have an elevated level, for example a subject that has the same disorder but without elevated biomarker levels, or a healthy subject without the disorder, or a subject whose levels are approximately at baseline levels as determined by one of skill in the art (such as an average of a population or subset thereof). In some embodiments, a patient that is "more likely to benefit" includes having a better response (e.g., greater reduction in one or more symptoms, or more symptoms are reduced) to treatment with fenebrutinib or a pharmaceutically acceptable salt thereof compared to a subject with the same disorder, administered the same dose of fenebrutinib or a pharmaceutically acceptable salt thereof, but without elevated levels of one or more biomarkers.

In some embodiments of the methods provided herein, the patient has CSU, and tests positive on the CU Index. In certain embodiments, such a CU Index positive patient is more likely to benefit (e.g., has a better response) from treatment with fenebrutinib or a pharmaceutically acceptable salt thereof compared to a patient with CSU who tests negative on the CU Index. In certain embodiments, a CU Index positive CSU patient is likely to have a greater reduction of one or more symptoms or measures of symptoms when treated with fenebrutinib or pharmaceutically acceptable salt thereof, compared to a CU index negative CSU patient. In still further embodiments, a CU Index positive CSU patient is likely to show response to treatment with fenebrutinib or a pharmaceutically acceptable salt thereof (e.g., through reduction of one or more symptoms or measures of symptoms) at a lower dose of fenebrutinib or a pharmaceutically acceptable salt thereof, compared to a CU Index negative patient. Thus, in some embodiments, provided herein is a method of reducing the level of fenebrutinib or pharmaceutically acceptable salt thereof administered to a patient in need thereof, wherein the patient has CSU, comprising determining if the patient is a CU Index positive patient, and administering to said CU Index positive patient a lower dose of fenebrutinib or pharmaceutically acceptable salt thereof compared to a CU Index negative patient. In certain embodiments, the greater response, or greater reduction of one or more symptoms or measures of symptoms, is reduction of UAS7, or reduction of weekly itch score, or both. In certain embodiments, a CU Index positive patient has a greater reduction of UAS7, or greater reduction of weekly itch score, or both, compared to a CU Index negative patient administered the same dose of fenebrutinib or a pharmaceutically acceptable salt thereof. In still further embodiments, a CU Index positive patient has about the same reduction of UAS7, or about the same reduction of weekly itch score, or both, compared to a CU Index negative patient administered a higher dose of fenebrutinib or a pharmaceutically acceptable salt thereof. In certain embodiments, the UAS7 score, or weekly itch score, or both, are evaluated over 4 weeks, or over 8 weeks, or over 12 weeks.

In some embodiments of the methods provided herein, the patient has CSU, and tests positive for IgG antibodies that bind to FcERI (e.g., IgG anti-FcERI autoantibodies). In certain embodiments, a patient who tests positive for IgG antibodies that bind to FcERI is more likely to benefit (e.g., has a better response) from treatment with fenebrutinib or a pharmaceutically acceptable salt thereof compared to a patient with CSU who tests negative for IgG antibodies that bind to FcERI. In certain embodiments, a patient who tests positive for IgG antibodies that bind to FcERI is likely to have a greater reduction of one or more symptoms or measures of symptoms when treated with fenebrutinib or pharmaceutically acceptable salt thereof, compared to a CSU patient who tests negative for said antibodies. In still further embodiments, a CSU patient who tests positive for IgG antibodies that bind to FcERI is likely to show response to treatment with fenebrutinib or a pharmaceutically acceptable salt thereof (e.g., through reduction of one or more symptoms or measures of symptoms) at a lower dose of fenebrutinib or a pharmaceutically acceptable salt thereof, compared to a CSU patient that tests negative for said antibodies. Thus, in some embodiments, provided herein is a method of reducing the level of fenebrutinib or pharmaceutically acceptable salt thereof administered to a patient in need thereof, wherein the patient has CSU, comprising determining if the patient tests positive for IgG antibodies that bind to FcERI, and administering to said antibody-positive patient a lower dose of fenebrutinib or pharmaceutically acceptable salt thereof compared to a patient who test negative for IgG antibodies that bind to FcERI. In certain embodiments, the greater response, or greater reduction of one or more symptoms or measures of symptoms, is reduction of UAS7, or reduction of weekly itch score, or both. In certain embodiments, a patient who tests positive for IgG antibodies that bind to FcERI has a greater reduction of UAS7, or greater reduction of weekly itch score, or both, compared to a patient who tests negative for said antibodies administered the same dose of fenebrutinib or a pharmaceutically acceptable salt thereof. In still further embodiments, a patient has that tests positive for IgG antibodies that bind to FcERI has about the same reduction of UAS7, or about the same reduction of weekly itch score, or both, compared to a patient that tests negative for said antibodies and is administered a higher dose of fenebrutinib or a pharmaceutically acceptable salt thereof. In certain embodiments, the UAS7 score, or weekly itch score, or both, are evaluated over 4 weeks, or over 8 weeks, or over 12 weeks.

In some embodiments, wherein a patient with a disorder has one or more elevated biomarker levels (e.g., elevated levels of one or more antibodies, such as IgG antibodies that bind to FcERI; or tests positive on the CU Index), the levels are elevated relative to a healthy subject without the disorder. In other embodiments, the levels are elevated relative to a baseline, such as a baseline determined by evaluation of a population or subpopulation, or a baseline provided by the manufacturer of a biomarker test, or the lower limit of quantitation. In some embodiments, the baseline is the average of a group of patients with the disorder, or the average of a group of healthy subjects. In some embodiments, the baseline is the average plus one standard deviation, average plus two standard deviations, or average plus three standard deviations, of a group of patients with the disorder, or a group of healthy subjects.

In some embodiments of any of the methods, assays and/or kits, the biomarker is detected in the sample using a method selected from the group consisting of FACS, Western blot, ELISA, immunoprecipitation, immunohistochemistry, immunofluorescence, radioimmunoassay, dot blotting, immunodetection methods, HPLC, surface plasmon resonance, optical spectroscopy, mass spectrometery, HPLC, qPCR, RT-qPCR, multiplex qPCR or RT-qPCR, RNA-seq, microarray analysis, SAGE, MassARRAY technique, and FISH, and combinations thereof.

In some embodiments of any of the methods, assays and/or kits, the biomarker is detected in the sample by protein expression. In some embodiments, protein expression is determined by immunohistochemistry (IHC). In some embodiments, biomarker is detected using an antibody. In some embodiments, the biomarker is detected as a weak staining intensity by IHC. In some embodiments, the biomarker is detected as a moderate staining intensity by IHC. In some embodiments, the biomarker is detected as a strong staining intensity by IHC. In some embodiments, the staining is membrane staining, cytoplasmic staining or combinations thereof.

IV. Biomarkers, Methods of Detection and Diagnosis

Also provided herein are methods of detecting and diagnosing one or more of the diseases described herein (i.e., RA, CSU or SLE) in a patient treated with, or to be treated with, fenebrutinib. In some embodiments, the method comprises obtaining a sample from a patient treated with, or to be treated with, fenebrutinib. Additional embodiments of biomarkers, methods of detection and diagnosis are provided in the Summary of the Disclosure above.

The SLE biomarkers IgJ, MZB1 and TXNDC5 and their relationship to BTK inhibition and fenebrutinib in particular are described in WO 2018/175863, the entire contents of which are hereby incorporated by reference.

In some embodiments, the sample obtained from a patient to be treated, or currently being treated, is whole blood. In some embodiments, the whole blood comprises immune cells, circulating cells and any combinations thereof. In some embodiments, the sample is taken from the plasma of the patient.

Presence and/or expression levels/amount of a biomarker can be determined qualitatively and/or quantitatively based on any suitable criterion known in the art, including but not limited to DNA, RNA, cDNA, proteins, protein fragments and/or gene copy number. In certain embodiments, presence and/or expression levels/amount of a biomarker in a first sample is increased or elevated as compared to presence/absence and/or expression levels/amount in a second sample. In certain embodiments, presence/absence and/or expression levels/amount of a biomarker in a first sample is decreased or reduced as compared to presence and/or expression levels/amount in a second sample. In certain embodiments, the second sample is a reference sample, reference cell, reference tissue, control sample, control cell, or control tissue. Additional disclosures for determining presence/absence and/or expression levels/amount of a gene are described herein.

In some embodiments of any of the methods, elevated expression refers to an overall increase of about any of 10%, 20%, 30%, 40%, 50%, 60%, 70%, 80%, 90%, 95%, 96%, 97%, 98%, 99% or greater, in the level of biomarker (e.g., protein or nucleic acid (e.g., gene or mRNA)), detected by standard art known methods such as those described herein, as compared to a reference sample, reference cell, reference tissue, control sample, control cell, or control tissue. In certain embodiments, the elevated expression refers to the increase in expression level/amount of a biomarker in the sample wherein the increase is at least about any of 1.5×, 1.75×, 2×, 3×, 4×, 5×, 6×, 7×, 8×, 9×, 10×, 25×, 50×, 75×, or 100× the expression level/amount of the respective biomarker in a reference sample, reference cell, reference tissue, control sample, control cell, or control tissue. In some embodiments, elevated expression refers to an overall increase of greater than about 1.5 fold, about 1.75 fold, about 2 fold, about 2.25 fold, about 2.5 fold, about 2.75 fold, about 3.0 fold, or about 3.25 fold as compared to a reference sample, reference cell, reference tissue, control sample, control cell, control tissue, or internal control (e.g., housekeeping gene).

In some embodiments of any of the methods, reduced expression refers to an overall reduction of about any of 10%, 20%, 30%, 40%, 50%, 60%, 70%, 80%, 90%, 95%, 96%, 97%, 98%, 99% or greater, in the level of biomarker (e.g., protein or nucleic acid (e.g., gene or mRNA)), detected by standard art known methods such as those described herein, as compared to a reference sample, reference cell, reference tissue, control sample, control cell, or control tissue. In certain embodiments, reduced expression refers to the decrease in expression level/amount of a biomarker in the sample wherein the decrease is at least about any of 0.9×, 0.8×, 0.7×, 0.6×, 0.5×, 0.4×, 0.3×, 0.2×, 0.1×, 0.05×, or 0.01× the expression level/amount of the respective biomarker in a reference sample, reference cell, reference tissue, control sample, control cell, or control tissue.

In some embodiments, the reference sample, reference cell, reference tissue, control sample, control cell, or control tissue is from one or more subjects that do not have the disorder or disease being treated in the patient. In other embodiments, the reference sample, reference cell, reference tissue, control sample, control cell, or control tissue was taken from the patient before beginning treatment. For example, in some embodiments of the methods provided herein, treatment of the patient results in reduced expression of one or more biomarkers compared to the level of the one or more biomarkers in the same patient before treatment. In other embodiments of the methods provided herein, the patient has a disorder or disease (such as a disorder or disease as described herein) and the patient has elevated expression of one or more biomarkers, compared to a subject who does not have the disorder or disease. In certain embodiments, the patient has a disorder or disease (such as a disorder or disease as described herein) and the patient has elevated expression of one or more biomarkers, compared to another subject who also has the disorder or disease.

Presence and/or expression level/amount of various biomarkers in a sample can be analyzed by a number of methodologies, many of which are known in the art and understood by the skilled artisan, including, but not limited to, immunohistochemistry ("IHC"), Western blot analysis, immunoprecipitation, molecular binding assays, ELISA, ELIFA, fluorescence activated cell sorting ("FACS"), MassARRAY, proteomics, quantitative blood based assays (as for example Serum ELISA), biochemical enzymatic activity assays, in situ hybridization, Southern analysis, Northern analysis, whole genome sequencing, polymerase chain reaction ("PCR") including quantitative real time PCR ("qRT-PCR") and other amplification type detection methods, such as, for example, branched DNA, SISBA, TMA and the like), RNA-Seq, FISH, microarray analysis, gene expression profiling, and/or serial analysis of gene expression ("SAGE"), as well as any one of the wide variety of assays that can be performed by protein, gene, and/or tissue array analysis. Typical protocols for evaluating the status of genes and gene products are found, for example in Ausubel et al., eds., 1995, Current Protocols in Molecular Biology, Units 2 (Northern Blotting), 4 (Southern Blotting), 15 (Immunoblotting) and 18 (PCR Analysis). Multiplexed immunoassays such as those available from Rules Based Medicine or Meso Scale Discovery ("MSD") may also be used.

In some embodiments, presence and/or expression level/amount of a biomarker is determined using a method comprising: (a) performing gene expression profiling, PCR (such as rtPCR or qRT-PCR), RNA-seq, microarray analysis, SAGE, MassARRAY technique, or FISH on a sample; and b) determining presence and/or expression level/amount of a biomarker in the sample. In some embodiments, the microarray method comprises the use of a microarray chip having one or more nucleic acid molecules that can hybridize under stringent conditions to a nucleic acid molecule encoding a gene mentioned above or having one or more polypeptides (such as peptides or antibodies) that can bind to one or more of the proteins encoded by the genes mentioned above. In one embodiment, the PCR method is qRT-PCR. In one embodiment, the PCR method is multiplex-PCR. In some embodiments, gene expression is measured by microarray. In some embodiments, gene expression is measured by qRT-PCR. In some embodiments, expression is measured by multiplex-PCR.

Methods for the evaluation of mRNAs in cells are well known and include, for example, hybridization assays using complementary DNA probes (such as in situ hybridization using labeled riboprobes specific for the one or more genes, Northern blot and related techniques) and various nucleic acid amplification assays (such as RT-PCR using complementary primers specific for one or more of the genes, and other amplification type detection methods, such as, for example, branched DNA, SISBA, TMA and the like).

Samples from mammals can be conveniently assayed for mRNAs using Northern, dot blot or PCR analysis. In addition, such methods can include one or more steps that allow one to determine the levels of target mRNA in a biological sample (e.g., by simultaneously examining the levels a comparative control mRNA sequence of a "housekeeping" gene such as an actin family member). Optionally, the sequence of the amplified target cDNA can be determined.

Optional methods include protocols which examine or detect mRNAs, such as target mRNAs, in a tissue or cell sample by microarray technologies. Using nucleic acid microarrays, test and control mRNA samples from test and control tissue samples are reverse transcribed and labeled to generate cDNA probes. The probes are then hybridized to an array of nucleic acids immobilized on a solid support. The array is configured such that the sequence and position of each member of the array is known. For example, a selection of genes whose expression correlates with increased or reduced clinical benefit of anti-angiogenic therapy may be arrayed on a solid support. Hybridization of a labeled probe with a particular array member indicates that the sample from which the probe was derived expresses that gene.

According to some embodiments, presence and/or expression level/amount is measured by observing protein expression levels of an aforementioned gene. In certain embodiments, the method comprises contacting the biological sample with antibodies to a biomarker described herein under conditions permissive for binding of the biomarker, and detecting whether a complex is formed between the antibodies and biomarker. Such method may be an in vitro or in vivo method.

Presence and/or expression level/amount of a selected biomarker in a tissue or cell sample may also be examined by way of functional or activity-based assays. For instance, if the biomarker is an enzyme, one may conduct assays known in the art to determine or detect the presence of the given enzymatic activity in the tissue or cell sample.

In certain embodiments, the samples are normalized for both differences in the amount of the biomarker assayed and variability in the quality of the samples used, and variability between assay runs. Such normalization may be accomplished by detecting and incorporating the expression of certain normalizing biomarkers, including well known housekeeping genes. Alternatively, normalization can be based on the mean or median signal of all of the assayed genes or a large subset thereof (global normalization approach). On a gene-by-gene basis, measured normalized amount of a subject mRNA or protein is compared to the amount found in a reference set. Normalized expression levels for each mRNA or protein per tested sample per subject can be expressed as a percentage of the expression level measured in the reference set. The presence and/or expression level/amount measured in a particular subject sample to be analyzed will fall at some percentile within this range, which can be determined by methods well known in the art.

In one embodiment, the sample is a clinical sample. In another embodiment, the sample is used in a diagnostic assay. In some embodiments, the sample is obtained from the tissue, urine, sputum, serum or plasma of a patient. The same techniques discussed above for detection of target genes or gene products in cancerous samples can be applied to other body samples. By screening such body samples, a simple early diagnosis can be achieved for these cancers. In addition, the progress of therapy can be monitored more easily by testing such body samples for target genes or gene products. In certain embodiments, a reference sample, reference cell, reference tissue, control sample, control cell, or control tissue is a single sample or combined multiple samples from the same subject or individual that are obtained at one or more different time points than when the test sample is obtained. For example, a reference sample, reference cell, reference tissue, control sample, control cell, or control tissue is obtained at an earlier time point from the same subject or individual than when the test sample is obtained. In certain embodiments, the reference sample, control cell, or control tissue is a combined multiple samples from one or more healthy individuals who are not the subject or individual. In certain embodiments, a reference sample, reference cell, reference tissue, control sample, control cell, or control tissue is a combined multiple samples from one or more individuals with a disease or disorder who are not the subject or individual. In certain embodiments, a reference sample, reference cell, reference tissue, control sample, control cell, or control tissue is pooled RNA samples from normal tissues or pooled plasma or serum samples from one or more individuals who are not the subject or individual.

Certain aspects of the present disclosure relate to measurement of the expression level of one or more genes or one or more proteins in a sample. In some embodiments, a sample may include leukocytes. In some embodiments, the sample may be a peripheral blood sample. A peripheral blood sample may include white blood cells, PBMCs, and the like. Any technique known in the art for isolating leukocytes from a peripheral blood sample may be used. For example, a blood sample may be drawn, red blood cells may be lysed, and a white blood cell pellet may be isolated and used for the sample. In another example, density gradient separation may be used to separate leukocytes (e.g., PBMCs) from red blood cells. In some embodiments, a fresh peripheral blood sample (i.e., one that has not been prepared by the methods described above) may be used. In some embodiments, a peripheral blood sample may be prepared by incubation in a solution to preserve mRNA and/or protein integrity.

V. Articles of Manufacture or Kits

In another embodiment of the invention, an article of manufacture or a kit is provided comprising fenebrutinib, or a pharmaceutically acceptable salt thereof, and a second therapeutic agent. In some embodiments, the article of manufacture or kit further comprises package insert comprising instructions for using fenebrutinib, or a pharmaceutically acceptable salt thereof, in conjunction with the second therapeutic agent to treat a disease provided herein (e.g., RA, CSU and/or SLE).

In some embodiments, fenebrutinib, or a pharmaceutically acceptable salt thereof, and a second therapeutic agent are in the same capsule or tablet, or in separate capsules or tablets with a kit. Suitable containers for kits include, for example, bottles or boxes. In some embodiments, the container holds the formulation and the label on, or associated with, the container may indicate directions for use. The article of manufacture or kit may further include other materials desirable from a commercial and user standpoint, including package inserts with instructions for use.

The specification is considered to be sufficient to enable one skilled in the art to practice the invention. Various modifications of the invention in addition to those shown and described herein will become apparent to those skilled in the art from the foregoing description and fall within the scope of the appended claims. All publications, patents, and patent applications cited herein are hereby incorporated by reference in their entirety for all purposes.

EXAMPLES

The present disclosure will be more fully understood by reference to the following examples. They should not, however, be construed as limiting the scope of the invention. It is understood that the examples and embodiments described herein are for illustrative purposes only and that various modifications or changes in light thereof will be suggested to persons skilled in the art and are to be included within the spirit and purview of this application and scope of the appended claims.

Example 1

A Two-Cohort Randomized Phase II, Double-Blind, Parallel Group Study in Patients with Active Rheumatoid Arthritis Evaluating the Efficacy and Safety of Fenebrutinib Compared with Placebo and Adalimumab in Patients with an Inadequate Response to Previous Methotrexate Therapy (Cohort 1) and Compared with Placebo in Patients with an Inadequate Response or Intolerance to Previous TNF Therapy (Cohort 2)

This study was designed to evaluate the efficacy and safety of fenebrutinib compared with placebo (Cohorts 1 and 2) and compared with adalimumab (ADA) (Cohort 1), each in combination with methotrexate (MTX), in patients with moderate to severe active rheumatoid arthritis (RA). Specific objectives and corresponding endpoints for the study are outlined below.

Study Objectives

The primary efficacy objective of Cohort 1 of this study was to evaluate the efficacy of fenebrutinib at three dose levels compared with placebo used in combination with stable doses of MTX in patients with active RA who have had an inadequate response to MTX and are naive to TNF therapy.

The primary efficacy objective of Cohort 2 of this study was to evaluate the efficacy of fenebrutinib compared with placebo used in combination with stable doses of MTX in patients with active RA who have had an inadequate response or intolerance to 1 or 2 TNF inhibitors and may have been previously exposed to no more than one non-TNF biologic.

The secondary efficacy objectives of this study were the following:

To evaluate the efficacy of fenebrutinib compared with ADA used in combination with stable doses of MTX in patients with active RA who have had an inadequate response to MTX and who are naive to TNF therapy.

To evaluate the efficacy of fenebrutinib over time with multiple standardized assessments (ACR20, ACR50, ACR70, DAS28, DAS28-3-CRP, etc.) and on the basis of the individual components of the ACR (tender/painful joint count, swollen joint count, patent's assessment of arthritis pain, patient's Global assessment of arthritis, physician's global assessment of arthritis, CRP, HAQ-DI).

To assess the efficacy of fenebrutinib over time (ACR50 response rates at Days 7, 14, 28 and 56).

To assess DAS28 remission (<2.6) and LDA (<3.2) state at Days 7, 14, 28, 56 and 84.

To assess ACR/EULAR remission according to the Boolean-based definition (tender joint count≤1, swollen joint count≤1, CRP≤1, and patient global assessment≤1) at Days 7, 14, 28, 56 and 84.

To assess SDAI-based remission (defined as ≤3.3 for ACR/EULAR remission) and CDAI-based remission (defined as ≤2.8) at Days 7, 14, 28, 56 and 84.

To evaluate the effect of fenebrutinib compared with placebo on health-related quality of life (SF-36, standard, Version 2, questionnaire at Day 84).

To evaluate the effect of fenebrutinib compared with placebo on fatigue (FACIT-Fatigue measure at Day 84).

The safety objective for this study was to evaluate the safety of fenebrutinib given in combination with MTX in patients with moderate to severe RA.

The pharmacokinetic objective for this study is to characterize the pharmacokinetics of fenebrutinib in patients using a population PK approach. Exploratory PK objectives included the relationship between measures of drug exposure and pharmacodynamic effect(s), efficacy, and safety of fenebrutinib; the impact of selected covariates on measures of fenebrutinib exposure and/or response; and the impact of genetic polymorphisms on measures of fenebrutinib exposure. The exploratory biomarker objectives for this study were the following:

To evaluate the effect of fenebrutinib on biomarkers to aid in defining the MOA.

To evaluate the relationship between changes in biomarkers and efficacy.

To evaluate if biomarkers, measured at baseline, identify a subset of patients with enhanced clinical benefit to fenebrutinib.

Study Design

The study was a multicenter, Phase II, randomized, double-blind, placebo-controlled, active comparator (Cohort 1 only), parallel-group, dose-ranging study to evaluate the efficacy and safety of fenebrutinib in patients with moderate to severe active RA and an inadequate response to previous MTX therapy (Cohort 1) or MTX and TNF therapy who may have also had exposure to no more than one non-TNF inhibitor biologic (Cohort 2). Moderate to severe active RA was defined by ≥6 tender/painful joints on motion (68 joint count) and ≥6 swollen joints (66 joint count) at both screening and Day 1 (randomization), as well as a high sensitivity C-reactive protein (hsCRP)≥0. 400 mg/dL for Cohort 1 a hsCRP≥0.650 mg/dL for Cohort 2 at screening.

The study enrolled 578 patients. In Cohort 1, 480 MTX-IR patients were randomized to placebo (110 patients), ADA (111 patients), or one of three doses of fenebrutinib: 50 mg QD (40 patients), 150 mg QD (109 patients), or 200 mg BID (110 patients). In Cohort 2, 98 TNF-IR patients were randomized to placebo or 200 mg BID fenebrutinib. After a screening period of up to 28 days, patients in both cohorts received blinded study drug (oral fenebrutinib or matching placebo) for 12 weeks, after which they had the option to enter an 8 week follow-up period or enroll into an open-label extension (OLE) study. In addition to study drug, patients in Cohort 1 were also treated with subcutaneous (SC) comparatory drug (ADA or placebo).

Cohort 1 treatment regimens. Patients in Cohort 1 will be randomly assigned in a 1:1:1:1:1 fashion to 1 of 5 parallel treatment arms; once enrollment in Arm A has completed, patients will be randomized 1:1:1:1 across the 4 remaining treatment arms:

Arm A: 50 mg QD fenebrutinib (BID tablets)+placebo injections SC every 2 weeks (Q2W) (n=40)

Arm B: 150 mg QD fenebrutinib (BID tablets)+placebo injections SC Q2W (n=109)

Arm C: 200 mg BID fenebrutinib (BID tablets)+placebo injections SC Q2W (n=110)

Arm D: placebo (BID tablets)+placebo injections SC Q2W (n=110)

Arm E: placebo (BID tablets)+40 mg ADA injections SC Q2W (n=111)

Cohort 2 treatment regimens. Patients in Cohort 2 will be randomly assigned in a 1:1 fashion to 1 of 2 parallel treatment arms:

Arm A: 200 mg QD fenebrutinib (BID tablets, n=49)

Arm B: placebo (BID tablet, n=49)

Patients must enter and remain on stable MTX treatment and a stable dose of folic acid while in the study. For patients receiving chronic non-steroidal anti-inflammatory drug (NSAIDs) and/or corticosteroids, the continued use of stable (for at least 2 weeks prior to randomization) oral NSAIDs and/or stable (for at least 6 weeks prior to randomization) oral corticosteroid (≤10 mg/day prednisone equivalent) doses is allowed and should be continued unchanged throughout the study, unless an adjustment is necessary for safety reasons. Patients receiving proton pump inhibitors (PPIs) or H2 receptor antagonists (H2RAs) should be stabilized on a regimen beginning at least 2 weeks prior to randomization and continuing throughout the study.

Inclusion Criteria

All patients must meet the following criteria for study entry:

Age 18 to 75 years at screening.

Able and willing to provide written informed consent and to comply with the requirements of the protocol.

Have a diagnosis of adult-onset RA as defined by the 2010 ACR/European League Against Rheumatism Classification Criteria for RA.

RA disease activity by joint counts and laboratory markers of inflammation: ≥6 tender/painful joints on motion (68 joint count) and ≥6 swollen joints (66 joint count) at BOTH screening and Day 1 (randomization).

At screening, must have hsCRP as follows: Cohort 1: ≥0.400 mg/dL (may be repeated once) Cohort 2: ≥0.650 mg/dL (may be repeated once).

Positive for anti-cyclic citrullinated protein/peptide antibody (anti-CCP or ACPA), rheumatoid factor, or both (if based on historical data, need documentation of prior positive laboratory value in the electronic Case Report Form).

Have received MTX for at least 12 weeks immediately prior to randomization, of which the last 8 weeks prior to randomization must have been at a stable dose of between 7.5 and 25 mg/week (oral or parenteral). For patients entering the trial on MTX doses <15 mg/week, there must be clear documentation in the medical record that higher doses were not tolerated or that the dose of MTX is the highest acceptable dose based on local clinical practice guidelines.

Willing to withdraw all non-biologic disease-modifying anti-rheumatic drugs (DMARDs), other than MTX and leflunomide, at least 4 weeks prior to randomization. Patients previously on leflunomide must have either discontinued ≥8 weeks prior to randomization or discontinued with the following elimination procedure at least 28 days prior randomization: Cholestyramine or activated charcoal should be taken at standard doses for a minimum of 6 days but ideally for the standard 11 days (Arava® U.S. Package Insert; Arava® Summary of Product Characteristics).

Willing to receive treatment at an adequate and stable dose of folic acid (not less than 5 mg total dose weekly) during study.

Only for patients currently receiving oral corticosteroids: Treatment must be at a stable dose of ≤10 mg/d prednisone (or equivalent) during the 6 weeks prior to randomization and with a plan to remain at a stable dose for the duration of the study.

Only for patients currently receiving NSAIDs on a regular basis (e.g., not as needed): Treatment must be at a stable dose during the 2 weeks prior to randomization and with a plan to remain at a stable dose for the duration of the study.

Only for patients currently receiving PPIs or H2RAs: Treatment must be at a stable dose during the 2 weeks prior to randomization and with a plan to remain at a stable dose for the duration of the study.

No evidence of active or latent or inadequately treated infection with *Mycobacterium tuberculosis* (TB).

For women of childbearing potential (including those who have had a tubal ligation): Agreement to remain abstinent (refrain from heterosexual intercourse) or use contraceptive methods that result in a failure rate of <1% per year during the treatment period and for at least 60 days after the last dose of study drug or longer if required per the local prescribing label for ADA.

For men: agreement to remain abstinent (refrain from heterosexual intercourse) or use contraceptive measures and agreement to refrain from donating sperm.

To be enrolled in Cohort 2, patients must also meet the following criteria:

Experienced an inadequate response or intolerance to previous treatment with at least one and no more than 2 biologic TNFα inhibitors (e.g., infliximab, etanercept, adalimumab, golimumab, or certolizumab, or biosimilar equivalent) and in the opinion of the investigator either of the following (which must be documented in the eCRF):

Experienced insufficient efficacy or loss of efficacy at a dose and duration that, in accordance with local clinical practice, is considered acceptable to adequately assess clinical response Experienced intolerance of such treatment May have also been exposed to no more than one non-TNFα inhibitor biologic (e.g., abatacept, tocilizumab, sarilumab, sirukumab, anakinra, or any biologics or or biosimilar equivalents with the same mode of action to the listed agents, including investigational biosimilar agents)

Exclusion Criteria

Patients who met the following criteria were excluded from the study:

History of or current inflammatory joint disease other than RA, or other systemic autoimmune disorder Systemic involvement secondary to RA leading to clinically significant organ dysfunction or increased risk for participation in the study, according to the investigator.

Functional Class IV, according to the ACR 1991 Revised Criteria for Global Functional Status in Rheumatoid Arthritis Major surgery, including bone/joint surgery (e.g., joint fusion) within 8 weeks prior to screening or joint surgery planned within 12 weeks following randomization Previous treatment with fenebrutinib or other BTK inhibitors History of treatment with cell-depleting therapy including B cell-depleting therapy (e.g., anti-CD20-directed therapy such as rituximab)

History of treatment with any non-TNF inhibitor biologic DMARD (e.g., anti-CD20-directed therapy, anti-IL6-directed therapy, or T cell-directed therapy including biosimilar equivalents Any condition or medication that precludes the use of or is contraindicated with MTX or folic acid, according to the local prescribing label or the investigator History of treatment with tofacitinib or other Janus kinase (JAK) inhibitor(s)·

Prior to randomization, must have discontinued all biologic therapies as follows: Etanercept and etanercept biosimilar agents for ≥2 weeks All other biologic agents (including biosimilars and investigational biosimilars to approved agents) for ≥28 days Previous exposure to any investigational agent (not including investigational biosimilars to approved therapies) within 12 weeks or 5 half-lives of the investigational agent, whichever is longer, prior to randomization Previous treatment within 6 months of randomization with IV gamma globulin or the Prosorba Column History of treatment with alkylating agents such as cyclophosphamide or chlorambucil or with total lymphoid irradiation Require any prohibited concomitant medications (Abatacept·Adalimumab (ADA) (prohibited for Cohort 2). Anakinra·Anti-TNF inhibitors (e.g., infliximab, etanercept, golimumab, certolizumab, or biosimilar equivalents)·Azathioprine·Chlorambucil·Chloroquine. Cyclophosphamide·Cyclosporine·Gold·Hydroxychloroquine·Immunosorbent column·IV, intramuscular, or intra-articular steroids·Leflunomide·Mycophenolate mofetil·Mycophenolic acid sodium·Oral anticoagulants, including but not limited to warfarin, dabigatran, rivaroxaban, apixaban·Anti-platelet agents, such as clopidogrel (Note: NSAIDs and low-dose aspirin are acceptable.)·Heparin, low molecular weight heparin (LMWH)·Penicillamine·Rituximab (or biosimilar equivalent)·Sirolimus Sulfasalazine·Tacrolimus·Tocilizumab and other anti-IL6R or anti-IL6 agents·Tofacitinib and other JAK inhibitors·All biosimilar agents)

Current treatment with corticosteroids at doses >10 mg/d of prednisone (or equivalent) or intra-articular or parenteral corticosteroids within 4 weeks prior to and during screening History of live attenuated vaccine within 6 weeks prior to randomization or requirement to receive these vaccinations at any time during study drug treatment Seasonal influenza and H1N1 vaccinations are permitted if the inactivated vaccine formulations are administered.

Evidence of serious uncontrolled concomitant cardiac, neurologic, pulmonary (including obstructive pulmonary disease), renal, hepatic, endocrine (including uncontrolled diabetes mellitus), metabolic, or GI disease that, in the investigator's opinion, would preclude patient participation Patients meeting the New York Heart Association Class III and Class IV criteria for congestive heart failure: Class III: Patients with marked limitation of activity; they are comfortable only at rest Class IV: Patients who should be at complete rest, confined to bed or chair; any physical activity brings on discomfort and symptoms occur at rest Screening 12-lead ECG that demonstrates clinically relevant abnormalities that may affect patient safety or interpretation of study results, including QT interval corrected using Fridericia's formula (QTcF)>440 ms demonstrated by at least two ECGs>30 minutes apart History of ventricular dysrhythmias or risk factors for ventricular dysrhythmias such as long QT syndrome and other genetic risk factors (e.g., Brugada syndrome), structural heart disease (e.g., severe left ventricular systolic dysfunction, severe left ventricular hypertrophy), coronary heart disease (CHD; symptomatic, or with ischemia demonstrated by diagnostic testing, prior coronary artery bypass grafting, or coronary lesions >70% diameter stenosis that have not been or cannot be re-vascularized), clinically significant electrolyte abnormalities (e.g., hypokalemia, hypomagnesemia, hypocalcemia), or family history of sudden unexplained death or cardiac ion channel mutations (e.g., congenital long QT syndrome)

Current treatment with medications that are well known to prolong the QT interval at doses that have a clinically meaningful effect on QT, as determined by the investigator. The investigator may contact the Sponsor for confirmation if needed.

Uncontrolled disease states, such as asthma, psoriasis, or inflammatory bowel disease, where flares are commonly treated with oral or parenteral corticosteroids History of vasculitis Current liver disease that is clinically significant, in the opinion of the investigator Evidence of chronic and/or active hepatitis B or C Positive hepatitis B surface antigen (HBsAg) or hepatitis C serology (regardless of treatment status) Positive hepatitis B core antibody (HBcAb)

Abnormalities in hepatic synthetic function tests (e.g., prothrombin, INR, PTT, albumin) judged by the investigator to be clinically significant History of alcohol, drug, or chemical abuse within the 12 months prior to screening as determined by the investigator History of non-gallstone-related pancreatitis or chronic pancreatitis that is judged to be clinically significant, in the opinion of the investigator (e.g., unexplained upper abdominal pain or malabsorptive diarrhea)

Any known active infection (with the exception of fungal nail infections or oral herpes)

History of recurrent bacterial, viral, mycobacterial or fungal infections (defined as >2 similar episodes requiring anti-microbial treatment within the previous 12 months), with the exception of recurrent oral or genital herpes (HSV1/HSV2)

Any history of opportunistic infections that, in the Investigator or Sponsor's judgment, would raise safety concerns regarding the patient's participation in the study Any major episode of infection requiring hospitalization or treatment with IV anti-microbials within 8 weeks prior to and during screening or treatment with oral anti-microbials within 2 weeks prior to and during screening Antimicrobials include antifungal, antibacterial, and antiviral agents.

History of or currently active primary or secondary immunodeficiency, including known history of HIV infection History of cancer, including hematologic malignancy and solid tumors, within 10 years before screening; basal or squamous cell carcinoma of the skin that has been excised and is considered cured and in situ carcinoma of the cervix treated with apparent success by curative therapy >1 year prior to screening are not exclusionary.

Women who are pregnant, nursing (breastfeeding), or intending to become pregnant during the study or within 60 days after completion of the study For women of childbearing potential (including those who have had a tubal ligation): Positive serum pregnancy test result at screening or on Day 1; a serum pregnancy test is needed on Day 1 ONLY if the urine pregnancy test is positive (see Appendix 8 for definition of "childbearing potential").

Neuropathies or other painful conditions that might interfere with pain evaluation, in the opinion of the investigator·Need for systemic anti-coagulation with warfarin, other oral or injectable anti-coagulants, or anti-platelet agents other than NSAIDs, aspirin, and other salicylates Aspirin at doses of up to 162 mg QD is allowed.

History of hospitalizations or transfusion for a GI bleed

History of CV accident (CVA) within 10 years, any history of hemorrhagic CVA, history of spontaneous intracranial hemorrhage, or history of traumatic intracranial hemorrhage within 10 years Known bleeding diathesis Any condition possibly affecting oral drug absorption (e.g., gastrectomy, clinically significant diabetic gastroenteropathy, or certain types of bariatric surgery such as gastric bypass); procedures such as gastric banding, that simply divide the stomach into separate chambers, are not exclusionary.

Any uncontrolled clinically significant laboratory abnormality that would affect safety, interpretation of study data, or the patient's participation in the study The following exclusion criteria are based on screening laboratory tests. Laboratory tests may be repeated once during the screening period unless otherwise indicated (see Section 4.5.1.1):

Creatinine>1.5 times the ULN (may be repeated if 1.5-2×ULN)

ALT or AST>1.5 times ULN (may be repeated if 1.5-3×ULN)

Total bilirubin >ULN (may be repeated if 1-3×ULN)

Hemoglobin <8.5 g/dL (may be repeated if 7-8.4 g/dL)

ANC<1.5×109/L (may be repeated if 1.2-1.5×109/L)

Platelet count<100×109/L (may be repeated if 80-100× 109/L)

IgG<500 mg/dL (should not be repeated) History of treatment with non-TNFα inhibitor biologic for RA, including anti-IL6-directed therapy (e.g., tocilizumab, sarilumab, sirukumab), anti-IL1-directed therapy (e.g., anakinra), or T cell-directed therapy (e.g., abatacept) including biosimilar equivalents History of treatment with any TNF inhibitor (e.g., infliximab, etanercept, ADA, golimumab, or certolizumab), including biosimilar equivalents and investigational biosimilars to approved agents Any condition that is a contraindication for treatment with ADA in accordance with the approved local label History of anaphylactic or other serious allergic reaction to ADA.

Clinical Assessments

Efficacy assessments included self-administered questionnaires prior to the performance of non-PRO assessments, and prior to the administration of study treatment. Except for the Day 28 visit, the sequence of assessments where efficacy is assessed were standardized as follows:

PRO Measures: Patient's Assessment of Arthritis Pain, Patient's Global Assessment of Arthritis, HAQ-DI (Health Assessment Questionnaire-Disability Index), SF-36v2 (The Short Form 36 Version 2 Health Survey) and FACIT-Fatigue.

Laboratory samples for safety, efficacy, biomarkers, and pharmacokinetics must be drawn after patient self-assessments are completed (except where specified).

Figure 32:
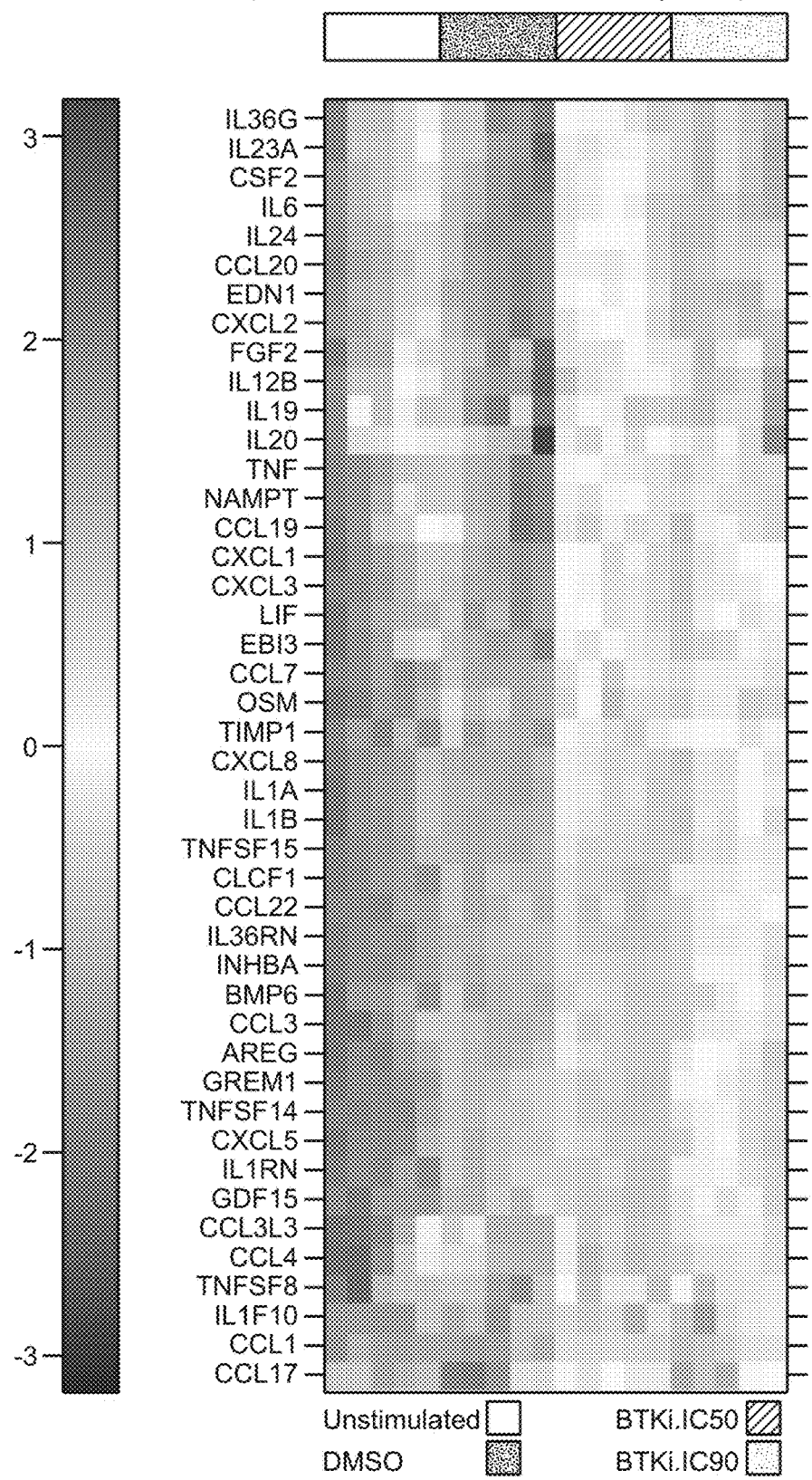
FIG. 32 shows a heatmap reflecting expression of genes regulated by BTK-dependent immune complex-mediated stimulation of Fcγ receptors.

Biomarkers were evaluated in serum or plasma samples at baseline and weeks 1, 4, and 12 in patients with available samples (cohort 1: n=438; cohort 2: n=86). The biomarkers evaluated in this assessment were chemokine [C-C motif] ligand 4 (CCL4), IL-6, and TNF-like cytokine 1A (TL1A). Total IgM, IgG, rheumatoid factor IgM autoantibody (RF), CCL4, TL1A, IL-6, and anti-CCP autoantibody (ACPA IgG) levels were analyzed with immunoassays. $CD19^+$ B cells and $CD3^+$ T cells were measured by flow cytometry. The proportion of patients achieving an ACR50 response at week 12 and the change in DAS28 score by week 12 were assessed relative to seropositivity (RF and/or ACPA positive at baseline) or baseline levels of RF in both cohorts. To select which biomarkers to evaluate in this trial, BTK-dependent myeloid biomarkers were identified using peripheral blood $CD14^+$ monocytes stimulated with immune-complexes in the presence or absence of a BTK inhibitor. In brief, the expression levels of genes in human monocytes were assayed under conditions of no stimulation; with human serum albumin immune complex stimulation; with stimulation and a low concentration of a BTK inhibitor with similar characteristics to fenebrutinib; or with stimulation and a high concentration of the BTK inhibitor. Genes were filter by up-regulation by immune complex stimulation of at least 2-fold, followed by subsequent reduction by $IC_{90}$ concentration of the BTK inhibitor of at least 1.5 fold. Genes annotated with cytokine activity were selected. A heatmap reflecting the gene expression is provided in FIG. 32. The color bar represents normalized gene expression.

Investigator conducted assessments: Joint counts and Physician's Global Assessment of Arthritis visual analog scale (VAS), safety assessments (adverse events, vital signs, concomitant medications, review of laboratory data). For Cohort 1 only: SC comparator drug injection; For Cohorts 1 and 2: Administration of oral study drug.

Disease Activity Score 28. The DAS 28-4 (CRP) and the DAS 28-4 (ESR) are calculated as follows. Assessments: (i) Tender joint count of 28 joints (TJC28), square-root transformed; (ii) Swollen joint count of 28 joints (SJC28), square-root transformed; (iii) Acute-phase reactant (erythrocyte sedimentation rate [ESR mm/hr] or high sensitivity C-reactive protein [hsCRP mg/L]), log transformed; (iv) Patient's global assessment of disease activity on visual analog scale (0-100 mm).

The DAS 28 is calculated according to the following formulas:

$$DAS\ 28(4)\text{-}ESR = 0.56 \times SQRT(TJC28) + 0.28 SQRT(SJC28) + 0.70 \times \ln(ESR) + 0.014 \times PtGA$$

$$DAS\ 28(4)\text{-}CRP = 0.56 \times SQRT(TJC28) + 0.28 SQRT(SJC28) + 0.36 \times \ln(CRP+1) + 0.014 \times PtGA + 0.96$$

Total score: Range, 0.49-9.07

Disease remission ≤2.6

Disease activity: Low ≤3.2; Moderate d>3.2 and ≤5.1; High >5.1

(PtGA=patient's global assessment of disease activity; ln=natural logarithm; SQRT=square root)

ACR Assessments. The ACR's definition for calculating improvement in RA (ACR20) is calculated as a 20% improvement in tender and swollen joint counts and a 20% improvement in 3 of the 5 remaining ACR-core set measures: patient and physician global assessments, pain, disability, and an acute-phase reactant. Similarly, ACR50 and ACR70 are calculated with the respective percent improvements. The Sponsor, on the basis of the component parts, will calculate the ACR score.

The specific components of the ACR Assessments used in this study are as follows: Tender/Painful Joint Count (68), Swollen Joint Count (66), Patient's Assessment of Arthritis Pain, Patient's Global Assessment of Arthritis, Physician's Global Assessment of Arthritis, CRP and HAQ-DI.

Swollen and Tender/Painful Joint Counts: An assessment of 66 joints for swelling and 68 joints for tenderness was made. Joints assessed and classified as swollen/not swollen and tender/not tender by pressure and joint manipulation on physical examination. Joint prosthesis, arthrodesis, or fused joints is not taken into consideration for swelling or tenderness. The response to pressure/motion on each joint is assessed using the following scale: Present, Absent, or Not Done. The 68 joints assessed for tenderness/pain are as follows:

Upper body: Temporomandibular, sternoclavicular, acromioclavicular

Upper extremity: Shoulder, elbow, wrist (includes radiocarpal, carpal, and carpometacarpal considered as one unit), metacarpophalangeals (MCPs I, II, III, IV, V), thumb interphalangeal, proximal interphalangeals (PIPs II, III, IV, V), distal interphalangeals (DIPs II, III, IV, V)

Lower extremity: Hip, knee, ankle, tarsus (includes subtalar, transverse tarsal and tarsometatarsal considered as one unit), metatarsophalangeals (MTPs I, II, III, IV, V), great toe interphalangeal, PIPs (PIPs II, III, IV, V)

The 66 joints assessed for swelling, the same as those listed above for tenderness/pain, except that the right and left hip joints are not included in the swollen joint count. Artificial joints are not assessed.

Patient reported and clinician reported outcomes PRO (Patient's Assessment of Arthritis Pain, Patient's Global Assessment of Arthritis, HAQ-DI, SF-36v2, and FACIT-Fatigue Scale and ClinRO (Physician's Global Assessment of Arthritis) data were collected by questionnaires and completed at the specified time points of the study (i.e., Weeks 1, 2, 6, 4, 8,10 and 12).

The demographics and baseline characteristics of patients in both cohorts are presented in FIGS. 30A-30B.

Results

The results of the study are presented in Tables 1 and 2 below:

TABLE 1

ACR50 Endpoint at Week 12 (Cohort 1)
Parameter: ACR50

|  | 50 mg QD (N = 40) | 150 mg QD (N = 109) | 200 mg QD (N = 110) | PBO (N = 110) | ADA (N = 111) |
| --- | --- | --- | --- | --- | --- |
| Week 12 Day 84 |  |  |  |  |  |
| n | 40 | 109 | 110 | 110 | 111 |
| Responders | 7 (17.5%) | 30 (27.5%) | 38 (34.5%) | 16 (14.5%) | 40 (36.0%) |
| 95% C.I. | (5.72, 29.28) | (19.14, 35.91) | (25.66, 43.43) | (7.96, 21.13) | (27.10, 44.97) |
| Weighted Difference vs Placebo | 8.00 | 12.93 | 20.00 |  | 21.61 |
| 95% C.I. of Weighted Difference | (−5.64, 21.64) | (2.37, 23.48) | (9.21, 30.79) |  | (10.61, 32.62) |
| p-Value | 0.2503 | 0.0164 | 0.0003 |  | 0.0001 |

Table 1 shows that the study met its primary ACR50 endpoint in both the 150 mg QD and 200 mg BID arms of Cohort 1, and that the results were statistically significant and clinically meaningful. The maximum difference in ACR50 response rates was 2.0% (150 mg QD).

TABLE 2

ACR50 Endpoint at Week 12 (Cohort 2)
Parameter: ACR50

|  | 200 mg BID (N = 48) | PBO (N = 50) |
| --- | --- | --- |
| Week 12 Day 84 |  |  |
| n | 48 | 50 |
| Responders | (12.75,37.25) | (2.99,21.01) |
| Weighted Difference vs Placebo | 13.85 |  |
| 95% C.I. of Weighted Difference | (−0.86,28.55) |  |
| p-Value | 0.0650 |  |

Table 2 shows that the study met its primary ACR50 endpoint in Cohort 2, and that the results were statistically significant and clinically meaningful. The maximum difference in ACR50 response rates was 2.0% (150 mg QD).

Figure 2:
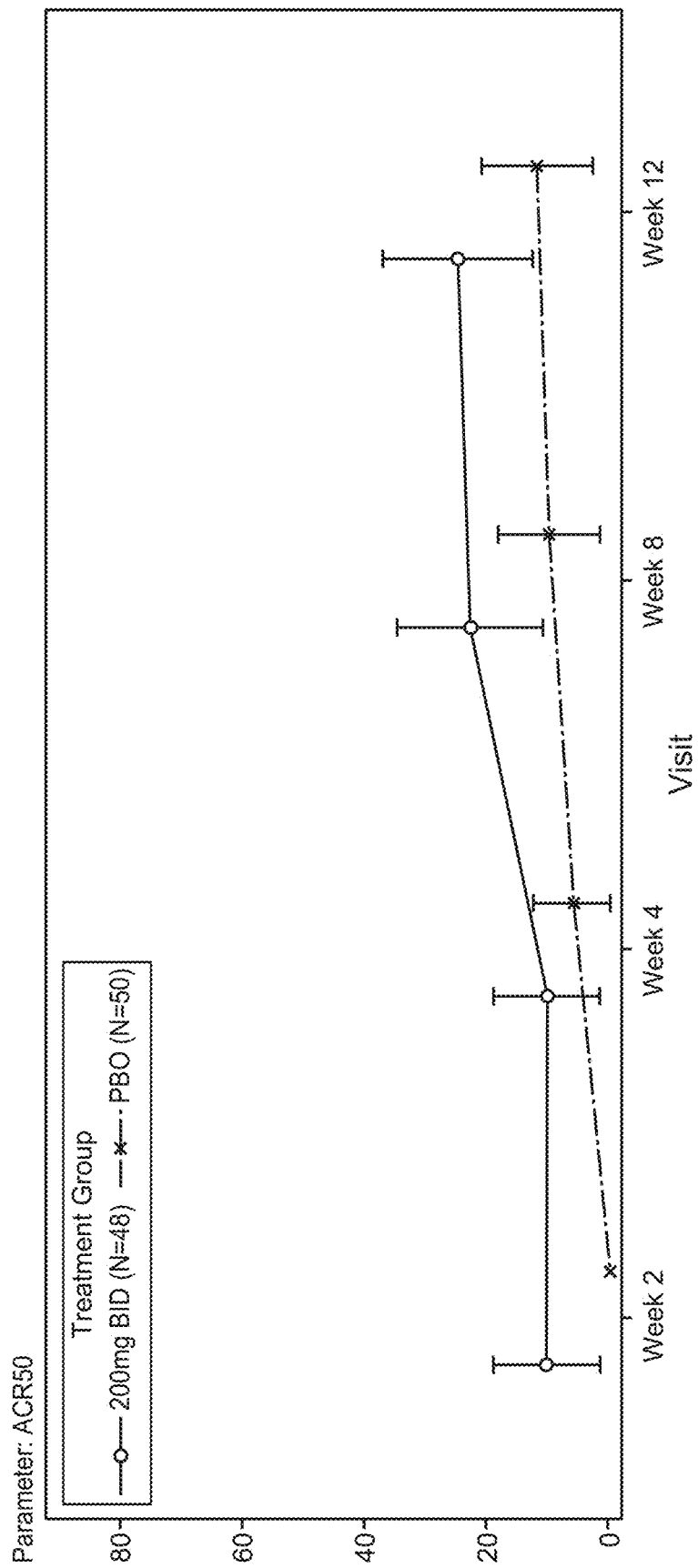
FIG. 2 shows ACR50 scores over time for Cohort 2 of the fenebrutinib RA study of Example 1.
Figure 3:
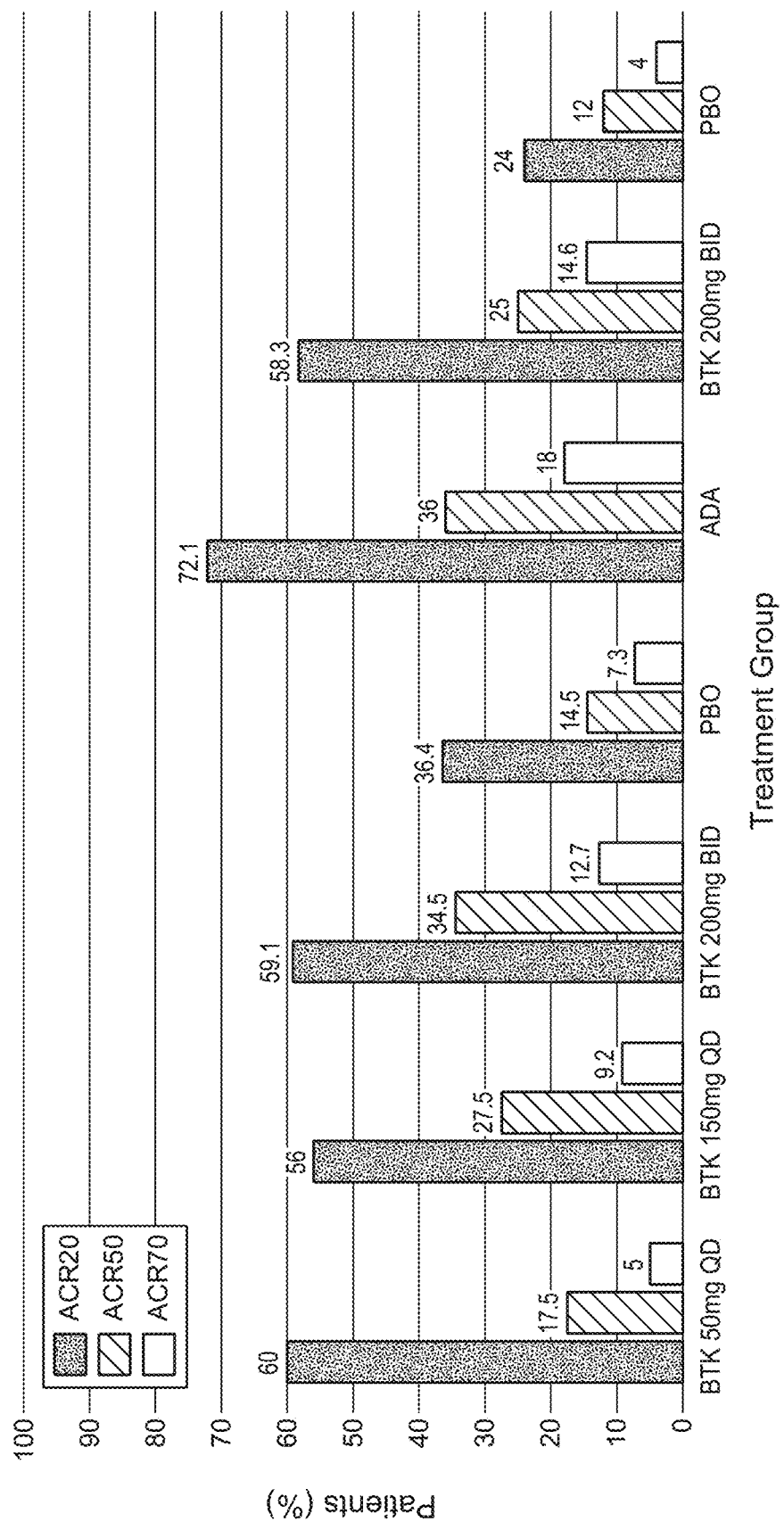
FIG. 3 shows ACR scores at week 12 by treatment group of the clinical study of the fenebrutinib study of Example 1.
Figure 4:
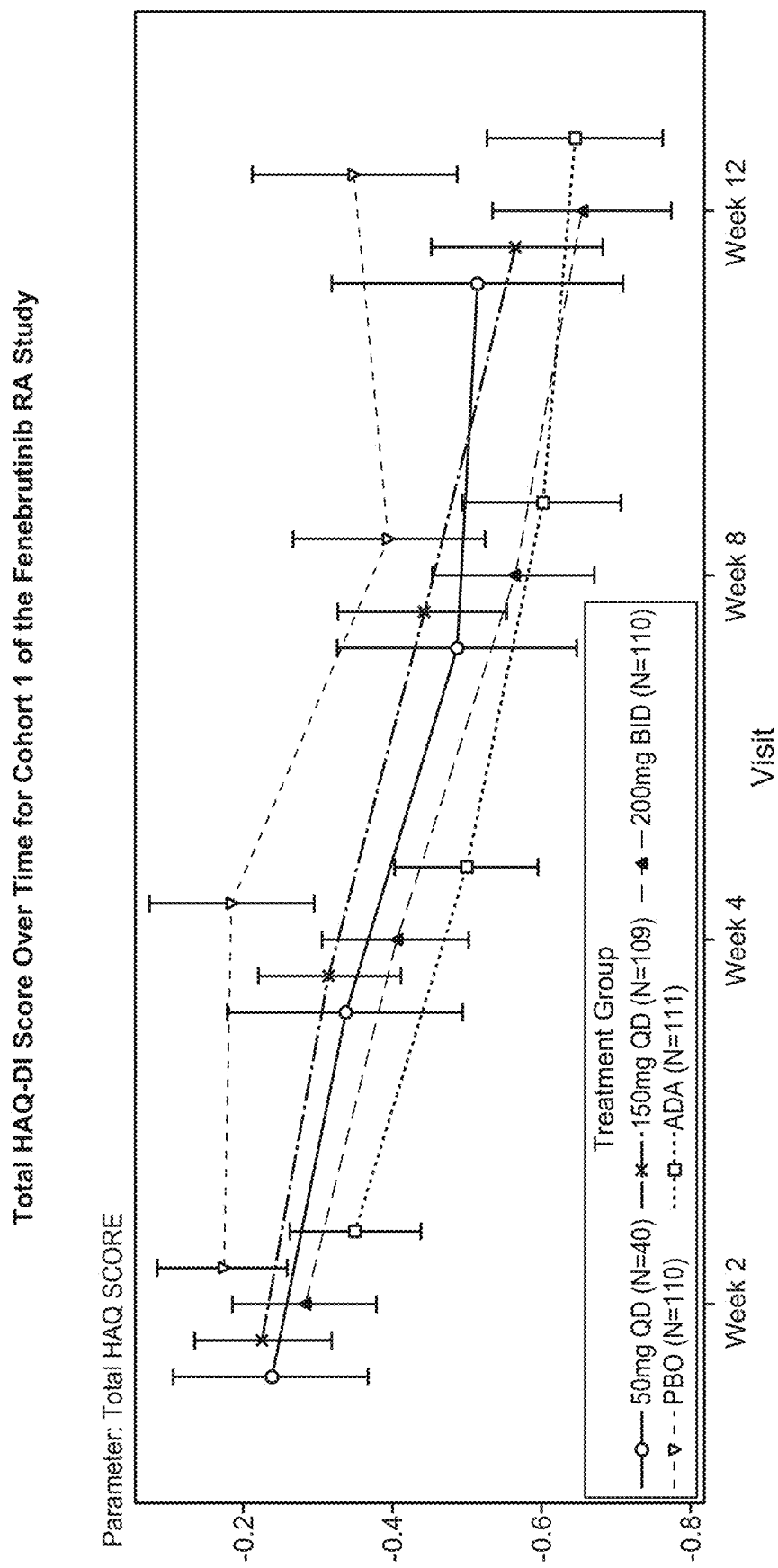
FIG. 4 shows ACR core parameters HAQ-DI for Cohort 1 of the fenebrutinib RA study of Example 1.
Figure 5:
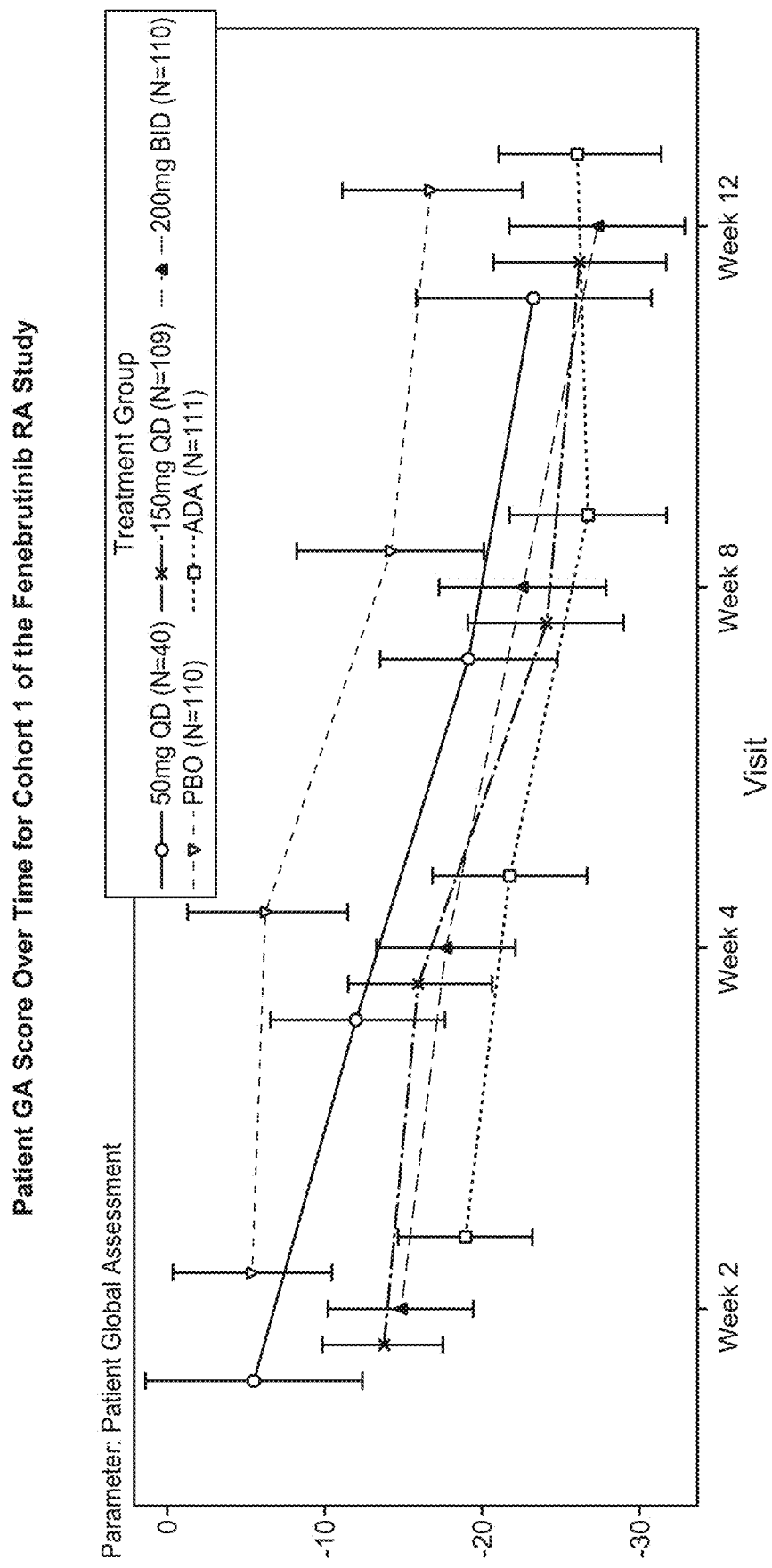
FIG. 5 shows Patient Global Assessment ("Patient GA") scores over time for Cohort 1 of the fenebrutinib RA study of Example 1.
Figure 6:
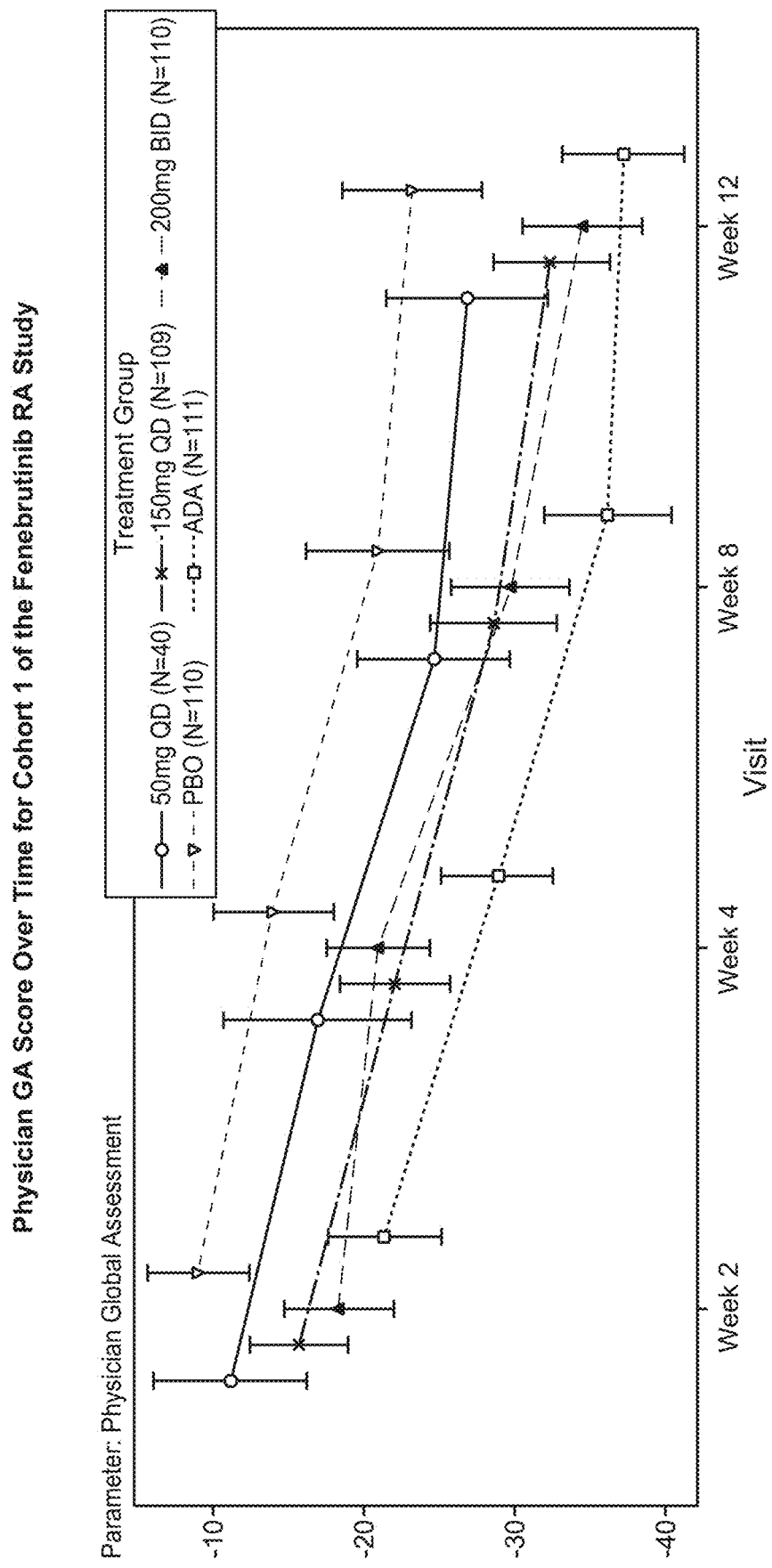
FIG. 6 shows Physician Global Assessment ("Physician GA") scores over time for Cohort 1 of the fenebrutinib RA study of Example 1.
Figure 7:
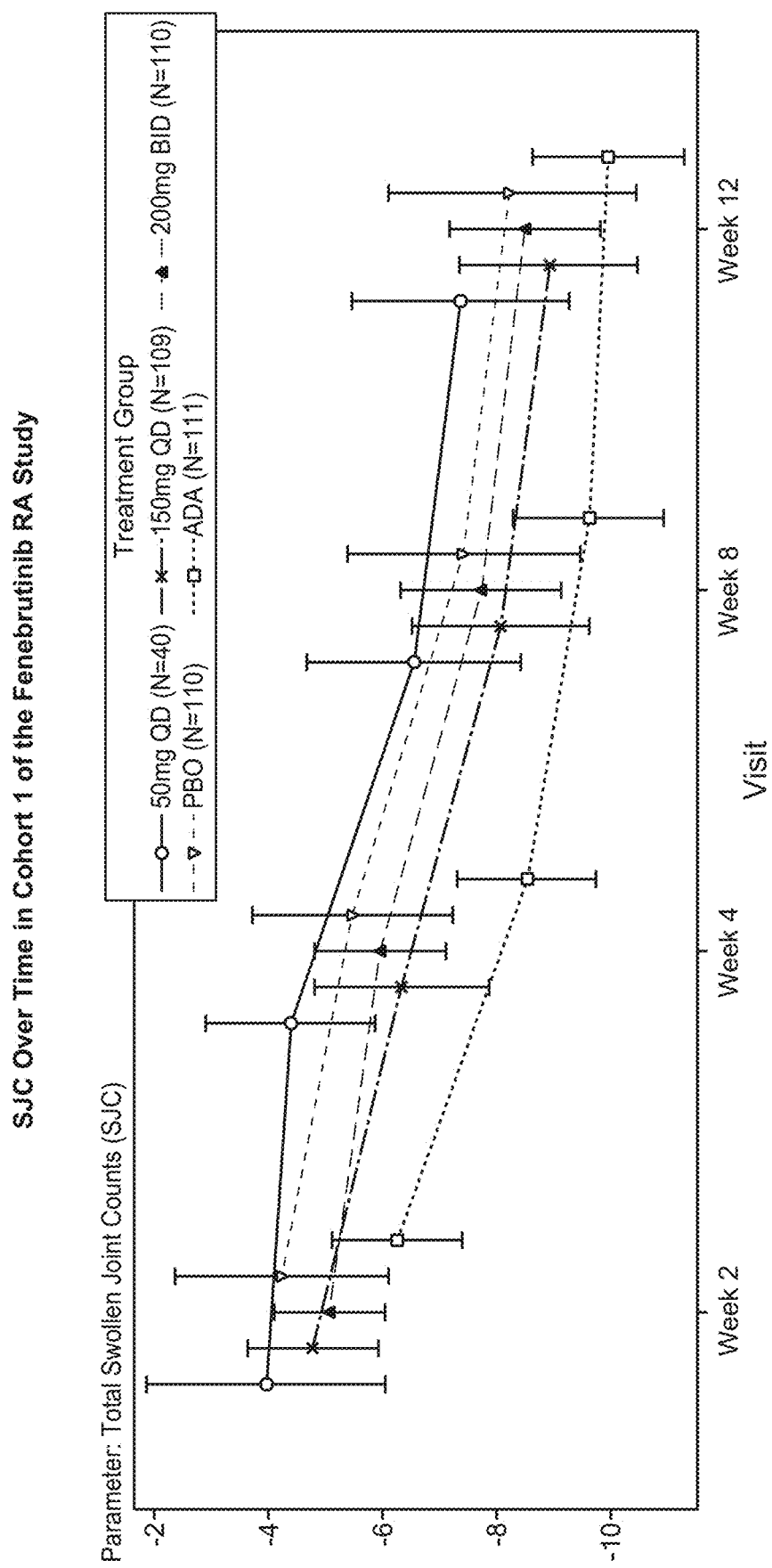
FIG. 7 shows total Swollen Joint Count ("SJC") scores in Cohort 1 of the fenebrutinib RA study of Example 1.
Figure 8:
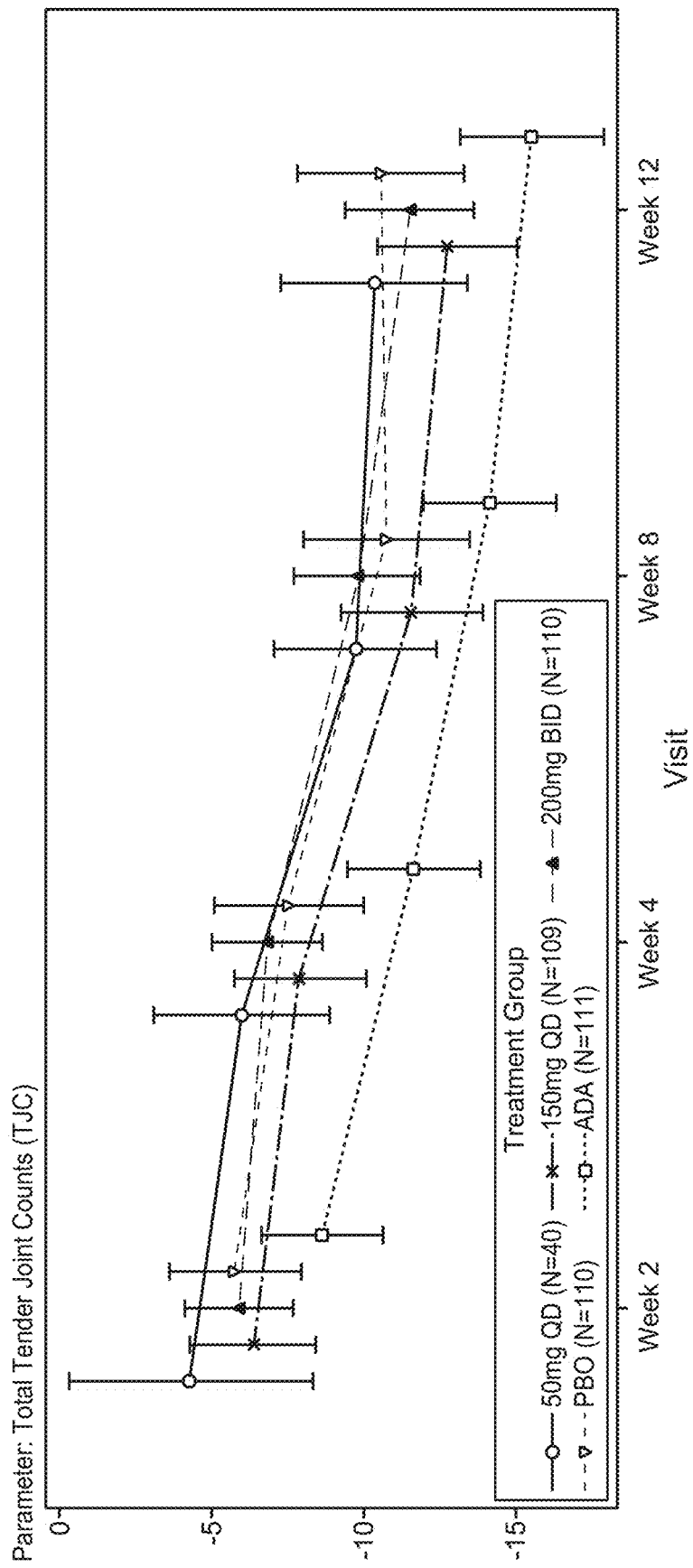
FIG. 8 shows Total Tender Joint ("TJC") scores in Cohort 1 of the fenebrutinib RA study of Example 1.
Figure 9:
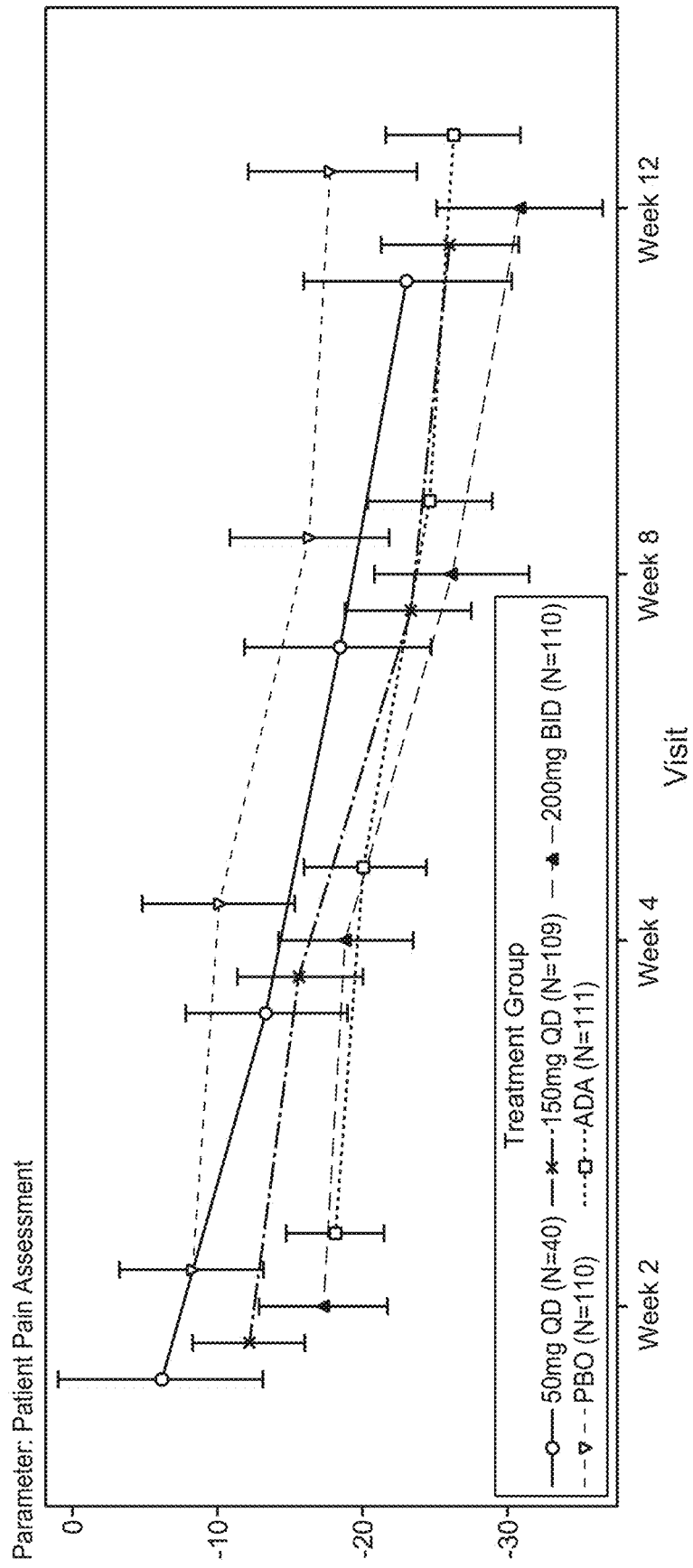
FIG. 9 shows patient pain over time in Cohort 1 of the fenebrutinib RA study of Example 1.
Figure 10:
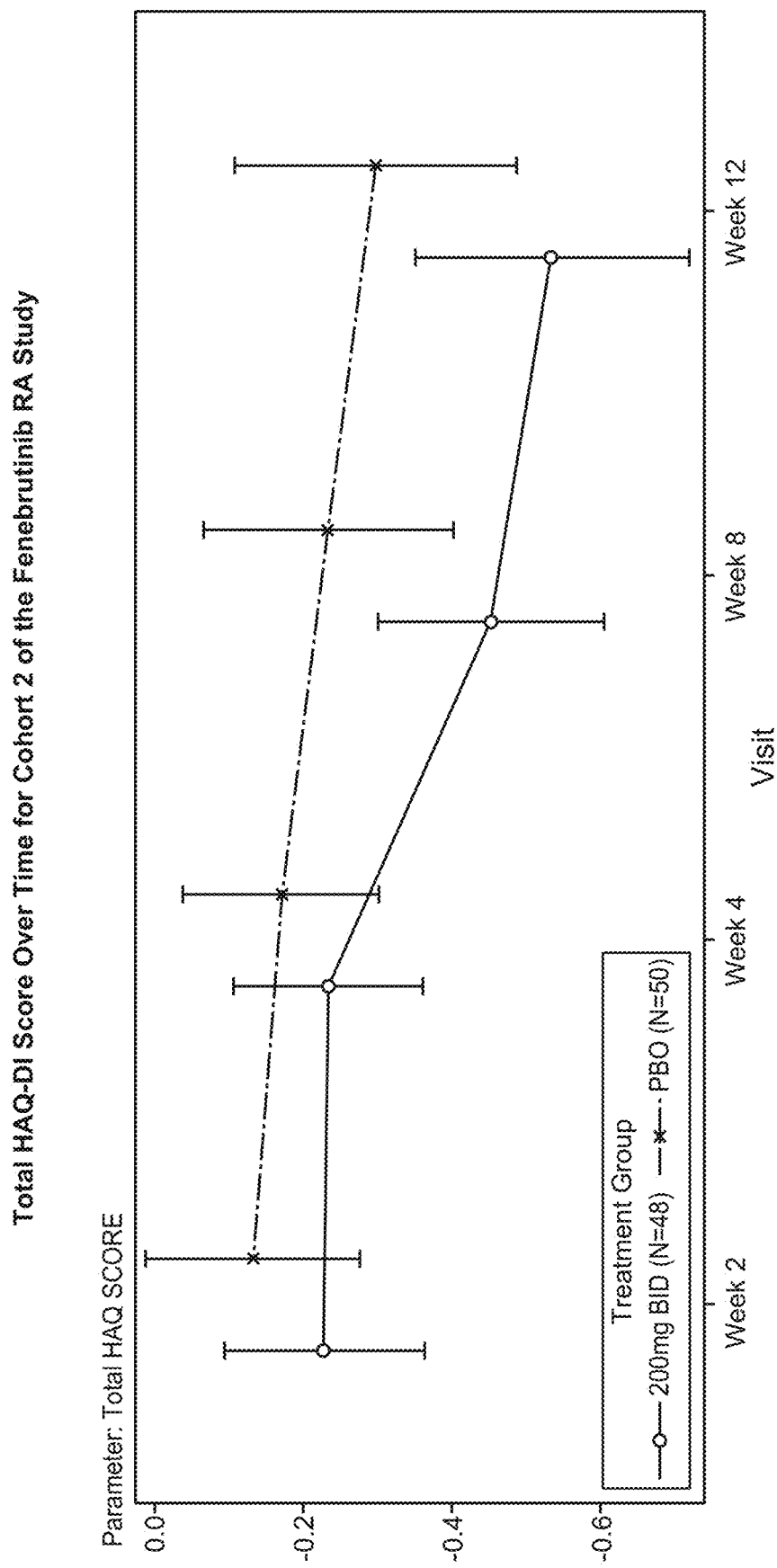
FIG. 10 shows total HAQ-DI for Cohort 1 of the clinical study of the fenebrutinib RA study of Example 1.
Figure 11:
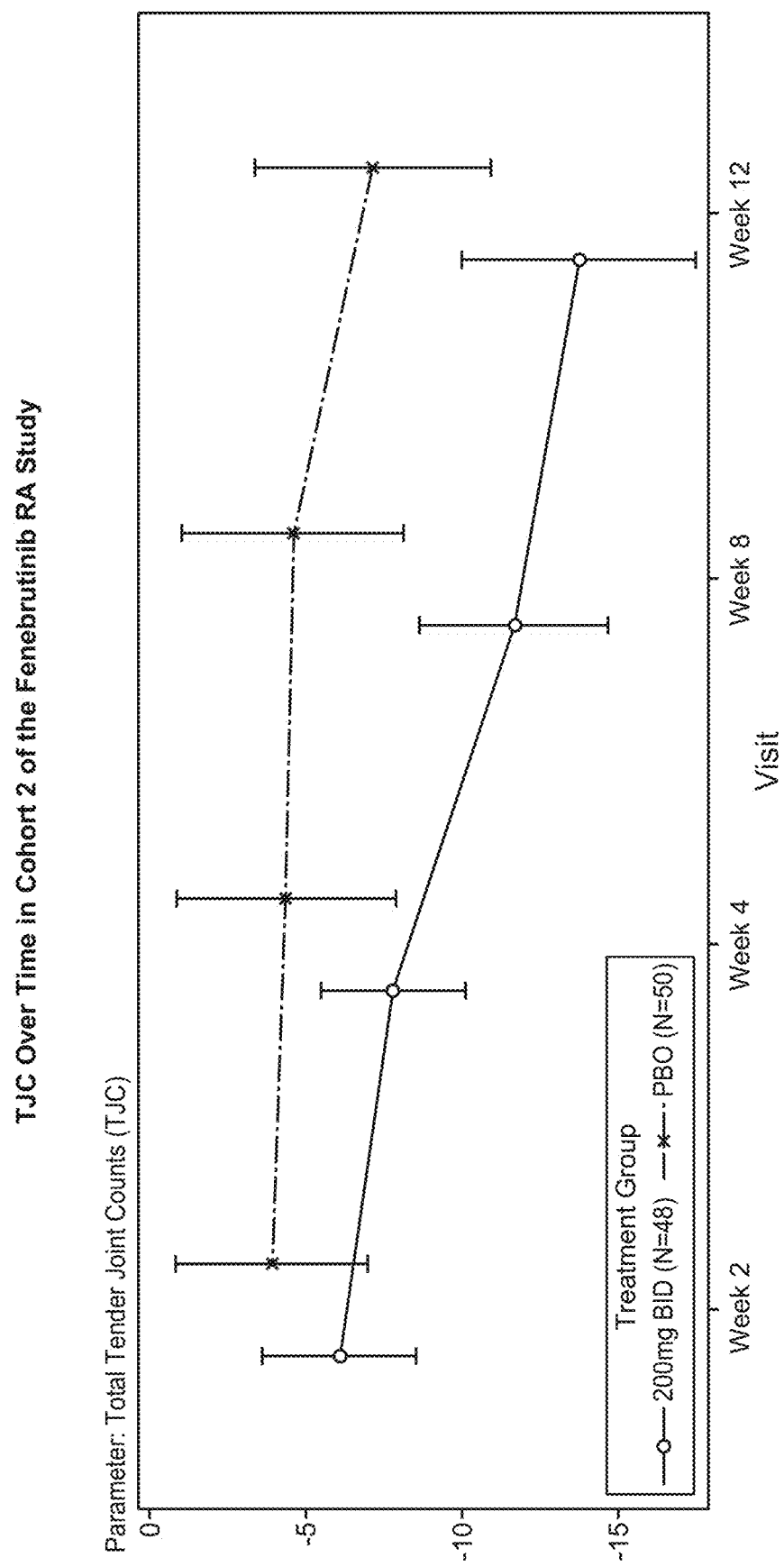
FIG. 11 shows TJC scores in Cohort 2 of the fenebrutinib RA study of Example 1.
Figure 12:
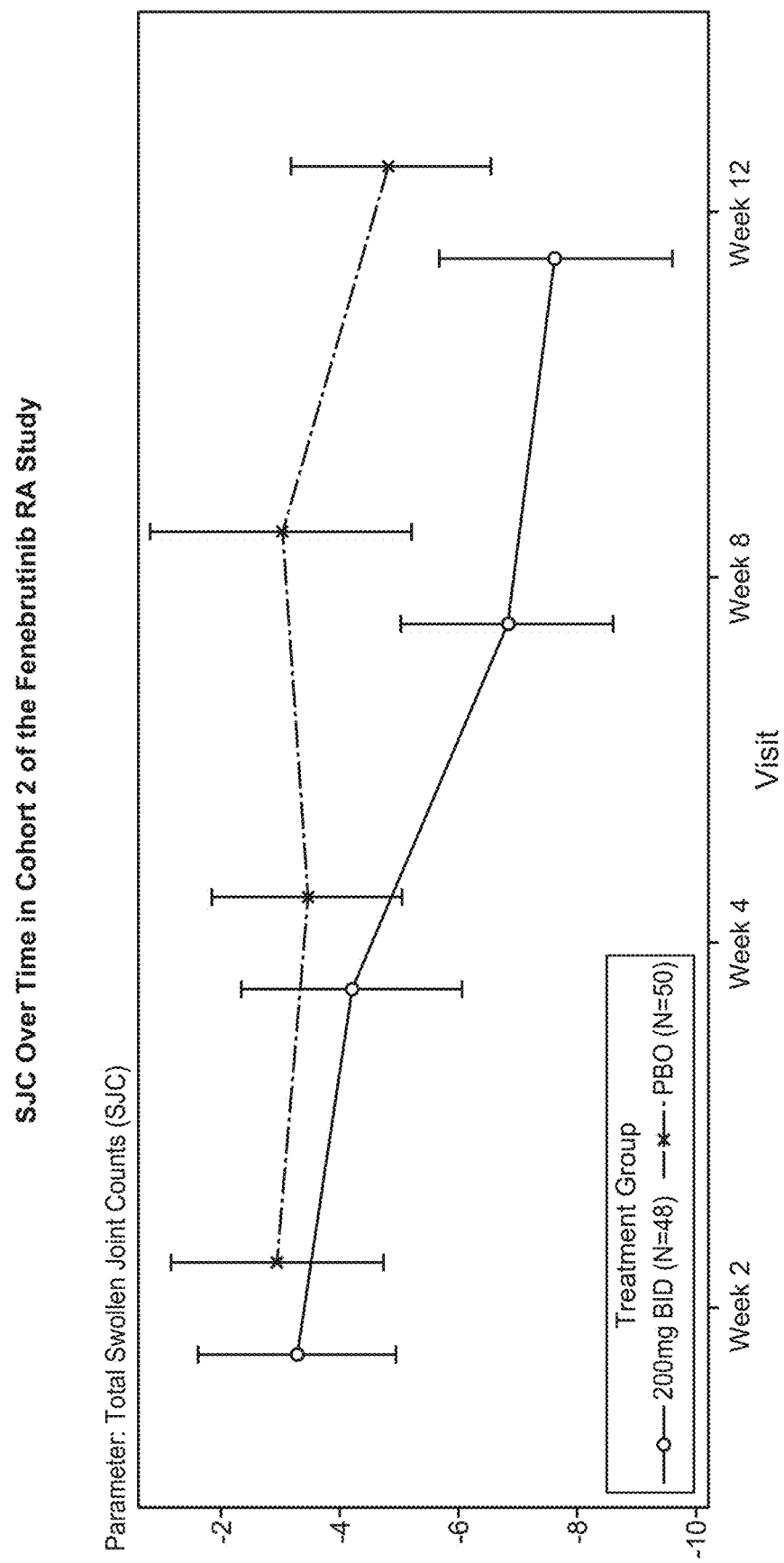
FIG. 12 shows SJC scores in Cohort 2 of the fenebrutinib RA study of Example 1.
Figure 13:
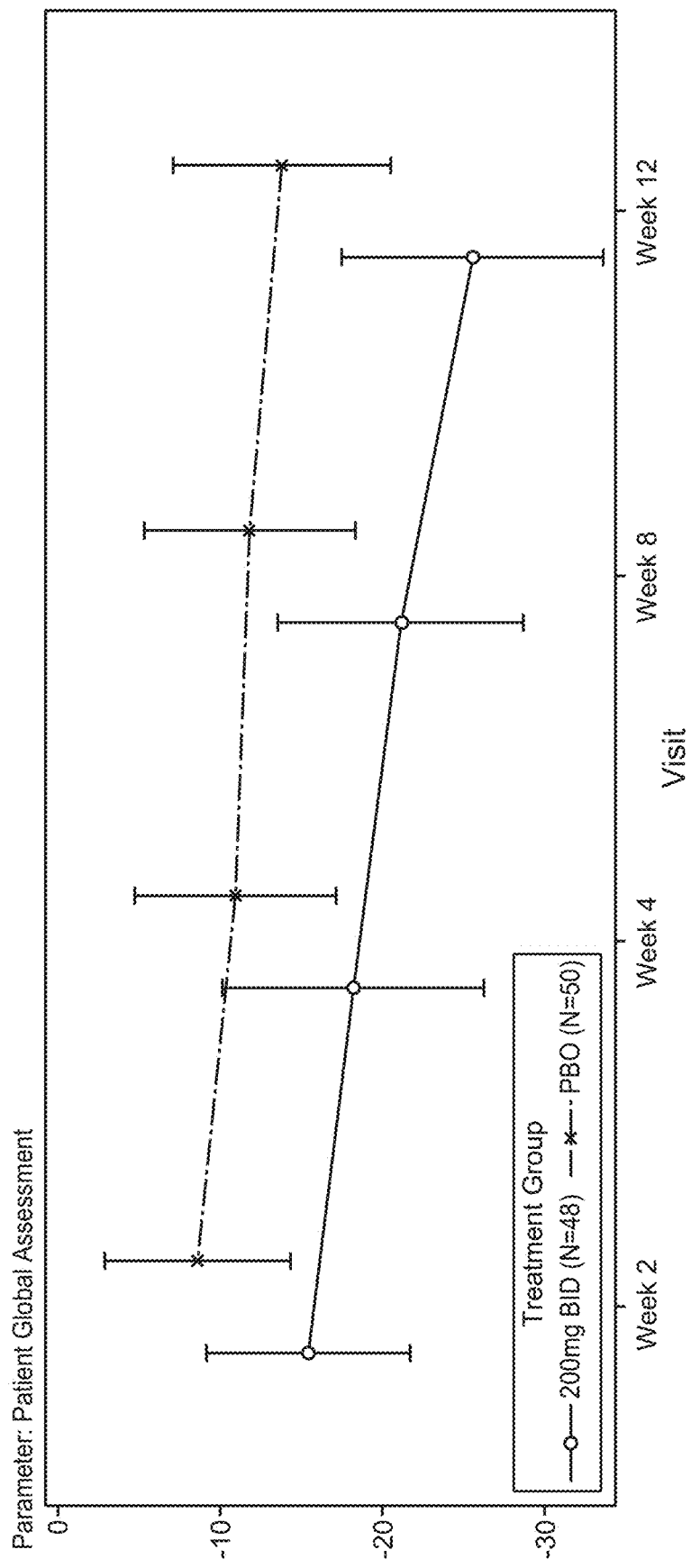
FIG. 13 shows Patient GA over time in Cohort 2 of the fenebrutinib RA study of Example 1.
Figure 14:
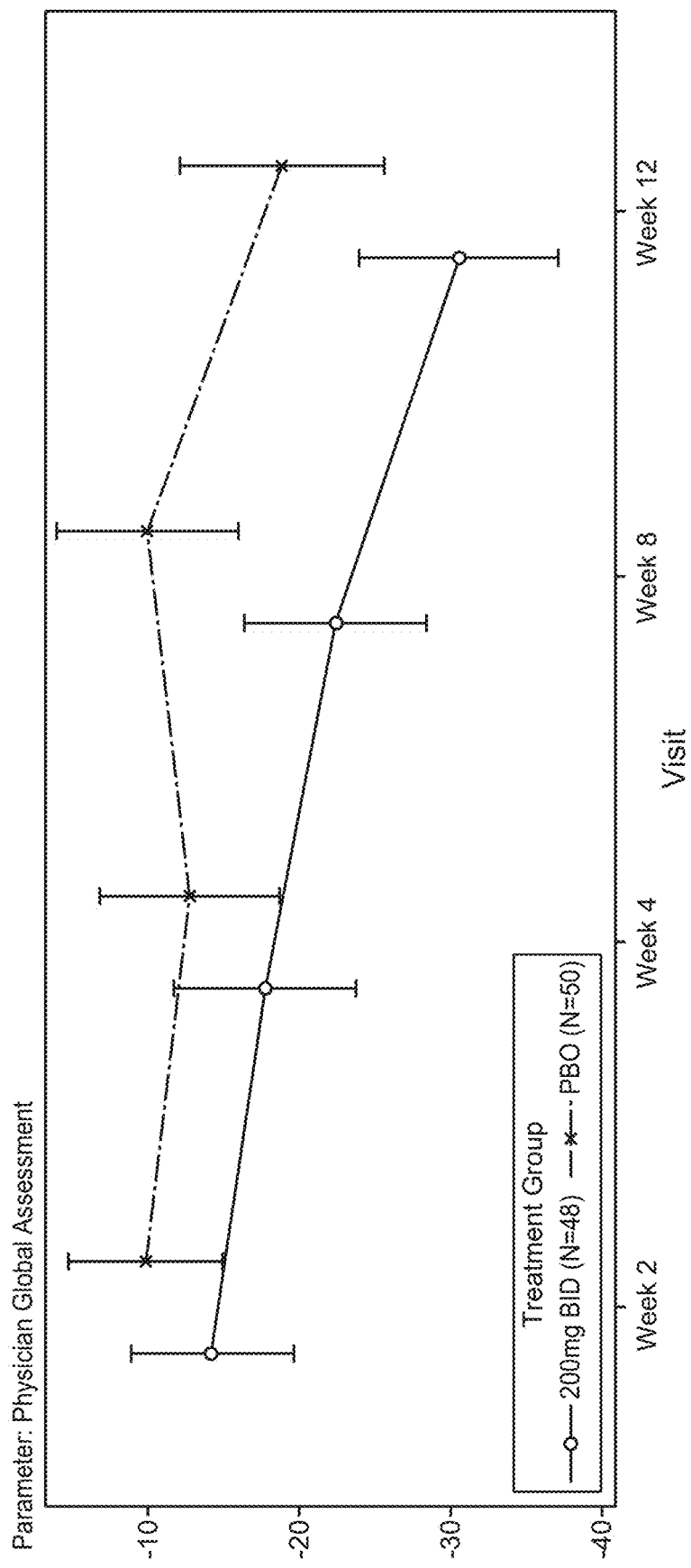
FIG. 14 shows Physician GA over time in Cohort 2 of the fenebrutinib RA study of Example 1.
Figure 15:
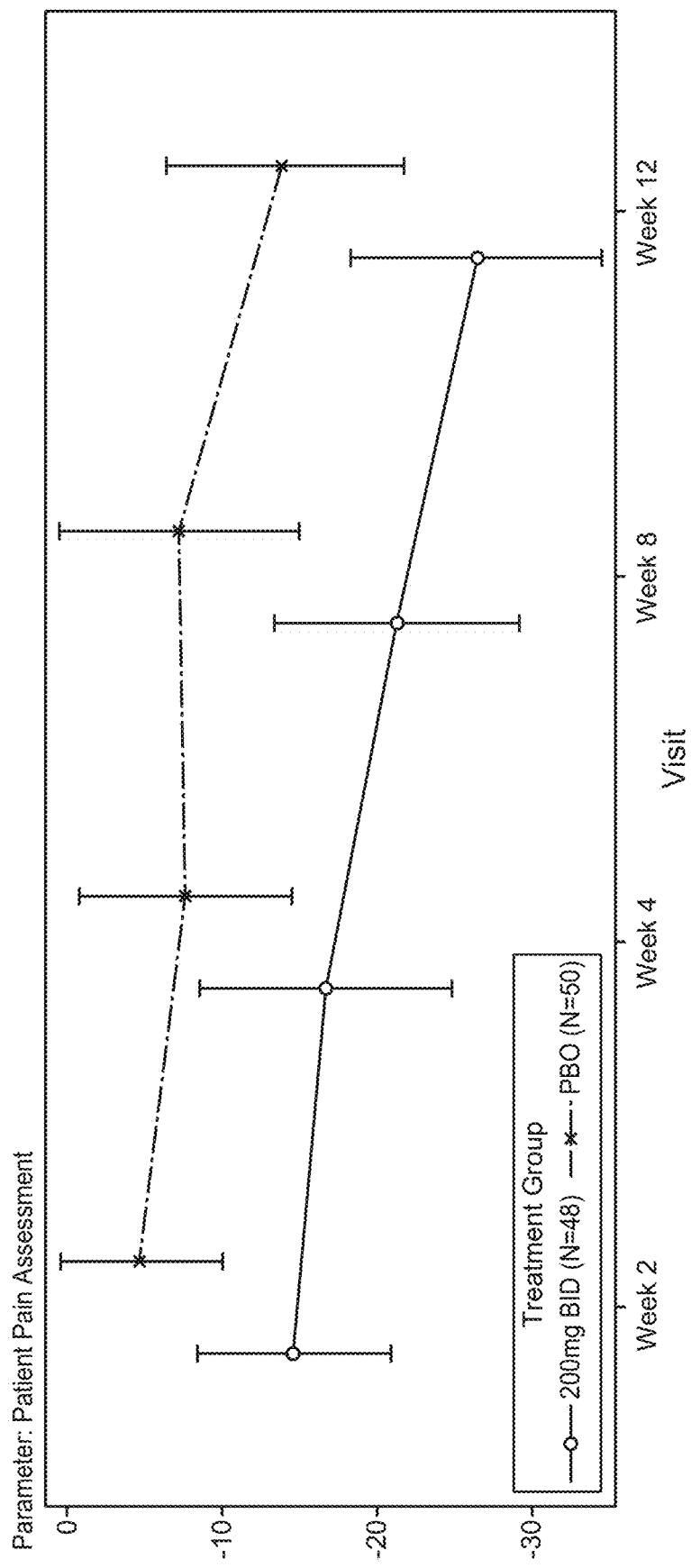
FIG. 15 shows patient pain over time in Cohort 2 of the fenebrutinib RA study of Example 1.
Figure 24A:
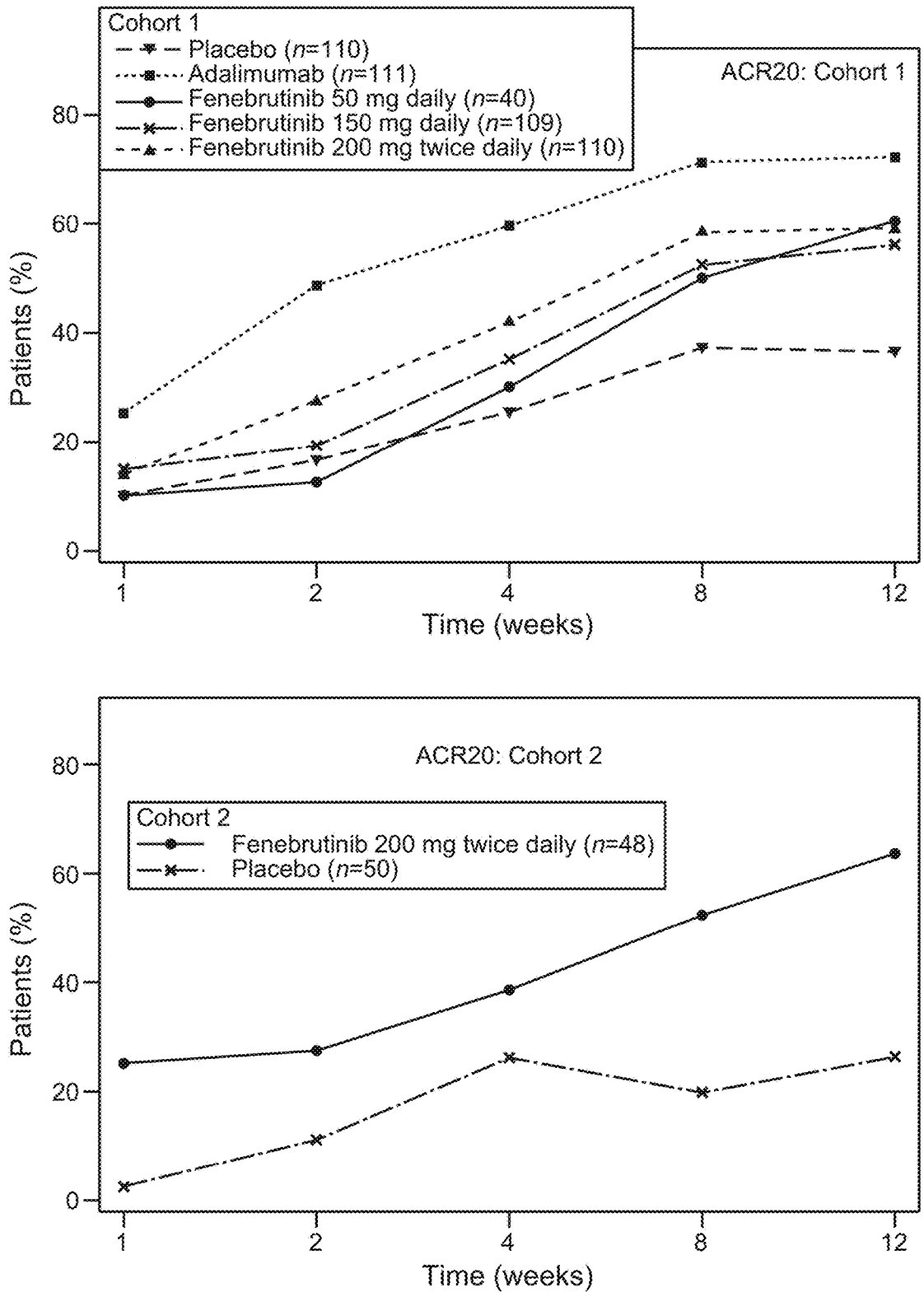
FIGS. 24A-24B show the ACR20 (FIG. 24A) and ACR70 (FIG. 24B) response from weeks 1 to 12 for cohorts 1 and 2 of the fenebrutinib RA study of Example 1.
Figure 24B:
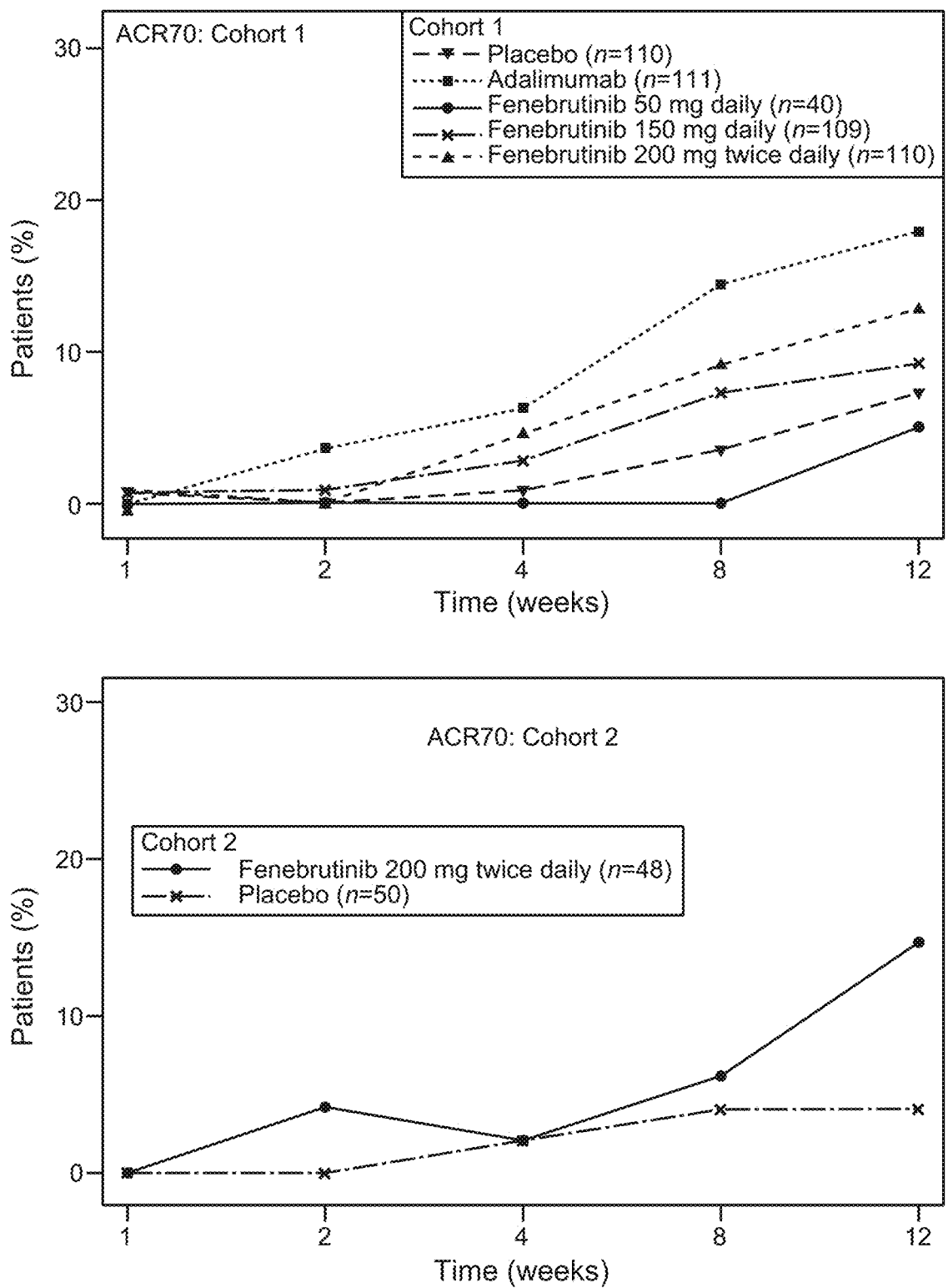
Figure 25A:
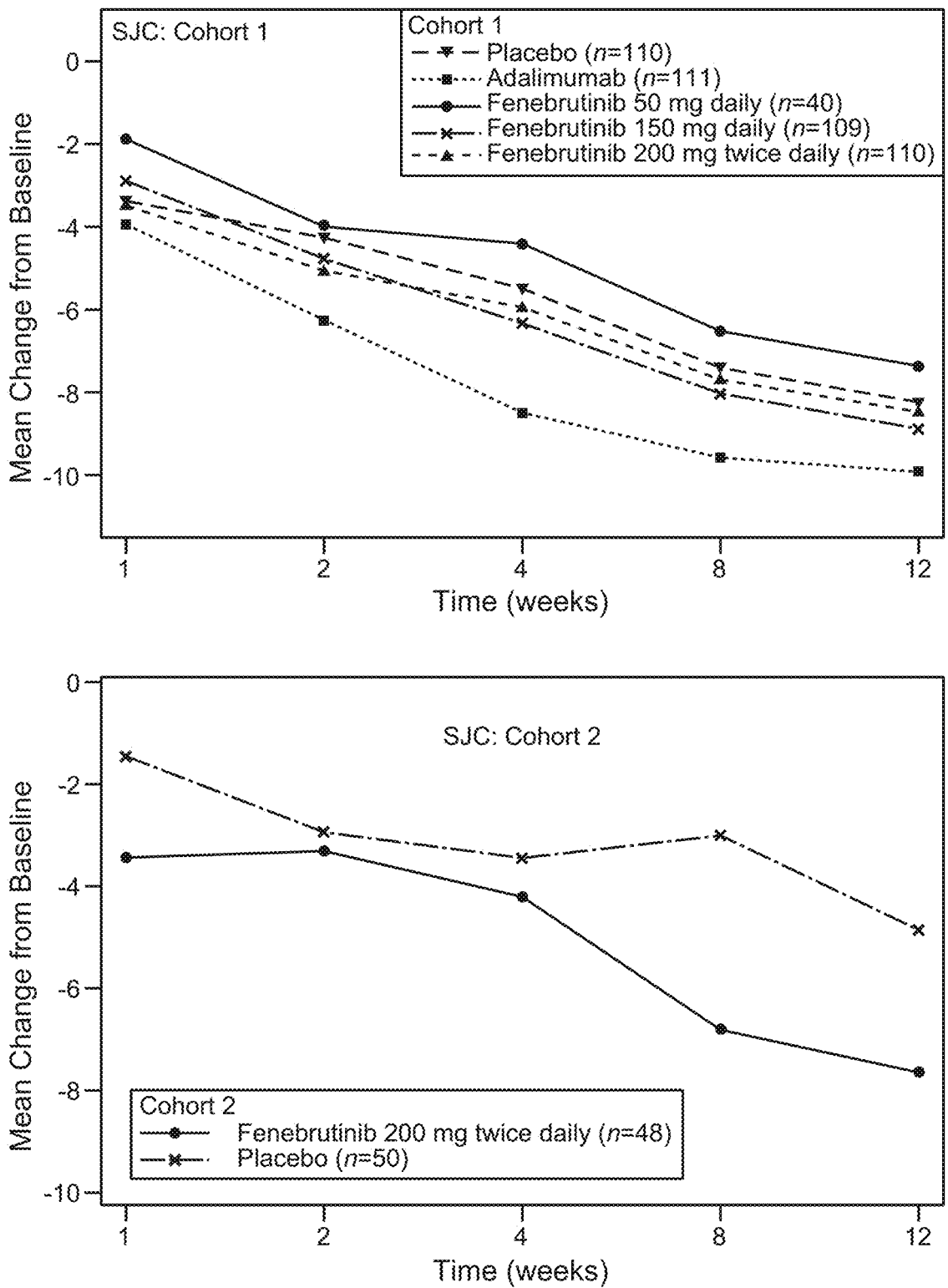
Figure 25B:
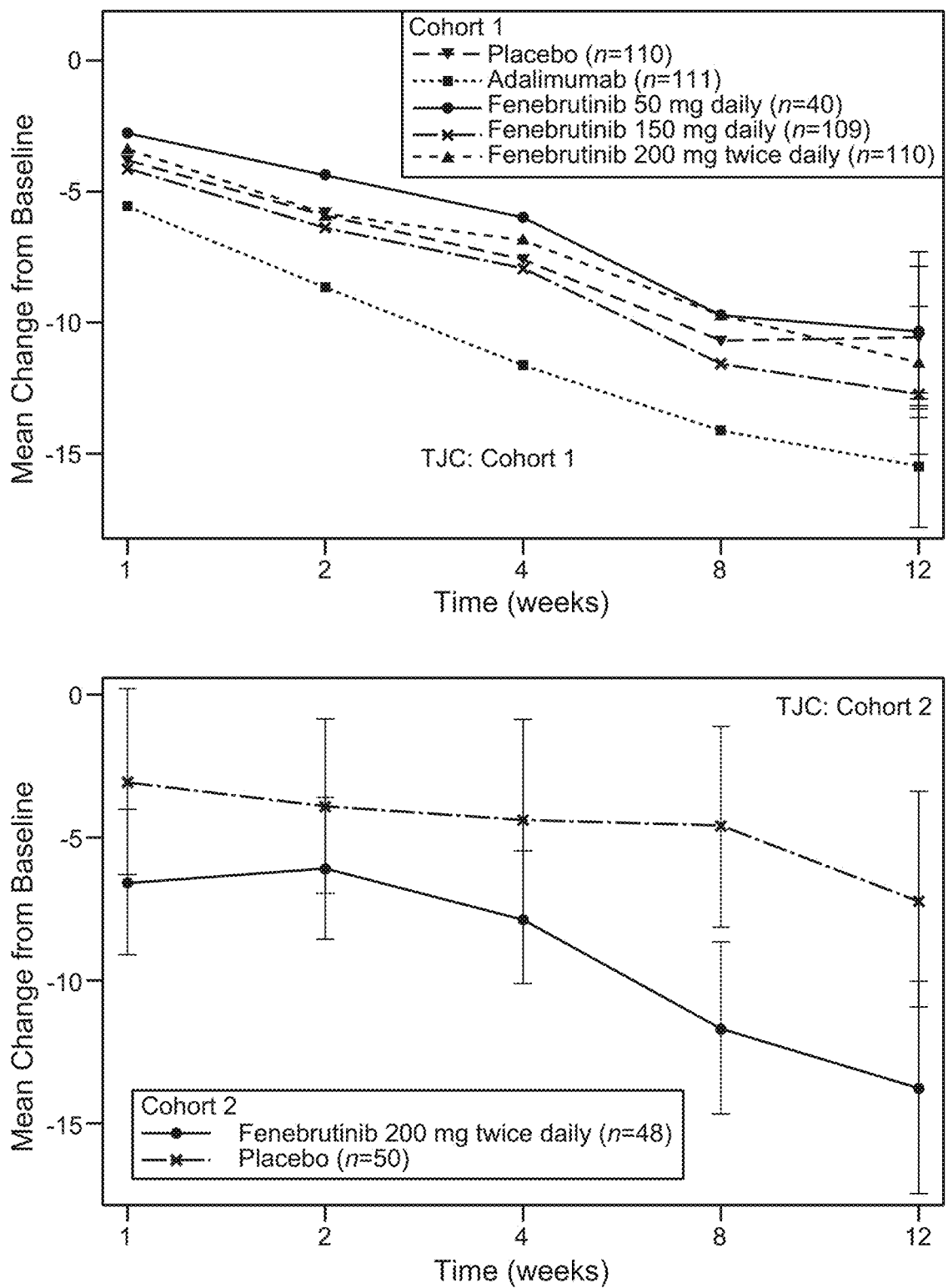
Figure 25C:
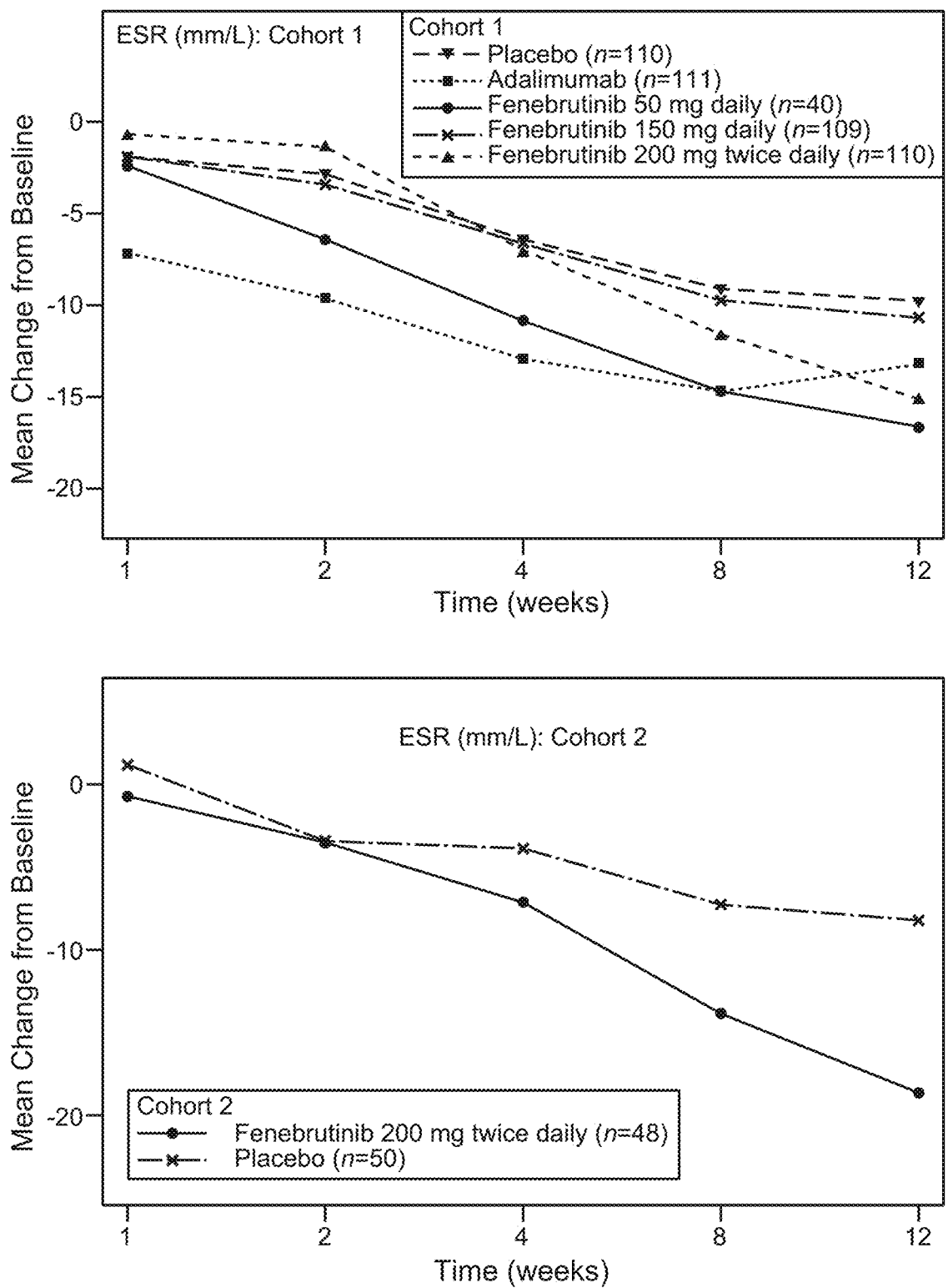
Figure 26B:
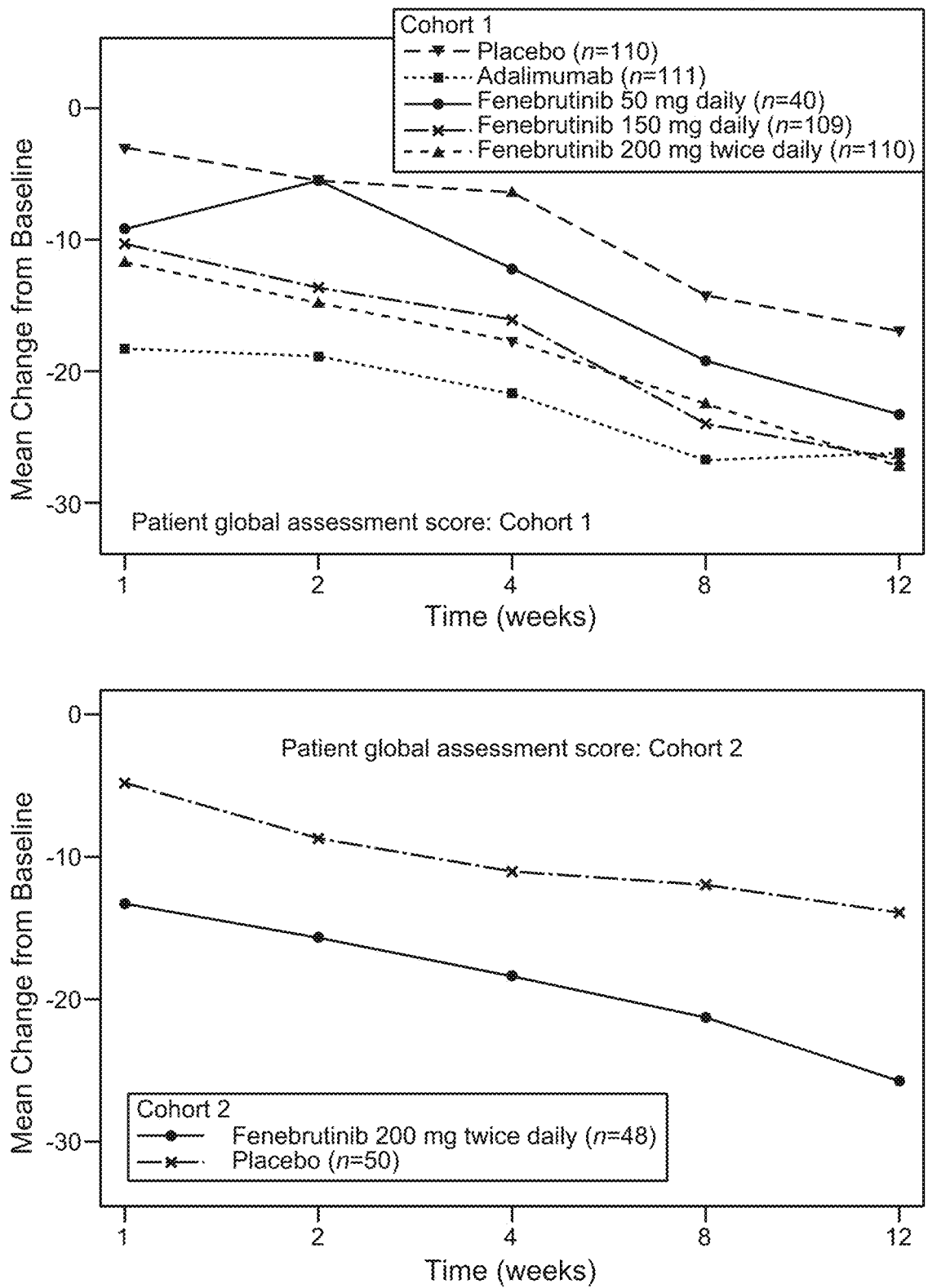

The secondary efficacy end point of ACR50 over time of Cohort 1 showed a dose-responsive relationship at Week 8 and Week 12. See FIG. 1. ACR50 response rates for Cohort 2 appear to level off starting at Week 8, and the endpoint was met at Weeks 2, 8 and 12. See FIG. 2. FIG. 3 plots the percentage of patients achieving ACR 20/50/70 response by visit by treatment versus non-responders. ACR20 and 70 responses are also summarized in FIGS. 24A and 24B. Clinically meaningful improvements with fenebrutinib versus placebo were seen for other secondary outcomes in both cohorts, including DAS28-ESR, CDAI, SDAI, and DAS low disease activity at week 12. Primary and secondary efficacy endpoint responses at week 12 are summarized in FIGS. 31A-31B. Results for the comparison of fenebrutinib with placebo and adalimumab for other secondary and exploratory outcomes showed comparable benefit for 200 mg twice daily fenebrutinib and adalimumab by week 12; these outcomes included ACR20, ACR70, DAS28-ESR, Boolean remission, quality of life assessments, and individual components of the ACR response rate. See FIGS. 24A-FIG. 26C.

Results from each cohort as measured by ACR core parameters HAQ-DI, Total Tender Joint Counts (TJC), Total Swollen Joint Counts (SJC), Patient General Assessment (GA), Physician General Assessment (GA) and Patient Pain, all shown over time, are presented in FIG. 4-FIG. 15, and FIGS. 21C, 25A, and 25B.

Figure 16:
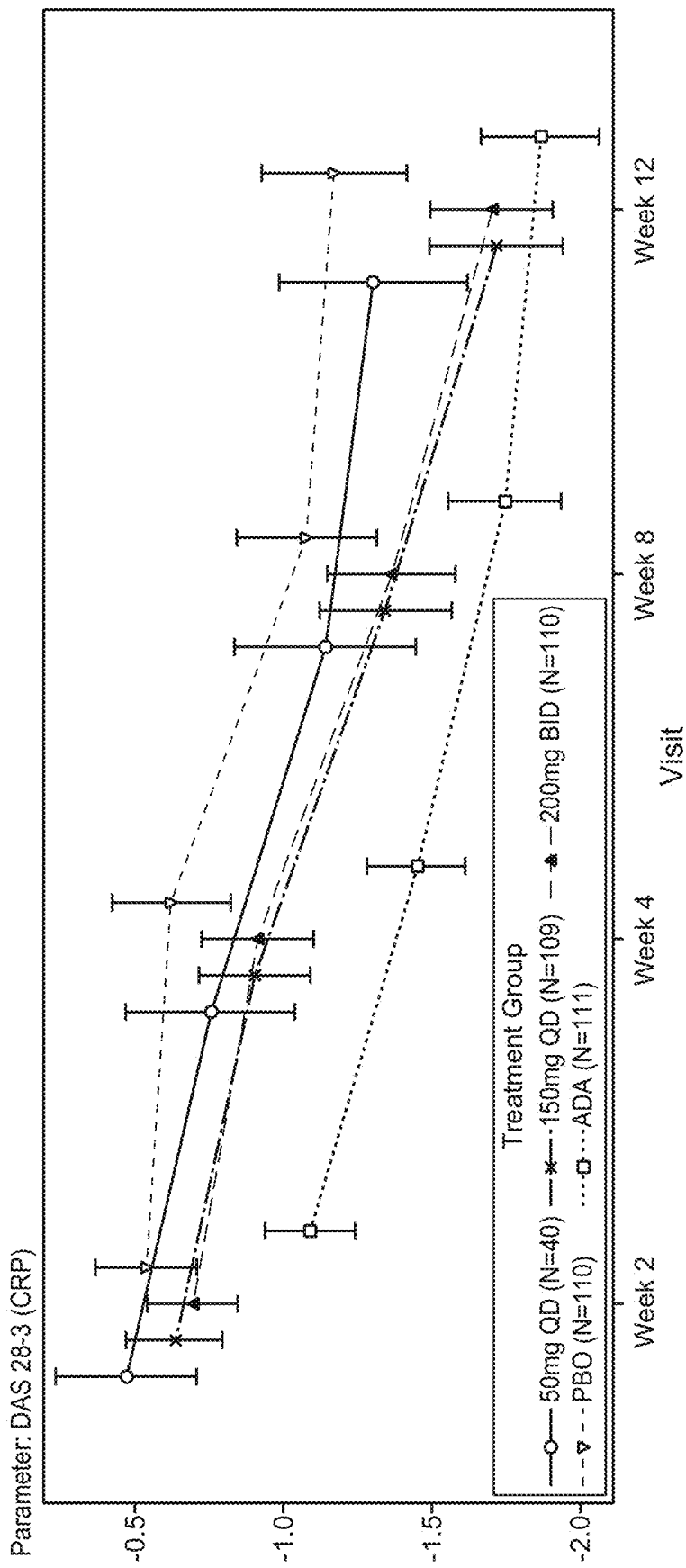
FIG. 16 shows DAS28-3-CRP scores over time in Cohort 1 of the fenebrutinib RA study of Example 1.

Statistically significant DAS28 improvements versus placebo were observed in each of the 150 mg QD and 200 mg BID fenebrutinib groups of Cohort 1, as measured by the DAS28-3-CRP score as shown in Table 3. The 150 mg QD and 200 mg BID fenebrutinib groups showed significant differences versus placebo starting at Week 4. See FIG. 16.

TABLE 3

Parameter: DAS 28-3 (CRP)

|  | 50 mg QD (N = 40) | 150 mg QD (N = 109) | 200 mg QD (N = 110) | PBO (N = 110) | ADA (N = 111) |
| --- | --- | --- | --- | --- | --- |
| Week 12 |  |  |  |  |  |
| n | 37 | 97 | 97 | 102 | 106 |
| Adjusted Mean | −1.54 | −1.74 | −1.75 | −1.18 | −1.94 |
| Difference (d) | −0.36 | −0.57 | −0.57 |  | −0.76 |
| 95% C.I. of Difference | (−0.84, 0.12) | (−0.92, −0.22) | (−0.92, −0.02) |  | (−1.10, −0.41) |
| p-Value | 0.2079 | 0.0003 | 0.0003 |  | <.0001 |

Figure 17:
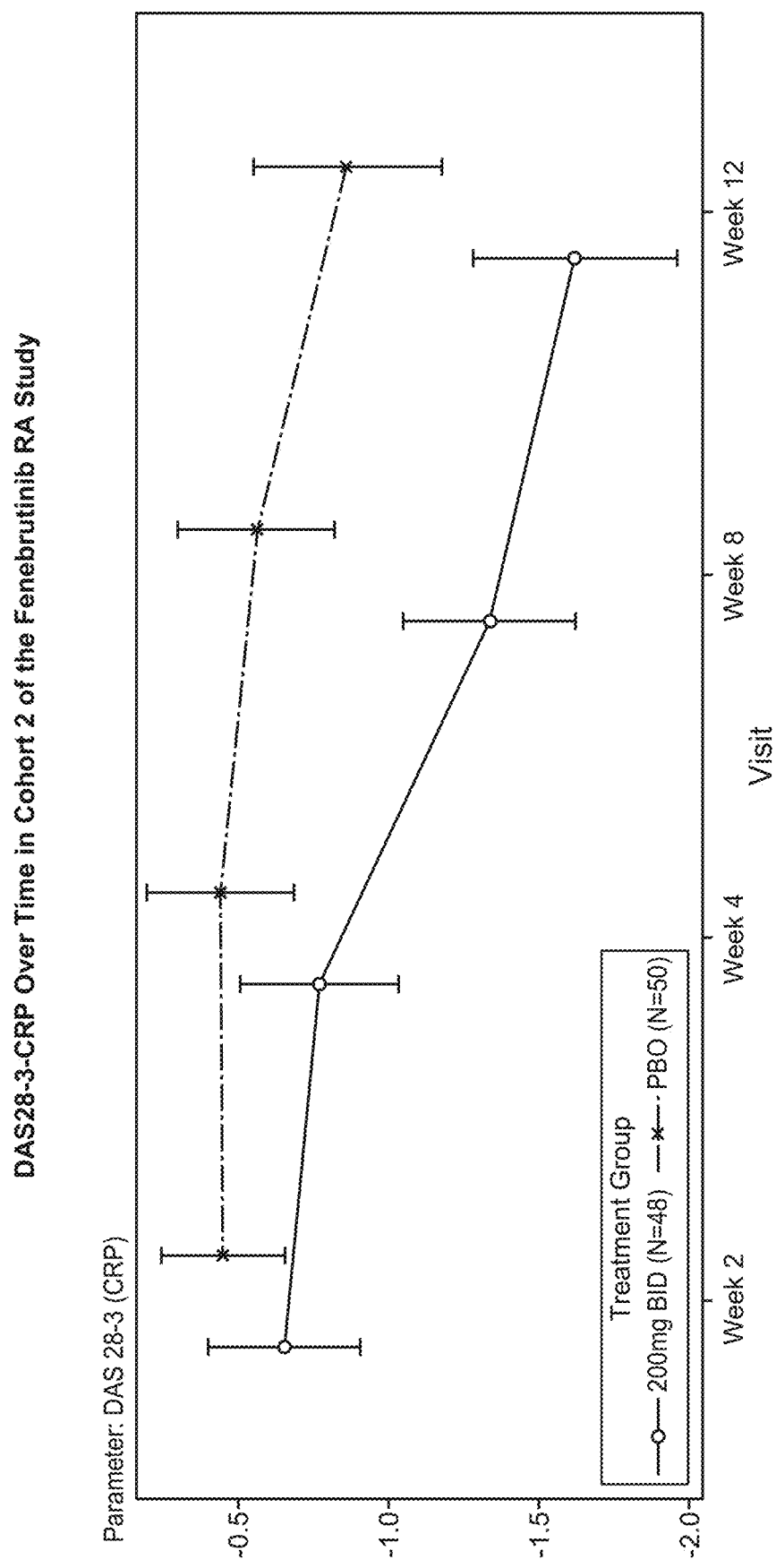
FIG. 17 shows DAS28-3-CRP scores over time in Cohort 2 of the fenebrutinib RA study of Example 1.

Statistically significant DAS28 improvement versus placebo were observed in the 200 mg BID fenebrutinib arm of Cohort 2, as measured by the DAS28-3-CRP score as shown in Table 4. The fenebrutinib group showed significant differences versus placebo starting at Week 2. See FIG. 17.

TABLE 4

| Parameter: DAS 28-3 (CRP) | | |
| --- | --- | --- |
| | 200 mg BID (N = 48) | PBO (N = 50) |
| Week 12 | | |
| n | 47 | 44 |
| Adjusted Mean | −1.96 | −1.20 |
| Difference (d) | −0.76 | |
| 95% C.I. of Difference | (−1.14,−0.37) | |
| p-Value | 0.0002 | |

Figure 18:
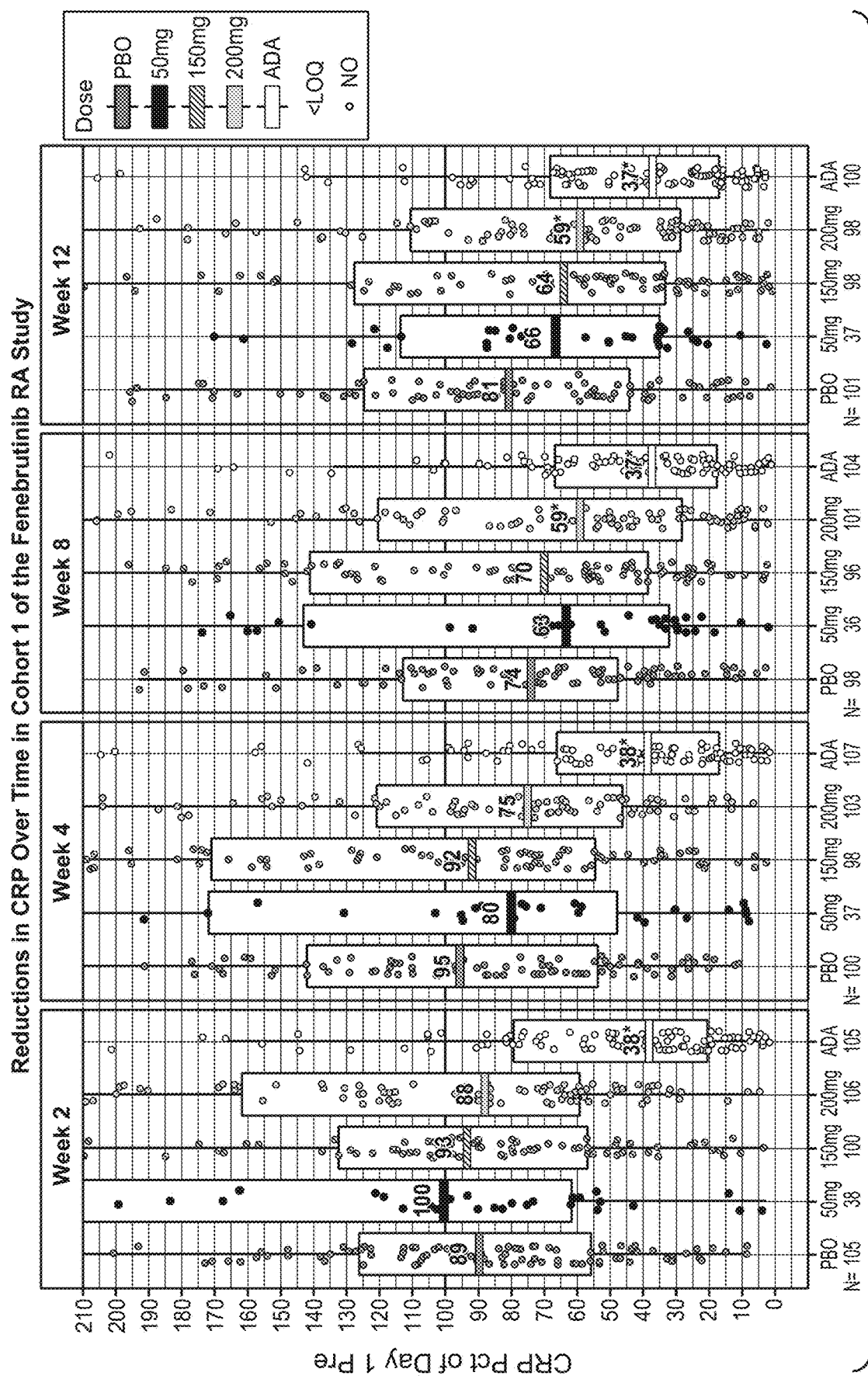
FIG. 18 shows reductions in CRP over time in Cohort 1 of the fenebrutinib RA study of Example 1.

Clinically and statistically significant reductions in CRP versus baseline were observed by Week 8 in the 200 mg BID arm of the fenebrutinib arm of Cohort 1 (59% of BL CRP at Week 8 and Week 12). Cohort 2 also showed reduced CRP levels at Week 8 and Week 12 in the fenebrutinib group. See FIG. 18 and FIG. 25D.

Figure 19:
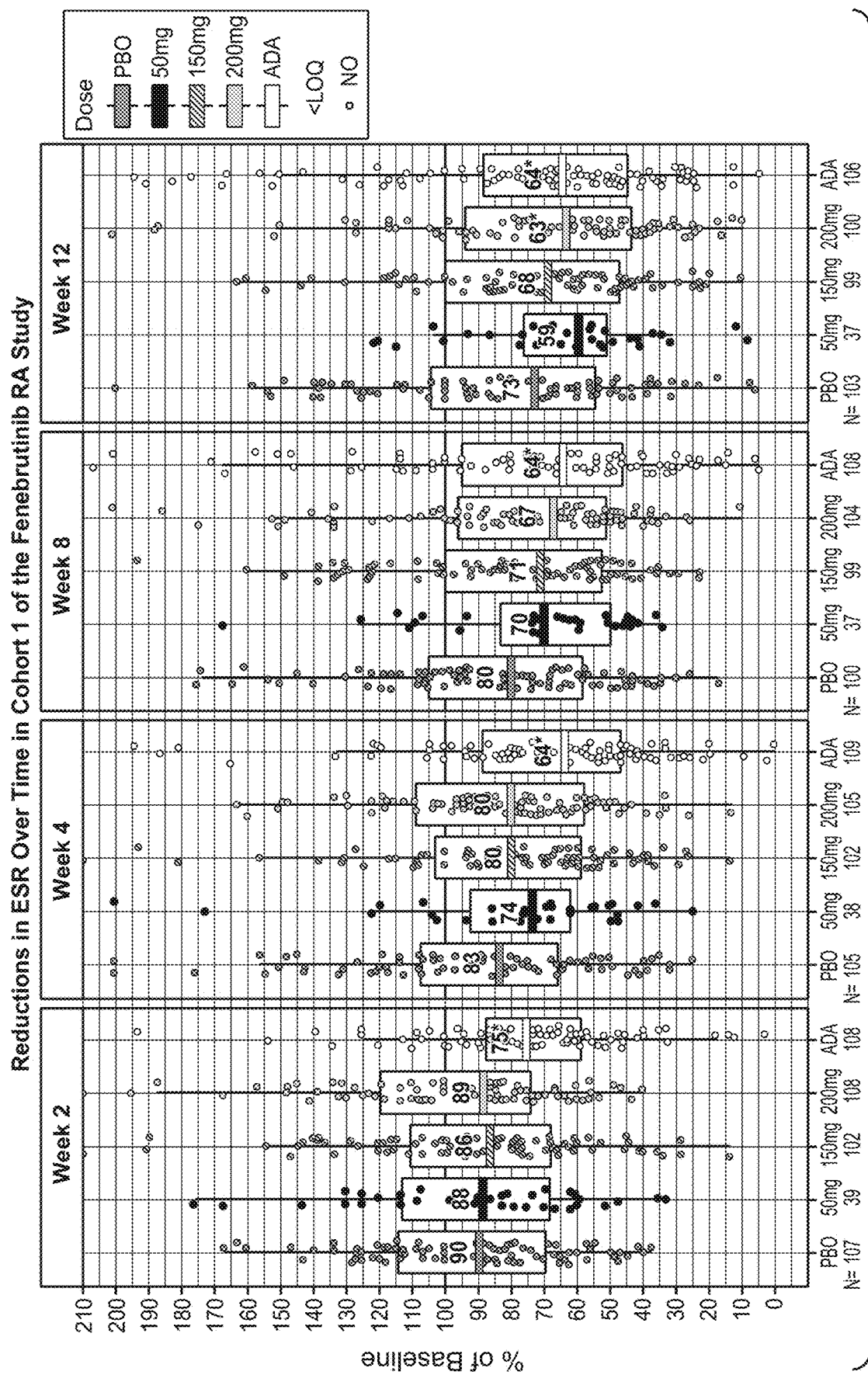
FIG. 19 shows reductions in ESR over time in Cohort 1 of the fenebrutinib RA study of Example 1.

Clinically and statistically significant reductions in ESR versus baseline were observed by Week 12 in the 200 mg BID arm of the fenebrutinib arm of Cohort 1 (63% of BL ESR at Week 12). Cohort 1 also showed reduced ESR levels at Weeks 2, 4 and 8 in the fenebrutinib group. Cohort 2 showed reduced ESR levels at Week 8 and Week 12 in the fenebrutinib group. See FIG. 19 and FIG. 25C.

Myeloid-enriched biomarker CCL4 was reduced in all fenebrutinib treatment groups of Cohort 1 relative to placebo starting at Week 2 as shown in Table 5. Similar results were seen in Cohort 2.

TABLE 5

| CCL4 Reduction as % of Baseline | | | | |
| --- | --- | --- | --- | --- |
| 50 mg QD fenebrutinib | 150 mg QD fenebrutinib | 200 mg BID fenebrutinib | Placebo | ADA |
| Week 2 | 78%* | 73%* | 71%* | 98% | 66%* |
| Week 4 | 84%* | 79%* | 74%* | 93% | 65%* |
| Week 12 | 78%* | 86%* | 76%* | 94% | 63%* |

*indicates statistically significant result.

Figure 23A:
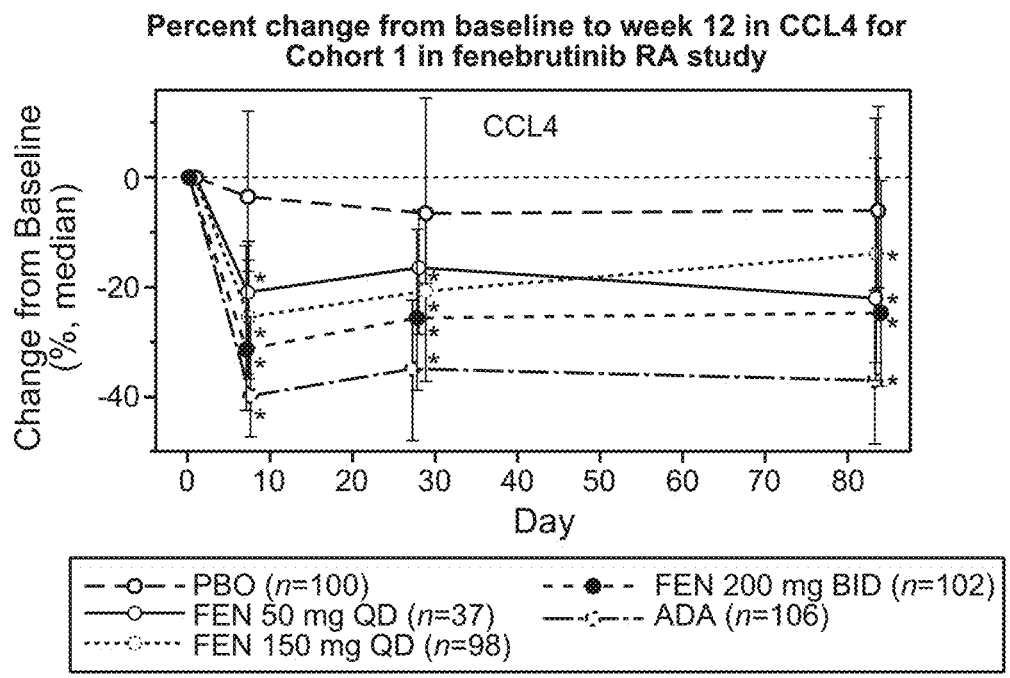
FIGS. 23A-23D show percent change from baseline to week 12 in CCL4 (FIG. 23A), IL-6 (FIG. 23B), CD19+ B cells (FIG. 23C), and CD3+ T cells (FIG. 23D) for Cohort 1 in the fenebrutinib RA study of Example 1. Significance versus placebo is indicated by *.
Figure 28A:
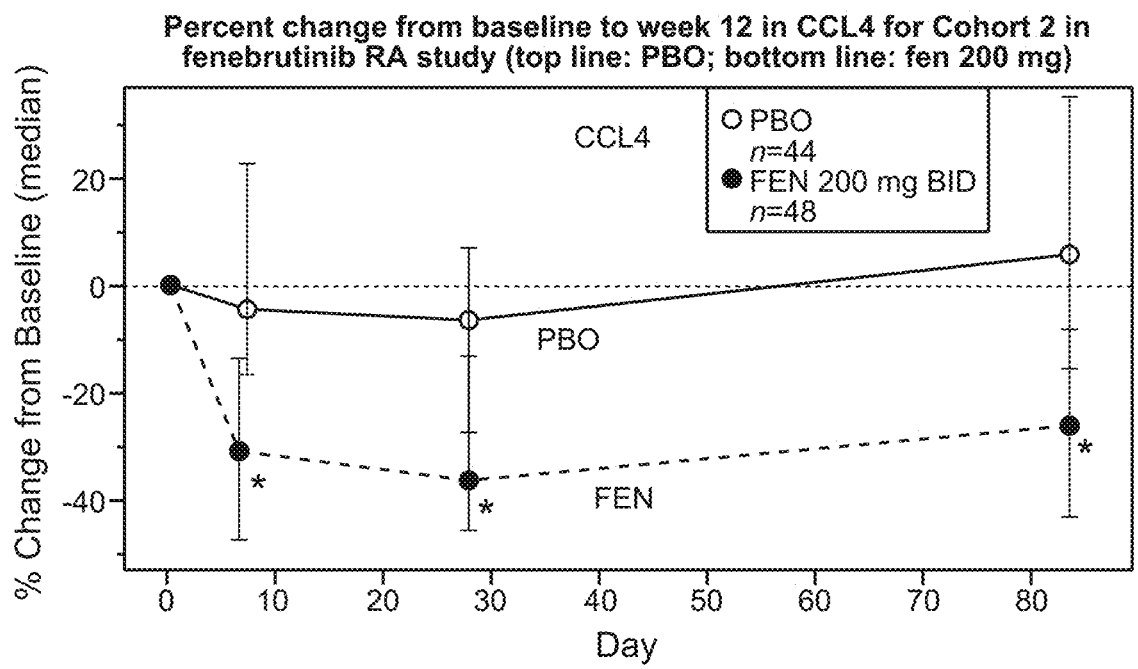
FIGS. 28A-28D show percent change from baseline to week 12 of CCL4 (FIG. 28A), IL-6 (FIG. 28B), CD19+ B cells (FIG. 28C), and CD3+ T cells (FIG. 28D) from Cohort 2 of the fenebrutinib RA study of Example 1. Significance versus placebo is indicated by *.

All doses of fenebrutinib reduced CCL4 levels by week 1 compared to placebo in cohorts 1 (FIG. 23A) and 2 (FIG. 28A). The largest reduction relative to placebo in cohort 1 was observed in the fenebrutinib 200 mg twice daily group (−28%). In cohort 1, adalimumab treatment reduced CCL4 levels by −36% relative to placebo. Reductions of CCL4 with adalimumab were in comparison to fenebrutinib treatment groups at weeks 4 and 12.

Figure 23B:
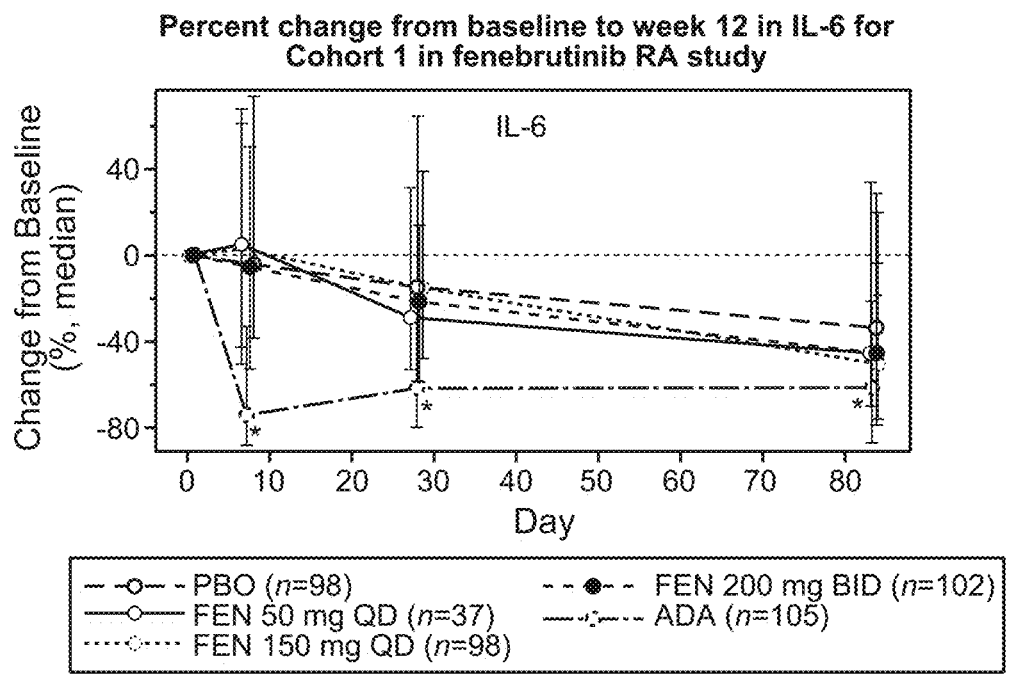
Figure 28B:
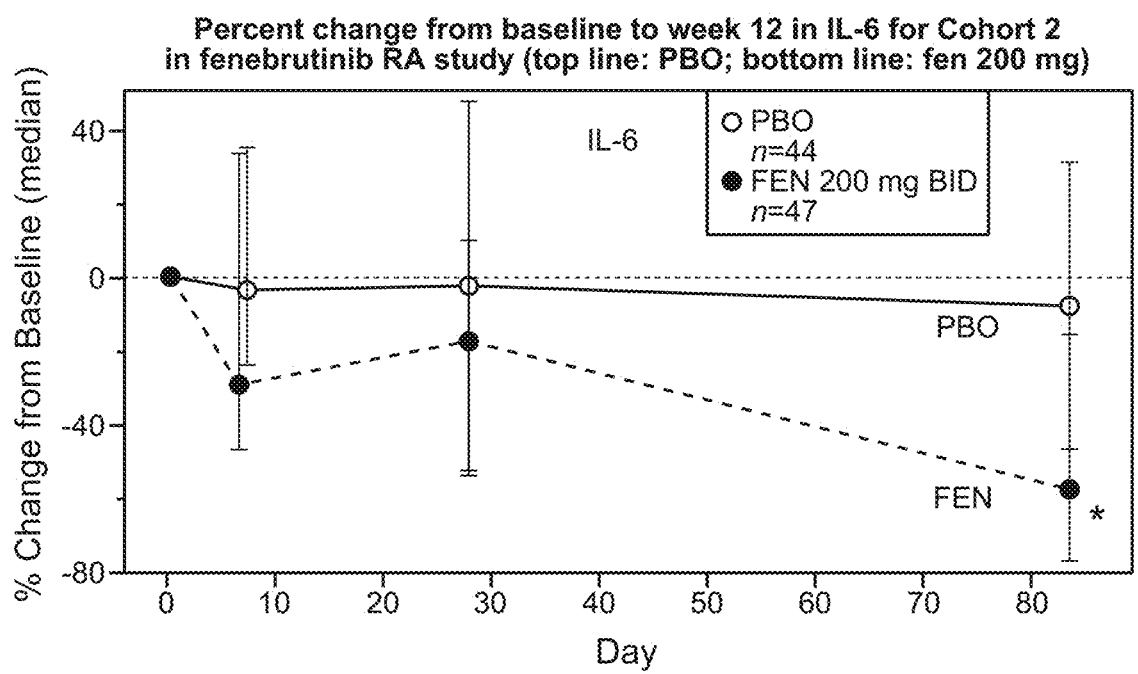

In Cohort 2, 200 mg twice daily fenebrutinib reduced IL-6 levels (−50%) relative to placebo by week 12 (FIG. 28B). This reduction was not observed in Cohort 1 (FIG. 23B). TL1A was not detectable in patient samples tested (n=33).

Total IgM was reduced in all fenebrutinib treatment groups of Cohort 1 relative to placebo and treatment with ADA, starting at Week 4 as shown in Table 6.

TABLE 6

| Total IgM Reduction as % of Baseline | | | | |
| --- | --- | --- | --- | --- |
| 50 mg QD fenebrutinib | 150 mg QD fenebrutinib | 200 mg BID fenebrutinib | Placebo | ADA |
| Week 4 | 94% | 91%* | 92%* | 98% | 100% |
| Week 8 | 91%* | 88%* | 86%* | 98% | 100% |
| Week 12 | 88%* | 86%* | 84%* | 100% | 103% |

*indicates statistically significant result.

Total IgG was reduced in the mid to high dose fenebrutinib treatment groups of Cohort 1 relative to placebo and treatment with ADA, starting at Week 4 as shown in Table 7.

TABLE 7

| Total IgG Reduction as % of Baseline | | | |
| --- | --- | --- | --- |
| 150 mg QD fenebrutinib | 200 mg BID fenebrutinib | Placebo | ADA |
| Week 4 | 97%* | 95%* | 100% | 100% |
| Week 8 | 94%* | 92%* | 99% | 105% |
| Week 12 | 95%* | 93%* | 101% | 107% |

*indicates statistically significant result.

Figure 22A:
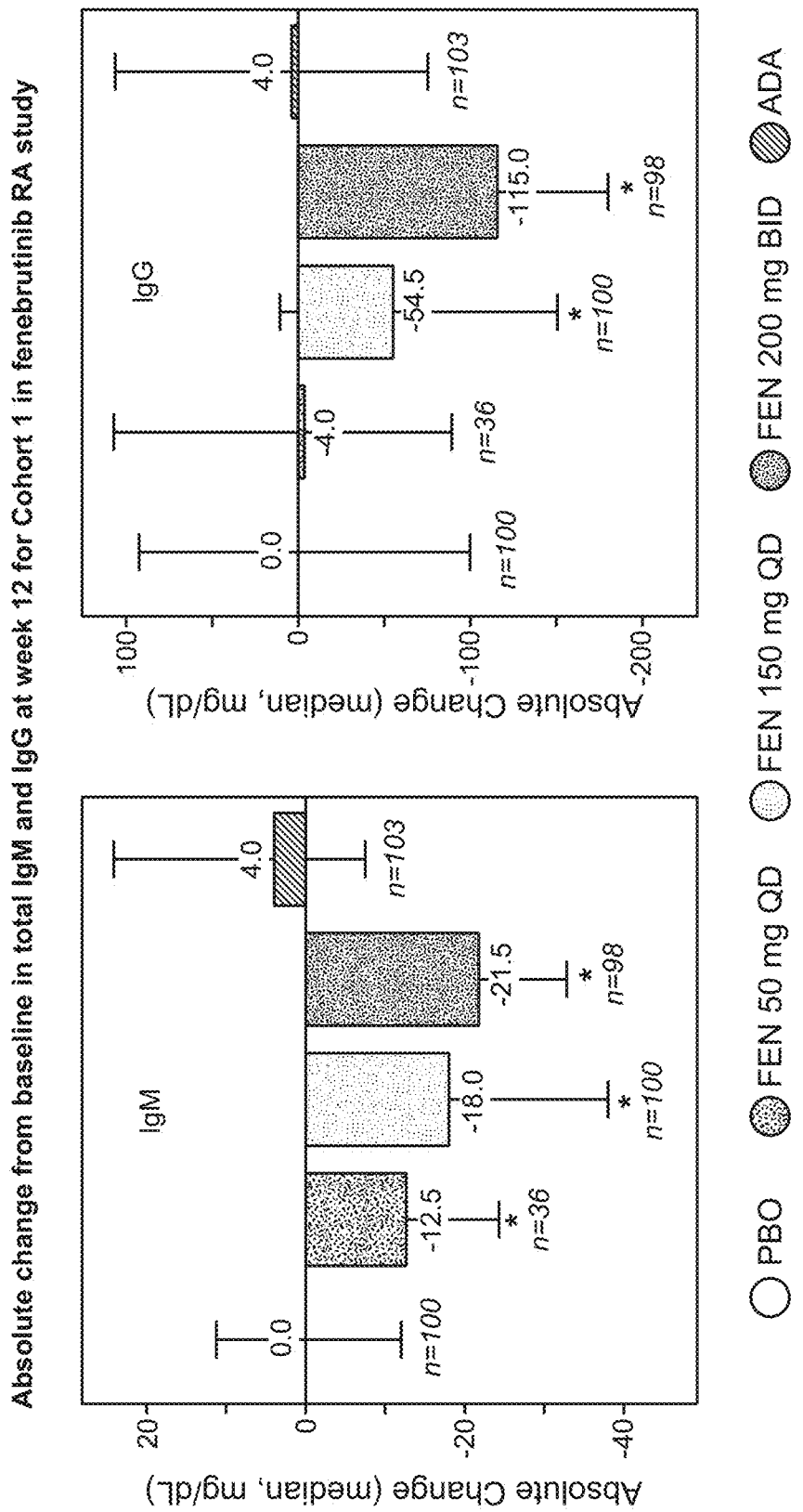
FIGS. 22A-22B show absolute change from baseline in total IgM and IgG (FIG. 22A), and percent change from baseline in levels of rheumatoid factor (RF) and ACPA (FIG. 22B) at week 12 for Cohort 1 in the fenebrutinib RA study of Example 1. Significance versus placebo is indicated by *. X axis in each graph from left to right: PBO, 50 mg QD, 150 mg QD, 200 mg BID, ADA.
Figure 22B:
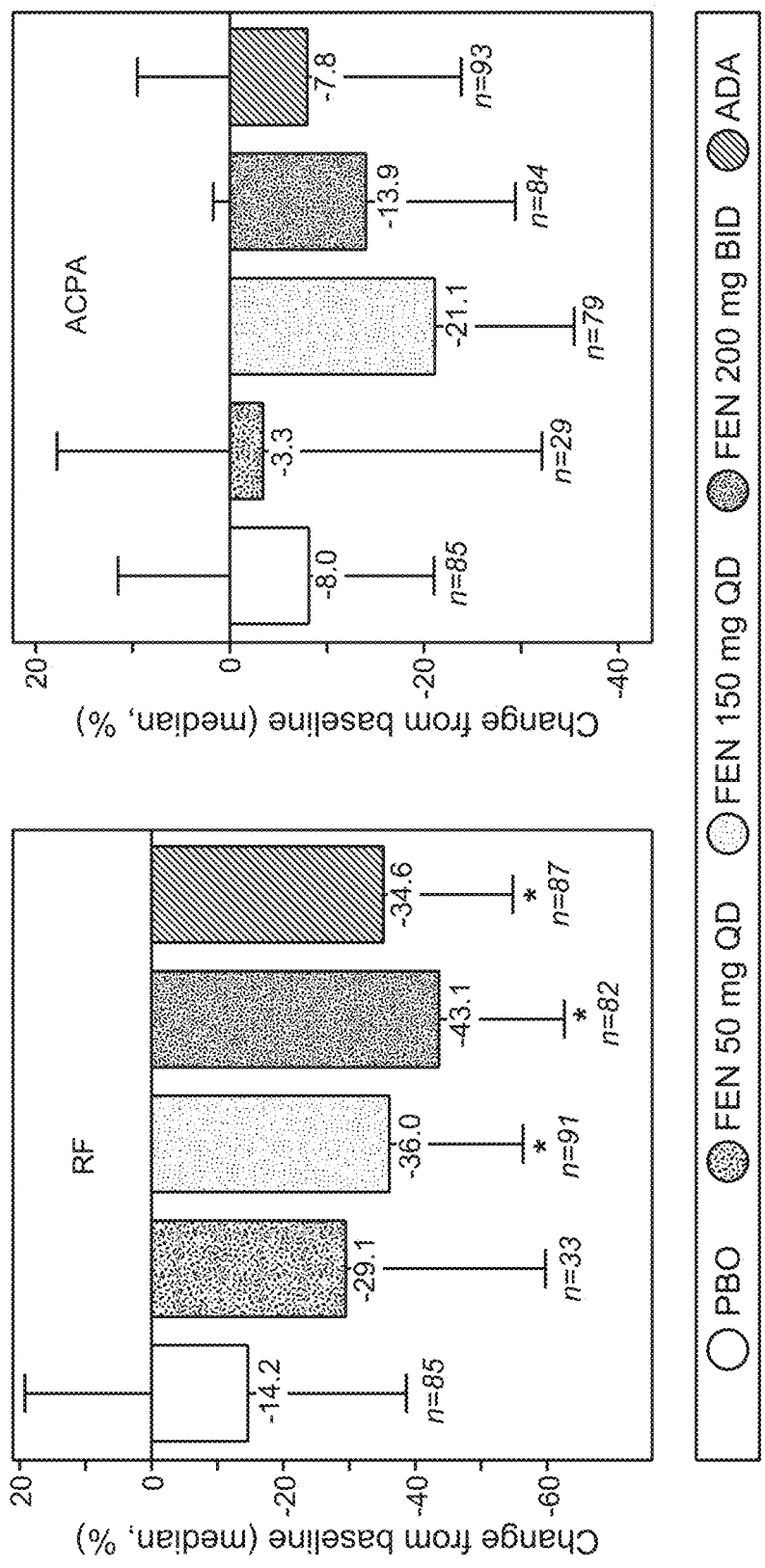
Figure 27:
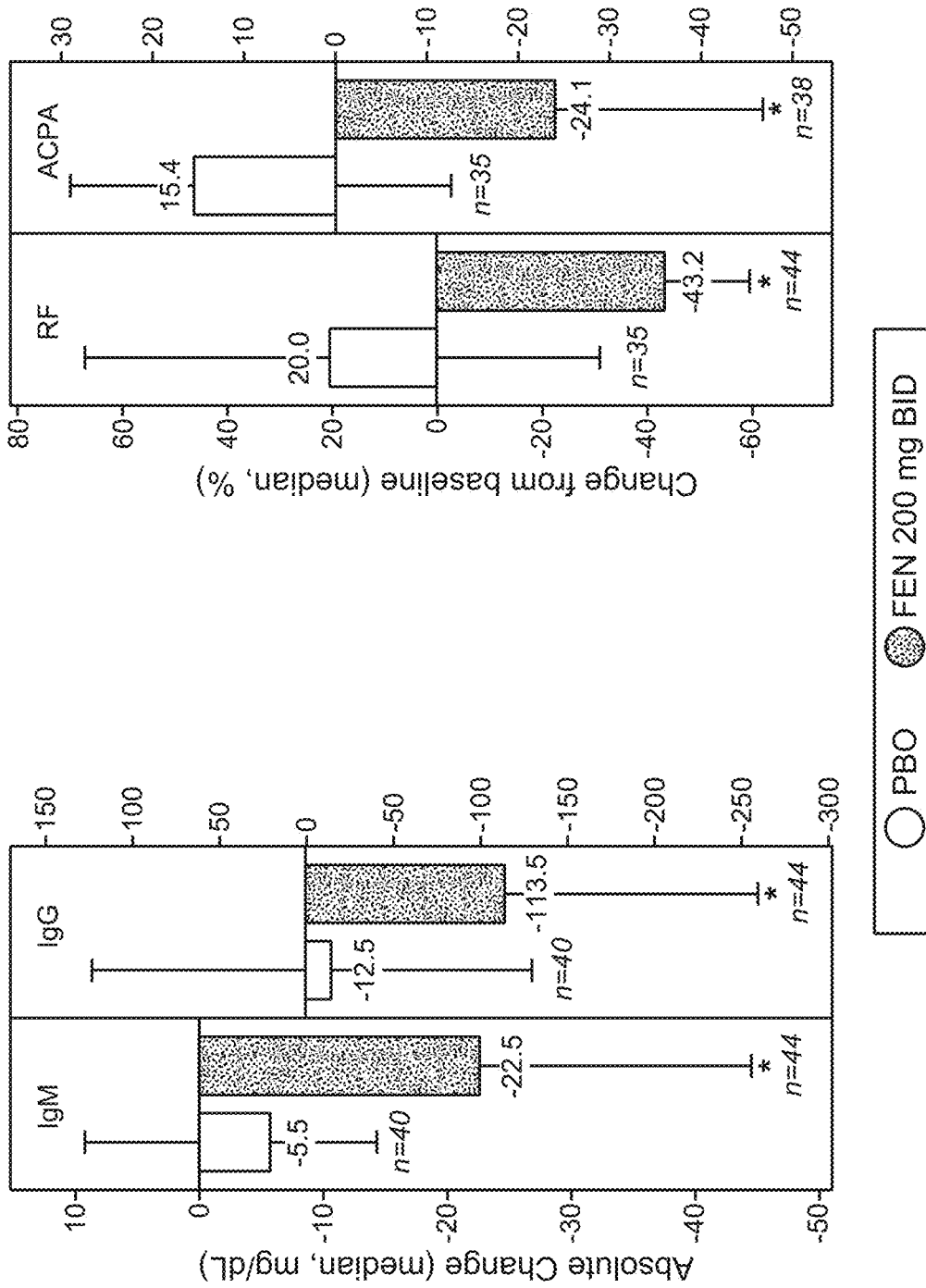
FIG. 27 shows absolute change from baseline in IgM and IgG (left), and percent change from baseline in rheumatoid factor (RF) and ACPA (right) at week 12 for Cohort 2 of the fenebrutinib RA study of Example 1. Significance versus placebo is indicated by *.

Rheumatoid factor (RF) IgM autoantibody levels were significantly reduced by fenebrutinib treatment by Week 12 (66% in 150 mg QD arm; 64% in 200 mg BID arm; 92% placebo). The largest reductions in total IgM, IgG, and RF IgM were observed in the fenebrutinib 200 mg twice daily groups in cohorts 1 and 2. In cohort 1, treatment with fenebrutinib 200 mg twice daily resulted in a median reduction of −29% for RF IgM relative to placebo by week 12. Absolute reductions in immunoglobulin levels were −22 mg/dL for total IgM and −115 mg/dL for IgG with fenebrutinib 200 mg twice daily relative to placebo by week 12 in cohort 1. By week 12, cohort 2 patients treated with fenebrutinib 200 mg twice daily had similar reductions in total IgM and IgG (−17 and −101 mg/dL, respectively, relative to placebo). Total IgM, IgG, and RF IgM are also summarized in FIGS. 22A-22B and 27. Adalimumab treatment (cohort 1) reduced RF IgM levels-20% relative to placebo by week 12 (FIG. 22B, left) but did not reduce total IgM or IgG levels (FIG. 22A). ACPA IgG levels trended downward with fenebrutinib treatment, but were not significantly changed relative to placebo in cohort 1 (FIG. 22B, right). In contrast, by week 12, ACPA IgG levels were reduced by −24% with fenebrutinib 200 mg twice daily compared to +15% in the placebo group in cohort 2 (FIG. 27).

B Cell chemokine CXCL13 was reduced in all fenebrutinib treatment groups of Cohort 1 relative to placebo starting at Week 4 as shown in Table 8. Similar results were seen in Cohort 2.

TABLE 8

| CXCL13 Reduction as % of Baseline | | | | |
| --- | --- | --- | --- | --- |
| 50 mg QD fenebrutinib | 150 mg QD fenebrutinib | 200 mg BID fenebrutinib | Placebo | ADA |
| Week 4 | 63%* | 65%* | 67%* | 90% | 49%* |
| Week 12 | 62%* | 58%* | 62%* | 84% | 46%* |

*indicates statistically significant result.

Figure 23C:
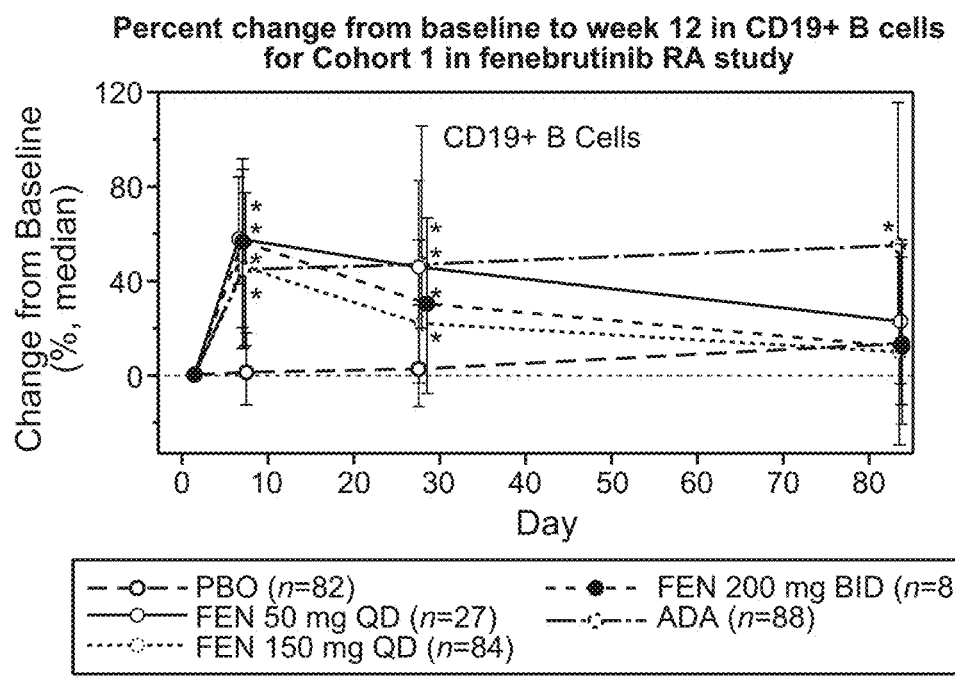
Figure 23D:
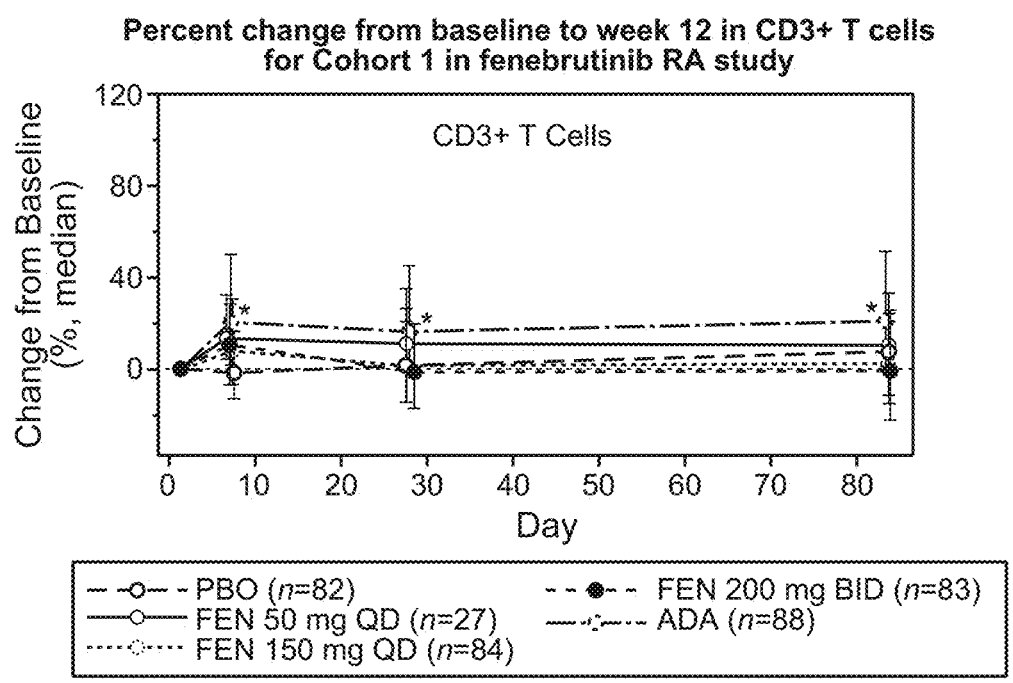
Figure 28C:
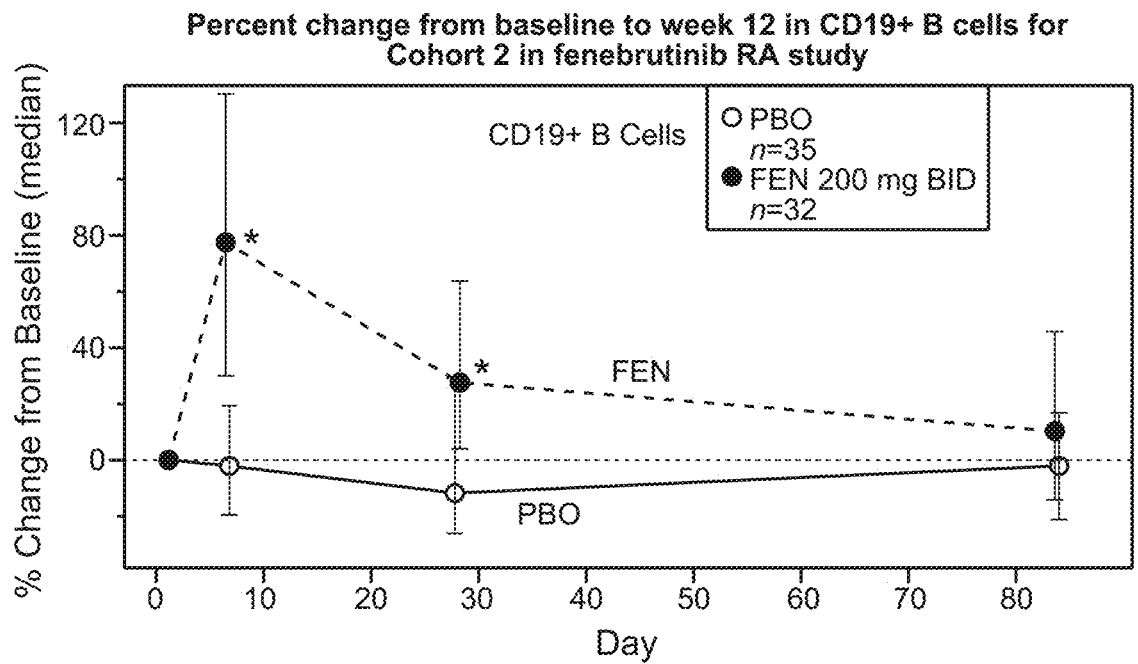
Figure 28D:
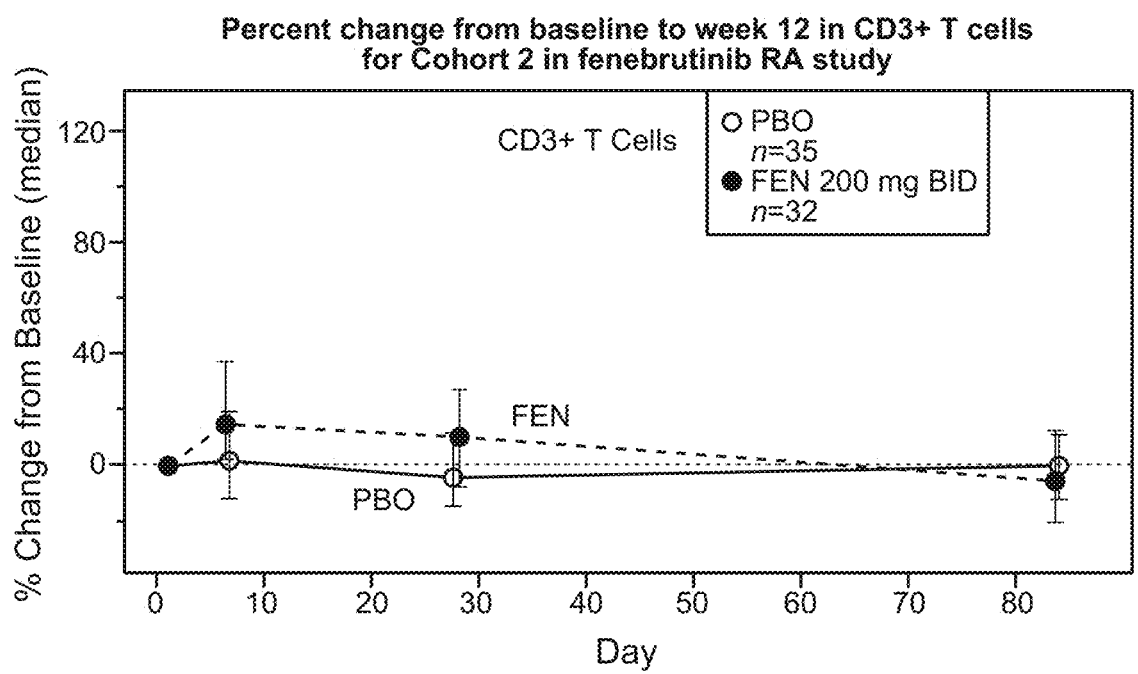

The percent change in $CD19^+$ B cells and $CD3^+$ T cells compared to baseline is shown in FIGS. 23C and 23D, respectively, for cohort 1, and FIGS. 28C and 28D, respectively, for cohort 2 (for all figures, significance versus placebo is indicated by *). By week 1, a transient increase of peripheral $CD19^+$ B cells occurred with fenebrutinib treated groups (45-79% relative to placebo) in cohort 1 and cohort 2, with levels returning towards pre-treatment ranges by week 12 (−4-13% relative to placebo). The $CD3^+$ T cells were numerically higher at week 1 following fenebrutinib treatment relative to placebo (+10-15%) in cohort 1 and cohort 2.

Figure 29A:
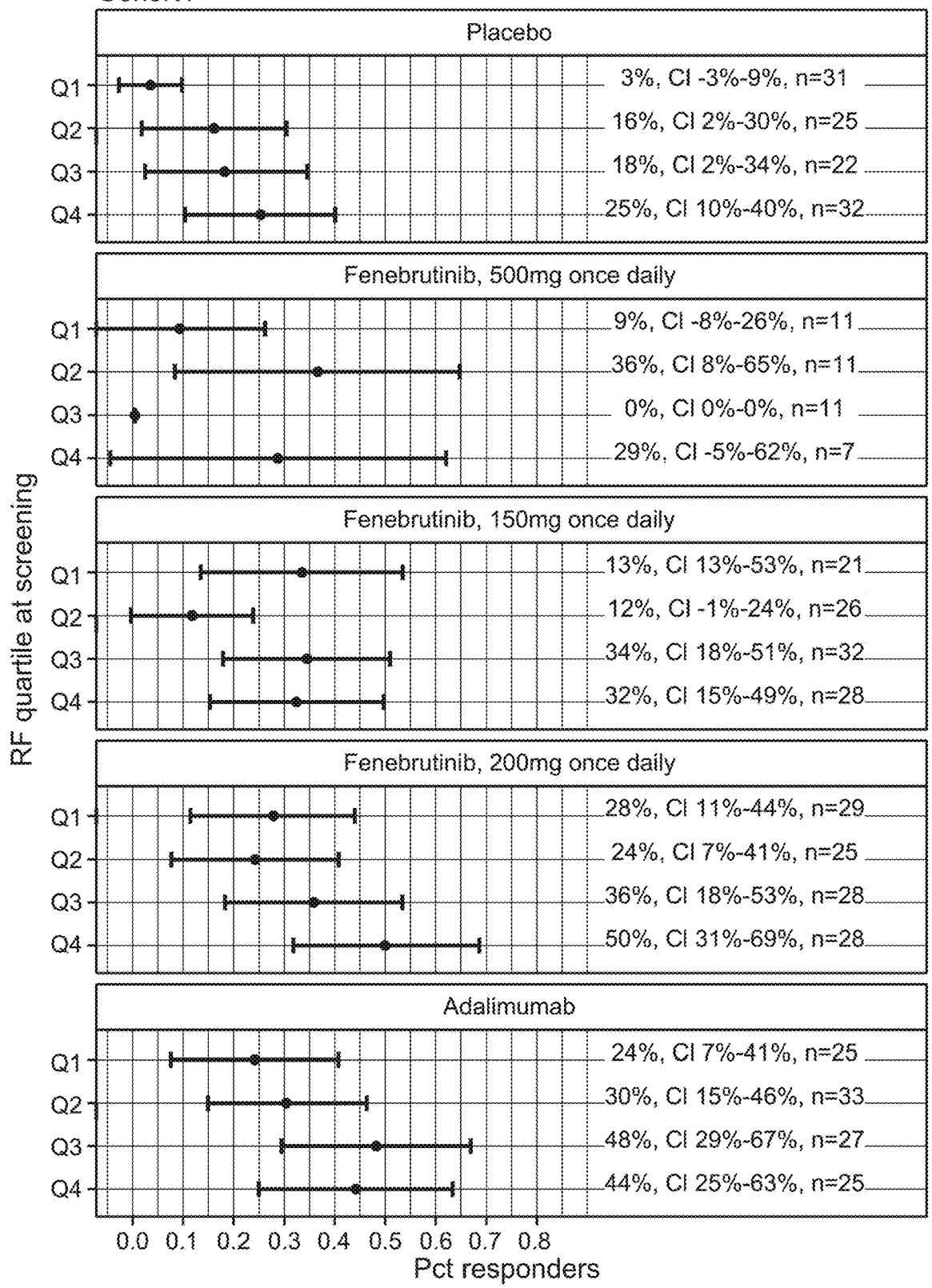
FIGS. 29A-29B show ACR50 response rate at week 12 as a function of baseline rheumatoid factor (RF) level, by quartile, for Cohort 1 (FIG. 29A) and Cohort 2 (FIG. 29B) of the fenebrutinib RA study of Example 1.
Figure 29B:
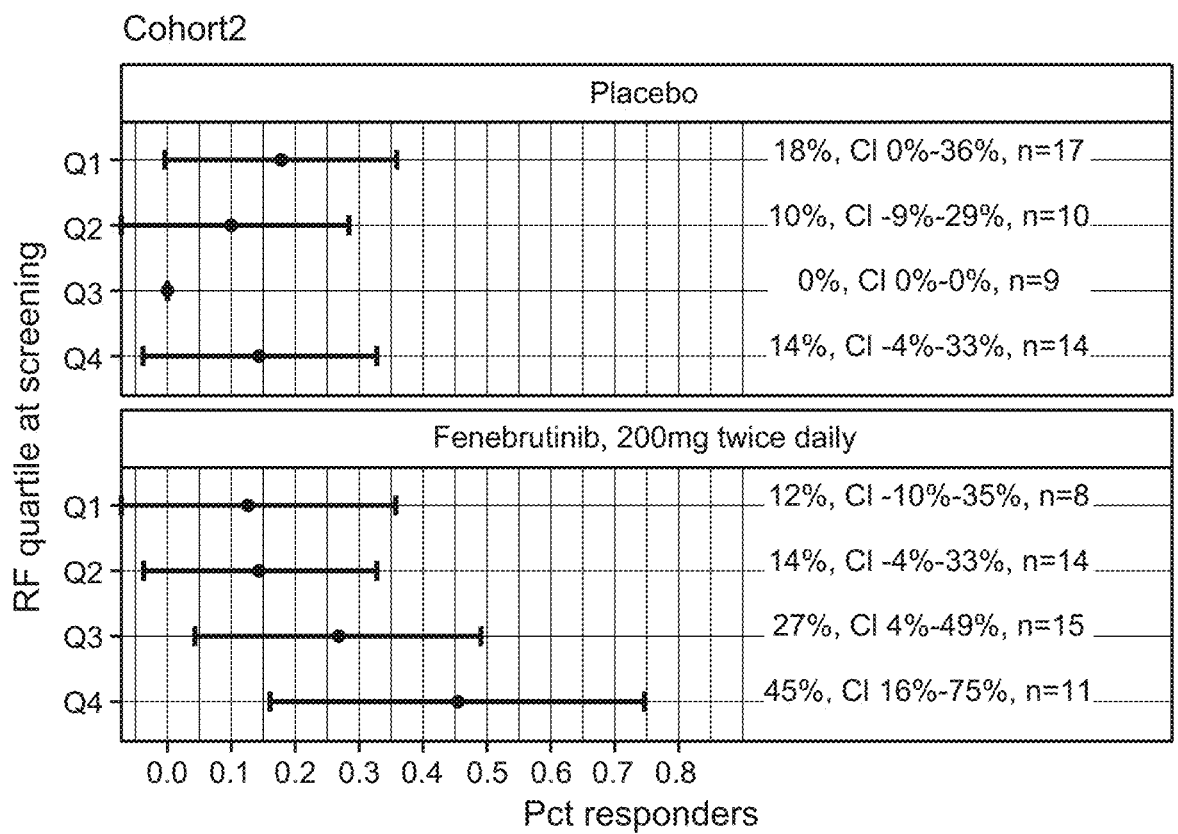

Regarding seropositive status screening, higher baseline levels of RF were associated with an increase in the proportion of ACR50 responders in the fenebrutinib 200 mg twice daily group in both cohorts. See FIGS. 29A-28B.

While the overall safety profile of fenenbrutinib in this study was comparable to placebo and ADA, there were numerically more Grade 3 LFT elevations in the fenebrutinib arms. The result suggested that monitoring liver function in patients receiving fenebrutinib may be warranted.

Dose simulations based on the patient population of this study indicated that a potential optimal range of fenebrutinib doses range from 200-400 mg QD or 100-200 mg BID. In addition to the doses explored in this study, a dose of 200 mg QD or 100 mg BID may be desired.

Overall, this study demonstrated that treatment with fenebrutinib helped patients with moderate to severe RA as compared to placebo. Meaningful improvements in clinical responses were observed in methotrexate-refractory patients receiving fenebrutinib compared to those who received placebo, as reflected by ACR50 scores at week 12. Treatment with fenebrutinib lead to better treatment outcomes compared to placebo in patients who had previously failed TNF inhibitor therapy.

Fenebrutinib treatment modified levels of both B cell and myeloid biomarkers. Fenebrutinib reduced ESR, CRP, and IL-6 levels relative to placebo; this effect was apparent after 8 to 12 weeks of treatment, which may be due to a delayed effect of BTK inhibition on systemic inflammation.

The reductions in autoantibodies indicate that fenebrutinib can affect autoreactive B cells; however, this effect on autoreactive B cells was not accompanied by a reduction in B cells. The initial effect of fenebrutinib on peripheral B cells results in a transient increase in peripheral B cell number, followed by an inhibitory effect on B cells as supported by subsequent decreases in the level of autoantibodies.

Without wishing to be bound by theory, the efficacy results of this study may reflect the direct effect of BTK inhibition on the development and proliferation of autoreactive B cells, a reduction in the underlying inflammatory pathology in rheumatoid arthritis mediated through the effect of BTK inhibition on myeloid cells, or a combination of both mechanisms Example 2

A Phase II, Multicenter, Randomized, Double-Blind, Placebo-Controlled Pilot and Dose-Ranging Study of Fenebrutinib in Patients with Refractory Chronic Spontaneous Urticaria (CSU)

This study was designed to evaluate the efficacy and safety of fenebrutinib compared with placebo as add-on therapy for the treatment of adult patients 18-75 years old who have been diagnosed with CSU and who remain symptomatic despite treatment with H1 antihistamines. Specific objectives and corresponding endpoints for the study are outlined below.
Study Objectives The study consists of two cohorts. The primary objective of Cohort 1 of this study was to evaluate the efficacy of orally administered 200 mg BID fenebrutinib as compared with placebo as add-on therapy to CSU patients who remain symptomatic despite treatment with H1 antihistamines.

The primary efficacy objective of Cohort 2 of this study was to evaluate the efficacy of fenebrutinib at three dose levels compared with placebo used as add-on therapy to CSU patients who remain symptomatic despite treatment with H1 antihistamines. The primary clinical endpoint is the UAS7 score at Week 8.

Secondary efficacy objectives of this study were the following:
To evaluate the proportion of patients who are well-controlled (UAS7≤6) at Day 57.
To evaluate the change in baseline in the UAS7 at Day 29 (Week 4).

Exploratory efficacy objectives of this study were the following:
Change from baseline in the weekly itch score at Day 29
Change from baseline in the weekly itch score at Day 57
Change from baseline in the weekly hives score at Day 57
Proportion of patients who are well controlled (UAS7≤6) at Day 29
Proportion of patients who achieve complete response (UAS7=0) at Day 29
Proportion of patients who achieve complete response (UAS7=0) at Day 57
Proportion of patients achieving MID in UAS7 at Day 57 (reduction from baseline ≥11 points)
Proportion of patients achieving MID in the weekly itch score at Day 57 (reduction from baseline ≥5 points)
Time to achieving MID in UAS7 (reduction from baseline ≥11 points)
Time to achieving MID in the weekly itch score (reduction from baseline ≥5 points)
Number of angioedema episodes
Use of rescue medication.
Change from baseline in the UCT score at Day 57

The safety objective for this study was to evaluate the safety of fenebrutinib as compared to placebo in patients with CSU who are refractory to antihistamines.

The pharmacokinetic objective for this study is to characterize the pharmacokinetics of fenebrutinib in patients by measuring plasma concentrations at specified time points. Exploratory PK objectives included the relationship between measures of drug exposure and pharmacodynamic effects, efficacy, and safety of fenebrutinib; the impact of selected covariates on measures of fenebrutinib exposure and/or response; and the impact of genetic polymorphisms on measures of fenebrutinib exposure.

The exploratory biomarker objectives for this study were to evaluate the effect of fenebrutinib on biomarkers to aid in defining its pharmacological activity or efficacy, and to evaluate the relationship between changes in biomarkers and efficacy (including but not limited to serum total tryptase, urine PGD2 and whole blood histamine).
Study Design This pilot and dose-ranging study is a multicenter, randomized, double-blind, placebo-controlled, parallel-group study of the efficacy and safety of fenebrutinib as add-on therapy for the treatment of adult patients 18-75 years old who have been diagnosed with CSU and who remain symptomatic despite treatment with H1 antihistamines (including doses up to 4 times the approved dose per local treatment guidelines). The study consists of two cohorts. Cohort 1 enrolled 41 patients across multiple sites. After screening, eligible patients were randomly allocated in a ~2:1 ratio to receive fenebrutinib 200 mg orally (PO) twice daily (BID) (n=28) or matching placebo (n=13) for 8 weeks and maintain stable doses of standard-of-care H1 antihistamine therapy throughout the study. A dose-ranging cohort, Cohort 2, enrolled approximately 120 patients randomly allocated in a 1:1:1:1 ratio received 50 mg PO daily (QD), 150 mg PO QD, 200 mg PO BID of GDC-0853, or placebo, respectively, for 8 weeks while maintaining stable doses of standard-of-care H1 antihistamine therapy throughout the study.

Both cohorts consist of three study periods over 14 weeks: (i) a screening period (Day −14 to Day −1), (ii) a treatment period [Day 1 to Day 57 (Week 0 to Week 8)], and (iii) a follow-up period [Day 57 to Day 85 (Week 8 to Week 12)].

Patients in both cohorts have a screening period of approximately 2 weeks to establish their eligibility for the study and baseline symptom scores. For the duration of the screening period, patients must maintain stable doses of their pre-screening combination therapy with standard-of-care H1 antihistamines (i.e., up to 4 times the approved dose per local treatment guidelines). The screening period will consist of visits at Day −14 and Day −7. Patients must have met all of the following criteria to enter the screening period:

Documented treatment with a regimen that includes standard-of-care H1 antihistamine for CSU at Day-14 and for at least the 3 consecutive days immediately prior to Day −14

Willing and able to complete a symptom electronic diary (Urticaria Patient Daily eDiary) twice daily throughout the screening period to establish the patient's Urticaria Activity Score over 7 days (UAS7) score.

To be eligible for randomization in both cohorts, for the 7 days prior to randomization, patients must have had 7 consecutive days of entries in the Urticaria Patient Daily eDiary and a UAS7 score of ≥16 (range: 0-42).

The primary efficacy endpoint was measured at Week 8 (Day 57). Patients must have maintained stable doses of their pre-randomization H1 antihistamine therapy throughout the treatment period. After completion of the 8-week treatment period, all patients in both cohorts will enter a 4-week safety follow-up period in which no fenebrutinib treatment is given as patients maintain stable doses of their pre-randomization H1 antihistamine therapy.

For the duration of the study, patients were able to use a single dose of loratadine (10 mg maximum) or cetirizine (10 mg maximum) within a 24-hour period as rescue medication if symptoms worsen. If rescue therapy is required, it should not exceed 4 times the approved dose per local treatment guidelines. Patients receiving 4 times the approved dose for background therapy should receive the alternate rescue medication. Patients should record the use of this medication in their eDiary.

Inclusion Criteria

Patients must meet the following criteria for study entry:

Willing to give written informed consent, adhere to the visit schedules, comply with the study drug regimen, and meet other study requirements Aged 18-75 years, inclusive Diagnosis of CSU refractory to H1 antihistamines at the time of randomization, as defined by all of the following:

The presence of itch and hives for >6 consecutive weeks at any time prior to enrollment despite current use of H1 antihistamines, consistent with standard of care (i.e., up to 4 times the approved dose per local treatment guidelines) during this time period UAS7 score ≥16 during the 7 days prior to randomization (Day 1)

Patients must have been on daily stable doses of H1 antihistamines, consistent with standard-of-care therapy for CSU starting at least 3 consecutive days immediately prior to the screening visit through Day 1 and must document current use on all visits.

CSU diagnosis for ≥6 months

Willing and able to complete an Urticaria Patient Daily eDiary for the duration of the study Completion of 7 days of the Urticaria Patient Daily eDiary entries in the 7 days prior to randomization No evidence of active or latent or inadequately treated infection with tuberculosis (TB) as defined by the following:

A negative QuantiFERON-TB-Gold® (QFT) performed (for German sites only: QFT is the preferred test) at the screening visit or within the 3 months prior to screening If QFT is unavailable, a negative Mantoux purified protein derivative (PPD) skin test as defined by the Centers for Disease Control and Prevention guidelines, may be performed at the screening visit or within the 3 months prior to screening-AND- Patients with a history of Bacille Calmette-Guérin (BCG) vaccination should be screened using the QFT test, only.

An indeterminate QFT test should be repeated.

A positive QFT test or two successive indeterminate QFT results should be considered a positive diagnostic TB test.

An indeterminate QFT test followed by a negative QFT test should be considered a negative diagnostic TB test.

For women of childbearing potential (including those who have had a tubal ligation): Agreement to remain abstinent (refrain from heterosexual intercourse) or use contraceptive methods that result in a failure rate of <1% per year during the treatment period and for at least 4 weeks after the last dose of study drug.

For men: agreement to remain abstinent (refrain from heterosexual intercourse) or use contraceptive measures and agreement to refrain from donating sperm.

Exclusion Criteria

Patients who met any of the following criteria were excluded from study entry:

Treatment with omalizumab or other monoclonal antibody therapies used to treat CSU within 4 months prior to screening or primary nonresponse to omalizumab Use of a non-biologic investigational drug or participation in an investigational study with a non-biologic drug within 30 days prior to study drug administration on Day 1 (or within 5 half-lives of the investigational product, whichever is greater)

Use of a biologic investigational therapy or participation in an investigational study involving biologic therapy within 90 days or 5 half-lives, whichever is greater, prior to study drug administration on Day 1

Previous treatment with fenebrutinib or other BTK inhibitors

Patients whose urticaria is solely due to physical urticaria

Other diseases with symptoms of urticaria or angioedema, including urticarial vasculitis, urticaria pigmentosa, erythema multiforme, mastocytosis, hereditary or acquired angioedema, lymphoma, or leukemia Atopic dermatitis, bullous pemphigoid, dermatitis herpetiformis, or other skin disease associated with itch such as psoriasis Routine (daily or every other day during 5 or more consecutive days) doses of the following medications within 30 days prior to screening: systemic or cutaneous (topical) corticosteroids (prescription or over the counter), hydroxychloroquine, methotrexate, cyclosporine, or cyclophosphamide Prior utilization of IV steroids for treatment of laryngeal angioedema IVIG or plasmapheresis within 30 days prior to screening History of anaphylactic shock without clearly identifiable avoidable antigen (e.g., due to food allergy)

Hypersensitivity to fenebrutinib or any component of the formulation

Major surgery within 8 weeks prior to screening or surgery planned prior to end of study (12 weeks after randomization)

Require any prohibited concomitant medications:
   Systemic or topical corticosteroids (prescription or over the counter), hydroxychloroquine, methotrexate, cyclosporine, or cyclophosphamide within 30 days prior to screening if used routinely (daily or every other day during 5 or more consecutive days)
   Doxepin within 30 days prior to screening
   Omalizumab or other monoclonal antibody therapies used to treat CSU within 4 months prior to screening
   IVIG within 30 days prior to screening
   Plasmapheresis within 30 days prior to screening
   LTRAs within 1 day prior to screening
   Astemizole, terfenadine, and ebastine within 1 day prior to screening History of live attenuated vaccine within 6 weeks prior to randomization or requirement to receive these vaccinations at any time during study drug treatment
   Seasonal influenza and H1N1 vaccination is permitted if the inactivated vaccine formulation is administered.

Evidence of clinically significant cardiac, neurologic, psychiatric, pulmonary, renal, hepatic, endocrine (including uncontrolled diabetes mellitus), metabolic, or GI disease that, in the investigator's opinion, would compromise the safety of the patient, interfere with the interpretation of the study results or otherwise preclude patient participation
   Any items that are cause for uncertainty must be reviewed with the Medical Monitor.

Uncontrolled disease states, such as asthma, psoriasis, or inflammatory bowel disease, where flares are commonly treated with oral or parenteral corticosteroids History of vasculitis Current liver disease Any known active infection (with the exception of fungal nail infections or oral herpes)

History of recurrent bacterial, viral, mycobacterial or fungal infections (defined as >2 similar episodes requiring anti-microbial treatment within the previous 12 months), with the exception of recurrent oral or genital herpes (herpes simplex virus 1/herpes simplex virus 2) or uncomplicated urinary tract infections in females.

Any history of opportunistic infections that, in the investigator or Sponsor's judgment, would raise safety concerns regarding the patient's participation in the study Any major episode of infection requiring hospitalization or treatment with IV antimicrobials within 8 weeks prior to and during screening or treatment with oral antimicrobials within 2 weeks prior to and during screening
   Antimicrobials include antifungal, antibacterial, and antiviral agents.

History of or currently active primary or secondary immunodeficiency, including known history of HIV infection Evidence of chronic and/or active hepatitis B or C
   Positive hepatitis B surface antigen (HBsAg) or hepatitis C serology (regardless of treatment status)
   Positive hepatitis B core antibody (HBcAb)

History of cancer, including hematologic malignancy and solid tumors, within 10 years before screening
   Basal or squamous cell carcinoma of the skin that has been excised and is considered cured and in situ carcinoma of the cervix treated with apparent success by curative therapy >1 year prior to screening are not exclusionary.

Women who are pregnant, nursing, or intending to become pregnant during the study or within 4 weeks after completion of the study For women of childbearing potential (including those who have had a tubal ligation): positive serum pregnancy test result at screening or on Day 1.

History of alcohol, drug (e.g., tetrahydrocannabinol, marijuana), or chemical abuse within the 12 months prior to screening as determined by the investigator Need for systemic anti-coagulation with warfarin, other oral or injectable anti-coagulants, or anti-platelet agents other than NSAIDs, aspirin, and other salicylates History of non-gallstone-related pancreatitis or chronic pancreatitis History of hospitalizations or transfusion for a GI bleed History of cerebrovascular accident (CVA) within 10 years or any history of hemorrhagic CVA History of spontaneous intracranial hemorrhage or history of traumatic intracranial hemorrhage within 10 years Known bleeding diathesis Screening 12-lead ECG that demonstrates clinically relevant abnormalities that may affect patient safety or interpretation of study results, including
   QT interval corrected using Fridericia's formula (QTcF) >440 ms demonstrated by at least two ECGs >30 minutes apart History of ventricular dysrhythmias or risk factors for ventricular dysrhythmias such as long QT syndrome and other genetic risk factors (e.g., Brugada syndrome), structural heart disease (e.g., severe left ventricular systolic dysfunction, severe left ventricular hypertrophy), coronary heart disease (symptomatic or with ischemia demonstrated by diagnostic testing, prior coronary artery bypass grafting, or coronary lesions >70% diameter stenosis that have not been or cannot be re-vascularized), clinically significant electrolyte abnormalities (e.g., hypokalemia, hypomagnesemia, hypocalcemia), or family history of sudden unexplained death or cardiac ion channel mutations (e.g., congenital long QT syndrome)

Current treatment with medications that are well known to prolong the QT interval (see https://crediblemeds(dot)org/index(dot)php/login/dlcheck) at doses that have a clinically meaningful effect on QT, as determined by the investigator; the investigator may contact the Sponsor for confirmation if needed Any condition possibly affecting oral drug absorption (e.g., gastrectomy, clinically significant diabetic gastroenteropathy, or certain types of bariatric surgery such as gastric bypass)
   Procedures such as gastric banding, that simply divide the stomach into separate chambers, are not exclusionary.

Any uncontrolled clinically significant laboratory abnormality that would affect safety, interpretation of study data, or the patient's participation in the study The following exclusion criteria are based on screening laboratory tests. Laboratory tests may be repeated once during the screening period unless otherwise indicated:

Creatinine >1.5 times the upper limit of normal (ULN; may be repeated if 1.5-2×ULN)

Creatinine clearance <70 mL/min/1.73 m² (may be repeated if 60-69 mL/min/1.73 m²) as estimated by the Cockcroft-Gault Equation ALT or AST>1.5 times ULN (may be repeated if 1.5-3×ULN)

Total bilirubin >ULN (may be repeated if 1-3×ULN)

Hemoglobin <11 g/dL (may be repeated if 10-10.9 g/dL)

ANC<1.5×10⁹/L (may be repeated if 1.2-1.5×10⁹/L)

Platelet count <100×10⁹/L (may be repeated if 80-100×10⁹/L)

IgG<500 mg/dL (should not be repeated)

Abnormalities in hepatic synthetic function tests (e.g., PT, INR, PTT, albumin) judged by the investigator to be clinically significant Clinical Assessments The primary efficacy endpoint was the change in baseline in the UAS7 at Week 8 (Day 57). The change in the UAS7 (Table 9) is a summation of the average daily (a.m./p.m.) scores on the UAS (range: 0-6), which is a composite diary score with numeric severity intensity ratings on a scale of 0-3 (0=none to 3=intense/severe) for two domains: the intensity of the itch and the number of wheals/hives. The UAS is recorded by the patient twice daily (morning and evening) in the patient Urticaria Patient Daily eDiary.

TABLE 9

Twice Daily Patient Assessment of CSU Disease Activity (UAS Scale)

| Score | Wheals (Hives) | Pruritus (Itch) |
| --- | --- | --- |
| 0 | None | None |
| 1 | Mild (1-6 hives/12 hour) | Mild |
| 2 | Moderate (7-12 hives/12 hour) | Moderate |
| 3 | Intense ( >12 hives/12 hour) | Severe |

Continuous longitudinal efficacy endpoints will be analyzed using a mixed model for repeated measures (MMRM) and descriptive statistics as appropriate. Additional model covariates will include baseline UAS7 and its interaction with visit. Missing data will be handled by the model under the missing-at-random assumption without need for imputation.

The secondary efficacy measurements are as described above in the "Study Objectives" section of this Example 2, and apply the UAS7 score and the weekly itch score measurement. Weekly itch scores are measured as part of the study patient's Urticaria Patient Daily eDiary.

Urticaria Patient Daily eDiary

Urticaria Patient Daily eDiary
General Instructions
Please answer each question to the best of your ability.
There are no right or wrong answers.
For each question, please choose the response that describes your experience.
Please pay close attention to the timeframe of interest. Some questions ask about the past 12 hours, while others ask about the past 24 hours.
Instructions for Counting the Number of Hives and Measuring the Size of the Largest Hive
Count each hive separately even if you have more than one hive grouped together with other hives.
Please use the ruler that you have been given to measure the size of your largest hive. If you need help, please have someone else take this measurement for you. Please do not measure a group of hives as one hive.

Today's Date
___  ___  ___
Day  Month  Year
Please complete this section every morning throughout the duration of the study. (Please circle only one response.)
1. Thinking about the past 12 hours, please record the severity of itch and the number of hives you may have had associated with your skin condition. Please count each hive separately even if you have more than one hive grouped together with other hives.

Itch (severity)
0 = none
1 = mild
2 = moderate
3 = severe

Hives (number)
0 = none
1 = between 1 and 6 hives
2 = between 7 and 12 hives
3 = greater than 12 hives This next question asks you to estimate the size of your largest hive in centimeters (cm). Please use the ruler that you have been provided with to make this measurement. If your largest hive is located on your back or in a place that is hard to reach, please have someone else take this measurement for you. When measuring the largest hive size, please do not measure a group of hives as one hive.

Largest Hive (size)
0 = none
1 = less than 1.25 centimeter (cm)
2 = between 1.25 centimeter (cm) and 2.5 centimeters (cm)
3 = greater than 2.5 centimeters (cm)

Today's Date
___  ___  ___
Day  Month  Year

Today's Date
___  ___  ___
Day  Month  Year
Please complete this section every evening throughout the duration of the study. (Please circle only one response.)
2. Thinking about the past 12 hours, please record the severity of itch and the number of hives you may have had associated with your skin condition. Please count each hive separately even if you have more one than one hive grouped together with other hives.

Itch (severity)
0 = none
1 = mild
2 = moderate
3 = severe

Hives (number)
0 = none
1 = between 1 and 6 hives
2 = between 7 and 12 hives
3 = greater than 12 hives Please complete this section twice each day (a.m. and p.m.) throughout the duration of the study (preferably at the same time each day).
(Please circle only one response.)
3. Please rate how much your hives or itch interfered with your sleep during the past 24 hours.
 0 No interference
 1 Mild, little interference with sleep
 2 Moderate, awoke occasionally, some interference with sleep
 3 Substantial, woke up often, severe interference with sleep
4. Please rate how much your hives or itch interfered with your daily activities during the past 24

Figure 20:
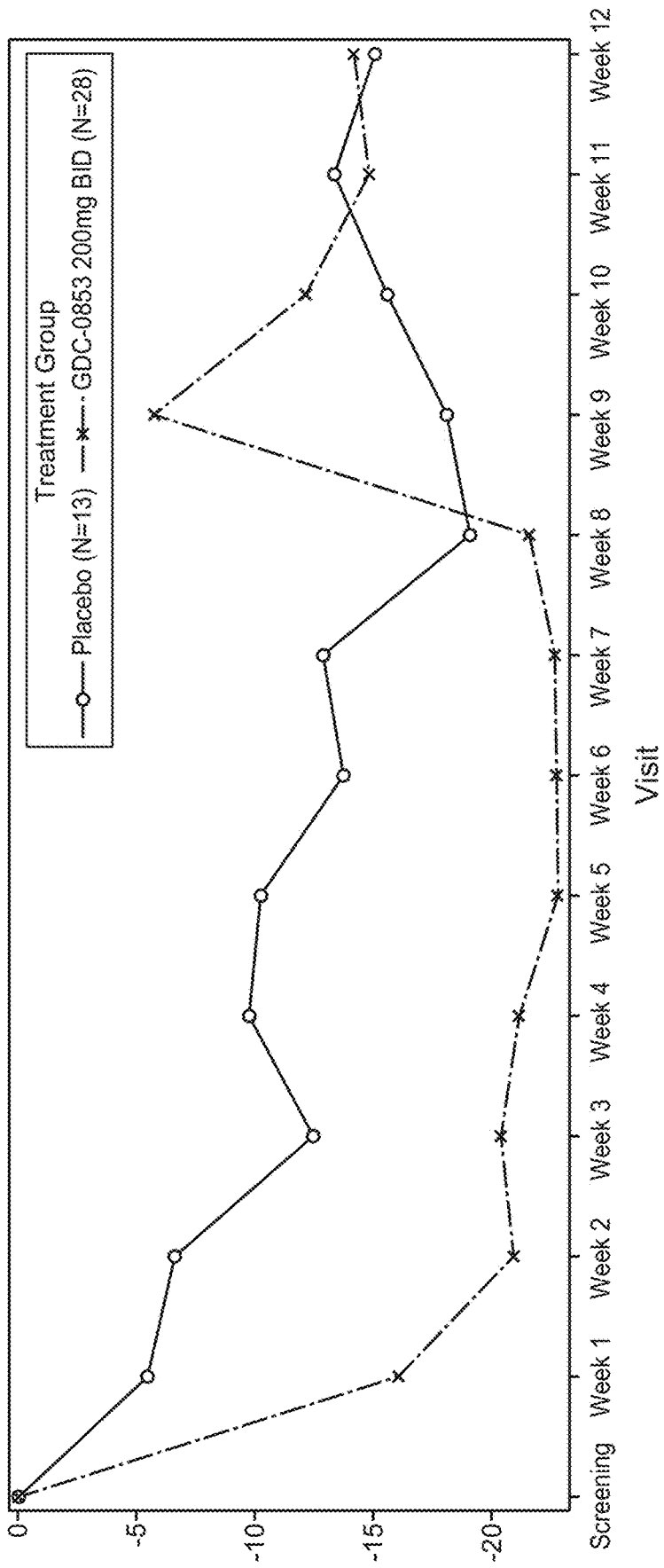
FIG. 20 shows UAS7 mean change over time from baseline in Cohort 1 of the fenebrutinib CSU study of Example 2.
Figure 21A:
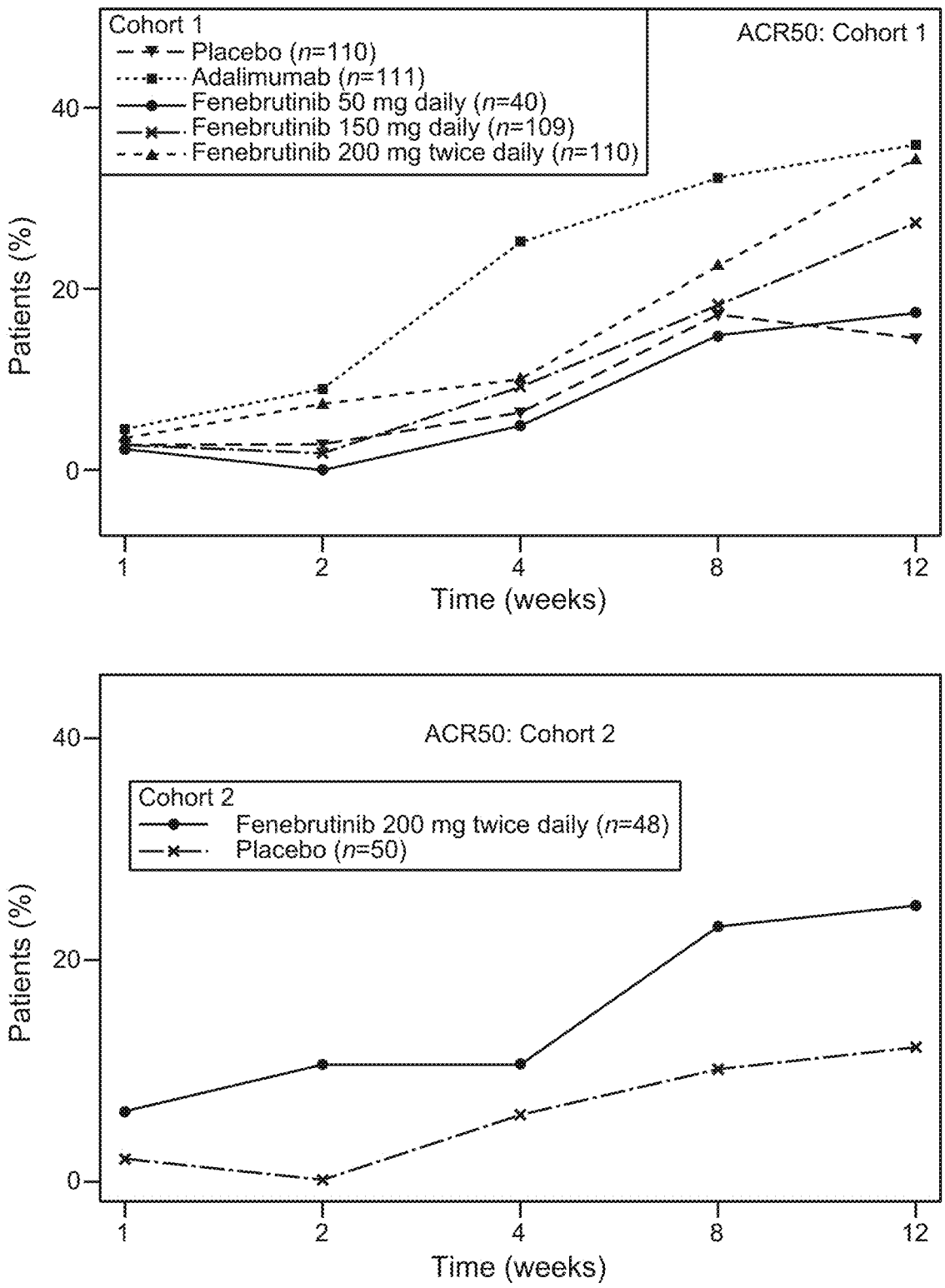
Figure 21C:
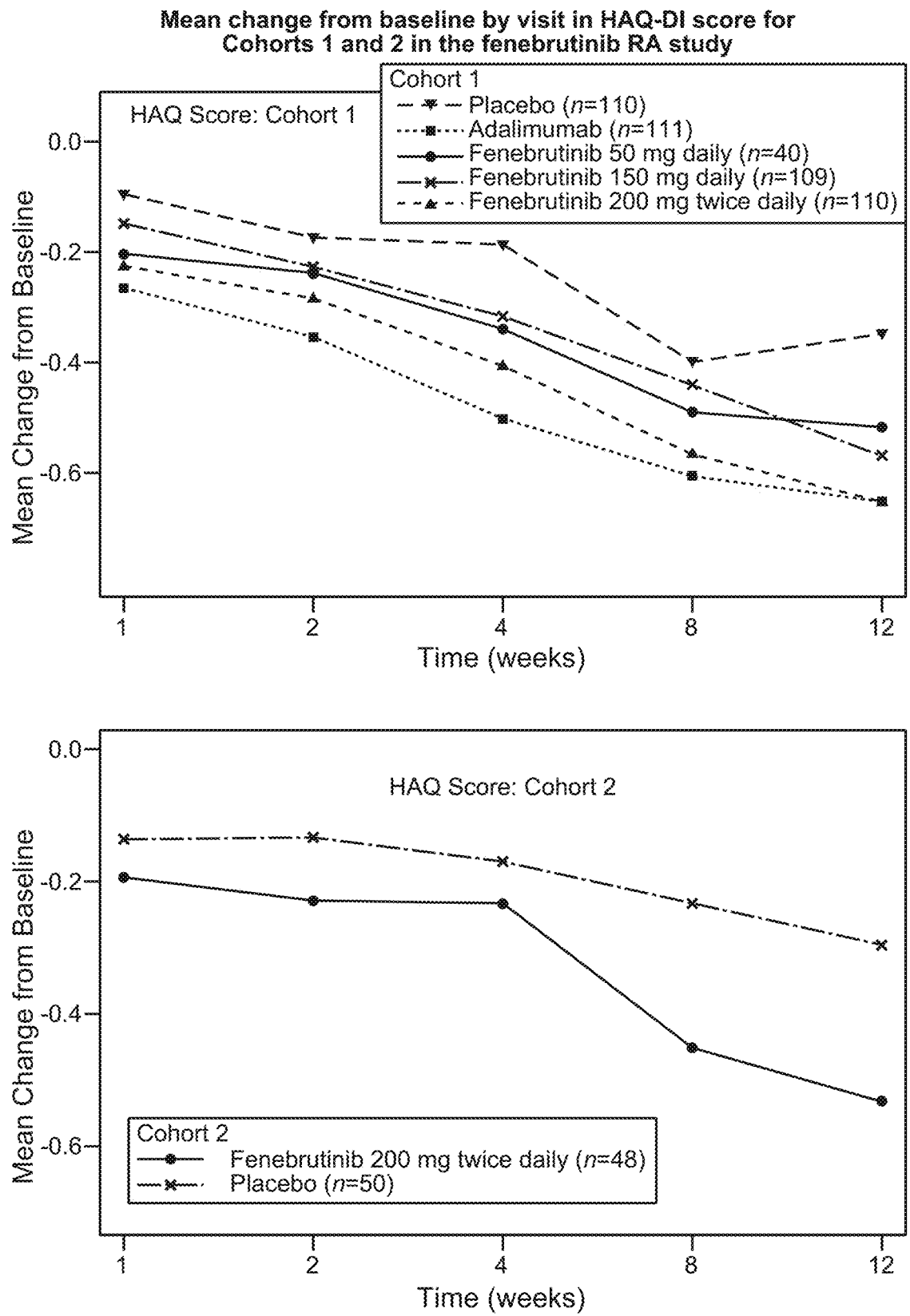

This next question asks you to estimate the size of your largest hive in centimeters (cm). Please use the ruler that you have been provided with to make this measurement. If your largest hive is located on your back or in a place that is hard to reach, please have someone else take this measurement for you. When measuring the largest hive size, please do not measure a group of hives as one hive.
Largest Hive (size)
0 = none
1 = less than 1.25 centimeter (cm)
2 = between 1.25 centimeter (cm) and 2.5 centimeters (cm)
3 = greater than 2.5 centimeters (cm)
These next questions are about your symptoms and how you managed them during the past 24 hours.
5. During the past 24 hours, did you use loratadine or cetirizine in order to control symptoms of your skin condition such as itch or hives?
0 = No
1 = Yes
6a. During the past 24 hours, did you have any rapid swelling on your face, (especially your eyelids or lips), inside your mouth (including your throat or tongue), or elsewhere on your body? This rapid swelling, also called angioedema, is at a deeper level under your skin than hives.
0 = No (GO TO Question 7) 1 = Yes hours. This could include work, school, sports, hobbies, and activities with friends and family.
0 No interference
1 Mild, little interference with daily activities
2 Moderate, some interference with daily activities
3 Substantial, severe interference with daily activities 6b. If Yes, how did you treat this rapid swelling? (Circle all that apply.)
0 Did nothing (GO TO Question 7)
1 Took some prescription or non-prescription medication
2 Called my doctor, nurse or nurse practitioner
3 Went to see my doctor, nurse, or nurse practitioner
4 Went to the emergency room at the hospital
5 Was hospitalized
7. During the past 24 hours, did you or someone else call your doctor, nurse or nurse practitioner because of your skin condition?
0 = No  1 = Yes Results Cohort 1: fenebrutinib treatment resulted in early activity (200 mg BID) starting at Week 1, which was maintained through Week 8. See FIG. 20. The secondary endpoint of UAS7 at Week 4 was met. The primary endpoint of UAS7 at Week 8 was not met, due to a surprisingly high placebo response. See Table 10 and FIG. 20.

64% of fenebrutinib patients were well-controlled at Week 4 (% treatment difference over placebo: 48.6%, p=0.005). 65% of fenebrutinib patients were well-controlled at Week 8 (% treatment difference over placebo: 31.9%, p=0.093).

Patients experienced an improvement in weekly itch severity and weekly hive scores at Week 4 and Week 8. See Table 11 and Table 12.

TABLE 10

CSU Cohort 1 Results at Weeks 4 and 8 in UAS7

| Efficacy Endpoint | Placebo (N = 13) | GDC-0853 200 mg BID (N = 28) |
|---|---|---|
| UAS7 - Change from BL to Week 4 | | |
| N | 13 | 25 |
| Mean (SD) | −9.7 (10.7) | −21.1 (11.3) |
| Median | −7.5 | −22.5 |
| Range | −36, 7 | −38, 3 |
| Treatment difference in LS means, 90% CI, p-value | −12.5 (−18.9, −6.1) 0.002 | |
| UAS7 - Change from BL to Week 8 | | |
| N | 12 | 23 |
| Mean (SD) | −19.0 (12.5) | −21.6 (11.8) |
| Median | −16.8 | −23.0 |
| Range | −42, 3 | −42, 10.7 |
| Treatment difference in LS means, 90% CI, p-value | −4.3 (−11.3, 2.7) 0.305 | |

TABLE 11

CSU Cohort 1 Results at Weeks 4 and 8, Weekly Itch Severity

| Efficacy Endpoint | Placebo (N = 13) | GDC-0853 200 mg BID (N = 28) |
|---|---|---|
| Weekly Itch Severity - Change from BL to Week 4 | | |
| N | 13 | 25 |
| Mean (SD) | −5.0 (6.0) | −9.5 (5.4) |
| Median | −4.5 | −9.0 |
| Range | −18.5, 5.5 | −19, 1.5 |
| Treatment difference in LS means, 90% CI, p-value | −5.5 (−8.5, −2.6) 0.003 | |
| Weekly Itch Severity - Change from BL to Week 8 | | |
| N | 12 | 23 |
| Mean (SD) | −9.0 (5.7) | −9.4 (5.6) |
| Median | −8.3 | −9.0 |
| Range | −21, 0 | −21, 1 |
| Treatment difference in LS means, 90% CI, p-value | −1.3 (−4.5, 1.8) 0.479 | |

TABLE 12

CSU Cohort 1 Results at Weeks 4 and 8, Weekly Hive Score

| Efficacy Endpoint | Placebo (N = 13) | GDC-0853 200 mg BID (N = 28) |
|---|---|---|
| Weekly Hive Score - Change from BL to Week 4 | | |
| N | 13 | 25 |
| Mean (SD) | −4.7 (5.9) | −11.6 (6.8) |
| Median | −3.0 | −14.0 |
| Range | −17.5, 1.5 | −21, 1.5 |
| Treatment difference in LS means, 90% CI, p-value | −7.5 (−11.2, −3.7) 0.002 | |

TABLE 12-continued

CSU Cohort 1 Results at Weeks 4 and 8, Weekly Hive Score

| Efficacy Endpoint | Placebo (N = 13) | GDC-0853 200 mg BID (N = 28) |
|---|---|---|
| Weekly Hive Score - Change from BL to Week 8 | | |
| N | 12 | 23 |
| Mean (SD) | −10.0 (7.7) | −12.2 (7.1) |
| Median | −8.7 | −14.0 |
| Range | −21, 0 | −21, 9.7 |
| Treatment difference in LS means, 90% CI, p-value | −2.8 (−6.9, 1.4) 0.269 | |

Figure 33:
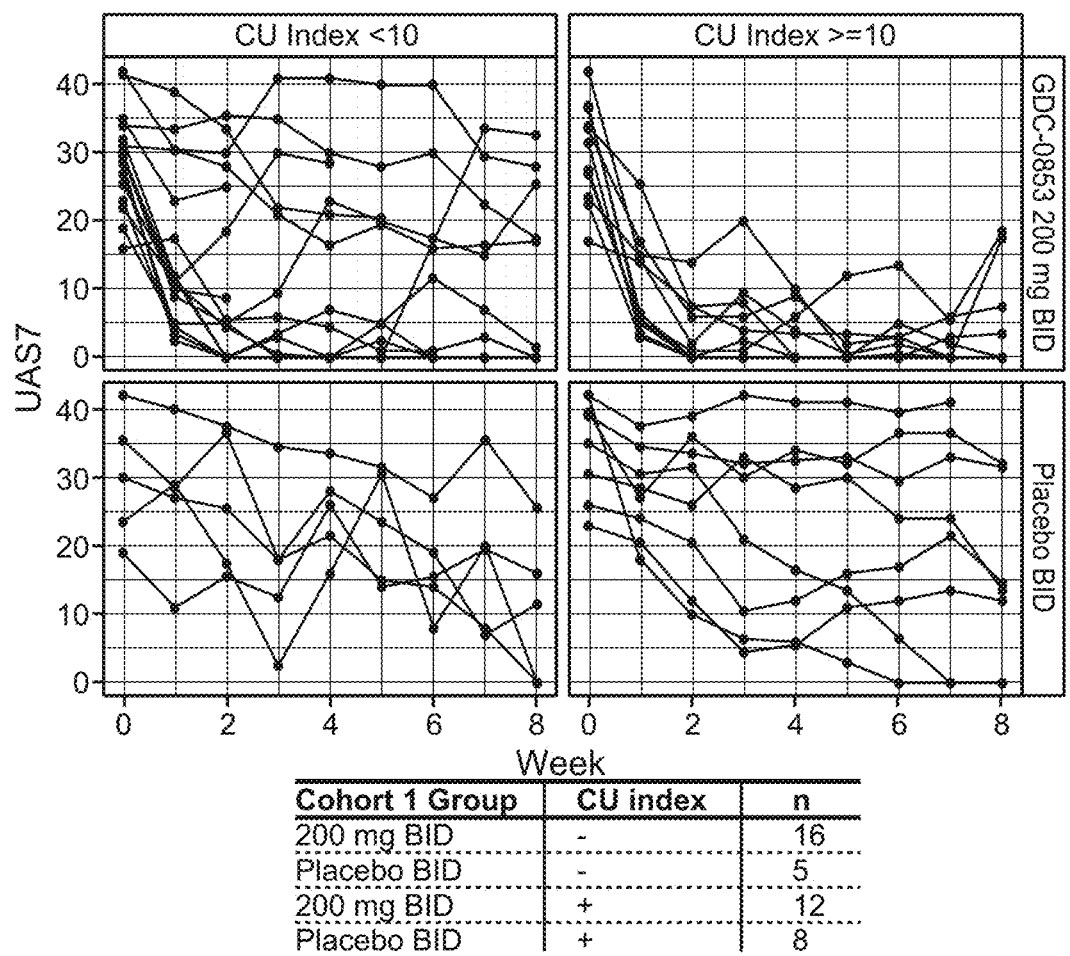
FIG. 33 shows plots of UAS7 scores over time for subjects in Cohort 1 of the CSU study of Example 2, separated by those who tested positive for the CU Index (CUI) or negative for the CUI.
Figure 34:
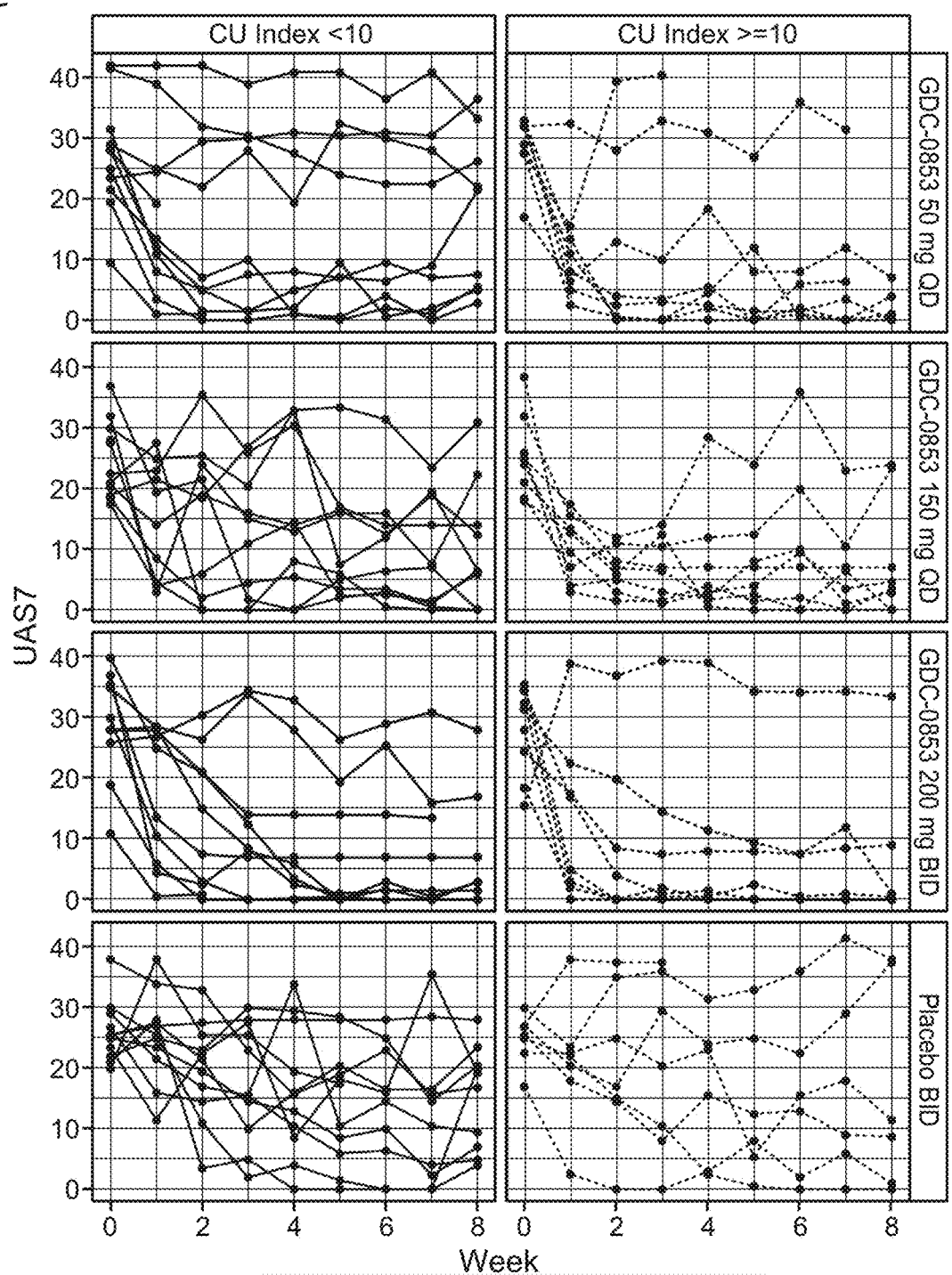
FIG. 34 shows plots of UAS7 scores over time for subjects in Cohort 2 of the CSU study of Example 2, separated by those who tested positive for the CUI or negative for the CUI. UAS7 MID=9.5-10.5.
Figures 35, 36:
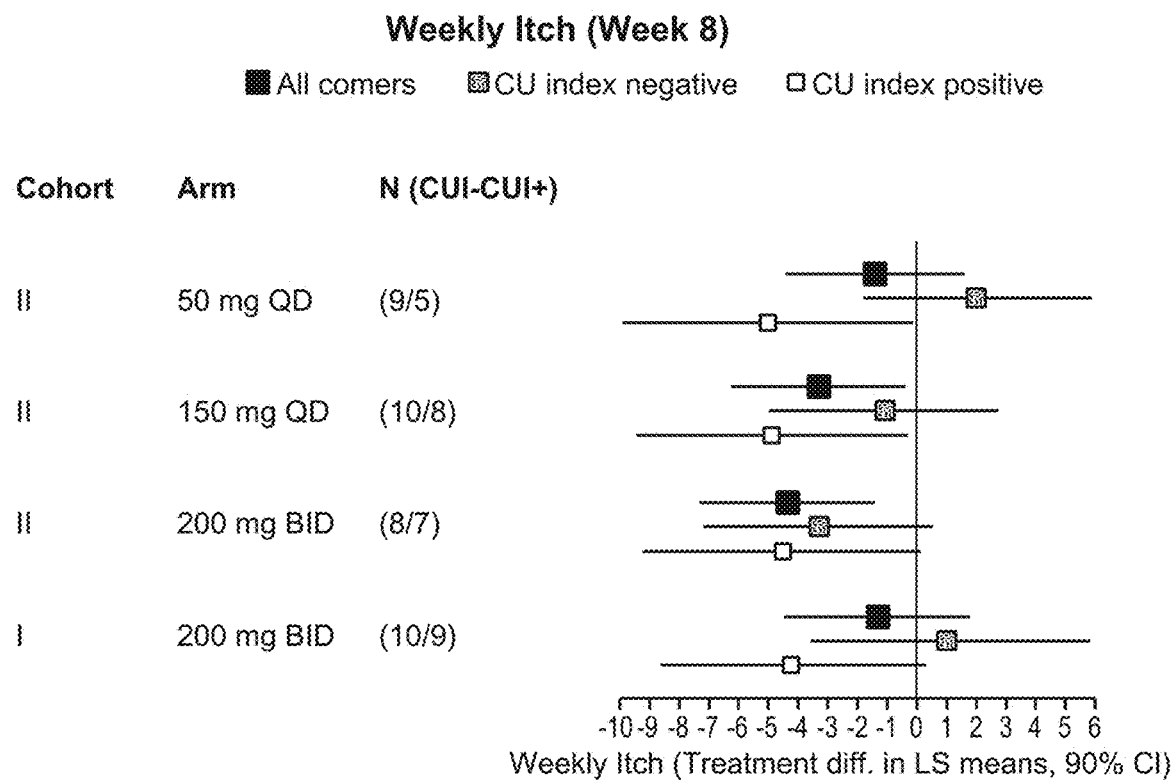
FIG. 35 is a plot of weekly itch at week 8 for both Cohorts of the CSU study of Example 2. Shown is the treatment difference in LS means for all comers in both cohorts, as well as broken down by the CUI negative group and CUI positive group.
FIG. 36 is a summary of UAS7 scores at week 8 both Cohorts of the CSU study of Example 2, as values for all comers in both Cohorts, as well as broken down by the CUI negative group (<10) and CUI positive group (>/=10).

As shown by FIG. 33 summarizing UAS7 scores over time in CU index positive and negative patients, the greatest efficacy in Cohort 1 was observed in patients administered fenebrutinib who also tested positive for the CU index (sample size based on week 8, summarized below graphs). The results in Cohort 2 were consistent with this observation, as shown in FIG. 34. Each treatment group of Cohort 2, there was greater efficacy (as evaluated by UAS7 scores) in CU index positive patients compared to CU index negative patients (UAS7 MID=9.5-10.5; sample size based on week 4, summarized below graphs). FIG. 35 summarizes the Week 8 weekly itch scores (as treatment difference in LS means) for each treatment group of Cohort 1 and Cohort 2, as both all comers and broken down between CU index positive and CU index negative patients. Administration of fenebrutinib reduced weekly itch scores in each group, as illustrated by the all comers data, but was particularly effective at all doses in patients who tested positive on the CU index. The 50 mg arm showed greatest efficacy difference between CU index positive and CU index negative patients at week 8. The week 8 UAS7 data for each treatment group of both Cohorts is summarized in FIG. 36, again as all comers and also CU index negative (<10) and CU index positive (>/=10) groups (as treatment effect in LS means, 90% CI).

Figure 37:
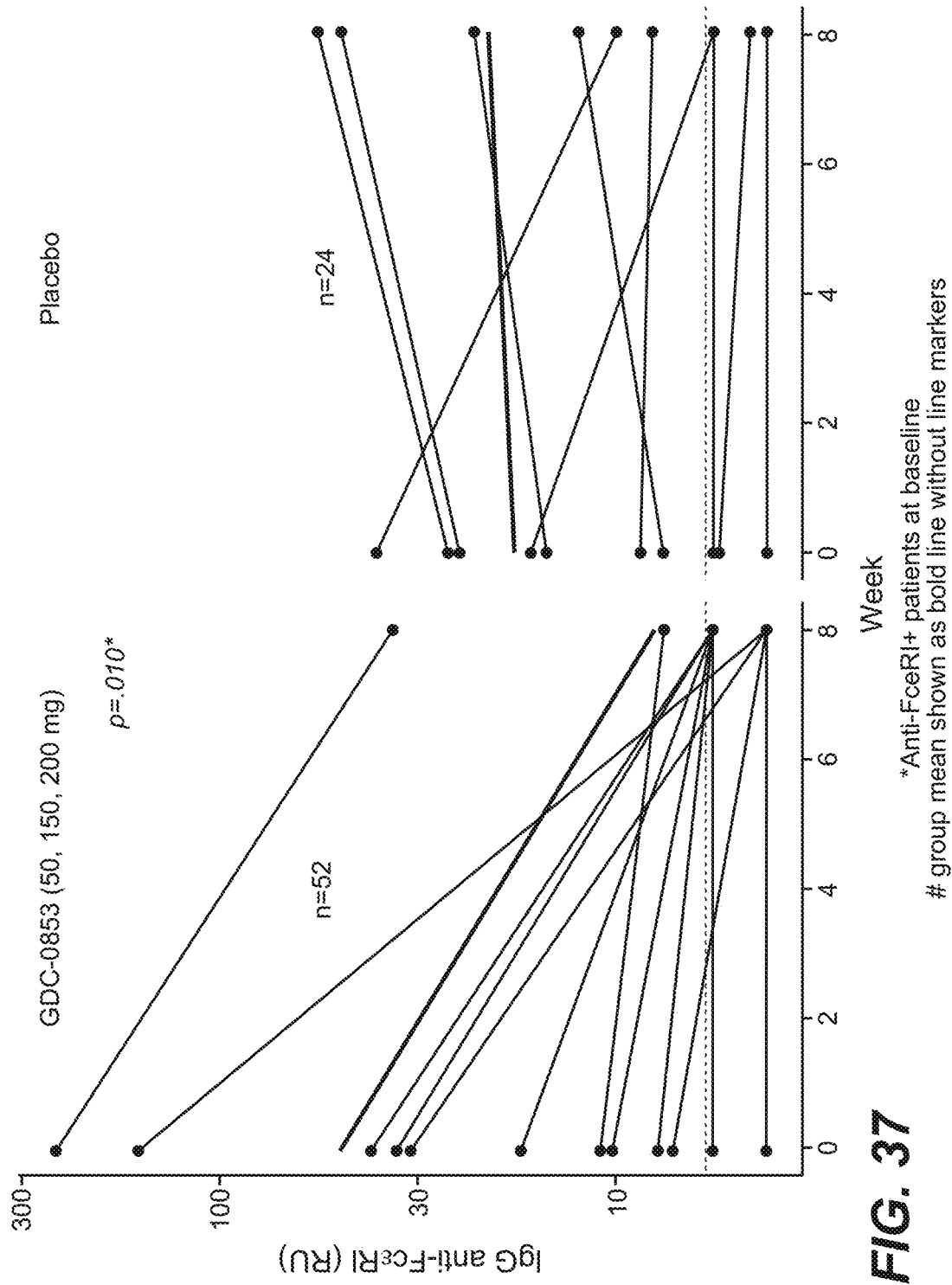
FIG. 37 is a plot of the level of IgG anti-FcERI autoantibodies in subjects of both Cohort 1 and 2 of the CSU study of Example 2, separated by those receiving fenebrutinib (left) and those receiving placebo (right), from week 0 to 8.
Figure 38:
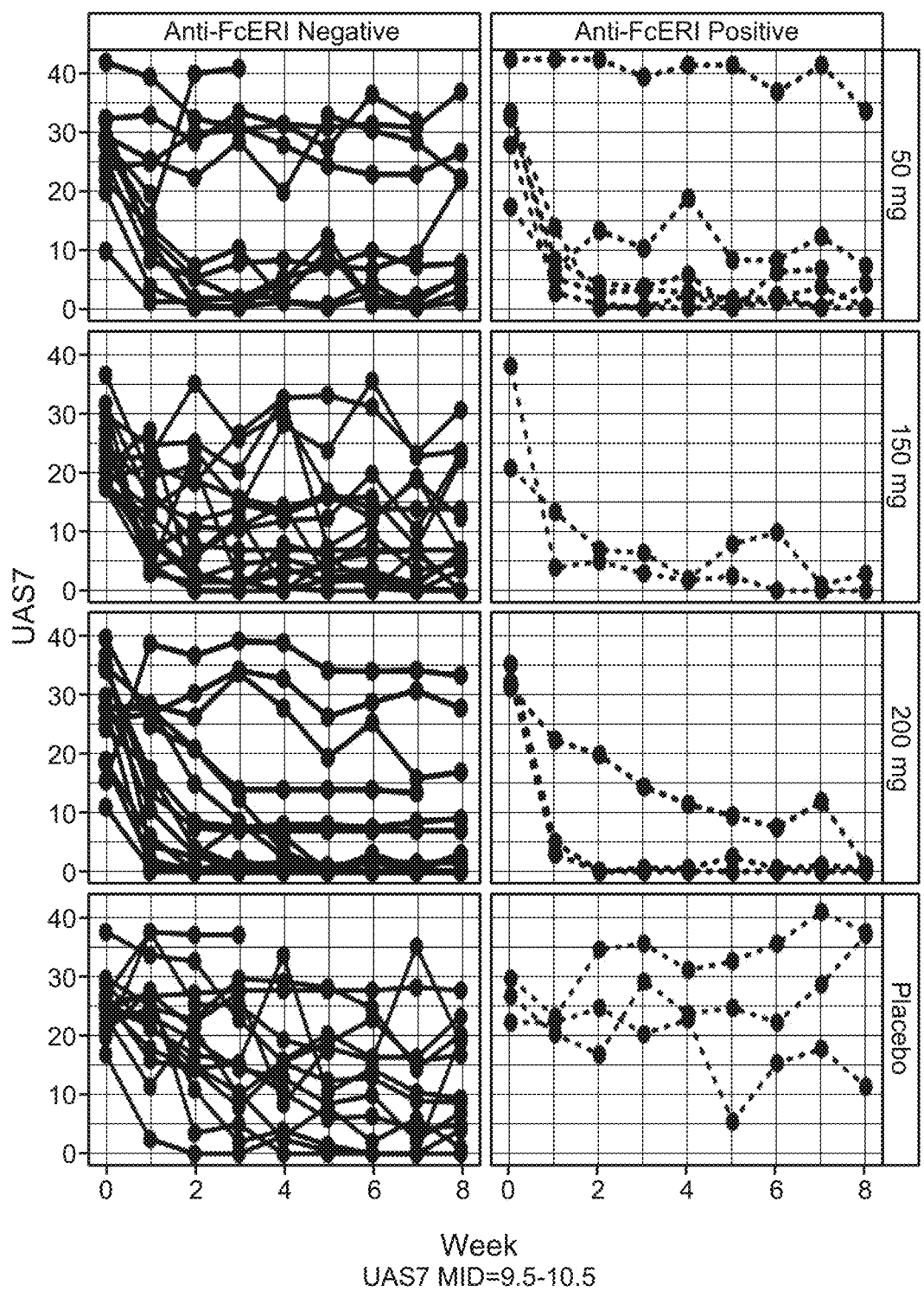
FIG. 38 shows plots of UAS7 scores from week 0 to 8 in individuals of Cohort 2 of the CSU study of Example 2, separated by those who tested positive for anti-FcERI autoantibodies (right) and those who tested negative for anti-FcERI autoantibodies (left). UAS7 MID=9.5-10.5.

Some patient samples were also evaluated specifically for IgG anti-FcERI autoantibodies, and the level of those autoantibodies over time in fenebrutinib-administered patients compared to placebo-administered patients is shown in FIG. 37. Serum samples were collected at 0 and 8 weeks from patients receiving fenebrutinib (left) versus placebo (right), with samples sizes for each group shown. Prior to direct FcERI immunoassay, samples were split and pre-incubated with equimolar concentrations of rhFcERI or an unrelated control protein. Reactivity levels were determined relative to a mouse monoclonal antibody standard. IgG anti-FcERI was defined as the difference in reactivity between the split samples, and is shown in relative units (RU). The bold lines without markers represent the average of patients who were anti-FcERI positive at baseline. The dotted line represents the mean+3 standard deviations of healthy volunteer samples. Some sample lines for IgG anti-FcERI negative patients overlap at the lower end of the assay range. Administration of fenebrutinib resulted in significant reduction in IgG anti-FcERI autoantibodies. Without wishing to be bound by any theory, it is thought that anti-FcERI may be a driver of positive CU index test results, and are associated with refractory CSU. As shown in FIG. 38, patients who were positive for anti-FcERI autoantibodies generally showed greater reduction in UAS7 over time when administered fenebrutinib at any dose in Cohort 2, compared to patients who were negative for anti-FcERI autoantibodies.

Example 3

A Phase II, Randomized, Double-Blind, Placebo-Controlled Study of the Safety and Efficacy of Fenebrutinib in Patients with Moderate to Severe Active Systemic Lupus Erythematosus This study was designed to evaluate the efficacy and safety of fenebrutinib in combination with standard-of-care (SOC) therapy compared with placebo in patients with moderate to severe active SLE. This study enrolled 260 patients from 44 sites in 12 countries. Specific objectives and corresponding endpoints for the study are outlined below.

Study Objectives

The primary efficacy objective of this study was to evaluate the efficacy of fenebrutinib at three dose levels compared with placebo used in combination with SOC in patients with moderate to severe active SLE as measured by SRI-4 response at Week 48.

The secondary efficacy objectives of this study were the following:
  To evaluate the clinical efficacy of fenebrutinib over time using the SRI-4 as a standardized disease activity measure:
    SRI-4 response at Week 48 with a sustained reduction of oral corticosteroid (OCS) dose to <10 mg/day and ≤Day 1 dose during Week 36 through Week 48
    SRI-4 response at Week 24 with a sustained reduction of OCS dose to <10 mg/day and ≤Day 1 dose during Week 12 through Week 24
    SRI-4 response at Week 24
  To evaluate if patients with high plasmablast signature levels have an enhanced clinical response to fenebrutinib relative to patients with low levels:
    SRI-4 response at Week 48
    SRI-4 response at Week 48 with a sustained reduction of OCS dose to <10 mg/day and ≤Day 1 dose during Week 36 through Week 48
  To evaluate the clinical efficacy of fenebrutinib over time using BILAG-based Composite Lupus Assessment (BICLA) and SRI-6 as standardized disease activity measures:
    SRI-6 response at Weeks 24 and 48
    BICLA response at Weeks 24 and 48

The exploratory efficacy objectives of this study were to evaluate the clinical efficacy of fenebrutinib over time with multiple standardized disease activity measures:
  SRI-5, 7, and 8 response at Week 48
  SRI-5-8 response at Week 48 with a sustained reduction of OCS dose to <10 mg/day and ≤Day 1 dose during Week 36 through Week 48.
  SRI-5, 7, and 8 response at Week 24.
  SRI-5-8 response at Week 24 with a sustained reduction of OCS dose to <10 mg/day and ≤Day 1 dose during Week 12 through Week 24

Additional exploratory efficacy objectives of this study were as follows:
  To evaluate the ability of fenebrutinib to prolong the time to first SLE flare
  To evaluate the ability of fenebrutinib to decrease the number of total SLE flares
  To evaluate the clinical efficacy of fenebrutinib over time based on the individual components of the SRI To evaluate if patients with high plasmablast signature levels have an enhanced clinical response to fenebrutinib relative to patients with low levels To evaluate the ability of fenebrutinib to improve cutaneous manifestations of SLE To evaluate the ability of fenebrutinib to prevent systemic damage To evaluate the ability of fenebrutinib to improve arthritis To evaluate the ability of fenebrutinib to improve fatigue To evaluate the ability of fenebrutinib to improve Patient's Global Assessment To evaluate if fenebrutinib is steroid sparing.

The safety objective for this study was to evaluate the safety of fenebrutinib given in combination with SOC in patients with moderate to severe active SLE.

The pharmacokinetic objective for this study is to characterize the pharmacokinetics of fenebrutinib in patients. Exploratory PK objectives included the relationship between measures of drug exposure and pharmacodynamic effect(s), efficacy, and safety of fenebrutinib; the impact of selected covariates on measures of fenebrutinib exposure and/or response; and the impact of genetic polymorphisms on measures of fenebrutinib exposure.

The exploratory biomarker objectives for this study were the following:

To evaluate the effect of fenebrutinib induced changes in biomarkers and efficacy.

To evaluate whether biomarkers, including plasmablasts, autoantibodies and other inflammatory biomarkers, measured as baseline may identify patients with enhanced clinical response to fenebrutinib.

To evaluate whether levels of the above biomarkers associate with disease progression.

Study Design

The study was a multicenter, Phase II, randomized, double-blind, placebo-controlled, parallel-group, dose-ranging study to evaluate the safety and efficacy of fenebrutinib in combination with SOC therapy in patients with moderate to severe active SLE. Moderate to severe SLE was defined at screening and baseline (i.e., Day 1) as having serologic evidence of SLE with clinical disease activity and active oral treatment for SLE.

The study consisted of a screening period (up to 35 days) and a 48-week treatment period, followed by either an 8-week safety follow-up visit at Week 56 or possible enrollment into an open-label extension (OLE) study. Approximately 240 patients, meeting all eligibility criteria, were randomized in a 1:1:1 ratio to one of the following 3 arms:

Arm A: GDC-0853 200 mg twice daily (BID)
Arm B: GDC-0853 150 mg once daily (QD)
Arm C: placebo All 3 arms received blinded study drug in combination with background SOC therapy. Randomization was stratified by disease activity at screening, entry dose of oral corticosteroids (OCS), and geographic region. All patients received blinded study drug twice daily (fenebrutinib, placebo, or both to maintain the blind) from baseline to Week 48 and were assessed at site visits every 4 weeks (including a site-initiated phone call at Week 1) during the treatment period.

Background SOC therapy may consist of an OCS (which must be stable for 2 weeks prior to screening, dose not to exceed 40 mg/day of prednisone or equivalent) and/or certain oral immunosuppression regimens (which must be stable for 2 months prior to screening). All immunosuppressive and anti-malarial medication w kept stable throughout the trial unless dose reductions are necessary due to toxicity.

All patients receiving immunosuppressive treatments were also encouraged to be on supportive therapy (e.g., folic acid, calcium, vitamin D). For patients on angiotensin converting enzyme (ACE) inhibitors or angiotensin receptor blockers (ARBs) at study entry, doses of ACE inhibitors or ARBs should be kept stable for at least 10 days prior to randomization and throughout the trial whenever possible.

For patients on an OCS at baseline, there are two, 12-week, OCS taper windows available to achieve the pre-specified OCS taper of <10 mg/day prednisone or equivalent. The dose at the end of each OCS-stability window (i.e., the 12-week period immediately following the 12-week OCS taper window) will then be kept stable for an additional 12 weeks.

In the case of increased SLE disease activity, there can be two temporary increases in the corticosteroid dose, called "bursts," that may be administered if needed. A burst may only be administered during a burst window (defined as the first 10 weeks of each OCS taper window) and only once per window. A burst is defined as a temporary increase in corticosteroid dose (up to 40 mg/d prednisone or equivalent for Burst Window 1, and up to 20 mg/d prednisone or equivalent for Burst Window 2) with a taper back down to the dose immediately preceding the burst, all within a 2-week period.

If additional treatment is needed beyond the permitted burst therapy because of active SLE, as identified by the investigator, the patient may receive escape therapy; however, such patients will be considered trial-defined non-responders for the purposes of the primary analysis. During taper, burst, and permitted escape therapies, patients will continue to receive their designated dose of study treatment. Starting at the screening period, all patients must record their actual OCS use weekly, as instructed by study staff.

An unblinded IMC and Scientific Oversight Committee is used to monitor multiple safety assessments. In addition, an interim analysis is conducted after 50-80 patients in each treatment arm have completed 24 weeks of treatment and have been evaluated for SLE Responder Index (SRI)-4 response, in order to conduct a preliminary assessment of the benefit-risk profile of fenebrutinib and potentially enable early stopping for futility and/or safety issues.

Patient inclusion and exclusion criteria are described as follows. Patients must meet the following criteria for study entry:

Signed Informed Consent Form, Age 18-75 years, inclusive and able to comply with the study protocol Fulfillment of SLE classification criteria according to either the current American College of Rheumatology (ACR) or Systemic Lupus International Collaborating Clinics (SLICC) criteria at any time prior to or at screening.

At least one serologic marker of SLE at screening as follows: Positive antinuclear antibody, (ANA) test by immunofluorescent assay with titer ≥1:80; OR Positive anti-double-stranded DNA (anti-dsDNA) antibodies; OR Positive anti-Smith antibody At both screening and Day 1, moderate to severe active SLE, defined as meeting all of the following unless indicated otherwise:

i. SLEDAI-2K score ≥8 (at screening only) with clinical SLEDAI-2K score ≥4.0 (at both screening and Day 1);

ii. Physician's Global Assessment ≥1.0 (out of 3); and iii. Currently receiving at least one standard oral treatment (e.g., corticosteroids, anti-malarials, and/or immunosuppressants) for SLE within the dose ranges, as specified below:
  If on an OCS, the dose must be≤40 mg/day prednisone (or equivalent) and must have been stable for at least 2 weeks prior to screening as well as during screening
  If on anti-malarial or immunosuppressant therapies, may only be receiving medications from the following list within the specified dose range; dose and route of administration must be stable for 8 weeks prior to screening as well as during screening:
    Azathioprine: 1 to 2.5 mg/kg/day
    Methotrexate: 7.5 to 25 mg/week
    Mycophenolate mofetil: 500 to 3000 mg/day
    Mycophenolic sodium: 360 to 2160 mg/day
    Hydroxychloroquine: 200 to 400 mg/day
    Chloroquine: 100 to 250 mg/day
    Quinacrine: 100 to 200 mg/day
  For women of childbearing potential: agreement to remain abstinent (refrain from heterosexual intercourse) or use contraceptive methods that result in a failure rate of <1% per year during the study treatment period and for a minimum of 60 days after the last dose of study drug or longer as required by local requirements for other standard of care medications. Women using estrogen-containing hormonal contraceptives as a method of contraception must also use a barrier.
  For men: agreement to remain abstinent (refrain from heterosexual intercourse) or use contraceptive measures, and agreement to refrain from donating sperm Patients who met the following criteria were excluded from study entry:
  Proteinuria >3.5 g/24 h or equivalent using urine protein-to-creatinine ratio (uPCR) in a first morning void urine sample
  Active proliferative lupus nephritis (as assessed by the investigator) or histological evidence of active Class III or Class IV lupus nephritis on renal biopsy performed in the 6 months prior to screening (or during the screening period)
  History of having required hemodialysis or high dose corticosteroids (>100 mg/d prednisone or equivalent) for the management of lupus renal disease within 90 days of Day 1
  Neuropsychiatric or central nervous system lupus manifestations, including but not limited to: seizure, psychosis, or acute confusional state within 52 weeks of screening
  Serum creatinine >2.5 mg/dL, or estimated glomerular-filtration rate (based on the 4-variable Modification of Diet in Renal Disease equation)<30 mL/min or on chronic renal replacement therapy
  History of receiving a solid organ transplant
  Newly diagnosed (within the last 24 weeks) transverse myelitis
  History of anti-phospholipid antibody syndrome (APLS) with or without associated consumptive coagulopathy at any time; presence of anti-phospholipid antibodies or a history of fetal loss, but without a history of thromboembolism or current requirement for anti-coagulation, are not exclusionary.
  Evidence of active, latent, or inadequately treated infection with *Mycobacterium tuberculosis* (TB) as follows:
    A positive QuantiFERON TB-Gold® (QFT) performed at screening visit. If QFT unavailable, a Mantoux purified protein derivative (PPD) skin test as defined by the Centers for Disease Control and Prevention (CDC) guidelines, performed at the screening visit or within the 12 weeks prior to screening and read locally
  Women who are pregnant or nursing (breastfeeding; within the last 12 weeks), or women intending to become pregnant, donate eggs or breast milk, or participate in in vitro fertilization during the study
  Significant and uncontrolled medical disease within the 12 weeks prior to screening in any organ system (e.g., cardiac, neurologic, pulmonary, renal, hepatic, endocrine [including uncontrolled diabetes mellitus], metabolic, GI, or psychiatric [including suicidality]) not related to SLE, which, in the investigator's or Sponsor's opinion, would preclude patient participation
  Concomitant chronic conditions, in addition to SLE, (e.g., asthma, Crohn's disease) that required oral, IV, or intramuscular (IM) steroids or immunosuppressive use in the 24 weeks prior to screening or are likely to require these during the course of the study
  History of non-gallstone-related pancreatitis or chronic pancreatitis that is judged to be clinically significant, in the opinion of the investigator (e.g., accompanied by upper abdominal pain or malabsorptive diarrhea)· Evidence of autoimmune myositis
  History of cancer, including hematological malignancy and solid tumors, within 10 years of screening; basal or squamous cell carcinoma of the skin that has been excised and is considered cured and in situ carcinoma of the cervix adequately treated by curative therapy more than 1 year prior to screening are not exclusionary
  History of alcohol, drug, or chemical abuse within the 1 year prior to screening as determined by the investigator
  Major surgery requiring hospitalization within 4 weeks of screening
  History of cerebrovascular accident (CVA) within 10 years or any history of hemorrhagic CVA, any history of spontaneous intracranial hemorrhage or a history of traumatic intracranial hemorrhage within 10 years
  History of clinically uncontrolled cardiac arrhythmias
  Screening 12-lead ECG that demonstrates clinically relevant abnormalities that may affect patient safety or interpretation of study results, including
    QT interval corrected using Fridericia's formula (QTcF)>450 msec for female patients and >430 msec for male patients demonstrated by at least two ECGs >30 minutes apart
  History of clinically significant ventricular dysrhythmias or risk factors for ventricular dysrhythmias such as long QT syndrome or other genetic risk factors, heart disease, or family history of sudden unexplained death or cardiac ion channel mutations
  Current treatment with medications that are well known to prolong the QT interval (except for anti-malarials) at doses that have a clinically meaningful effect on QT, as determined by the investigator
  Any condition possibly affecting oral drug absorption (e.g., gastrectomy, clinically significant diabetic gastroenteropathy, or certain types of bariatric surgery such as gastric bypass); procedures, such as gastric banding, that simply divide the stomach into separate chambers are not exclusionary Need for systemic anticoagulation with warfarin, or other oral or injectable anticoagulants (other than NSAIDs, aspirin (≤325 mg/day), or other salicylates)·

Known bleeding diathesis

Any history of hospitalization or transfusion for a GI bleed

History of or currently active primary or secondary immunodeficiency, including known history of HIV infection or IgG<500 mg/dL Any known active infection during screening up to and including at the time of enrollment (with the exception of fungal nail infections or oral herpes)

History of treated recurrent bacterial, viral, mycobacterial, or fungal infections, defined as >2 similar episodes requiring anti-microbial treatment within the past 52 weeks, with the exception of the following:

Oral or genital herpes (herpes simplex virus 1/herpes simplex virus 2)

Uncomplicated cystitis or asymptomatic bacteriuria

Uncomplicated viral, bacterial or culture-negative bronchitis without pneumonia

Bacterial or viral sinusitis

Bacterial or fungal (yeast) vaginal infections

Any history of opportunistic infections that, in the Investigator's or Sponsor's judgment, would raise safety concerns regarding the patient's participation in the study Any major episode of infection requiring hospitalization or treatment with IV or IM antimicrobials within 4 weeks prior to or during screening or treatment with oral antimicrobials within 2 weeks prior to and during screening (with the exception of prophylaxis for *Pneumocystis* jiroveci pneumonia)

History of severe and/or disseminated viral infections, particularly herpes viruses, such as HSV1, HSV2, varicella zoster virus (VZV), cytomegalovirus; uncomplicated influenza during a flu season, herpes labialis, and genital herpes are not exclusionary Evidence of chronic and/or active hepatitis B or C.

Received any of the following medications and/or treatments within the indicated period of time:

Plasmapheresis or IV Ig in the last 12 weeks prior to screening

B cell-depleting therapy (e.g., anti-CD20 or anti-CD19) within 24 weeks prior to screening Belimumab, blisibimod, tabalumab (or other anti-B-cell activating factor [BAFF] agents), atacicept (or other anti-transmembrane activator and calcium-modulator and cyclophilin ligand [CAML] interactor [TACI] agents), epratuzumab (or other anti-CD22 agents), or denosumab within 5 half-lives or 12 weeks (whichever is longer) prior to screening Cyclophosphamide or other alkylating agents within 12 weeks prior to screening Oral cyclosporine, tacrolimus, topical calcineurin inhibitors, anakinra (inhibitor IL-1), sirolimus (inhibitor IL-2), or other calcineurin inhibitors within 4 weeks prior to screening Thalidomide or thalidomide derivatives within 24 weeks prior to screening Tumor necrosis factor (TNF)-antagonists, tocilizumab, or other biologics not previously mentioned above within 12 weeks prior to screening Any investigational drug within 4 weeks or 5 half-lives, whichever is longer, of screening Any parenteral (IV), IM, or intra-articular steroid administration within 4 weeks prior to screening Any other immunosuppressive medication for SLE not listed in the inclusion criteria, within 12 weeks or 5 half-lives prior to screening, whichever is longer, unless approved by the Medical Monitor Live vaccines within 6 weeks prior to randomization; seasonal influenza and H1N1 vaccination are permitted if the inactivated vaccine formulation is administered Use of any of the medications, herbal supplements, or foods in the categories below should be avoided within 1 week or 5 half-lives, whichever is longer, prior to randomization, on the basis of possible drug interactions (CYP3A inhibitors/inducers).

Any of the following laboratory results, for which testing may be repeated once if the initial results are out of range during screening:

AST or ALT>1.5×ULN

Total bilirubin >1.2 ULN

Amylase or lipase >2×ULN

Hemoglobin <7 g/dL

Absolute neutrophil count (ANC)<1.5×10$^9$/L

Absolute lymphocyte count (ALC)<0.5×10$^9$/L

Platelet count <50,000/μL

Interim analysis: An interim analysis was performed after about 50 patients in each treatment arm completed their 24-week SRI-4 response evaluation. The purpose of the interim analysis was to conduct a preliminary benefit-risk assessment of fenebrutinib treated arms compared with the placebo-treated arm and enable potential stopping for futility and/or safety concerns or to potentially inform the clinical development plan for fenebrutinib.

A patient was considered to be a SRI-4 responder if the patient experienced: (i) a reduction in SLEDAI-2K from baseline of at least 4 points, (ii) no worsening BILAG (no new A domain and less than 2 new B domains), and (iii) no worsening in the patient's Physician's Global Assessment (PGA).

Interim Results: 57% of patients in the 200 mg BID fenebrutinib arm (28 patients) were SRI-4 responders at Week 24. 49% of patients in the 150 mg QD fenebrutinib arm (25 patients) were SRI-4 responders at Week 24. 46% of placebo patients (23 patients) were also SRI-4 responders at Week 24. These results demonstrated the efficacy of fenebrutinib in the treatment of SLE in this trial.

Fenebrutinib was safe and well tolerated at the interim analysis at each dose. Some patients in the 200 mg BID arm showed signs of ALT and AST elevations.

End of Study: The end of study is defined as the last patient, last safety follow-up visit in this protocol, last patient to discontinue from the study, or the last patient enrolled into an OLE, if initiated, whichever occurs latest. The maximum length of time on study for a patient is 61 weeks, including screening for up to 35 days, treatment for 48 weeks, and a safety follow-up period for 8 weeks (unless enrolled into an OLE study).

Biomarkers

The following biomarkers were explored according to the biomarker objectives provided above in the Study Objectives. In Table 13, biomarkers are measured at baseline and subsequent timepoints during and after treatment. One set of biomarkers evaluated is the plasmablast signature. Plasmablasts are rapidly dividing, short-lived antibody secreting cells. While they represent a small proportion of B cells in the blood, they are responsible for a majority of antibody transcripts found in whole blood mRNA. The plasmablast signature comprises the biomarkers IgJ, Mzbl, and Txndc5. The gene expression of IgJ, Mzbl, and Txndc5 may be measured, for example, a polypeptide expression by evaluating the level of mRNA for said gene in a patient's blood relative to a reference level.

TABLE 13

Proposed Biomarkers for Exploratory Research

| Sample Type | Proposed Biomarkers |
|---|---|
| Plasma | Markers including but not limited to: CCL3, CCL4 |
| Serum | Markers including but not limited to: CXCL13, CCL20, and autoantibodies |
| Whole blood for FACS | Cells including but not limited to basophils and plasmablasts |
| RNA extracted from blood | Markers including but not limited to the plasmablasts ignature |
| Blood for peripheral blood mononuclear cells for CyTOF analysis | Cells and surface or activation markers, including but not limited to B and T cell subsets |
| Blood for peripheral blood mononuclear cells lysate | Markers including but not limited to phosphorylated and total BTK protein |
| Urine | Urinary biomarkers including but not limited to CXCL13, TWEAK, BAFF and lipids |

Results: Efficacy and results at week 48 are summarized in Table 14. At week 48, the SRI-4 response rates for the 150 mg QD and 200 mg BID arms were 51% (95% CI: −8.5, 21.2) and 52% (95% CI: −7.3, 22.4), respectively, compared to 44% for the placebo arm. The week 48 BICLA response rates for FEN 150 mg QD and FEN 200 mg BID were 53% (95% CI: −3.4, 26.8) and 42% (95% CI: −14.2, 16.1), respectively, compared to 41% for the placebo arm.

TABLE 14

Efficacy and safety results

| | PBO (n = 86) | FEN 150 mg QD (n = 87) | FEN 200 mg BID (n = 87) |
|---|---|---|---|
| Primary Endpoint | | | |
| SRI-4 Response at W48 | | | |
| Responder, n (%) | 38 (44) | 44 (51) | 45 (52) |
| Treatment difference vs. PBO (%) | | 6.4 | 7.5 |
| 95% CI | | (−8.5, 21.2) | (−7.3, 22.4) |
| P-value | | 0.37 | 0.34 |
| Additional Efficacy Results | | | |
| SLEDA at W48[a] | | | |
| Reduction from baseline | | | |
| ≤4 points, n (%) | 62 (72) | 68 (78) | 70 (81) |
| Treatment difference vs. PBO (%) | | 6.1 | 8.4 |
| BILAG at W48[a] | | | |
| Change from baseline | | | |
| Absence of new A and >1 new B domains, n (%) | 83 (97) | 84 (97) | 84 (97) |
| Treatment difference vs. PBO (%) | | 0.0 | 0.0 |
| PGA at W48[a] | | | |
| Change from baseline | | | |
| ≥0.3 point increase, n (%) | 83 (97) | 82 (94) | 83 (95) |
| Treatment difference vs. PBO (%) | | −2.3 | −1.1 |
| BICLA Response at W48[b] | | | |
| Responder, n (%) | 33/80 (41) | 45/85 (53) | 35/83 (42) |
| Treatment difference vs. PBO (%) | | 11.7 | 0.9 |
| 95% CI | | (−3.4, 26.8) | (−14.2, 16.1) |

TABLE 14-continued

Efficacy and safety results

| | PBO (n = 86) | FEN 150 mg QD (n = 87) | FEN 200 mg BID (n = 87) |
|---|---|---|---|
| P-value | | 0.086 | 0.879 |
| Early Study Discontinuations, n (%) | 22 (26) | 21(24) | 22 (25) |
| Received Escape Therapy[c], n (%) | 8 (10) | 7 (8.2) | 10 (12) |
| Safety, n (%) | | | |
| Total number of patients with at least one | | | |
| AE | 64 (76) | 77 (89) | 68 (77) |
| Serious AE | 8 (10) | 4 (5) | 12 (14) |
| AE leading to death[d] | 2 (2) | 1 (1) | 0 |

[a]Note:
SLEDAI, BILAG, and PGA are presented with the last observation carried forward. Study discontinuations are accounted for in the SRI-4 Response but not in the SRI-4 Components.
[b]Based on the BICLA-Evaluable Population.
[c]Escape therapy defined as receipt of SLE medications exceeding limits in protocol.
[d]Deaths due to salivary gland tumor (150 mg QD); respiratory failure (PBO); infected skin ulcer (PBO).

Biomarker results are summarized in Table 15. Treatment with both doses of fenebrutinib significantly reduced levels of $CD19^+$ B cells, anti-dsDNA autoantibodies, IgG, and a BTK-dependent RNA signature highly expressed in plasmablasts by week 48 compared to placebo; C4 levels modestly improved with fenebrutinib versus placebo. These results indicate BTK target and pathway inhibition was achieved by oral administration of fenebrutinib.

TABLE 15

Summary of change in biomarkers from baseline to week 48.

| | PBO | FEN 150 mg QD | FEN 200 mg BID |
|---|---|---|---|
| Median Biomarker Levels at Baseline | | | |
| Plasmabast signature (−ΔCt) | 1.29 (n = 85) | 1.22 (n = 87) | 1.34 (n = 88) |
| $CD19^+$B cells (cells/μl) | 136 (n = 63) | 140 (n = 71) | 126 (n = 70) |
| Anti-dsDNA[#] (IU/ml) | 154 (n = 41) | 124 (n = 47) | 180 (n = 48) |
| Total IgG (g/L) | 14.1 (n = 85) | 14.3 (n = 86) | 15.0 (n = 87) |
| C3 (g/L) | 1.03 (n = 85) | 1.03 (n = 87) | 1.03 (n = 88) |
| C4 (g/L) | 0.18 (n = 85) | 0.17 (n = 87) | 0.16 (n = 88) |
| Median (IQR) Change from Baseline at Week 48 | | | |
| Plasmablast signature | −19.7% (−42.6 to 15.8) n = 52 | −54.3%* (−74.7 to −20.6) n = 53 | −51.7%* (−77.8 to −15.3) n = 57 |
| $CD19^+$B cells (cells/μl) | −0.50 (−38.3 to 28.8) n = 38 | −57.0* (−128.0 to −6.0) n = 49 | −57.5* (−121.0 to −24.8) n = 48 |
| Anti-dsDNA[#] (IU/ml) | +6.9 (−27.3 to 78.2) n = 31 | −38.3* (−91.7 to −3.9) n = 36 | −75.7* (−263.7 to −18.4) n = 33 |
| Total IgG (g/L) | −0.20 (−1.30 to 1.55) n = 65 | −1.25* (−2.63 to 0.05) n = 64 | −1.56* (−3.73 to −0.68) n = 64 |
| C3 (g/L) | −0.02 (−0.12 to 0.08) n = 65 | +0.01 (−0.12 to 0.12) n = 67 | −0.01 (−0.12 to 0.13) n = 66 |
| C4 (g/L) | 0.00 (−0.03 to 0.02) n = 65 | +0.02* (−0.01 to 0.05) n = 67 | +0.01* (−0.01 to 0.05) n = 66 |

Reference ranges: $CD19^+$B cells (80-616 cells/μl), Anti-dsDNA (<30 IU/ml), IgG (5.65-17.65 g/L), C3 (0.9-1.8 g/L), C4 (0.1-0.4 g/L)
[#]Patients who were positive at baseline (>30 IU/mL)
*Denotes significant versus PBO ; Kruskal-Wallis false-discovery rate controlled two sided (p-value <=0.05).

Although the present disclosure has been described in some detail by way of illustration and example for purposes of clarity of understanding, the descriptions and examples should not be construed as limiting the scope of the present disclosure. The disclosures of all patent and scientific literature cited herein are expressly incorporated in their entirety by reference.

What is claimed is:

1. A method of treating a human patient having moderately to severely active rheumatoid arthritis, the method comprising the administration of fenebrutinib, or a pharmaceutically acceptable salt thereof, at a dose of about 150 to about 400 mg daily, wherein the patient has demonstrated inadequate response to prior treatment with methotrexate.

2. The method of claim 1, wherein the fenebrutinib, or a pharmaceutically acceptable salt thereof, is administered in combination with one or more additional therapeutic agents.

3. The method of claim 1, wherein the patient has a reduction in one or more symptoms of rheumatoid arthritis after treatment with fenebrutinib, or a pharmaceutically acceptable salt thereof.

4. The method of claim 3, wherein the reduction in one or more symptoms of the patient is measured by at least a 50% reduction in the patient's American College of Rheumatology score (ACR50).

5. The method of claim 3, wherein the reduction in one or more symptoms of the patient is a reduction in the patient's DAS28 score.

6. The method of claim 1, wherein the dose is 150 mg of fenebrutinib per day.

7. The method of claim 6, wherein the dose is 150 mg of fenebrutinib per day, administered orally once per day.

8. The method of claim 1, wherein the dose is 400 mg of fenebrutinib per day.

9. The method of claim 8, wherein the dose is 400 mg of fenebrutinib per day, administered orally as 200 mg twice per day.

* * * * *